United States Patent
Bahrs et al.

(10) Patent No.: US 6,748,570 B1
(45) Date of Patent: Jun. 8, 2004

(54) SENDING A VIEW EVENT, AND A REQUEST EVENT HAVING A CLASS NAME AND A METHOD NAME

(75) Inventors: Peter C. Bahrs, Austin, TX (US); Raphael Poole Chancey, Austin, TX (US); Barry Alan Feigenbaum, Austin, TX (US); Manish Mahesh Modh, Round Rock, TX (US); Sean Michael Sundberg, Cedar Park, TX (US); John Allen Hubert Woolfrey, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,592

(22) Filed: Oct. 28, 1999

Related U.S. Application Data

(62) Division of application No. 09/366,404, filed on Aug. 3, 1999.

(51) Int. Cl.$^7$ .................................................. G06F 7/00
(52) U.S. Cl. ...................... 715/526; 345/764; 717/116; 717/118
(58) Field of Search .......................... 715/526; 345/749, 345/760, 764; 717/108, 116, 118

(56) References Cited

U.S. PATENT DOCUMENTS

| | | | |
|---|---|---|---|
| 4,649,473 A | 3/1987 | Hammer et al. ............. | 709/314 |
| 4,816,653 A | 3/1989 | Anderl et al. ................ | 235/380 |
| 5,233,686 A | 8/1993 | Rickenbach et al. ........ | 345/788 |
| 5,317,741 A | 5/1994 | Schwanke .................... | 717/120 |
| 5,317,746 A | 5/1994 | Watanabe .................... | 713/200 |
| 5,369,778 A | 11/1994 | San Soucie et al. .... | 707/103 R |
| 5,396,630 A | 3/1995 | Banda et al. ................ | 709/316 |
| 5,408,650 A | 4/1995 | Arsenault .................... | 717/124 |
| 5,408,659 A | 4/1995 | Cavendish et al. ......... | 717/107 |
| 5,438,676 A | 8/1995 | Schwanke .................... | 717/120 |
| 5,560,014 A | 9/1996 | Imamura ...................... | 717/108 |
| 5,566,330 A | 10/1996 | Sheffield ........................ | 707/4 |

(List continued on next page.)

OTHER PUBLICATIONS

"Mastering Java 2", Zukowski, J., hereinafter Zukowski, Sybex, Aug. 21, 1998, chapters 14, and 22.*

(List continued on next page.)

Primary Examiner—Stephen S. Hong
Assistant Examiner—Cesar B Paula
(74) Attorney, Agent, or Firm—Duke W. Yee; David A. Mims, Jr.; Lisa L.B. Yociss

(57) ABSTRACT

A method and apparatus for a data processing system for accessing classes and methods in an object oriented system. Responsive to receiving a selected user input to a container, a view event is sent from a view controller to an application mediator. The view event identifies an action taken to generate the selected user input. A request is selectively generated based on the view event, wherein the request event includes a major code identifying a class name as a destination and a minor code identifying a method name a function to be invoked. The request event is sent to a transporter. The transporter acts as a router to send the request event to an appropriate destination object from a plurality of destination objects. Responsive to receiving the request event at the transporter, the request event is sent to a destination object within a plurality of destination objects based in the class name. The destination object formats the request event into a form recognizable by the destination associated with the destination object. The destination may be located on a remote data processing system. The request event is used to access the class or method identified in the request event. The access may be, for example, an invocation of the method.

17 Claims, 119 Drawing Sheets

U.S. PATENT DOCUMENTS

| | | | |
|---|---|---|---|
| 5,634,124 A | 5/1997 | Khoyi et al. | 707/103 R |
| 5,675,755 A | 10/1997 | Trueblood | 345/791 |
| 5,704,029 A | 12/1997 | Wright, Jr. | 715/505 |
| 5,710,920 A | 1/1998 | Maruyama et al. | 707/103 R |
| 5,713,045 A | 1/1998 | Berdahl | 709/318 |
| 5,724,589 A | 3/1998 | Wold | 709/318 |
| 5,752,018 A | 5/1998 | Sheffield | 707/2 |
| 5,758,152 A | 5/1998 | LeTourneau | 707/102 |
| 5,761,509 A | 6/1998 | Danforth et al. | 717/116 |
| 5,764,230 A | 6/1998 | Baradel et al. | 345/804 |
| 5,787,431 A | 7/1998 | Shaughnessy | 707/100 |
| 5,801,701 A | 9/1998 | Koppolu et al. | 345/821 |
| 5,805,892 A | 9/1998 | Nakajima | 717/131 |
| 5,812,849 A | 9/1998 | Nykiel et al. | 717/101 |
| 5,819,055 A | 10/1998 | MacLean et al. | 345/798 |
| 5,822,580 A | 10/1998 | Leung | 707/103 R |
| 5,835,914 A | 11/1998 | Brim | 707/206 |
| 5,838,969 A | 11/1998 | Jacklin et al. | 709/318 |
| 5,892,510 A | 4/1999 | Lau et al. | 345/866 |
| 5,893,118 A | 4/1999 | Sonderegger | 707/203 |
| 5,926,177 A | 7/1999 | Hatanaka et al. | 345/747 |
| 5,974,428 A | 10/1999 | Gerard et al. | 707/203 |
| 5,983,348 A | 11/1999 | Ji | 713/200 |
| 6,002,874 A | 12/1999 | Bahrs et al. | 717/157 |
| 6,003,042 A | 12/1999 | Melahn | 707/203 |
| 6,023,271 A | 2/2000 | Quaeler-Bock et al. | 345/335 |
| 6,026,413 A | 2/2000 | Challenger et al. | 707/202 |
| 6,029,182 A | 2/2000 | Nehab et al. | 715/523 |
| 6,035,303 A | 3/2000 | Baer et al. | 707/103 R |
| 6,054,985 A | 4/2000 | Morgan et al. | 345/804 |
| 6,054,996 A | 4/2000 | Bardon et al. | 345/619 |
| 6,064,382 A | 5/2000 | Diedrich et al. | 345/700 |
| 6,085,120 A | 7/2000 | Schwerdtfeger et al. | 700/90 |
| 6,091,411 A | 7/2000 | Straub et al. | 345/747 |
| 6,108,583 A | 8/2000 | Schneck et al. | 700/9 |
| 6,112,024 A | 8/2000 | Almond et al. | 717/122 |
| 6,115,646 A | 9/2000 | Fiszman et al. | 700/181 |
| 6,134,676 A | 10/2000 | VanHuben et al. | 714/39 |
| 6,148,306 A | 11/2000 | Seidl et al. | 707/104.1 |
| 6,167,523 A | 12/2000 | Strong | 713/201 |
| 6,169,546 B1 | 1/2001 | Bogdan | 345/786 |
| 6,175,364 B1 | 1/2001 | Wong et al. | 345/763 |
| 6,177,936 B1 | 1/2001 | Cragun | 345/760 |
| 6,182,153 B1 * | 1/2001 | Hollberg et al. | 709/315 |
| 6,182,154 B1 | 1/2001 | Campagnoni et al. | 709/315 |
| 6,185,583 B1 | 2/2001 | Blando | 715/507 |
| 6,185,590 B1 | 2/2001 | Klein | 707/526 |
| 6,185,684 B1 | 2/2001 | Pravetz et al. | 713/182 |
| 6,202,207 B1 | 3/2001 | Donohue | 717/173 |
| 6,208,339 B1 | 3/2001 | Atlas et al. | 345/780 |
| 6,208,994 B1 | 3/2001 | Abdelnur | 707/103 R |
| 6,211,872 B1 | 4/2001 | Matsutsuka et al. | 345/744 |
| 6,237,011 B1 | 5/2001 | Ferguson et al. | 715/515 |
| 6,249,284 B1 | 6/2001 | Bogdan | 345/764 |
| 6,272,641 B1 | 8/2001 | Ji | 713/201 |
| 6,275,228 B1 * | 8/2001 | Cataudella | 345/764 |
| 6,275,232 B1 | 8/2001 | Cataudella et al. | 345/815 |
| 6,292,803 B1 | 9/2001 | Richardson et al. | 707/102 |
| 6,295,553 B1 | 9/2001 | Gilbertson et al. | 709/207 |
| 6,307,571 B2 | 10/2001 | Mozdzer et al. | 345/762 |
| 6,330,659 B1 * | 12/2001 | Poff et al. | 712/34 |
| 6,335,741 B1 | 1/2002 | Nock | 345/764 |
| 6,355,741 B1 | 3/2002 | Marechal | 526/64 |
| 6,362,839 B1 | 3/2002 | Hamilton et al. | 345/764 |
| 6,425,126 B1 | 7/2002 | Branson et al. | 717/168 |
| 6,438,617 B1 | 8/2002 | Savitsky et al. | 709/316 |
| 6,442,620 B1 | 8/2002 | Thatte et al. | 709/316 |
| 6,442,754 B1 | 8/2002 | Curtis | 717/175 |
| 6,457,142 B1 | 9/2002 | Klemm et al. | 714/38 |
| 6,469,714 B2 | 10/2002 | Buxton et al. | 345/762 |
| 6,493,871 B1 | 12/2002 | McGuire et al. | 717/173 |
| 6,532,498 B1 | 3/2003 | Hager et al. | 709/318 |
| 6,556,218 B1 | 4/2003 | Alcorn | 345/749 |
| 6,557,046 B1 | 4/2003 | McCauley, III et al. | 709/318 |
| 6,560,770 B1 | 5/2003 | Saxena et al. | 717/107 |
| 6,590,594 B2 | 7/2003 | Bates et al. | 345/784 |
| 6,611,498 B1 | 8/2003 | Baker et al. | 370/252 |
| 6,615,258 B1 | 9/2003 | Barry et al. | 709/223 |
| 6,654,932 B1 * | 11/2003 | Bahrs et al. | 715/507 |
| 2002/0109734 A1 | 8/2002 | Umezu et al. | 345/846 |

OTHER PUBLICATIONS

"Mastering JavaBeans", Vanhelsuwe, L., Sybex, 1997, chapter 5.*

Bryant et al., "Automatic Parallelization of Object–Oriented Programming Languages Using Tuple Space", ACM pp. 89–96, 1995.

Hadjerrouit, "A Constructivist Approach to Object–Oriented Design and Programming", ITICSE ACM, pp. 171–174, Feb. 1999.

Jarvinen et al., "Object–Oriented Specification of Reactive Systems", IEEE, pp. 63–71, 1990.

McDonald et al., "Painting Multiple View of Complex Objects", 1990, ACM, 245–257.

Grundy et al., "Support for Constructing Environments with Multiple View", 1996, ACM, pp. 212–216.

Sullivan et al., "Reconciling Environment Integration and Software Evolution", ACM Transactions on Software Engineering and Methodology, vol. 1, No. 3, Jul. 1992, pp. 229–268.

Boone, "Harvesting Design for an Application Framework", Proceedings of the 1996 Conference of the Centre from Advanced Studies on Collaborative Research, Nov. 1996, pp. 1–9.

Schuckmann et al., "Designing Object–Oriented Synchronous Groupware with COAST", Proceedings of the 1996 ACM Conference on Computer Supported Cooperative Work, Nov. 1996, pp. 30–38.

Lemay et al., "Laura Lemay's Web Workshop JavaScript", Sams.net, 1996, pp. 132–137.

Weber, "Advanced JFC", QUE, 1998, chapter 24.

IBM TDB, "Sequencing Event Handlers in Java", vol. No. 423, Jul. 1999.

* cited by examiner

600

Class Hierarchy class java.lang.Object
    interface com.ibm.jtc.ApplicationMediator (extends com.ibm.jtc.JTC)
    class com.ibm.jtc.ApplicationMediatorImpl (implements com.ibm.jtc.ApplicationMediator, com.ibm.jtc.ViewListener, com.ibm.jtc.RequestResponseListener)
    interface com.ibm.jtc.Destination (extends com.ibm.jtc.JTC)
    class com.ibm.jtc.DestinationImpl (implements com.ibm.jtc.Destination)
    class java.util.EventObject (implements java.io.Serializable)
        class com.ibm.jtc.PlacementEvent (implements java.io.Serializable)
        class com.ibm.jtc.RequestEvent (implements java.io.Serializable)
        class com.ibm.jtc.TopEvent (implements java.io.Serializable)
        class com.ibm.jtc.ViewEvent (implements java.io.Serializable)
    class com.ibm.jtc.Factory (implements java.io.Serializable)
    interface com.ibm.jtc.JTC (extends java.io.Serializable)
    interface com.ibm.jtc.PlacementListener
    interface com.ibm.jtc.RequestListener
    interface com.ibm.jtc.RequestResponseListener
    class java.lang.Throwable (implements java.io.Serializable)
        class java.lang.Exception
            class com.ibm.jtc.RequestException (implements java.io.Serializable)
            class com.ibm.jtc.ValidationRuleException (implements java.io.Serializable)
    interface com.ibm.jtc.TopListener
    class com.ibm.jtc.Transporter (implements com.ibm.jtc.RequestListener, com.ibm.jtc.JTC)
    class com.ibm.jtc.ValidationRule (implements java.io.Serializable)
    interface com.ibm.jtc.ViewController (extends com.ibm.jtc.JTC)
    interface com.ibm.jtc.ViewListener

ViewController 800

Variables

| Name | Declaration | Description |
|---|---|---|
| copyright | public static final String _copyright | (c) International Business Machines, Inc., 1997 1998 1999. All rights reserved. |

Methods

| Name | Declaration | Description |
|---|---|---|
| addViewListener | public abstract void addViewListener (ViewListener listener) | Invoked when a ViewListener is added. |
| getComponent | public abstract Component getComponent() | Invoked when the ViewController as a component is needed. |
| getPermissions | public abstract String[] getPermissions () | Invoked when the ViewController permission keys are needed. |
| isValid | public abstract boolean isValid() | Invoked when a ViewController's GUI state needs to be checked to see if it is valid. |
| isVisible | public abstract boolean isVisible() | Invoked to see if the ViewController is visible. |
| refresh | public abstract void refresh (Object data) | Invoked to supply new or changed data. |
| removeViewListener | public abstract void removeViewListener (ViewListener listener) | Invoked to remove a ViewListener. |
| setPermissions | public abstract void setPermissions (Hashtable permissions) | Invoked to set the permissions keys and values. |
| setProperties | public abstract void setProperties (Properties properties) | Invoked to set the properties. |
| setResources | public abstract void setResources (ResourceBundle bundle) | Invoked to set the resources. |
| setValidationLevel | public abstract void setValidationLevel (int level) | Invoked to give a hint to the ViewController as to what validation level to use. The value for level defined in this interface include: NONE=try to do no validation EVENT=try to do validation every event (key) FOCUS=try to do validation on focus change VIEWEVENT=try to do validation before a ViewEvent is issued. |
| setVisible | public abstract void setVisible (boolean visible) | Invoked to set the visibility. |

ViewControllerImpl

Variables

| Name | Declaration | Description |
|---|---|---|
| _copyright | public static final String _copyright | (c) International Business Machines Inc., 1997 1998 1999. All rights reserved. |
| validationLevel | protected int validationLevel | The current validation level. |
| viewEvent | protected ViewEvent viewEvent | A reference to a ViewEvent. Create one ViewEvent reuse it between events. |
| data | protected Object data | A reference to the data. |

*FIG. 9A*

Constructors

| Name | Declaration | Description |
|---|---|---|
| ViewControllerImpl | public ViewControllerImpl() | Default constructor. |

*FIG. 9B*

ViewControllerImpl 904

| Methods | | |
|---|---|---|
| Name | Declaration | Description |
| addViewListener | public final void addViewListener (ViewListener listener) | Add a ViewListener. |
| clear | public void clear() | Clear local state by setting the data reference to null and by removing all ViewListeners. |
| exit | public void exit() | Get read to exit. Clear local state by setting the data reference to null, removing all Viewlisteners and setting view listeners to null. |
| fireViewEvent | public final void fireViewEvent(ViewEvent event) | If the ViewEvent is not null then send it to all ViewListeners |
| getComponent | public Component getComponent() | Return the Component that is "this" ViewController. By default, "this" is returned. Redefine this method in ViewControllerBaseImpl when you have a non-java.awt.Component superclass. |
| getJTCs | public Vector getJTCs() | Return all JTC type objects defined. By default null is returned. Typically, ViewControllers will not return anything. |
| getPermissions | public String[] getPermissions() | Return a set "keys" that can a management system can use when assigning JTC function based on roles (i.e. group, user). For example, consider the common case of operator override. In grocery store, if a cashier makes a mistake, a manager inserts a key or enters a password to enable more function on the cash register. The software analogy is that a button may become active or disabled. Suppose the ViewController implements a button labeled "Override" and it is the only component whose state can be visibly altered outside the ViewController. The ViewController writer will return: "Override". In this case, the only options are ENABLE or DISABLE. Suppose these constants are define to be 0x001 and 0x002, respectively. A management system that maintains user privileges is queried at runtime. The ViewController is then called with setPermissions(keys, values) where keys is "Override" and values is "0x001". The ViewController writer now responds to this request by turning off the button. Instead of hard coding the possible roles, the ViewController simply reacts to key/value settings. By default, nothing is returned. |

FIG. 9C

ViewControllerImpl (continued) 904

Methods

| Name | Declaration | Description |
|---|---|---|
| init | public void init() | Initialize, by default do nothing. |
| isEnabled | public boolean isEnabled() | Is this ViewController enabled? |
| isValid | public boolean isValid() | Is the ViewController in a consistent state? This usually means: Do all fields pass ValidationRules? The meaning could also be application specific. This value can provide other components with the ability to show a visual indicator, such as an X or a check in a tree menu indicating incomplete or partial data. The default value is true. |
| isVisible | public boolean isVisible() | Is this ViewController visible? |
| refresh | public void refresh(Object data) | Data objects are being passed in. By default, keep a reference to them. Interpretation of the data is performed in the subclass. For example, suppose the data being passed is a Customer object. Then a subclass can perform the following: This can be extended to more complex data types and data type composites (i.e. arrays, Vectors, etc.). |
| removeViewListener | public final void removeViewListener (ViewListener listener) | Remove a ViewListener. |
| setEnabled | public void setEnabled(boolean toggle) | Enable or disable the ViewController. Remember the state and ask the ViewControllerBaseImpl to handle it. |

ViewControllerImpl (continued)

| Methods | | |
|---|---|---|
| Name | Declaration | Description |
| setPermissions | public void setPermissions (Hashtable permissions) | Given a set of keys and values, update the internal state of the ViewController. The keys and values are supplied via a management system and relate to roles (i.e. users and groups). The possible values in the key/value pairs are application and ViewController specific. For example, create an interface to define the keys and values:<br>public interface Customer {<br>  public static final String DETAILS="DETAILS";<br>  public static final String ON="1";<br>  public static final String OFF="0";<br>}<br>then set the ViewController:<br>Hashtable permissions=new Hashtable();<br>permissions.put(Customer.DETAILS, Customer.ON);<br>vc.setPermissions(Permissions);<br>The ViewController will interpret the meaning of ON and perform the necessary action, such as active a button. The meaning of keys, values and actions should be defined in a GUI spec. By default, nothing happens. |
| setProperties | public void setProperties(Properties properties) | Set the properties. Default is to do nothing. |
| setResources | public void setResources(ResourceBundle bundle) | Set the ResourceBundles. Default is to do nothing. |
| setValidationLevel | public void setValidationLevel(int level) | Set the validation level to indicate when ValidationRules should be applied<br>Four constants are defined in the ValidationRule class:<br>  NONE<br>  COMPONENT<br>  FOCUS<br>  VIEWEVENT<br>This value will be stored for the subclass to reference and act. The default value is ValidationRule.NONE. |
| setVisible | public void setVisible(boolean visible) | Set the ViewController's visibility on or off. Remember the state and ask the ViewControllerBaseImpl to handle it. |
| toString | public String toString() | Return the instance class name. |

ViewControllerBaseImpl 1000

Variables

| Name | Declaration | Description |
|---|---|---|
| _copyright | public static final String _copyright | (c) International Business Machines Inc., 1997 1998 1999. All rights reserved. |

*FIG. 10A*

Constructors 1002

| Name | Declaration | Description |
|---|---|---|
| ViewControllerBaseImpl | public ViewControllerBaseImpl() | Default constructor. |

*FIG. 10B*

Methods

| Name | Declaration | Description |
|---|---|---|
| getComponent | public Component getComponent() | By default, return this. This works when the superclass is derived from java.awt.Component. Otherwise, override this method and return your own this, but be sure to override setEnabled and setVisible also. |
| setEnabled | public void setEnabled(boolean toggle) | By default, passes the call to the super class. |
| setVisible | public void setVisible(boolean visible) | By default, passes the call to the super class. |

*FIG. 10C*

ViewControllerAdapter

Variables

| Name | Declaration | Description |
|---|---|---|
| _copyright | public static final String _copyright | (c) International Business Machines Inc., 1997 1998 1999. All rights reserved. |

Constructors

| Name | Declaration | Description |
|---|---|---|
| ViewControllerAdapter | public ViewControllerAdapter() | Constructor. |

Methods

| Name | Declaration | Description |
|---|---|---|
| actionPerformed | public void actionPerformed(ActionEvent e) | Do nothing. |
| adjustmentValueChanged | public void adjustmentValueChanged(AdjustmentEvent e) | Do nothing. |
| componentAdded | public void componentAdded(ContainerEvent e) | Do nothing. |
| componentHidden | public void componentHidden(ComponentEvent e) | Do nothing. |
| componentMoved | public void componentMoved(ComponentEvent e) | Do nothing. |
| componentRemoved | public void componentRemoved(ContainerEvent e) | Do nothing. |
| componentResized | public void componentResized(ComponentEvent e) | Do nothing. |
| componentShown | public void componentShown(ComponentEvent e) | Do nothing. |
| focusGained | public void focusGained(FocusEvent e) | Do nothing. |
| focusLost | public void focusLost(FocusEvent e) | Do nothing. |
| itemStateChanged | public void itemStateChanged(ItemEvent e) | Do nothing. |
| keyPressed | public void keyPressed(KeyEvent e) | Do nothing. |
| keyReleased | public void keyReleased(KeyEvent e) | Do nothing. |
| keyTyped | public void keyTyped(KeyEvent e) | Do nothing. |
| mouseClicked | public void mouseClicked(MouseEvent e) | Do nothing. |
| mouseDragged | public void mouseDragged(MouseEvent e) | Do nothing. |
| mouseEntered | public void mouseEntered(MouseEvent e) | Do nothing. |
| mouseExited | public void mouseExited(MouseEvent e) | Do nothing. |
| mouseMoved | public void mouseMoved(MouseEvent e) | Do nothing. |
| mousePressed | public void mousePressed(MouseEvent e) | Do nothing. |
| mouseReleased | public void mouseReleased(MouseEvent e) | Do nothing. |
| textValueChanged | public void textValueChanged(TextEvent e) | Do nothing. |

ValidationRule Variables                                            1200

| Name | Declaration | Description |
|---|---|---|
| _copyright | public static final String_copyright | (c) International Business Machines Inc., 1997 1998 1999. All rights reserved. |
| NONE | public static final int NONE | |
| COMPONENT | public static final int COMPONENT | |
| FOCUS | public static final int FOCUS | |
| VIEWEVENT | public static final int VIEWEVENT | |

FIG. 12B

Constructors                                                        1202

| Name | Declaration | Description |
|---|---|---|
| ValidationRule | public ValidationRule() | |

FIG. 12D                                                         1206

```
/**
* Given a list of class names, apply each validation rule of the classes
* to input string and return the formatted result.
*
* @return the viewable formatted string.
* @param classNames a comma-separated fully qualified list of concrete AbstractRule classes.
* @param input the input string to apply edit rules to.
* @exception ValidatonRuleException if there was an error in applying the edits.
*/
public static String applyEdits(String classNames, String input) throws ValidationRuleException {
        int commaIndex = -1;
        int curIndex = 0;
        do {
                commaIndex=classNames.indexOf(',', curIndex);
                if (commaIndex == -1) {
                        commaIndex = classNames.length();
                }
                String className = classNames.substring(curIndex, commaIndex).trim();
                try {
                        ValidationRule rule = (ValidationRule) Factory.newInstance(className);
                        input = rule.edit(input);
                } catch (ValidationRuleException re) {
                        throw re;
                } catch (Exception e) {
                        throw new ValidationRuleException("Rule class '" + className + "' not found.");
                }
                curIndex = commaIndex + 1;
        } while (curIndex < classNames.length());
        return input;
}
```

Methods

| Name | Declaration | Description |
|---|---|---|
| applyEdits | public static String applyEdits (String classNames, String input) throws ValidationRuleException | Given a list of class names, apply each validation rule of the classes to input string and return the formatted result. Parameters: classNames – a comma-separated fully qualified list of concrete AbstractRule classes. input – the input string to apply edit rules to. Returns: the viewable formatted string. Throws: ValidationRuleException if there was an error in applying the edits. |
| applyNormalize | public static String applyNormalize (String classNames, String input) throws ValidationRuleException | Given a list of class names, apply each normalize rule of the classes to input string and return the transmittable result. Parameters: classNames – a comma-separated fully qualified list of concrete AbstractRule classes. input – the input string to apply normalize rules to. Returns: the transmittable string. Throws: ValidationRuleException |
| edit | public abstract String edit (String input) throws ValidationRuleException | Subclasses must implement this method to take an input string and apply some edit rule which returns a properly formatted string that can be used to display to the user. Parameters: input–the input string. Returns: the viewable formatted string. Throws: ValidationRuleException if unable to properly format input string. |
| normalize | public abstract String normalize (String input) throws ValidationRuleException | Subclasses must implement this method to take an input string and apply some normalize rule which returns a properly formatted string that can be used to send data to some server. Parameters: input – the input string. Returns: the transmittable string. Throws: ValidationRuleException if unable to properly format input string. |

ValidationRuleException

Variables

| Name | Declaration | Description |
|---|---|---|
| _copyright | public static final String_copyright | (c) International Business Machines Inc., 1997 1998 1999. All rights reserved. |

*FIG. 13A*    1300

Constructors

| Name | Declaration | Description |
|---|---|---|
| ValidationRuleException | public ValidationRuleException() | Default constructor. |
| ValidationRuleException | public ValidationRuleException(String s) | Constructor with a message to the rule exception. |

ViewEvent  1400

| Variables | | |
|---|---|---|
| Name | Declaration | Description |
| _copyright | public static final String _copyright | (c) International Business Machines Inc., 1997 1998 1999. All rights reserved. |
| VIEWEVENT_FIRST | public static final int VIEWEVENT_FIRST | |
| OK | public static final int OK | |
| DONE | public static final int DONE | |
| OPEN | public static final int OPEN | |
| CLOSE | public static final int CLOSE | |
| CANCEL | public static final int CANCEL | |
| EXIT | public static final int EXIT | |
| FILE | public static final int FILE | |
| SAVE | public static final int SAVE | |
| SAVEAS | public static final int SAVEAS | |
| ERROR | public static final int ERROR | |
| WARNING | public static final int WARNING | |
| RETURN | public static final int RETURN | |
| LOAD | public static final int LOAD | |
| NOTIFY | public static final int NOTIFY | |
| NOTIFY2 | public static final int NOTIFY2 | |
| INFO | public static final int INFO | |
| SETUP | public static final int SETUP | |
| PRINT | public static final int PRINT | |

ViewEvent
(continued)

1400

Variables

| Name | Declaration | Description |
|---|---|---|
| TITLEMESSAGE | public static final int TITLEMESSAGE | |
| STATUSMESSAGE | public static final int STATUSMESSAGE | |
| ERRORMESSAGE | public static final int ERRORMESSAGE | |
| SUGGESTIONMESSAGE | public static final int SUGGESTIONMESSAGE | |
| NEXT | public static final int NEXT | |
| PREVIOUS | public static final int PREVIOUS | |
| FIRST | public static final int FIRST | |
| LAST | public static final int LAST | |
| START | public static final int START | |
| BEGIN | public static final int BEGIN | |
| END | public static final int END | |
| PAUSE | public static final int PAUSE | |
| STOP | public static final int STOP | |
| RESTART | public static final int RESTART | |
| SUBMIT | public static final int SUBMIT | |
| BACKSPACE | public static final int BACKSPACE | |
| INSERT | public static final int INSERT | |

ViewEvent (continued) 1400

Variables

| Name | Declaration | Description |
|---|---|---|
| HOME | public static final int HOME | |
| PGUP | public static final int PGUP | |
| PGDN | public static final int PGDN | |
| LEFT | public static final int LEFT | |
| RIGHT | public static final int RIGHT | |
| UP | public static final int UP | |
| DOWN | public static final int DOWN | |
| LIST | public static final int LIST | |
| MORE | public static final int MORE | |
| ADD | public static final int ADD | |
| DELETE | public static final int DELETE | |
| MODIFY | public static final int MODIFY | |
| NEW | public static final int NEW | |
| EDIT | public static final int EDIT | |
| COPY | public static final int COPY | |
| CUT | public static final int CUT | |
| PASTE | public static final int PASTE | |
| UNDO | public static final int UNDO | |
| REMOVE | public static final int REMOVE | |
| PLUS | public static final int PLUS | |
| MINUS | public static final int MINUS | |
| INCREMENT | public static final int INCREMENT | |
| DECREMENT | public static final int DECREMENT | |
| CHANGED | public static final int CHANGED | |

FIG. 14D

ViewEvent (continued) 1400

Variables

| Name | Declaration | Description |
|---|---|---|
| FILL | public static final int FILL | |
| EMPTY | public static final int EMPTY | |
| READY | public static final int READY | |
| VIEW | public static final int VIEW | |
| DETAILS | public static final int DETAILS | |
| READ | public static final int READ | |
| WRITE | public static final int WRITE | |
| SEARCH | public static final int SEARCH | |
| FIND | public static final int FIND | |
| HELP | public static final int HELP | |
| HINT | public static final int HINT | |
| TRAIN | public static final int TRAIN | |
| TEACH | public static final int TEACH | |
| SUGGEST | public static final int SUGGEST | |
| VIEWEVENTTEST1 | public static final int VIEWEVENTTEST1 | |
| VIEWEVENTTEST2 | public static final int VIEWEVENTTEST2 | |
| VIEWEVENTTEST3 | public static final int VIEWEVENTTEST3 | |
| VIEWEVENT_LAST | public static final int VIEWEVENT_LAST | |
| consumed | protected boolean consumed | Is event still valid? |
| timestamp | protected long timestamp | Time stamp when event is fired. |
| data | protected Object data | Data reference. |

FIG. 14E

Constructors — 1402

| Name | Declaration | Description |
|---|---|---|
| ViewEvent | public ViewEvent() | Constructs a ViewEvent. |
| ViewEvent | public ViewEvent(Object source) | Constructs a ViewEvent. |
| ViewEvent | public ViewEvent(Object source, int major) | Constructs a ViewEvent object with the specified source object and code; |
| ViewEvent | public ViewEvent(Object source, int major, int mirror, Object data) | Constructs a ViewEvent object with the specified source object and code; |
| ViewEvent | public ViewEvent(Object source, int major, Object data) | Constructs a ViewEvent object with the specified source object and code; |

FIG. 14F

ViewEvent (continued) — 1404

Methods

| Name | Declaration | Description |
|---|---|---|
| consume | public final void consume() | Consume this event. |
| getData | public Object getData() | Return the data. |
| getMajor | public final int getMajor() | Return the major event code. |
| getMinor | public final int getMinor() | Return the event option. |
| getSource | public final Object getSource() | Gets the event source Overrides: getSource in class EventObject. |
| getTimestamp | public long getTimestamp() | Get the timestamp when the event was fired. By default, this was set by JTC. |
| isConsumed | public final boolean isConsumed() | Is the event consumed? |
| setConsumed | public final void setConsumed(boolean consumed) | Turn event consumed on/off. |
| setData | public void setData(Object data) | Sets the data. |
| setMajor | public final void setMajor(int code) | Sets the event code. |
| setMinor | public final void setMinor(int code) | Sets the event option. |
| setSource | public final void setSource(Object source) | Sets the event source. |
| setTimestamp | public void setTimestamp(long time) | Set the timestamp when the event is fired. By default, this is set by JTC. |
| toString | public String toString() | Returns a string representation of the object. The class of the event and the reason for the event is returned. |

FIG. 15A

ViewListener — 1500

Variables

| Name | Declaration | Description |
|---|---|---|
| _copyright | public static final String _copyright | (c) International Business Machines Inc., 1997 1998 1999. All rights reserved. |

Methods

| Name | Declaration | Description |
|---|---|---|
| viewEventPerformed | public abstract void viewEventPerformed(ViewEvent event) | Invoked when a ViewEvent has been fired. |

FIG. 16A

ApplicationMediator — 1600

Variables

| Name | Declaration | Description |
|---|---|---|
| copyright | public static final String _copyright | (c) International Business Machines Inc., 1997 1998 1999. All rights reserved. |

FIG. 16B

Methods 1602

| Name | Declaration | Description |
|---|---|---|
| addPlacementListener | public abstract void addPlacementListener (PlacementListener listener) | Invoked when a PlacementListener is added. |
| addRequestListener | public abstract void addRequestListener (RequestListener listener) | |
| addTopListener | public final void addTopListener (TopListener listener) | Add a TopListener. |
| addViewListener | public abstract void addViewListener (ViewListener listener) | Invoked when a ViewListener is added. |
| getPermissions | public abstract String[] getPermissions() | Invoked when the ApplicationMediator permission keys are needed. |
| init | public abstract void init (ApplicationMediator applicationMediator) | Invoked when an ApplicationMediator should be initialized based on another ApplicationMediator's contents. |
| isValid | public abstract boolean isValid() | Invoked when the ApplicationMediator's state needs to be checked to see if it is valid. |
| isVisible | public abstract boolean isVisible() | Invoked to see if the ApplicationMediator is visible. |
| refresh | public abstract void refresh (Object data) | Invoked to supply new or changed data. |
| removePlacementListener | public abstract void removePlacementListener (PlacementListener listener) | Invoked to remove a PlacementListener. |
| removeRequestListener | public abstract void removeRequestListener (RequestListener listener) | Invoked to remove a RequestListener. |
| removeTopListener | public final void removeTopListener (TopListener listener) | Removes the TopListener. |
| removeViewListener | public abstract void removeViewListener (ViewListener listener) | Invoked to remove a ViewListener. |
| setPermissions | public abstract void setPermissions (Hashtable permissions) | Invoked to set the permissions keys and values. |
| setProperties | public abstract void setProperties (Properties properties) | Invoked to set the properties. |
| setResouces | public abstract void setResources (ResourceBundle bundle) | Invoked to set the resources. |
| setVisible | public abstract void setVisible(boolean visible) | Invoked to set the visibility. |

ApplicationMediatorImpl                                    1700

Variables

| Name | Declaration | Description |
| --- | --- | --- |
| placementListeners | protected Vector placementListeners | The PlacementListeners. |
| topListeners | protected TopListener topListener | The TopListener. |
| requestListeners | protected Vector requestListeners | The RequestListeners. |
| viewListeners | protected Vector viewListeners | The ViewEventListeners. |
| viewControllers | protected Vector viewControllers | Whenever view controllers are created, it is by convention they will be added to this array. |
| applicationMediators | protected Vector applicationMediators | Whenever application mediators are created, it is by convention they will be added to this array. |
| data | protected Object data | This is a reference to the system data model. |
| requestEvent | protected RequestEvent requestEvent | This is a reference to a RequestEvent. |

Constructors

| Name | Declaration | Description |
| --- | --- | --- |
| ApplicationMediatorImpl | public ApplicationMediatorImpl() | Constructor. By changing commented code, you can switch between threading styles 1 and 2. |

ApplicationMediatorImpl                                                                          1704

| Methods | | |
|---|---|---|
| Name | Declaration | Description |
| addPlacementListener | public final void addPlacementListener(PlacementListener listener) | Add a PlacementListener. |
| addRequestListener | public final void addRequestListener(RequestListener listener) | Add a RequestListener. |
| addTopListener | public final void addTopListener(TopListener listener) | Add a TopListener. |
| addViewListener | public final void addViewListener(ViewListener listener) | Add a ViewListener. |
| clear | public void clear() | Clear the ApplicationMediator by clearing all allocated ViewControllers and ApplicationMediators. All data is set to null, but lists are not destroyed. A 'cleared' ApplicationMediator can be used again. If this method is overriden in a subclass, be sure to invoke super.clear(); |
| exit | public void exit() | Exit the ApplicationMediator by exiting all allocated ViewControllers and ApplicationMediators. All data is set to null, and lists are destroyed. An 'exited' ApplicationMediator cannot be used again. If this method is overriden in a subclass, be sure to invoke super.exit(); |
| firePlacementEvent | protected final void firePlacementEvent(PlacementEvent event) | Notify the PlacementListeners. |
| fireRequestEvent | protected final void fireRequestEvent(RequestEvent event) throws RequestException | Notify the RequestListeners - synchronous. |
| fireRequestEvent | protected final void fireRequestEvent(RequestEvent event, RequestResponseListener caller) throws RequestException | Notify the RequestListeners - asynchronous. |
| fireTopEvent | protected final void fireTopEvent(TopEvent event) | Notify the TopListeners. |
| fireTopListener | | |
| fireViewEvent | protected final void fireViewEvent(ViewEvent event) | Notify the ViewListeners. |
| getAM | protected ApplicationMediator getAM(int i) | Return the i'th ApplicationMediator. |
| getJTCs | public Vector getJTCs() | Return a vector of all ThinClient objects. By default, this is a Vector containing the created ViewControllers and ApplicationMediators. |

FIG. 17D

ApplicationMediatorImpl (continued) 1704

Methods

| Name | Declaration | Description |
|---|---|---|
| getPermissions | public String[] getPermissions() | Get the settable permission keys. By default, return the class names of all allocated ViewControllers and ApplicationMediators. |
| getVC | protected ViewController getVC(int i) | Return the i'th ViewController |
| init | public void init() | Initialize the ApplicationMediator, nothing to do by default. |
| init | public void init(ApplicationMediator applicationMediator) | Initialize the ApplicationMediator using the listeners of an existing ApplicationMediator. |
| initApplicationMediators | public final void initApplicationMediators(String classnames[]) throws ClassNotFoundException, InstantiationException, IllegalAccessException | For each ApplicationMediator classname, load it, new it and add myself as a ViewEvent. The Factory class is used as helper class. |
| initViewControllers | public final void initViewControllers(String classnames[]) throws ClassNotFoundException, InstantiationException, IllegalAccessException | For each ViewController classname, load it, new it and add myself as a ViewEvent. The Factory class is used as helper class. |
| isEnabled | public boolean isEnabled() | Is the ApplicationController enabled? |
| isValid | public boolean isValid() | Return the AND'ed value of calling isValid on ApplicationMediators and ViewControllers. |
| isVisible | public boolean isVisible() | Is the ApplicationController visible? Hardly, since it is a non visible class. But this looks to see if any of its ViewControllers are visible. Not really, they were all set to visible/invisible via the setVisible method and we remembered the state to return here. |
| processViewEvent | public abstract void processViewEvent(ViewEvent e) | Deliver the ViewEvent to the subclass via this method. |
| refresh | public void refresh(Object data) | When new data arrives allow the ViewControllers and ApplicationControllers to be refreshed also. |
| removePlacementListener | public final void removePlacementListener(PlacementListener listener) | Removes the PlacementListener. |

Methods

| Name | Declaration | Description |
|---|---|---|
| removeRequestListener | public final void removeRequestListener(RequestListener listener) | Removes the RequestListener. |
| removeViewListener | public final void removeViewListener(ViewListener listener) | Removes the ViewListener. |
| requestException | public void requestException(RequestException yikes) | Called back because an asynchronous request has thrown an Exception. By default, print the message to System.err. |
| requestResponse | public void requestResponse(RequestEvent response) | Called back with the results of an asynchronous request. By default, call refresh with the data in the response. |
| run2 | public final void run2() | This method is used in style 1 threading. Rename this to run() and uncomment the code as described in the class javadoc. |
| setAM | public void setAM(ApplicationMediator applicationMediator, int i) | Set the i'th ApplicationMediator. |
| setEnabled | public void setEnabled(boolean toggle) | Call setEnabled on each ViewController and ApplicationMediator. |
| setPermissions | public void setPermissions(Hashtable permissions) | Set the permissions. By default, call setPermissions on each ViewController and ApplicationMediator. |
| setProperties | public void setProperties(Properties properties) | Set the properties. By default, call setProperties on each ViewController and ApplicationMediator. |
| setResources | public void setResources(ResourceBundle bundle) | Set the resources. By default, call setResources on each ViewController and ApplicationMediator. |
| setVC | public void setVC(ViewController viewController, int i) | Set the i'th ViewController. |
| setVisible | public void setVisible(boolean visible) | Set visible on each ViewController and ApplicationMediator. |
| toString | public String toString() | Return the Class name of the ApplicationController instance. |
| viewEventPerformed | public void viewEventPerformed(ViewEvent e) | A ViewEvent is delivered. Process it using Threading style 1 or 2. In the end, the processViewEvent will be called on the subclass. |

1706

ApplicationMediatorImpl.exit(): AUS8-1999-0694

```
/**
 * Exit the ApplicationMediator by exiting all allocated ViewControllers
 * and ApplicationMediators. All data is set to null, and lists are
 * destroyed. An 'exited' ApplicationMediator cannot be used again.
 * If this method is overriden in a subclass, be sure to invoke
 * super.exit();
 **/
public void exit() {
      synchronized (this) {

/* Used for style 1 event dispatching. Leave this code commented. */
            //if (this.eventThread !=null) {
            //    try {
            //        eventThread.stop ();
            //    } catch (Exception e) {
            //    }
            //}

/* Used for style 2 event dispatching. Leave this code commented. */
            for (int i = 0; i < runningThreads.size(); i++) {
                  ((ApplicationMediatorThread) runningThreads.elementAt (i)) .stop();
            }
            runningThreads.removeAllElements();
            viewListeners.removeAllElements();
            try {
                  for (int i = 0; i < viewControllers.size(); i++) {
                        ((ViewController) viewControllers.elementAt(i)) .setEnabled(false);
                        ((ViewController) viewControllers.elementAt(i)) .exit ();
                  }
                  for (int i = 0; i < applicationMediators.size(); i++) {
                        ((ApplicationMediator) applicationMediators.elementAt(i)) .setEnabled(false);
                        ((ApplicationMediator) applicationMediators.elementAt(i)) .exit();
                  }
            } catch (Exception noProblem) {
            }
            viewControllers = null;
            applicationMediators = null;
            runningThreads = null;
            runningThreads = null;
            data = null;
      }
}
```

ApplicationMediatorImpl.clear(): AUS8-1999-0694

```java
/**
 * Clear the ApplicationMediator by clearing all allocated ViewControllers
 * and ApplicationMediators. All data is set to null, but lists are
 * not destroyed. A 'cleared' ApplicationMediator can be used again.
 * If this methed is overriden in a subclass, be sure to invoke
 * super.clear();
 */
public void clear() {
    synchronized (this) {

/* Used for style 1 event dispatching. Leave this code commented. */
        //if (this.eventThread != null) {
        //    try {
        //        eventThread.stop ();
        //    } catch (Exception e) {
        //    }
        //}

/* Used for style 2 event dispatching. Leave this code commented. */
        for (int i = 0; i < runningThreads.size(); i++) {
            ((ApplicationMediatorThread) runningThreads.elementAt (i)) .stop();
        }
        runningThreads.removeAllElements();

//
        try {
            for (int i = 0; i < viewControllers.size(); i++) {
                ((ViewController) viewControllers.elementAt(i)) .setEnabled(false);
                ((ViewController) viewControllers.elementAt(i)) .clear ();
            }
            for (int i = 0; i < applicationMediators.size(); i++) {
                ((ApplicationMediator) applicationMediators.elementAt(i)) .setEnabled(false);
                ((ApplicationMediator) applicationMediators.elementAt(i)) .clear();
            }
        } catch (Exception noRealProblem) {
        }
        viewControllers = null;
        applicationMediators = null;
        data = null;
        viewListeners.removeAllElements();
    }
}
```

```
/**
 * Initalize the ApplicationMediator using the listeners of an
 * existing ApplicationMediator.
 */
public void init(ApplicationMediator applicationMediator) {
        if (applicationMediator instanceof ApplicationMediatorImpl) {
                ApplicationMediatorImpl a = (ApplicationMediatorImpl) applicationMediator;
                requestListeners = (Vector) a.requestListeners.clone();
                placementListeners = (Vector) a.placementListeners.clone();
                topListeners = (Vector) a.topListeners.clone();
                addViewListener(a);
        }
        init();
}
```

```
/**
 * When new data arrives allow the ViewControllers
 * and ApplicationControllers to be refreshed also.
 */
public void refresh(Object data) {
        this.data = data;
        try {
                synchronized (viewControllers) {
                        for (int j = 0; j < viewControllers.size(); j++) {
                                ((ViewController) viewControllers.elementAt(j)).
                                        refresh(data);
                        }
                }
        } catch (Exception noRealProblem) {
        }
        try {
                synchronized (applicationMediators) {
                        for (int j = 0; j < applicationMediators.size(); j++) {
                                ((ApplicationMediator) applicationMediators.
                                        elementAt(j)).refresh(data);
                        }
                }
        } catch (Exception noRealProblem) {
        }
}
```

```
/**
 * A ViewEvent is delivered. Process it using Threading style 1 or 2. In
 * the end, the processViewEvent will be called on the subclass.
 */
public void viewEventPerformed (ViewEvent e) {
        /* Used for style 2 event dispatching, start an inner class thread */
        ApplicationMediatorThread t = new ApplicationMediatorThread (e);
        runningThreads.addElement (t);
        t.start ();

/* Used for style 1 event dispatching. Leave this code commented. */
        //ViewEvent saved = saveViewEvent(e);
        //if (eventThread == null || !eventThread.isAlive()) {
        //   finished = false;
        //   eventThread = new Thread(this);
        //   eventThread.start ();
        //}
        //synchronized (this) {
        //   notify();
        //}
}
```

```
/**
 * This method is used in style 1 threading. Rename this to run ()
 * and uncomment the code as described in the class javadoc.
 */
public final void run2 () {
        /* Used for style 1 event dispatching. Leave this code commented. */
        /*
        while (true) {
                ViewEvent event = null;
                event = getViewEvent ();
                if (event != null) {
                        handleViewEvent (event);
                { else {
                    waitForEvent ();
                    if (finished) {
                    // something went wrong with the thread so hose this loop
                    break;
                    }
                }
          }
        }
        */
}
```

FIG. 17K

```
/**
 * Private class to handle executions of ViewEvents () on another thread.
**/
private class ApplicationMediatorThread extends Thread {
    /**
     * The current event
    **/
    private ViewEvent event;
    /**
     * Create an ApplicationMediatorThread to process the ViewEvent
    **/
    public ApplicationMediatorThread(ViewEvent event) {
        super ();
        this.event = event;
    }
    /**
     * Just call the handleViewEvent method that the subclass will override
    **/
    public void run () {
        processViewEvent (event);
    }
}
```

FIG. 17L

```
/**
 * Save the current ViewEvent on a Q
 */
private final ViewEvent saveViewEvent (ViewEvent e) {
    /* Used for style 1 event dispatching. Leave this code commented. */
    //return viewEventQueue.add(e);
    return null;
}

/**
 * Method: return the first view event saved. Used by the Q'ing system.
 */
private ViewEvent getViewEvent () {
    /* Used for style 1 event dispatching. Leave this code commented. */
    //return (ViewEvent) viewEventQueue.remove();
    return null;
}
```

PlacementEvent

Variables

| Name | Declaration | Description |
|---|---|---|
| _copyright | public static final String_copyright | (c) International Business Machines Inc., 1997 1998 1999. All rights reserved. |
| PLACEMENTEVENT_FIRST | public static final int PLACEMENTEVENT_FIRST | |
| ADD | public static final int ADD | |
| REMOVE | public static final int REMOVE | |
| MODIFY | public static final int MODIFY | |
| PLACEMENTEVENT_LAST | public static final int PLACEMENTEVENT_LAST | |
| major | protected int major | The placementevent code |
| minor | protected int minor | The placementevent option |
| component | protected Object component | Component Reference |
| data | protected Object data | Data reference |

Constructors

| Name | Declaration | Description |
|---|---|---|
| PlacementEvent | public PlacementEvent() | Constructs a PlacementEvent |
| PlacementEvent | public PlacementEvent(Object source, Object component) | Constructs a PlacementEvent |
| PlacementEvent | public PlacementEvent(Object source, Object component, int major) | Constructs a PlacementEvent |
| PlacementEvent | public PlacementEvent(Object source, Object component, int major, int minor) | Constructs a PlacementEvent |
| PlacementEvent | public PlacementEvent(Object source, Object component, int major, int minor, Object data) | Constructs a PlacementEvent |

Methods

| Name | Declaration | Description |
|---|---|---|
| getComponent | public final Component getComponent() | Return the Component |
| getData | public final Object getData() | Return the data |
| getMajor | public final int getMajor() | Return the major code |
| getMinor | public final int getMinor() | Return the minor code |
| getSource | public final Object getSource() | Gets the event source |
| setComponent | public final void setComponent(Component component) | Sets the Component |
| setData | public final void setData(Object data) | Set the data |
| setMajor | public final void setMajor(int code) | Set the major code |
| setMinor | public final void setMinor(int code) | Sets the minor code |
| setSource | public final void setSource(Object source) | Set the event source |
| toString | public String toString() | Returns a string representation of the object. |

FIG. 19A

PlacementListener

1900

Variables

| Name | Declaration | Description |
|---|---|---|
| copyright | public static final String_copyright | (c) International Business Machines Inc., 1997 1998 1999. All rights reserved. |

Methods

| Name | Declaration | Description |
|---|---|---|
| placementEventPerformed | public abstract void placementEventPerformed (PlacementEvent event) | Invoked when we are being called to add/remove/modify a component. Do it. |

TopEvent

| Variables | | |
|---|---|---|
| Name | Declaration | Description |
| copyright | public static final String_copyright | (c) International Business Machines Inc., 1997 1998 1999. All rights reserved. |
| TOPEVENT_FIRST | public static final int TOPEVENT_FIRST | |
| EXIT | public static final int EXIT | |
| BROWSER | public static final int BROWSER | |
| TITLE | public static final int TITLE | |
| STATUS | public static final int STATUS | |
| OS | public static final int OS | |
| A | public static final int A | |
| B | public static final int B | |
| C | public static final int C | |
| D | public static final int D | |
| E | public static final int E | |
| F | public static final int F | |
| TRACE | public static final int TRACE | |
| DEBUG | public static final int DEBUG | |
| LOG | public static final int LOG | |
| HOOKAWT | public static final int HOOKAWT | |
| HOOKJTC | public static final int HOOKJTC | |
| TOPEVENT_LAST | public static final int TOPEVENT_LAST | |
| TEAM | public static final int TEAM | |
| WIN | public static final int WIN | |
| EXECUTE | public static final int execute | |
| consumed | protected boolean consumed | Is event still valid? |
| data | protected Object data | This is a loose reference to the data model. We don't care what the class shape is and we only reference it via the interface that it must implement. |

FIG. 20B

TopEvent

2002

Constructors

| Name | Declaration | Description |
|---|---|---|
| TopEvent | public TopEvent () | Default constructor for a Request. |
| TopEvent(Object) | public TopEvent (Object source) | Construct with the given source and default major and minor values. |
| TopEvent(Object, int) | public TopEvent (Object source, int major) | Create a Request with a source, major and minor codes. |
| TopEvent(Object, int, int) | public TopEvent (Object source, int major, int minor) | Create a Request with major and minor codes. |
| TopEvent(Object, int, int, Object) | public TopEvent (Object source, int major, int minor, Object data) | Create a Request with a source, major and minor codes, and some data. If source is null, an InvalidArgumentException will be thrown. |

Methods

| Name | Declaration | Description |
|---|---|---|
| consume | public final void consume () | Consume this event. |
| getData | public final Object getData () | Return the reference to the data. |
| getMajor | public final int getMajor () | Get the major code. |
| getMinor | public final int getMinor () | Get the minor code. |
| getSource | public final Object getSource () | Gets the event source. Overrides: getSource in class EventObject. |
| isConsumed | public final boolean isConsumed () | Is the event consumed? |
| setConsumed | public final void setConsumed (boolean consumed) | Turn event consumed on or off. |
| setData | public final void setData (Object data) | Set the data. |
| setMajor | public final void setMajor (int major) | Set the major code. |
| setMinor | public final void setMinor (int minor) | Set the minor code. This is always a String. |
| setSource | public final void setSource (Object source) | Sets the event source. |
| toString | public String toString () | Show a String representation of the Request in the format of "TopEvent(major,minor)". |

TopListener

Variables

| Name | Declaration | Description |
|---|---|---|
| copyright | public static final String_copyright | (c) International Business Machines Inc., 1997 1998 1999. All rights reserved. |

Methods

| Name | Declaration | Description |
|---|---|---|
| exec | public abstract void exec (Object programInformation) | Invoked to execute a desktop program. The parameter programInformation can be a complex object with lots of data. For example: String[] params = {"netscape.exe", "http://www.ibm.com"}; aTopListener.exec(params). Another usage might be to interact with JavaScript under a browser. It is up to the TopListener implementer to understand what the params mean. Do not create a language with a language. This method should only be defined to support legacy environments or corporate desktop rules. Consider using a RequestEvent for more complex requirements. |
| exit | public abstract void exit() | Invoked to exit a JTC application. Never let a program perform its own "exit". This shuts the JVM down. The implementer of TopListener will know the appropriate actions to take to exit from an application on a corporate desktop. |
| message | public abstract void message (Object messageInfo) | Invoked to show a business specific message. Try to isolate calls to the browser here. |
| title | public abstract void title (Object titleInfo) | Invoked to display a business specific title. Try to isolate calls to a browser or a desktop program to display titles here. |
| topEventPerformed | public abstract void topEventPerformed (TopEvent event) | Invoked when we are being called to perform a top desktop function. |

RequestEvent

Variables 2200

| Name | Declaration | Description |
|---|---|---|
| _copyright | public static final String _copyright | (c) International Business Machines Inc., 1997 1998 1999. All rights reserved. |
| consumed | protected boolean consumed | Is event still valid? |
| data | protected Object data | This is a loose reference to the data model. We don't care what the class shape is and we only reference it via the interface that it must implement. |

*FIG. 22A*

Constructors 2202

| Name | Declaration | Description |
|---|---|---|
| RequestEvent | public RequestEvent() | Default constructor for a Request. |
| RequestEvent | public RequestEvent(Object source) | Construct with the given source and default major and minor values. |
| RequestEvent | public RequestEvent(Object source, String major) | Create a Request with a source, major and minor codes. |
| RequestEvent | public RequestEvent(Object source, String major, String minor) | Create a Request with major and minor codes. |
| RequestEvent | public RequestEvent(Object source, String majorCode, String minorCode, Object data) | Create a Request with a source, major and minor codes, and some data. If source is null, an InvalidArgumentException will be thrown. |

*FIG. 22B*

Methods

| Name | Declaration | Description |
|---|---|---|
| consume | public final void consume() | Consume this event. |
| getData | public final Object getData() | Return the reference to the data. |
| getMajor | public final String getMajor() | Get the major code. This is always a String. |
| getMinor | public final String getMinor() | Get the minor code. This is always a String. |
| getSource | public final Object getSource() | Gets the event source. |
| getStatus | public final String getStatus() | Return the status. |
| isConsumed | public final boolean isConsumed() | Is the event consumed? |
| setConsumed | public final void setConsumed(boolean consumed) | Turn event consumed on or off. |
| setData | public final void setData(Object data) | Set the data. |
| setMajor | public final void setMajor(String major) | Set the major code. This is always a String. |
| setMinor | public final void setMinor(String minor) | Set the minor code. This is always a String. |
| setSource | public final void setSource(Object source) | Sets the event source. |
| setStatus | public final void setStatus(String message) | Append a message to the status. |
| toString | public String toString() | Show a String representation of the Request in the format of "RequestEvent(major,minor)". |

RequestException

Variables

| Name | Declaration | Description |
|---|---|---|
| _copyright | public static final String _copyright | (c) International Business Machines Inc., 1997 1998 1999. All rights reserved. |

Constructors

| Name | Declaration | Description |
|---|---|---|
| RequestException | public RequestException() | Default constructor. |
| RequestException | public RequestException(String s) | Constructor with a message to the request exception. |
| RequestException | public RequestException(Throwable target) | Constructor with a throwable target. |
| RequestException | public RequestException(Throwable target, String s) | Constructor with a throwable target and a message. |

Methods

| Name | Declaration | Description |
|---|---|---|
| getTargetException | public Throwable getTargetException() | Get the target throwable. |
| setTargetException | public void setTargetException(Throwable target) | Set the target throwable. |
| toString | public String toString() | String version. |

RequestListener — 2400

Variables

| Name | Declaration | Description |
|---|---|---|
| copyright | public static final String_copyright | (c) International Business Machines Inc., 1997 1998 1999. All rights reserved. |

Methods

| Name | Declaration | Description |
|---|---|---|
| requestEventPerformed | public abstract void requestEventPerformed (RequestEvent request) throws RequestException | Invoked for a synchronous RequestEvent. |
| requestEventPerformed | public abstract void requestEventPerformed (RequestEvent request, RequestResponseListener listener) throws RequestException | Invoked for an asynchronous RequestEvent. |

FIG. 25A

RequestResponseListener — 2500

Variables

| Name | Declaration | Description |
|---|---|---|
| copyright | public static final String_copyright | (c) International Business Machines Inc., 1997 1998 1999. All rights reserved. |

Methods

| Name | Declaration | Description |
|---|---|---|
| requestException | public abstract void requestException (RequestException yikes) | Invoked when an exception occured during processing of an asynchronous RequestEvent. |
| requestResponse | public abstract void requestResponse (RequestEvent result) | Invoked when the processing of an asynchronous RequestEvent was successful. |

Transporter

Variables — 2600

| Name | Declaration | Description |
|---|---|---|
| _copyright | public static final String _copyright | (c) International Business Machines Inc., 1997 1998 1999. All rights reserved. |
| PRIORITY | public static final String PRIORITY | Priority symbol. |
| WILDCARD | public static final String WILDCARD | Wildcard symbol. |

*FIG. 26A*

Constructors — 2602

| Name | Declaration | Description |
|---|---|---|
| Transporter | public Transporter() | Default constructor. |

Transporter

Methods

| Name | Declaration | Description |
|---|---|---|
| addDestinationListener | public void addDestinationListener (Object major, <u>Destination</u> destination) | Add the Destination using the given major code. If the destination is present with the same major don't re-add it - only one major/destination pair can exist. If the major is present, but the destination isn't, add the destination to the list of other destinations with the same key. If the key isn't present, store it and then add the new destination. If the destination is disabled, do nothing. |
| clear | public void clear() | For each RequestEvent not started, a RequestException will be thrown and the internal data structures will be emptied including RequestEvent queues and listeners. |
| exit | public void exit() | For each RequestEvent not started, a RequestException will be thrown and the internal data structures will be emptied including RequestEvent queues and listeners. All variable references will be set to null. |
| getDestinations | public synchronized Vector getDestinations() | Return a Vector of all Destinations currently registered. |
| getDestinations | public Vector getDestinations(Object major) | Return a Vector of the Destinations currently registered for the given major code. |
| getJTCs | public Vector getJTCs() | Return allocated JTC objects. By default, return the Destinations. |
| getMajorCodes | public Vector getMajorCodes() | Return a Vector of the registered major codes. |
| init | public void init() | Initialize the transporter. By default, do nothing. |
| isEnabled | public boolean isEnabled() | Is this Transporter enabled or disabled? A Transporter that is disabled will not process a RequestEvents but will throw RequestExceptions. |

FIG. 26D

Transporter (continued) 2604

Methods

| Name | Declaration | Description |
|---|---|---|
| isTagging | public boolean isTagging() | Is this Transporter tagging RequestEvents? |
| processDestinations | protected void processDestinations(RequestEvent request, Vector currentDestinations) throws RequestException | Given a RequestEvent and a Vector of destinations, call each Destination in FIFO/FEFR order. If tagging is enabled, then append a status tag to the RequestEvent. |
| removeDestinationListener | public void removeDestinationListener(Object major, Destination d) | Remove the destination using the given major. If the destination is not present, do nothing. If the destination is present, just remove it. If it was the last destination, remove all references to the major code. |
| requestEventPerformed | public void requestEventPerformed(RequestEvent request) throws RequestException | Submit a synchronous request. For each Destination that is listening for the current family of RequestEvents (the major code), send the RequestEvent to the Destination for processing. If there is a problem, throw a RequestException. Continue processing the RequestEvent as long as a RequestException is not thrown by a Destination and the RequestEvent is not consumed. If tagging is enabled, then append a status tag to the RequestEvent. Destinations are processed in the following FIFO order: 1-All using "!" (priority). 2-All using a major code. 3-All using "*". |
| requestEventPerformed | public void requestEventPerformed(RequestEvent request, RequestResponseListener caller) throws RequestException | Submit an asynchronous request. See the synchronous requestEventPerformed for more information. |
| setEnabled | public void setEnabled(boolean toggle) | Enable or disable the Transporter. A disabled Transporter will throw RequestExceptions if accessed via requestEventPerformed. |
| setRequestTagging | public void setRequestTagging(boolean toggle) | Stop or start the tagging of Requests. |
| toString | public String toString() | Return the String Transporter plus the number of registered Destinations. |

Transporter.processDestinations(RequestEvent, Vector):AUS8-1999-0693

```java
/**
 * Given a RequestEvent and a Vector of destinations, call each Destination
 * in FIFO/FEFR order.
 * <p>
 * If tagging is enabled, then append a status tag to the RequestEvent.
 * @exception RequestException if the Request can't be submitted
 */
protected void processDestinations(RequestEvent request, Vector currentDestinations) throws RequestException {
    if (!enabled) {
        throw new RequestException("Transporter disabled");
    }
    if (currentDestinations == null)
        return;

/* process FIFO/FEFR */
    Destination d = null;
    int size = currentDestinations.size();
    for (int i = 0; !request.isConsumed() && i < size; i++) {
        d = (Destination) currentDestinations.elementAt(i);
        d.requestEventPerformed(request);
        /* Try to tag the request */
        if (tagging)
            request.setStatus (request.getStatus() + d);
    }
```

Transporter.requestEventPerformed(RequestEvent):AUS8-1999-0693

```
/**
 * Submit a synchronous request. For each Destination that is listening for
 * the current family of RequestEvents (the major code), send the RequestEvent
 * to the Destination for processing. If there is a problem, throw
 * a RequestException. Continue processing the RequestEvent as long
 * as a RequestException is not thrown by a Destination and the RequestEvent
 * is not consumed.
 * <p>
 * If tagging is enabled, then append a status tag to the RequestEvent.
 *<p>
 * Destinations are processed in the following FIFO order:
 * 1- All using "!" (priority).
 * 2- All using a major code.
 * 3- All using "*".
 *<p>
 * @exception RequestException if the Request can't be submitted
 */
public void requestEventPerformed(RequestEvent request) throws RequestException {
      if (!enabled) {
            throw new RequestException("Transporter disabled");
      }

/* Try to tag the request */
      if (tagging)
            request.setStatus(request.getStatus() + "[Transporter]");

/* Process PRIORITY, major and then WILDCARD destinations */
      processDestinations(request, getDestinations(PRIORITY));
      processDestinations(request, getDestinations(request.getMajor()));
      processDestinations(request, getDestinations(WILDCARD));
}
```
↘ 2606

FIG. 26F

```
/**
 * Submit an asynchronous request. See the synchronous
 * requestEventPerformed for more information.
 */
public void requestEventPerformed(RequestEvent request,
RequestResponseListener caller) throws RequestException {
      if (!enabled) {
            throw new RequestException("Transporter disabled");
      }
      if (tagging)
            request.setStatus(request.getStatus() +
                  "[Transporter async.]");

//start an inner class thread
      TransporterThread t = new TransporterThread(request, caller);
      runningThreads.put(request, t);
      t.start();
}
```
← 2608

Transporter.TransporterThread:AUS8-1999-0693

```
/**
 * Private class to handle executions of submits() on another
thread.
**/
private class TransporterThread extends Thread {
    /**
     * The current request
    /**
    private RequestEvent request;

/**
     * The caller of submit that we will call back
    **/
    private RequestResponseListener caller;

/**
     * Create a transporter thread
    **/
    public TransporterThread(RequestEvent request,
RequestResponseListener caller) {
            super();
            this.request = request;
            this.caller = caller;
    }
    /**
     * Just call the synchronous version of
requestEventPerformed()
    **/
    public void run() {
            try {
                    requestEventPerformed(request);
                    caller.requestResponse(request);
            } catch (RequestException yikes); {
                    caller.requestException(yikes);
            } finally {
                    runningThreads.remove(request);
            }
    }
}
```

Destination — 2700

Variables

| Name | Declaration | Description |
|---|---|---|
| _copyright | public static final String _copyright | (c) International Business Machines Inc., 1997 1998 1999. All rights reserved. |

Methods

| Name | Declaration | Description |
|---|---|---|
| getTimeout | public abstract long getTimeout() | Invoked to return the timeout value. |
| requestEventPerformed | public abstract void requestEventPerformed (RequestEvent request) throws RequestException | Invoked to process a RequestEvent. |
| setTimeout | public abstract void setTimeout(long timeout) | Invoked to set the timeout value in ms. |

FIG. 28A

DestinationImpl — 2800

Variables

| Name | Declaration | Description |
|---|---|---|
| _copyright | public static final String _copyright | (c) International Business Machines Inc., 1997 1998 1999. All rights reserved. |

Constructors

| Name | Declaration | Description |
|---|---|---|
| DestinationImpl | public DestinationImpl() | Default constructor. |

Methods 2804

| Name | Declaration | Description |
|---|---|---|
| clear | public void clear() | By default, do nothing. |
| exit | public void exit() | By default, do nothing. |
| getJTCs | public Vector getJTCs() | By default, do nothing. |
| getTimeout | public long getTimeout() | Return the timeout value. |
| init | public void init() | By default, do nothing. |
| isEnabled | public boolean isEnabled() | Is the Destination enabled? |
| requestEventPerformed | public void requestEventPerformed (RequestEvent request) throws RequestException | A RequestEvent has arrived. If not enabled, throw an exception. Subclasses can call this method first to see if processing should continue. |
| setEnabled | public void setEnable(boolean enable) | Enable or disable the Destination. A Destination that is called when disabled will throw a RequestException. By default, record it. |
| setTimeout | public void setTimeout(long timeout) | Set the timeout value. By default, record it. |
| toString | public String toString() | Returns a String that represents the value of this object which is the class name and time timeout value. |

FIG. 28C

RemoteDestination.requestEventPerformed(RequestEvent):AUS8-1999-0704
```
/**
 * Process request event.
 *
 * <P>PRE: None
 * <P>POST: None
 *
 * @param request the RequestEvent object to be processed.
 * @exception RequestException if there was an error during the
 *                              processing of the event.
 */
public void requestEventPerformed(RequestEvent request) throws
RequestException {
        try {
                Method method = null;
                if (session == null) {
                        // get home interface.
                        Context ctxt = getInitialContext();
                        Object home = ctxt.lookup(request.getMajor() +
"SessionHome");

method = home.getClass().getMethod("create", null);
                        session = method.invoke(home, null);
                }

//get method on home object and invoke it.
                method = session.getClass().getMethod(request.getMinor(),
                        new Class[] {Object.class});
                request.setData(method.invoke(session, new Object[]
{request.getData()}));

if (request.getMinor().equals("remove")) {
                        session = null;
                }
        } catch (InvocationTargetException te) {
                throw new RequestException(te.getTargetException());
        } catch (Throwable t) {
                throw new RequestException(t);
        }
}
```

FIG. 28D  2806

Factory

Variables

| Name | Declaration | Description |
| --- | --- | --- |
| _copyright | public static final String _copyright | (c) International Business Machines Inc., 1997 1998 1999. All rights reserved. |

Methods

| Name | Declaration | Description |
|---|---|---|
| list | public static void list() | Show the contents of the singletons. |
| newInstance | public static Object newInstance(String classname) throws ClassNotFoundException, InstantiationException, IllegalAccessException | Given a class name, create it and return it. |
| newInstance | public static Object newInstance(String classname, String key, boolean singleton) throws ClassNotFoundException, InstantiationException, IllegalAccessException | Given a class name, create the object and return it. If you want to create a singleton (true), then check to see if the object was already created and if so, return it. The class name is not used as the key but the "key" parameter is. |
| newInstance | public static Object newInstance(String classname, boolean singleton) throws ClassNotFoundException, InstantiationException, IllegalAccessException | Given a class name, create the object and return it. If you want to create a singleton (true), then check to see if the object was already created and if so, return it. Use the class name as the key. |
| newInstances | public static Vector newInstances(String classnames[]) throws ClassNotFoundException, InstantiationException, IllegalAccessException | Given some class names, create and return a Vector of objects. |
| newInstances | public static Vector newInstances(String classnames[], String keys[], boolean singleton) throws ClassNotFoundException, InstantiationException, IllegalAccessException | Given some class names, create and return a Vector of objects. If you want singleton objects system wide, then if any of the classes were already created, return them, otherwise, create the new ones, remember them and return them. The class names are not used as the keys but the "keys" parameters are. |
| newInstances | public static Vector newInstances(String classnames[], boolean singleton) throws ClassNotFoundException, InstantiationException, IllegalAccessException | Given some class names, create and return a Vector of objects. If you want singleton objects system wide, then if any of the classes were already created, return them, otherwise, create the new ones, remember them and return them. Use the class name as the key. |
| removeInstance | public static void removeInstance(String key) throws ClassNotFoundException, InstantiationException, IllegalAccessException | Given a class key, clear the reference to it. |
| removeInstances | public static void removeInstances(String keys[]) throws ClassNotFoundException, InstantiationException, IllegalAccessException | Given some class keys, clear the references. |

FIG. 30A

Interface com.ibm.jtc.JTC

3000

Variables

| Name | Declaration | Description |
|---|---|---|
| _copyright | public static final String_copyright | (c) International Business Machines Inc., 1997 1998 1999. All rights reserved. |
| _version | public static final String_version | |
| _author | public static final String_author | |
| _email | public static final String_email | |

Methods

| Name | Declaration | Description |
|---|---|---|
| clear | public abstract void clear() | Invoked to indicate that all memory allocations should be cleaned up. This includes removing listeners and flushing any lists (vectors or hashtables). A JTC object that has been cleared can be reused. |
| exit | public abstract void exit() | Invoked to indicate that all memory allocations should be cleaned up. This includes removing listeners and flushing any lists (vectors or hashtables). It also includes setting all variable references to null. A JTC object that has been cleared cannot be reused. |
| getJTCs | public abstract Vector getJTCs() | Invoked to get a Vector of all JTC objects that this JTC object has created. For example, a Transporter will at least return all of its Destinations. This is a very powerful mechanism. It allows us to get a reference to all primary objects in the JTC application and manipulate them according to the JTC methods, or by casting them to more specific classes or interfaces and manipulating them. Examples usage includes non code intrusive tracing, debugging, logging, profiling, etc. |
| init | public abstract void init() | Invoked to initialize the JTC object. The object should be ready for operation. |
| isEnabled | public abstract boolean isEnabled() | Invoked to determine if the JTC object is enabled. |
| setEnabled | public abstract void setEnabled(boolean enable) | Invoked to enable or disable the JTC object. |
| toString | public abstract String toString() | Invoked to get a String representation of the JTC object. |

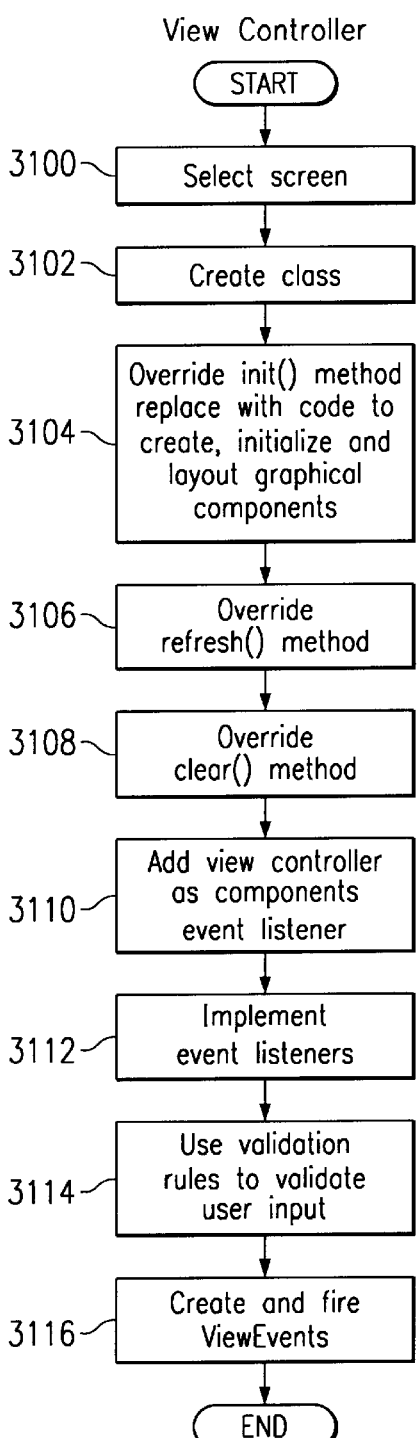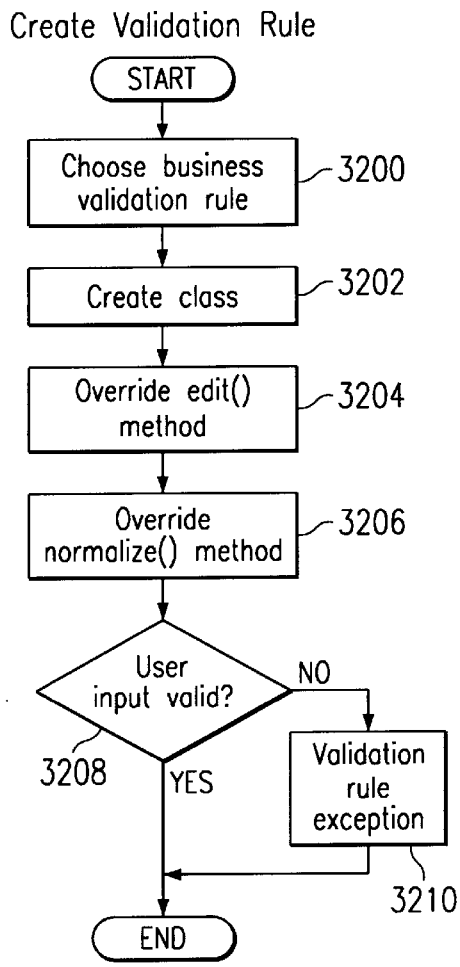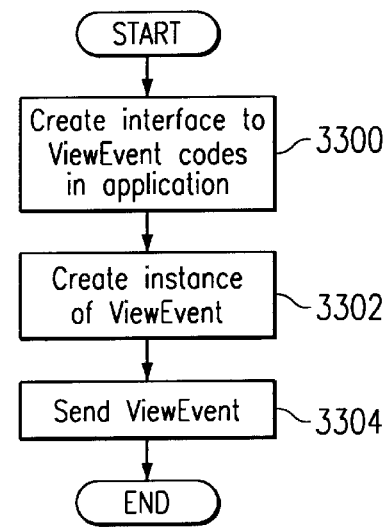
FIG. 31
FIG. 32
FIG. 33

ViewEvent and ViewListener Usage

→ Usage from a ViewController
```
public void actionPerformed(ActionEvent e) {
    if (e.getSource() == nextButton) {
        ViewEvent ve = new ViewEvent (this);
        ve.setMajor(ViewEvent.NEXT);
        fireViewEvent(ve);  //notify
    ViewEvent listener
        return;
    }
}
```

FIG. 42

→ Usage from ViewListener (i.e. ApplicationMediator)
```
//add myself as a listener
customerDetailsViewController.addViewListener(this);

//later, we are called back on this method to handle the
ViewEvent
    processViewEvent (ViewEvent event) {
        //do something
        switch (event.getMajor()) {
            case ViewEvent.NEXT: //...
            break;
            case ViewEvent.OK: //...
            break;
        }
    }
```

FIG. 43

Major and/or minor codes

→ Pre-defined major codes- A subclass can define others.
- // system
  - OK DONE OPEN CLOSE CANCEL EXIT FILE SAVE SAVEAS ERROR WARNING RETURN LOAD NOTIFY NOTIFY2 INFO SETUP PRINT LOGIN LOGOUT ENABLE DISABLE
- // status
  - TITLEMESSAGE STATUSMESSAGE ERRORMESSAGE SUGGESTIONMESSAGE
- // navigational
  - NEXT PREVIOUS FIRST LAST START BEGIN END PAUSE STOP RESTART SUBMIT BACKSPACE INSERT HOME PGUP PGDN LEFT RIGHT UP DOWN
- // live
  - FAST MEDIUM SLOW RUN DELAY WAIT TIMER ON OFF HIGH LOW
- // data related
  - LIST MORE ADD DELETE MODIFY NEW EDIT COPY CUT PASTE UNDO REMOVE PLUS MINUS INCREMENT DECREMENT CHANGED FILL EMPTY READY VIEW DETAILS READ WRITE UPDATE REFRESH
- // assit related
  - SEARCH FIND HELP HINT TRAIN TEACH SUGGEST
- // sub options related
  - A B C D E F OPTION CHOOSE
- // test values
  - TRACE UNTRACE DEBUG UNDEBUG LOG UNLOG HOOK UNHOOK
- // ibm values
  TEAM WIN EXECUTE

*FIG. 44*

ValidationRules Usage

Examples:
edit("123456") -> $1234.56
normalize("$1234.56") -> 123456
edit("12345x") -> ValidationRuleException → edit
  //validate and re-display
  String value = textfield.getText();
  try {
    result = SocialSecurity.edit(value);
  }
  catch (ValidationRuleException yikes) {
    //...
    return;
  }
  textField.setText(value);

*FIG. 45*

→ normalize
  //validate and update the data objects
  String value = textfield.getText();
  try {
    result = SocialSecurity.normalize(value);
  }
  catch (ValidationRuleException yikes) {
    //message box ...
    return;
  }
  dataObject.setText(value);

*FIG. 46*

ValidationRules Usage
→ Example Chaining

```
//each rule
String range = "com.xyz.jtc.RangeChecker";
String money = "com.xyz.jtc.AccountMoney";

//build the chain of rules
String[] rules = {range, money};

//get the value to validate
String value = textField.getText();

try {
    value = applyEdits(rules, input);
}
catch (ValidationRuleException ouch) {
    //...
}

//the value is validated and formatted, redisplay
textField.setText(value);
```

FIG. 47

ViewControllerBaseImpl
→ For example:
• inheritance

```
public class ViewControllerBaseImpl extends JPanel {
    public Component getComponent() {
        return this;
    }
}
```

FIG. 48

• delegation

```
public class ViewControllerBaseImpl implements ViewController
{
    XYZ xyz = new XYZ();

public java.awt.Component getComponent() {
        return xyz;
    } public void setEnabled(boolean e) {
        xyz.setEnabled(e);
    } public void setVisible(boolean v) {
        xyz.setVisible(v);
    }
}
```

FIG. 49

Design Steps for an ApplicationMediator

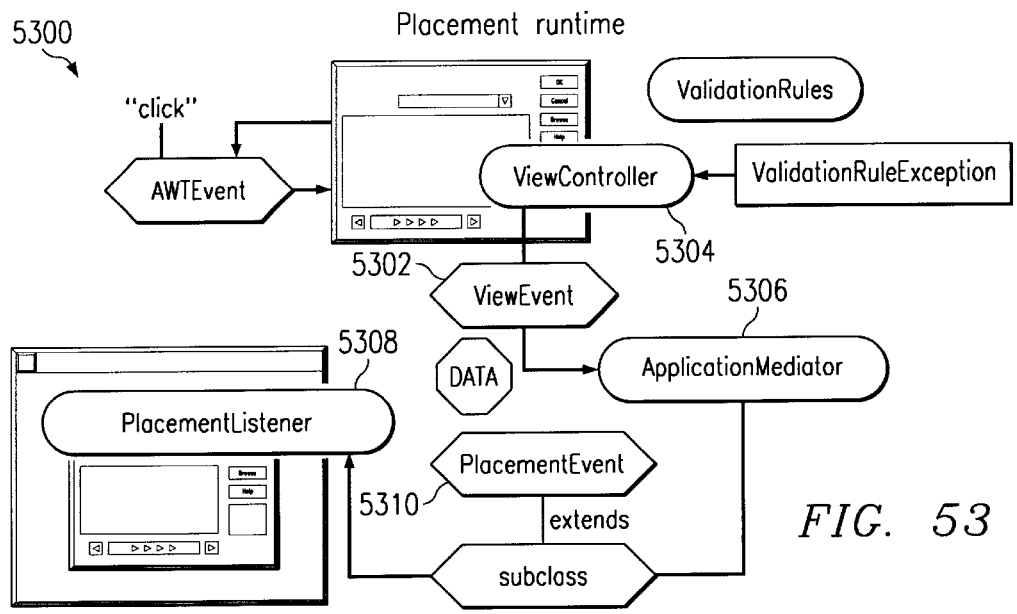

FIG. 53

Placement example

→ Usage from ApplicationMediator
    //in an ApplicationMediator
    int major = PlacementEvent.ADD;
    Component component =
    customerDetailsViewController.getComponent();
    PlacementEvent e = new PlacementEvent(this, component, major);
    firePlacementEvent(e);

FIG. 54

→ Usage from PlacementListener
    public class MyProgram implements PlacementListener {
        public void placementEventPerformed(PlacementEvent e) {
            //decide based on source type
            switch (e.getMajor()) { case PlacementEvent.ADD:
                    if (e.getSource() instanceof PreferencesAm)
                        panel1.add("Center", e.getComponent());
                    else panel2.add("A", e.getComponent());
                break;
                case PlacementEvent.REMOVE:
                    //do something else
                break;
            }
            //etc.
        }
    }

FIG. 55

Design Steps for a PlacementEvent

TopListener example

```
//from the TopListener
ApplicationMediatorXYZ m = new ApplicationMediatorXYZ();
m.addTopListener(this);
```

*FIG. 58*

```
//in the ApplicationMediator
String status = "Loading files...";
TopEvent e = new TopEvent(this, TopEvent.STATUS, 0, status);
fireTopEvent(e);
```

*FIG. 59*

```
//later in the TopListener callback
public void topEventPerformed(TopEvent e) {
    switch(e.getMajor()) {
        case STATUS:
            //access the browser
            break;
        /etc.
    }
}
```

*FIG. 60*

RequestEvent example

```
//from an ApplicationMediator - create event
RequestEvent r = new RequestEvent();
r.setMajor ("Loans");
r.setMinor("SubmitCustomerInfo");
```

*FIG. 62*

```
//fire an asynchronous event
try {
    //asynchronous
    fireRequestEvent(this, r);
}
catch (RequestException yikes) {}
```

*FIG. 63*

```
//later, called back with success
public void requestResponse(RequestEvent result) {
    //process response
}

//or failure
public void requestException(RequestException yikes) {
    //now what?
}
```

*FIG. 64*

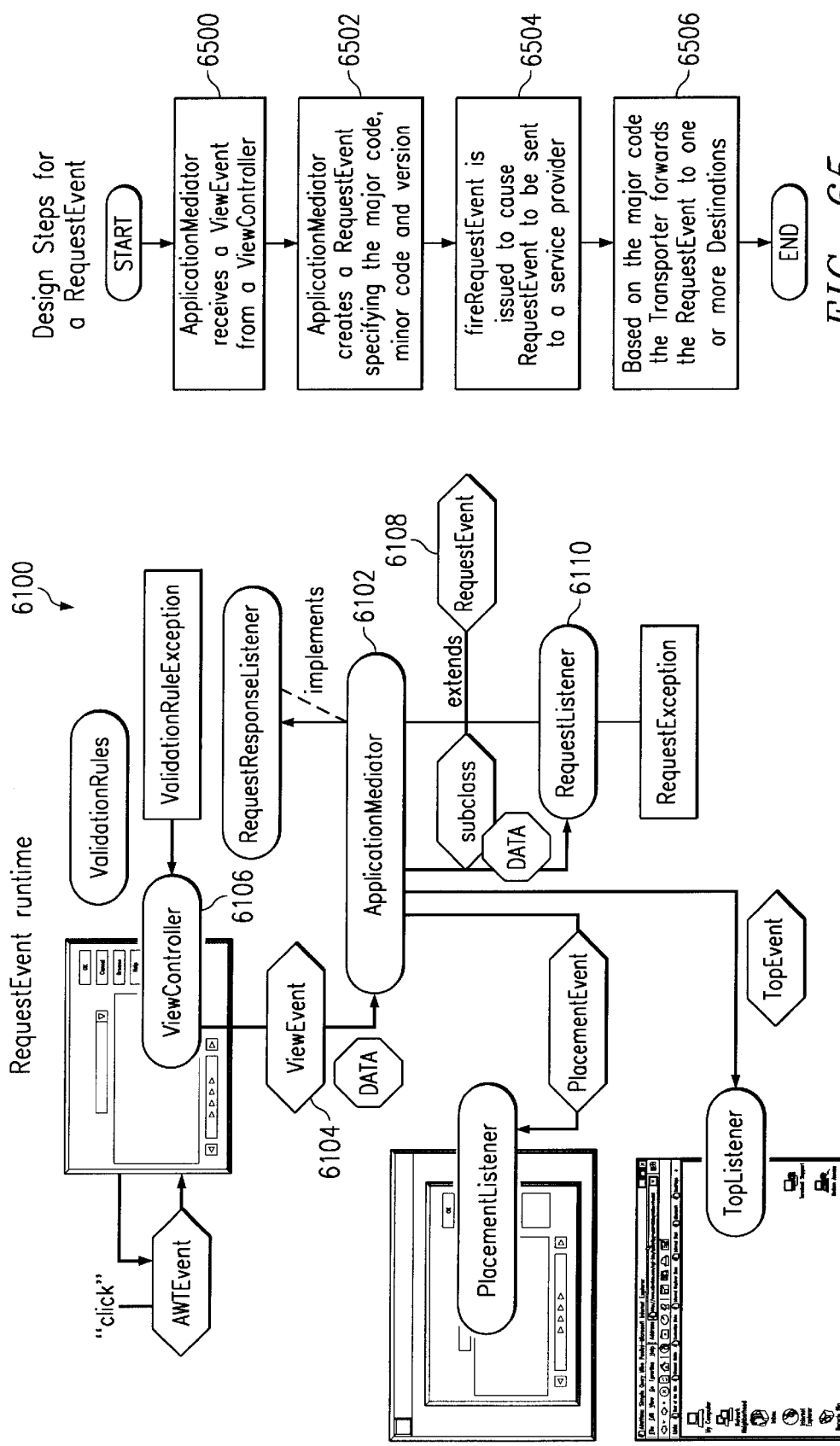

Transporter

→ This class implements the JTC and RequestEventListener interfaces
→ Its primary function is to map RequestEvents to Destinations.
  • Typically ApplicationMediators fire RequestEvents and Destinations process them
→ Add a Transporter to an ApplicationMediator to listen for RequestEvents

```
Transporter t = new Transporter();
ApplicationMediator am = new ApplicationMediator();
am.addRequestListener(t);
```

→ The ApplicationMediator will fire RequestEvents

```
RequestEvent r = new RequestEvent(source, major, minor, data);
try {
      fireRequestEvent(r);
}
catch (RequestException yikes) {}
```

FIG. 67

Destination

→ RequestEvents are identified by
  • major code – represents a family of Requests
  • minor code – represents a specific Request
→ Destinations are added to the Transporter as DestinationListeners
    specifing a major code for RequestEvents they are interested in receiving
→ The destination is called when the major code of the RequestEvent
  matches the destination major code

```
EJBDestination d = new EJBDestination();
Transporter t = new Transporter();
String major = "Loans";
t.addDestinationListener(major, d);
```

→ Multiple Destinations can listen for the same RequestEvent major code
  • processed FIFO/FESP (first in first out, first exception stop forwarding)
  • results of one Destination can be passed to the next Destination

*FIG. 69*

Destinations and major codes

→ Special major codes
  • wildcard
    ▪ "*" major code indicates the Destination is interested in all and any RequestEvents
    ▪ processed after specific major codes have been matched.
  • priority
    ▪ "!" major code indicates the Destination is interested in all requests and should be given priority.
    ▪ processing performed before specific major codes and wildcards
→ For example

```
Transporter t = new Transporter();
t.addDestinationListener ("*", new WildDestination ());
t.addDestinationListener ("Loans", new EJBDestination());
t.addDestinationListener ("!", new PriorityDestination());

//later
RequestEvent r = new RequestEvent(this, "Loans", " ", null);
try {
    fireRequestEvent(r);
}
catch (RequestException yikes) {}
```

• The RequestEvent "r" will be sent to PriorityDestination 1st, EJBDestination 2nd,
  and WildDestination() 3rd, assuming no RequestExceptions are thrown.

*FIG. 70* getJTCs example
// Recursively look at the root, find each JTC and/or AWT and hook
public void hookJTCs(JTC root) {
    Vector jtcs = null;
    try {
        jtcs = root.getJTCs();
    } catch (Exception none) { return; } // should not happen if (jtc == null) return; //we are done int size = jtcs.size();
    for (int j = 0; j < size; j++) {
        Object current = jtcs.elementAt(j);
        if (current instanceof ApplicationMediator) {
            hookAM((ApplicationMediator) current);
        } else
            if (current instanceof ViewController) {
                hookVC((ViewController) current);
            } else
                if (current instanceof Transporter) {
                    hookTransporter((Transporter) current);
                } else
                    if (current instanceof java.awt.Component) {
                        //once into AWT tree, never back to JTCs
                        hookAWTs((java.awt.Component) current);
                        continue;
                    }
        hookJTCs((JTC) jtcs.elementAt(j)); //recursive
    }
}

FIG. 71 hookJTC helpers
/**
 * Hook the ApplicationMediator
 */
public void hookAM(ApplicationMediator am) {
    vc1.refresh("ApplicationControllers found:" + am);
    am.addViewListener(this);
    am.addRequestListener(this);
    vc1.refresh("....add as ViewListener");
    vc1.refresh("....add as RequestListener");
}

/**
 * Hook the ViewController and it's getComponent()
 */
public void hookVC(ViewController vc) {
    vc1.refresh("ViewController found:" + vc);
    vc.addViewListener(this);
    vc1.refresh("....add as ViewListener");
    hookAWTs(vc.getComponent());
}

/**
 * Hook the Transporter
 */
public void hookTransporter(Transporter transporter) {
    vc1.refresh("Transporter found:" + transporter);
    transporter.addDestinationListener("!", this);
    vc1.refresh("....add as ! DestinationListener");
}

FIG. 72

```
hookAWTs
//Recursively find each AWT object and hook
public void hookAWTs(Component comp) {
    if (component instanceof Container) {
        vc1.refresh("Container found:" + comp);
        Component[] comps = ((Container) comp).getComponents();
        int size = comps.length;
        for (int i = 0; i < size; i++) {
            hookAWTs(comps[i]);
        }
    }
    /* continue here since some regular Components, such as JLabels,
     * are Containers also.
     */
    if (comp instanceof Button) {
        hookAWTButton((Button) comp);
    }
    else
    if (comp instanceof JButton) {
        hookSwingJButton((JButton) comp);
    }
    else
        if (component instanceof JTextField) {
            hookSwingJTextField((JTextField) comp);
        }
        /*...else do over every other Bean/Component/Container
         * type possibly using reflection or a table driven
         * implementation.
         */
}
```

FIG. 73

```
hookAWTs - helpers

/**
 * Hook the java.awt.Button
 */
public void hookAWTButton(Button button) {
    vc1.refresh("java.awt.Button found:" + button);
    button.addActionListener(this);
    vc1.refresh("....add as ActionListener");
}

/**
 * Hook the com.sun.java.swing.JButton
 */
public void hookSwingJButton(JButton button) {
    vc1.refresh("com.sun.java.swing.JButton found:" + button);
    button.addActionListener(this);
    button.addChangeListener(this);
    button.addItemListener(this);
    vc1.refresh("....add as ActionListener");
    vc1.refresh("....add as ChangeListener");
    vc1.refresh("....add as ItemListener");
}

/**
 * Hook the com.sun.java.swing.JTextField
 */
public void hookSwingJTextField(JTextField textfield) {
    vc1.refresh("com.sun.java.swing.JTextField found:" textfield);
    textfield.addActionListener(this);
    textfield.addCaretListener(this);
    vc1.refresh("....add as ActionListener");
    vc1.refresh("....add as CaretListener");
}
```

FIG. 74

Data Objects

✓ The ApplicationMediatorImpl will forward the refresh (default)

```
for each: ApplicationMediator -> refresh(data)
for each: ViewController -> refresh(data);
```

*FIG. 79*

✓ The ViewController will update the GUI

```
public void refresh(Object data) {
  //this example uses a keyValue pair data model if (data == null) return;
    else refresh((KeyValue) data);
} public void refresh (KeyValue data) {
    nameField.setText(data.get("CustomerName"));
    idField.setText(data.get("CustomerId"));
    repaint(); //if necessary
}
```

*FIG. 80*

Data Objects

✓ How can we add a new data model (i.e. real objects)?
```
    public void refresh(Object data) {
       if (data == null) return;
       else if (data instanceof Vector) {
           refresh((Vector) data);
       }
       else if (data instanceof KeyValue) {
              refresh((KeyValue) data);
           }
    }
```

*FIG. 81*

```
public void refresh(Vector data) {
    //I know what they are
    Customer c = (Customer) data.elementAt(0);
    ID id = (ID) data.elementAt(1);
    nameField.setText(c.getName());
    idField.setText(id.toString());
    repaint(); //if necessary
}
```

*FIG. 82*

Encoding ApplicationMediators

→ S1: (VE.source==vc1 && VE.major==A && VE.minor==B) =>
(RE.major=C RE.minor=D RE.data=VE.data RE.fireS)
 if event source is vc1 with A,B as major/minor then
  fire sync request with C,D major/minor and use data from event)

→ S2: VE.source==vc4 && VE.major==5) ==> (TE.major=3 TE.fire)
 if event source is vc4 with 5 as major then
  fire top event with major 3

→ S3: (Refresh) ==> (VC.i.refresh(Refresh.data))
 if refresh(data) occurs, then refresh all view controllers with the
 same data, but not the other application mediators → S4: (VE.source==vcA) ==> (RE.major="set"RE.fireA) &&
(PE.major=PE.ADD PE.source=vcB PE.fire) && (VC.vcB.refresh(RE.data))
 if event source is vcA, then fire async request, then fire placement
 event, then refresh the newly placed view controller with the data
 returned with the request

*FIG. 102*

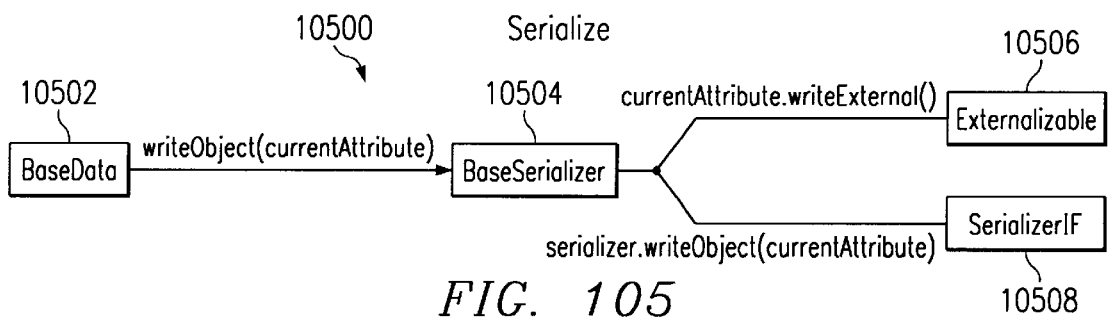

*FIG. 105*

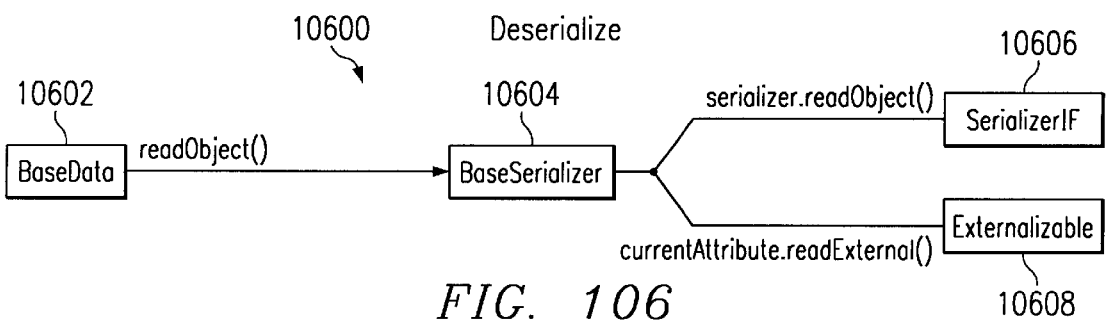

```
package com.ibm.jtcx.serialization;

import java.io.Externalizable;
import java.io.IOException;
import java.io.ObjectInput;
import java.io.ObjectOutput;
/**
 * Default type comment.
 *
 * <P>INVARIANT:
 */
public class BaseData implements Externalizable {
        private Object[] data = null;
/**
 * BaseData constructor comment.
 */
public BaseData() {
        this(0);
}
/**
 * BaseData constructor comment.
 * @param dataArray java.lang.Object[]
 */
public BaseData(int count) {
        super();

setData(new Object[count]);
}
/**
 * Default method comment.
 *
 * <P>PRE:
 * <P>POST:
 *
 * @return Parameter not modified
 * @return java.lang.Object[]
 */
public final Object[], getData() {
        return data;
}
```

```
/**
 * Default method comment.
 *
 * <P>PRE:
 * <P>POST:
 *
 * @return Parameter not modified
 * @return java.lang.Object
 * @param index int
 */
public final Object getData(int index) {
        Object retVal = null;

if ((data != null) && (index < data.length)) {
                retVal = data[index];
        } return retVal;
}
/**
 * Default method comment.
 *
 * <P>PRE:
 * <P>POST:
 *
 * @return Parameter not modified
 * @param in ObjectInput
 */
public void readExternal(ObjectInput in)
        throws ClassNotFoundException, IOException { setData((Object[])in.readObject());
}
/**
 * Default method comment.
 *
 * <P>PRE:
 * <P>POST:
 *
 * @return Parameter not modified
 * @param dataArray java.lang.Object[]
 */
public final void setData(Object[] dataArray) {
        data = dataArray;
}
```

```
/**
 * Default method comment.
 *
 * <P>PRE:
 * <P>POST:
 *
 * @return Parameter not modified
 * @param index int
 * @param dataElement java.lang.Object
 */
public final void setData(int index, object dataElement) {
    if ((data != null) && (index < data.length)) {
        data[index] = dataElement;
    }
}
/**
 * Default method comment.
 *
 * <P>PRE:
 * <P>POST:
 *
 * @return Parameter not modified
 * @param out ObjectOutput
 */
public void writeExternal(ObjectOutput out) throws IOException {
    out.writeObject(getData());
}
```

```java
package com.ibm.jtcx.serialization;
import java.io.Externalizable;
import java.io.IOException;
import java.io.ObjectInput;
import java.io.ObjectOutput;
import java.math.BigDecimal;
import java.math.BigInteger;
import java.util.Date;
import java.util.Enumeration;
import java.util.GregorianCalendar;
import java.util.Hashtable;
import java.util.SimpleTimeZone;
import java.util.TimeZone;
import java.util.Vector;
/**
 * Base class of data objects that require small serialization. The
 * attributes of the data object are stored in an array and the elements
 * of the array are written individually.
 *
 * <P>INVARIANT:
 */
public class BaseDataS extends BaseData implements Externalizable {
/**
 * Default constructor.
 */
public BaseDataS() {
        super();
}
/**
 * Creates a new <code>BaseDataS</code> object with a data array of
 * size <code>count</code>.
 *
 * @param count the size of the data array containing the attributes
 */
public BaseDataS(int count) {
        super(count);
```

FIG. 108A

```java
}
/**
 * Reads the array of data elements from the stream. The responsibility
 * of reading the individual element is left to the
 * <code>BaseSerializer</code> via <code>readObject()<code>.
 *
 * @param in the input stream that contains the serialized object
 * @exception ClassNotFoundException thrown if
 * <code>BaseSerializer</code> fails to read the object from the stream
 * @exception IOException thrown if
 * <code>BaseSerializer</code> fails to read the object from the stream
 * @see BaseSerializer#readObject
 */
public void readExternal(ObjectInput in)
        throws ClassNotFoundException, IOException { int size = in.readShort();

if (size == -1) {
            setData(null);
    } else {
            Object[] array = new Object[size];

for (int i = 0; i < size; i++) {
                    array[i] = BaseSerializer.getInstance().readObject(in);
            } setData(array);
    }
}
/**
 * Writes the array of data elements. The responsibility of writing the
 * data elements is left to <code>BaseSerializer</code> via
 * <code>writeObject()</code>.
 *
 * @param out the output stream to which the data elements will be
 * written
 */
public void writeExternal(ObjectOutput out) throws IOException {
    Object[] array = getData();

if (array == null) {
            out.writeShort(-1);
    } else {
            out.writeShort(array.length);

for (int i = 0; i < array.length; i++) {
                    BaseSerializer.getInstance().writeObject(out, array[i]);
            }
    }
}
```

```java
package com.ibm.jtcx.serialization;

import java.io.IOException;
import java.io.ObjectInput;
import java.io.ObjectOutput;
/**
 * The interface for those classes that serialize objects to and from
 * a stream. The object that implements this interface should write
 * just the object's attributes, not any other descriptive information
 * about the object. Typically, a <code>SerializerIF</code> knows how
 * to serialize a specific class.
 */
public interface SerializerIF {
/**
 * Reads an object from the stream.
 *
 * @return The object that was read.
 * @param in the input stream containing the object
 * @exception java.io.IOException thrown if the stream fails
 * @exception java.lang.ClassNotFoundException thrown if the stream
 * fails
 */
Object readObject(ObjectInput in) throws IOException, ClassNotFoundException;
/**
 * Writes the given object to the stream.
 *
 * @param out the output stream into which the object will be written
 * @param element the object that will be written to the stream
 * @exception java.io.IOException thrown if the stream fails
 */
void writeObject(ObjectOutput out, Object element) throws IOException;
}
```

```java
package com.ibm.jtcx.serialization;

import java.io.*;
import java.math.BigInteger;
import java.math.BigDecimal;
import java.util.Date;
import java.util.GregorianCalendar;
import java.util.Hashtable;
import java.util.SimpleTimeZone;
import java.util.StringTokenizer;
import java.util.TimeZone;
import java.util.Vector;

/**
 * The <code>SerializerIF</code> that is used as the base level
 * serializer. It contains three tables used to serialize objects:
 * <br><ul>
 *          <li> codeTable: the table containing the serialization code of
 *               an object based on the name of the class
 *          <li> nameTable: the table containing the name of the class
 *               based on the serialization code
 *          <li> serializationTable: the table containing the serializer of
 *               an object based on its serialization code
 * </ul>
 * <br><br>
 * <code>BaseSerializer</code> delegates the responsibility of
 * serializing the objects to the <code>SerializerIF</code> associated
 * with that class or to the object itself if it implements
 * <code>Externalizable</code>.
 */
public class BaseSerializer implements SerializerIF {
        static private final int NULL_OBJECT = 0;
        static private final int OTHER = 0x00ff;

static private final String HASHTABLE_SER = "ClassNameHash.ser";
        static private final String INI_FILE = "ClassNames.ini";

static private Hashtable codeTable = null;
        static private Hashtable nameTable = null;
        static private Hashtable serializerTable = null;
        static private BaseSerializer instance = null;

class BigDecimalSerializer implements Serializer IF {
                public Object readObject(ObjectInput in) throws ClassNotFoundException, IOException {
```

```
        int scale = in.readShort();
        int size = in.readShort();
        byte[] bytes = new byte[size];
        in.readFully(bytes);

BigInteger temp = new BigInteger(bytes);
        return new BigDecimal(temp, scale);
    }
    public void writeObject(ObjectOutput out, Object element) throws IOException {
        BigDecimal bigD = (BigDecimal)element;

int scale = bigD.scale();
        bigD.setScale(0);
        byte[] bytes = bigD.toBigInteger().toByteArray();
        bigD.setScale(scale);

out.writeShort(scale);
        out.writeShort(bytes.length);
        out.write(bytes);
    }
}
class BigIntegerSerializer implements SerializerIF {
    public Object readObject(ObjectInput in) throws ClassNotFoundException, IOException
{
        int size = in.readShort();
        byte[] bytes = new byte[size];
        in.readFully(bytes);

return new BigInteger(bytes);
    }
    public void writeObject(ObjectOutput out, Object element) throws IOException {
        byte[] bytes = ((BigInteger)element).toByteArray();

out.writeShort(bytes.length);
        out.write(bytes);
    }
}
class BooleanSerializer implements SerializerIF {
    public Object readObject(ObjectInput in) throws ClassNotFoundException, IOException
{
        int value = in.readByte();

return (value == 1) ? Boolean.TRUE: Boolean.FALSE;
    }
    public void writeObject(ObjectOutput out, Object element) throws IOException {
        out.writeByte(((Boolean)element).booleanValue() ? 1 : 0);
    }
}
```

```
class ByteSerializer implements SerializerIF {
        public Object readObject(ObjectInput in) throws ClassNotFoundException, IOException {
                byte value = in.readByte();

return new Byte(value);
        }
        public void writeObject(ObjectOutput out, Object element) throws IOException {
                out.writeByte(((Byte)element).byteValue());
        }
}
class CharacterSerializer implements SerializerIF {
        public Object readObject(ObjectInput in) throws ClassNotFoundException, IOException {
                char value = in.readChar();

return new Character(value);
        }
        public void writeObject(ObjectOutput out, Object element) throws IOException {
                out.writeChar(((Character)element).charValue());
        }
}
class DateSerializer implements SerializerIF {
        public Object readObject(ObjectInput in) throws ClassNotFoundException IOException {
                long value = in.readLong();

return new Date(value);
        }
        public void writeObject(ObjectOutput out, Object element) throws IOException {
                out.writeLong(((Date)element).getTime());
        }
}
class DoubleSerializer implements SerializerIF {
        public Object readObject(ObjectInput in) throws ClassNotFoundException, IOException {
                double value = in.readDouble();

return new Double(value);
        }
        public void writeObject(ObjectOutput out, Object element) throws IOException {
                out.writeDouble(((Double)element).doubleValue());
        }
}
```

```
class FloatSerializer implements SerializerIF {
        public Object readObject(ObjectInput in) throws ClassNotFoundException, IOException {
            float value = in.readFloat();

return new Float(value);
        }
        public void writeObject(ObjectOutput out, Object element) throws IOException {
            out.writeFloat(((Float)element).floatValue());
        }
}
class GregorianCalendarSerializer implements SerializerIF {
        public Object readObject(ObjectInput in) throws ClassNotFoundException, IOException {
            long time = in.readLong();
            Date date = new Date(time);
            SerializerIF serializer = BaseSerializer.getInstance();
            TimeZone tz = (TimeZone)serializer.readObject(in);

GregorianCalender gCalender = new GregorianCalendar(tz);
            gCalendar.setTime(date);

return gCalendar;
    }
    public void writeObject(ObjectOutput out, Object element) throws IOException {
            GregorianCalendar temp = (GregorianCalendar)element;

Date date = temp.getTime();
            TimeZone tz = temp.getTimeZone();

out.writeLong(date.getTime());
            SerializerIF serializer = BaseSerializer.getInstance();
            serializer.writeObject(out, tz);
        }
}
class IntegerSerializer implements SerializerIF {
        public Object readObject(ObjectInput in) throws ClassNotFoundException, IOException {
            int value = in.readInt();

return new Integer(value);
        }
        public void writeObject(ObjectOutput out, Object element) throws IOException {
            out.writeInt(((Integer)element).intValue());
        }
}
class LongSerializer implements SerializerIF {
        public Object readObject(ObjectInput in) throws ClassNotFoundException, IOException {
```

```
        long value = in.readLong();

return new Long(value);
    }
    public void writeObject(ObjectOutput out, Object element) throws IOException {
        out.writeLong(((Long)element).longValue());
    }
}
class ObjectArraySerializer implements SerializerIF {
    public Object readObject(ObjectInput in) throws ClassNotFoundException, IOException {
        int size = in.readShort();

Object[] array = new Object[size];
        for (int i = 0; i < size; i++) {
            SerializerIF serializer = BaseSerializer.getInstance();
            array[i] = serializer.readObject(in);
        } return array;
    }
    public void writeObject(ObjectOutput out, Object element) throws IOException {
        Object[] array = (Object[])element;

out.writeShort(array.length);
        for (int i = 0; i < array.length; i++) {
            SerializerIF serializer = BaseSerializer.getInstance();
            serializer.writeObject(out, array[i]);
        }
    }
}
class ObjectSerializer implements SerializerIF {
    public Object readObject(ObjectInput in) throws ClassNotFoundException, IOException {
        return in.readObject();
    }
    public void writeObject(ObjectOutput out, Object element) throws IOException {
        out.writeObject(element);
    }
}
class ShortSerializer implements SerializerIF {
    public Object readObject(ObjectInput in) throws ClassNotFoundException, IOException {
        short value = in.readShort();

return new Short(value);
    }
```

```
        public void writeObject(ObjectOutput out, Object element) throws IOException {
            out.writeShort(((Short)element).shortValue());
        }
}
class SimpleTimeZoneSerializer implements SerializerIF {
        public Object readObject(ObjectInput in) throws ClassNotFoundException, IOException {
            int offset = in.readInt();
            SerializerIF serializer = BaseSerializer.getInstance();
            String id = (String)serializer.readObject(in);

return new SimpleTimeZone(offset, id);
        }
        public void writeObject(ObjectOutput out, Object element) throws IOException {
            SimpleTimeZone temp = (SimpleTimeZone)element;

out.writeInt(temp.getRawOffset());
            SerializerIF serializer = BaseSerializer.getInstance();
            serializer.writeObject(out, temp.getID());
        }
}
class StringSerializer implements SerializerIF {
        public Object readObject(ObjectInput in) throws ClassNotFoundException, IOException {
            int size = in.readShort();
            byte[] bytes = new byte[size];
            in.readFully(bytes);

return new String(bytes);
        }
        public void writeObject(ObjectOutput out, Object element) throws IOException {
            byte[] bytes = ((String)element).getBytes();

out.writeShort(bytes.length);
            out.write(bytes);
        }
}
class VectorSerializer implements SerializerIF {
        public Object readObject(ObjectInput in) throws ClassNotFoundException, IOException {
            int size = in.readShort();

Vector vector = new Vector(size);
            for (int i = 0; i < size; i++) {
                SerializerIF serializer = BaseSerializer.getInstance();
                vector.addElement(serializer.readObject(in));
            }
```

```
            return vector;
    }
    public void writeObject(ObjectOutput out, Object element) throws IOException {
        Vector temp = (Vector)element;

Object[] array = new Object[temp.size()];
        for (int i = 0; i < array.length; i++) {
            array[i] = temp.elementAt(i);
        } out.writeShort(array.length);
        for (int i = 0; i < array.length; i++) {
            SerializerIF serializer=BaseSerializer.getInstance();
            serializer.writeObject(out, array[i]);
        }
    }
}
/**
 * Default constructor. The constructor is private because this is a
 * singleton class. When the object is constructed, it initializes its
 * tables.
 */
private BaseSerializer() {
    init();
}
/**
 * Adds the given elements to the three tables.
 *
 * @param className the name of the class
 * @param code the code for the given class
 * @param serializer the object responsible for serializing the given
 * class
 */
private void addDataToTables(String className, Number code, SerializerIF serializer) {
    getCodeTable().put(code, className);
    getNameTable().put(className, code);

if (serializer != null) {
        getSerializerTable().put(code, serializer);
    }
}
```

```java
/**
 * Creates the codes and serializer objects for the default serialization
 * classes and adds them to the tables. The tables are then written to
 * a serialized file.
 */
private void createDefaultTables() {
        addDataToTables(BigDecimal.class.getName(), new Byte((byte)1), new BigDecimalSerializer());
        addDataToTables(BigInteger.class.getName(), new Byte((byte)2), new BigIntegerSerializer());
        addDataToTables(Boolean.class.getName(), new Byte((byte)3), new BooleanSerializer());
        addDataToTables(Byte.class.getName(), new Byte((byte)4), new ByteSerializer());
        addDataToTables(Character.class.getName(), new Byte((byte)5), new CharacterSerializer());
        addDataToTables(Date.class.getName(), new Byte((byte)6), new DateSerializer());
        addDataToTables(Double.class.getName(), new Byte((byte)7), new DoubleSerializer());
        addDataToTables(Float.class.getName(), new Byte((byte)8), new FloatSerializer());
        addDataToTables(GregorianCalendar.class.getName(), new Byte((byte)9), new GregorianCalendarSerializer());
        addDataToTables(Integer.class.getName(), new Byte((byte)10), new IntegerSerializer());
        addDataToTables(Long.class.getName(), new Byte((byte)11), new LongSerializer());
        addDataToTables(Short.class.getName(), new Byte((byte)12), new ShortSerializer());
        addDataToTables(SimpleTimeZone.class.getName(), new Byte((byte)13), new SimpleTimeZoneSerializer());
        addDataToTables(String.class.getName(), new Byte((byte)14), new StringSerializer());
        addDataToTables(Vector.class.getName(), new Byte((byte)15), new VectorSerializer());
        addDataToTables(Object.class.getName(), new Byte((byte)16), new ObjectSerializer());

writeTables();
}
/**
 * Returns an instance of the table of class names, keyed by their code.
 * If the table does not exist, it is created.
 *
 * @return The table of class names.
 */
protected Hashtable getCodeTable() {
        if (codeTable == null) {
                codeTable = new Hashtable();
        }
```

```
            return codeTable;
    }
    /**
     * Returns an instance of <code>BaseSerializer</code>.
     *
     * @return An instance of <code>BaseSerializer</code>.
     */
    public static SerializerIF getInstance() {
            if (instance == null) {
                    instance = new BaseSerializer();
            } return instance;
    }
    /**
     * Returns an instance of the table of codes, keyed by their
     * corresponding class name.
     * If the table does not exist, it is created.
     *
     * @return The table of codes.
     */
    protected Hashtable getNameTable() {
            if (nameTable == null) {
                    nameTable = new Hashtable();
            } return nameTable;
    }
    /**
     * Returns an instance of the table of serializers, keyed by their
     * corresponding code.
     * If the table does not exist, it is created.
     *
     * @ return The table of class names.
     */
    protected Hashtable getSerializerTable() {
            if (serializerTable == null) {
                    serializerTable = new Hashtable();
            } return serializerTable;
    }
    /**
     * Initializes the hashtable from either a serialized hashtable or from
     * an ini file.
     */
```

```
protected void init() {
        File serializedFile = new File(HASHTABLE_SER);
        File iniFile = new File(INI_FILE);

if (serializedFile.exists()) {
                readSerializedFile(serializedFile);
        } else {
                if (iniFile.exists()) {
                        readIniFile(iniFile);
                } createDefaultTables();
        }
}
/**
 * Gets the value of the serialization code from the table based on
 * the className provided. The value returned can either be a
 * <code>Byte</code> or an <code>Integer</code>. The return value
 * will be a <code>Byte</code> if the className is one of the base
 * data types.
 *
 * @return The serialization code of the className.
 * @param className the name of the class
 */
private Number lookupCode(String className) {
        Number code = null;

if (className != null) {
                code = (Number)getNameTable().get(className);
        } return code;
}
/**
 * Looks up the hashcode in the table and returns the String value of
 * the hashcode. If the hashcode does not exist in the table
 * <code>null</code> is returned.
 *
 * @return The object that was stored in the table with the given
 *              hashcode.
 * @param hashcode the hashcode that will be used to look up the value
 */
```

```java
private String lookupName(Number code) {
        String className = null;

if (code != null) {
                className = (String)getCodeTable().get(code);
        } return className;
}
/**
 * Default method comment.
 *
 * <P>PRE:
 * <P>POST:
 *
 * @return Parameter not modified
 * @return com.ibm.jtc.util.SerializerIF
 * @param code int
 */
private SerializerIF lookupSerializer(Number code) {
        SerializerIF serializer = null;

if (code != null) {
                serializer = (SerializerIF)getSerializerTable().get(code);
        } return serializer;
}
/**
 * Default method comment.
 *
 * <P>PRE:
 * <P>POST:
 *
 * @return Parameter not modified
 * @param iniFile java.io.File
 */
private void readIniFile(File iniFile) {
        BufferedReader in = null;

try {
                in = new BufferedReader(new FileReader(iniFile));

for (String inLine = in.readLine(); inLine != null; inLine = in.readLine()) {
                        String trimLine = inLine.trim();
```

```
        if ((trimLine.length() > 0) &&
                !trimLine.startsWith("#")) {
            StringTokenizer tokenizer = new StringTokenizer(trimLine);

String className = tokenizer.nextToken();
            Integer code = new Integer(className.hashCode());
            SerializerIF serializer = null;

if (tokenizer.hasMoreTokens()) {
                String serializerName = tokenizer.nextToken();

try {
                    serializer = (SerializerIF)Class.forName(serializerName).newInstance();
                } catch(Exception e) { }
            } addDataToTables(className, code, serializer);
        }
    }
} catch (Exception throwAway) {
} finally {
    try {
        in.close();
    } catch (Exception throwAway) {
    }
} writeTables();
}
/**
 * Reads the object from the stream by first reading the code for the
 * element then reads the appropriate data for that object.
 *
 * @return The object that was read from the stream.
 * @param in the input stream that contains the object
 */
public Object readObject(ObjectInput in)
        throws ClassNotFoundException, IOException {
    Object retVal = null;
    Number code = null;

byte baseCode = in.readByte();
```

```
        if (baseCode == NULL_OBJECT) {
                retVal = null;
        } else {
                if (baseCode != OTHER) {
                        code = new Byte(baseCode);
                } else {
                        int secondCode = in.readInt();
                        code = new Integer(secondCode);
                }

SerializerIF serializer = lookupSerializer(code);
                if (serializer != null) {
                        retVal = serializer.readObject(in);
                } else {
                        String className = lookupName(code);

try {
                                retVal = Class.forName(className).newInstance();

if (retVal instanceof Externalizable) {
                                        ((Externalizable)retVal).readExternal(in);
                                } else {
                                        retVal = in.readObject();
                                }
                        } catch(Exception e) {
                        }
                }
        } return retVal;
}
/**
 * Reads the file containing the serialized hashtables of data.
 *
 * @param serializedFile the file containing the serialized tables
 */
private void readSerializedFile(File serializedFile) {
        ObjectInputStream in = null;
        try {
                in = new ObjectInputStream(new FileInputStream(serializedFile));
                codeTable = (Hashtable)in.readObject();
                nameTable = (Hashtable)in.readObject();
                serializerTable = (Hashtable)in.readObject();
```

```
        } catch (Exception throwAway) {
        } finally {
                try {
                        in.close();
                } catch (Exception throwAway) { }
        } if ((codeTable == null) ||
                (nameTable == null) ||
                (serializerTable == null)) { createDefaultTables();
                }
        }
}
/**
 * Writes the given object to the stream. First, the code representing
 * the type of the object is written, then the data within the object
 * is written.
 *
 * @param out the output stream that will contain the object
 * @param element the data object that will be written
 */
public void writeObject(ObjectOutput out, Object element)
        throws IOException { if (element == null) {
                out.writeByte(NULL_OBJECT);
        } else {
                String className = element.getClass().getName();
                Number code = lookupCode(className);

if (code != null) {
                        if (code instanceof Byte) {
                                out.writeByte(code.byteValue());
                        } else if (code instanceof Integer) {
                                out.writeByte(OTHER);
                                out.writeInt(code.intValue());
                        }

SerializerIF serializer = lookupSerializer(code);

if (serializer != null) {
                                serializer.writeObject(out, element);
                        } else if (element instanceof Externalizable) {
                                ((Externalizable)element).writeExternal(out);
```

```
                        } else {
                                out.writeObject(element);
                        }
                } else {
                        if (element instanceof Object[]) {
                                className = Object[].class.getName();
                        } else {
                                className = Object.class.getName();
                        } code = lookupCode(className);
                        SerializerIF serializer = lookupSerializer(code);

out.writeByte(code.byteValue());
                        serializer.writeObject(out, element);
                }
        }
}
/**
 * Writes the tables to the file.
 */
private void writeTables() {
        ObjectOutputStream out = null;

try {
                File serFile = new File(HASHTABLE_SER);
                out = new ObjectOutputStream(new FileOutputStream(serFile));

out.writeObject(getCodeTable());
                out.writeObject(getNameTable());
                out.writeObject(getSerializerTable());
                out.writeObject(new Date());
        } catch(Exception e) {
        } finally {
                try {
                        out.close();
                } catch(Exception e) { }
        }
}
```

FIG. 1100

SENDING A VIEW EVENT, AND A REQUEST EVENT HAVING A CLASS NAME AND A METHOD NAME

This is a division of U.S. Ser. No. 09/366,404, filed Aug. 3, 1999.

BACKGROUND OF THE INVENTION

1. Technical Field

The present invention relates generally to an improved distributed data processing system and, in particular to an improved method and apparatus for creating applications. Still more particularly, the present invention relates to a method and apparatus for creating client applications.

2. Description of Related Art

Distributed data processing systems involve data transfers between clients and servers (also know as services). Typically, a client locates a server, initiates a session with a server and requests the server to perform some service. The server expects requests from a client to arrive in a particular format. A server is more complex than a client because the server typically handles a large number of clients simultaneously, often fetches and stores information from a large database, creates additional transactions for other services, performs business logic, and returns information formatted according to each client channel. For example, data will be specified in a particular message format. A particular transmission protocol will deliver the message to the server. The server accepts the message protocol as its application programming model (API) to its services and returns a result. A variety of software systems, such as Enterprise Java Beans (EJB), Servlets, Java Server Pages (JSP), and XML have been implemented to enhance the development of client and server-side software.

Client applications perform a number of different functions. For example, the application on the client side handles the user interface and may provide program logic for processing user input. Additionally, a client application must match the requirements of a particular server to provide communications with the particular server. Clients are packaged and distributed according to the services provided by the server.

A graphical user interface (GUI) exists in the client application to handle what the user views on the screen. Events resulting from user input, such as mouse clicks or keyboard strokes, are detected and handled using "listener" processes in the application. The events are processed by program logic. The program logic may result in requests being sent to a server. Communication with the server is provided using processes that use protocols, such as hypertext transfer protocol (HTTP), secure sockets (SSL), or Remote Method Invocation (RMI).

Client software can be either "thick" or "thin". A thick client is typically a large client-installed application that may access a database directly and apply business logic. They typically have dependence on the client operating system and require manual support to install and configure. By contrast a thin client is typically a small application downloaded on request from a server and accesses the database through an intermediate application server. This is known as a multi-tier application. A number of different usage scenarios for clients are present, resulting in a variety of client needs being present. For example, it is typical that in an global enterprise Intranet, the client configuration is controlled by the business but the large number of clients includes older machines with slow networks (e.g. 9600 baud). Likewise, in the Internet, there is little configuration control by the business and it is estimated that a large percentage of clients worldwide still use 14.4K connections that result in very slow network speeds and downloads. A typical user will become very frustrated if downloads take longer than a minute or two. Further, mobile users require compact software that can be customized and packaged to fit on machines and operate disconnected from the network. Subsequent automated support to connect to the network is needed.

At the other end of the spectrum, power users with high speed connections expect screen refresh times in the sub-second range and "instantaneous" echoing of typed characters to provide the look and feel of processing in a local environment. In a multi-tier computing environment, the primary role of the client is to present and gather information quickly. The client application is considered a business asset independent of the network topology and server function. In these environments, it is desirable to be able to use the same client processing code for different user types and interface channels, such as automated teller machines (ATM), Kiosks, Internet [hypertext markup language (HTML)/ applets], and regional office clients (applications).

Consequently, a common thin or thick client development environment for developing clients may be used to solve these problems, especially when the size and speed of the application download, integration and operation is important. Any software development environment should be based on sound software engineering principles.

Object-oriented languages have been employed in creating thin clients. Object-oriented programming environments have been presented as providing software reuse, which is a desirable feature in creating thin clients and reducing development time. In reality, the present object-oriented programming environments for developing thin clients are unable to provide enough object reuse and repeatability for quickly developing thin clients. Nor do they specify how to readily support additional message formats, protocols, data models and servers, mobile disconnected users, and caching.

Therefore, it would be advantageous to have an improved method and apparatus for a client development architecture that facilitates creating thin clients in a manner in which component reuse is increased while client development time is reduced, and multiple message formats, protocols, data models and servers, mobile disconnected users and caching can be readily integrated.

SUMMARY OF THE INVENTION

The present invention provides an architectural pattern for creating applications for a data processing system. A graphical user interface is created in which the graphical user interface includes a plurality of components. Processes for presenting the plurality of components and receiving user input are handled by a first set of graphical objects, wherein in response to selected user input, a first event is generated. An application object is created in which the application process controls an order in which the graphical objects present the set of components and process the event and wherein the application generates a second event. A transport object is created in which the transport object processes the second event and forwards the second event for processing to a destination within the plurality of destinations. A plurality of destination objects are created in which each destination object within the plurality of destinations objects handles accessing a destination within the plurality of destinations.

The present invention provides a method and apparatus in a data processing system for refreshing data in an application. A call is received to update data in the application, wherein the data is destined for a component in the application. A data type is identified for the data. Responsive to the data type being a handled data type, the data is formatted and a refresh is called on the component.

The present invention provides a method and apparatus in a data processing system for displaying a component or container. The container is displayed within a display using a first component. A location of the component or container is controlled within the display using a second component, wherein the second component controls the location and geometry of the component or container in response to receiving an event. The component or container is selectively displayed using a third component, wherein the third component generates the event.

The present invention provides a process in a data processing system for managing services in a desktop environment from an object oriented-environment. A presentation of a graphical user interface is controlled using a view controller, wherein the view controller handles user input to the graphical user interface. Responsive to a selected user input, the selected user input is sent from the view controller to an application mediator. Responsive to receiving the selected user input at the application mediator, the selected user input is processed at the application mediator. Responsive to the application mediator determining that a service is required in the desktop environment, an event is generated. Responsive to detecting the event at a listener object, a method is executed in the listener object to perform the service in the desktop environment.

The present invention provides a method and apparatus in a data processing system for managing transactions. A request event is received at a transporter object. The request event includes a target and an indication of how to handle the request event. A destination object is identified within the plurality of destination objects using the request event to form an identified destination object. The request event is sent to the identified destination object, wherein the identified destination object handles the request using the indication and accesses the target.

The present invention provides a method and apparatus in a data processing system for displaying a graphical user interface. A container is displayed in a graphical user interface from a set of containers, wherein a display of the container handled by a view controller from a set of view controllers. Each view controller handles the display of an associated container within the set of containers and user input for the associated container. A display of the set of containers is altered by an application mediator, wherein the set of containers are displayed in an order determined by the application mediator.

The present invention provides a method and apparatus in a data processing system for performing validation of user input. User input is received in a container displayed in a graphical user interface, wherein presentation of the container and the user input to the container are handled by a view controller. Responsive to receiving the user input, a call is sent to a validation object by the view controller. Responsive to the call, the validation object tests the user input using a criteria, wherein the rule is separate from the view controller.

The present invention provides a method and apparatus in a data processing system for managing permissions in an application. A user input is received at a container handled by a view controller, wherein the user input requests a change in permissions in the application. This user input, may be, for example, a change in security in an application through a login process. A view event describing the user input is generated. The view event is received at an application mediator. Responsive to receiving the view event, by the application mediator, a request event is generated and a permission corresponding to the user input is received. The permission alters an item, which may be in either of both the view controller and the application mediator.

The present invention provides a process and apparatus in a data processing system for presenting a view to a client. At an application mediator, a view event is received from a view controller, wherein the view event describes an action on a displayed container handled by the view controller. Responsive to a requirement that a change in a placement of the displayed container is required, a placement event is generated by the application mediator. A determination is then made by a placement listener, as to whether the placement event includes an indication that an alternate view is to be generated. Responsive to a determination that an alternate view is to be generated, a call is sent to a method in the view controller to generate the alternate view.

The present invention provides a method and apparatus in a data processing system for processing user input in a graphical user interface. A graphical user interface is presented using a view controller, wherein the view controller handles the user input to the graphical user interface. Responsive to a selected user input, an event is sent to a first application mediator. Responsive to the first application mediator being unable to process the event, the event is sent to a second application mediator for processing, wherein the first application mediator and the second application mediator handle an order in which a set of displays are displayed by a view controller.

The present invention provides a method and apparatus in a data processing system for presenting a set of screens in a graphical user interface. A first screen within a set of screens is presented, wherein the set of screens are presented using a set of view controllers. Responsive to a selected user input to the first screen, an event is generated by a view controller within the set of view controllers identifying the user input to the first screen, which is handled by the first view controller. Responsive to detecting the event generated by the view controller, a second screen from the set of screens is selected, by an application mediator, for display by sending a response to a view controller handling the second screen.

The application mediator is initialized from reading a state machine file and control processing of view event received from virtual controllers.

The present invention provides a method and apparatus in a data processing system for serializing data. A serializer receives a data element for serialization, wherein the data element includes a class name string. Responsive to receiving the data element, the serializer replaces the class name string with a code having a smaller size than the class name string to form a modified data element. Responsive to forming the modified data element, in which the serializer serializes the modified data element. This serialized data is transmitted and deserialized by a deserializer, which replaces the indicator with the class name.

The present invention provides a method and apparatus in a data processing system for providing an interface to an application for monitoring execution of the application. An event generated by a view controller is detected, wherein the view controller handles presentation of a container in a graphical user interface. A determination is made as to whether the event is an event selected for monitoring. Responsive to the determination that the event is an event selected for monitoring, a request event is generated, wherein the request event includes data from the event and a destination.

The present invention provides a method and apparatus for a data processing system for accessing classes and methods in an object oriented system. Responsive to receiving a selected user input to container, a view event is sent from a view controller to an application mediator. The view event identifies an action taken to generate the selected user input. A request is selectively generated based on the view event, wherein the request event includes a major code identifying a class name as a destination and a minor code identifying a method name a function to be invoked. The request event is sent to a transporter. The transporter acts as a router to send the request event to an appropriate destination object from a plurality of destination objects. Responsive to receiving the request event at the transporter, the request event is sent to a destination object within a plurality of destination objects based in the class name. The destination object formats the request event into a form recognizable by the destination associated with the destination object. The destination may be located on a remote data processing system. The request event is used to access the class or method identified in the request event. The access may be, for example, an invocation of the method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating classes in a class hierarchy depicted in accordance with a preferred embodiment of the present invention;

FIGS. 8A and 8B are diagrams illustrating variables and methods in a ViewController depicted in accordance with a preferred embodiment of the present invention;

FIGS. 9A–9E are diagrams illustrating variables, constructors, and methods for ViewControllerImpl depicted in accordance with a preferred embodiment of the present invention;

FIGS. 10A–10C are tables which show the variables, constructors and methods for ViewControllerBaseImpl depicted in accordance with a preferred embodiment of the present invention;

FIGS. 11A–11C are tables which illustrate a variable, a constructor, and methods for a ViewControllerAdapter depicted in accordance with a preferred embodiment of the present invention;

FIGS. 12A–12D are drawings illustrating variables, constructors, and methods for a ValidationRule depicted in accordance with a preferred embodiment of the present invention;

FIGS. 13A and 13B are tables illustrating variables and constructors for a ValidationRuleException depicted in accordance with a preferred embodiment of the present invention;

FIGS. 14A–14F are diagrams illustrating variables, constructors, and methods for a ViewEvent depicted in accordance with a preferred embodiment of the present invention;

FIGS. 15A and 15B are diagrams illustrating a variable and a method for a ViewListener depicted in accordance with a preferred embodiment of the present invention;

FIGS. 16A and 16B diagrams illustrating a variable and methods for an ApplicationMediator depicted in accordance with a preferred embodiment of the present invention;

FIGS. 17A–17D are diagrams illustrating variables and a constructor for an ApplicationMediatorImpl depicted in accordance with a preferred embodiment of the present invention;

FIGS. 17F–17I are diagrams illustrating code used in methods for an ApplicationMediatorImpl depicted in accordance with a preferred embodiment of the present invention;

FIGS. 17J–17M are diagrams which depicts code used to handle the event dispatch in accordance with a preferred embodiment of the present invention;

FIGS. 18A–18C are diagrams illustrating variables, constructors, and methods for a PlacementEvent depicted in accordance with a preferred embodiment of the present invention;

FIGS. 19A and 19B are diagrams illustrating a variable and method for a PlacementListener depicted in accordance with a preferred embodiment of the present invention;

FIGS. 20A–20C are diagrams illustrating variables, constructors, and methods for a TopEvent depicted in accordance with a preferred embodiment of the present invention;

FIGS. 21A and 21B are diagrams illustrating a variable and methods for TopListeners depicted in accordance with a preferred embodiment of the present invention;

FIGS. 22A–22C are diagrams illustrating a variable, constructors, and methods for RequestEvent depicted in accordance with a preferred embodiment of the present invention;

FIGS. 23A–23C are diagrams illustrating a variable, constructors, and methods for a RequestException depicted in accordance with a preferred embodiment of the present invention;

FIGS. 24A and 24B are diagrams illustrating a variable and methods for a RequestListener depicted in accordance with a preferred embodiment of the present invention;

FIGS. 25A and 25B are diagrams illustrating a variable and methods for a RequestResponseListener depicted in accordance with a preferred embodiment of the present invention;

FIGS. 26A–26C are diagrams illustrating variables, a constructor, and methods for a Transporter depicted in accordance with a preferred embodiment of the present invention;

FIGS. 26D–26H are diagrams illustrating code used in methods in a Transporter depicted in accordance with a preferred embodiment of the present invention;

FIGS. 27A and 27B are diagrams illustrating a variable and methods for a Destination depicted in accordance with a preferred embodiment of the present invention;

FIGS. 28A–28C are diagrams illustrating variables, constructors, and methods for a DestinationImpl depicted in accordance with a preferred embodiment of the present invention;

FIG. 28D is code used to process a RequestEvent depicted in accordance with a preferred embodiment of the present invention;

FIGS. 29A and 29B are diagrams illustrating variables and methods in a Factory depicted in accordance with a preferred embodiment of the present invention;

FIGS. 30A and 30B are diagrams illustrating a variable and methods for a JTC depicted in accordance with a preferred embodiment of the present invention;

FIG. 31 is a flowchart of a process for creating a ViewController depicted in accordance with a preferred embodiment of the present invention;

FIG. 32 is a flowchart of a process for creating ValidationRules depicted in accordance with a preferred embodiment of the present invention;

FIG. 33 is a flowchart of a process for creating a ViewEvent depicted in accordance with a preferred embodiment of the present invention;

FIGS. 42 and 43 are diagrams detailing processes within the ViewController subsystem depicted in accordance with a preferred embodiment of the present invention;

FIG. 44 is a complete list of predefined major event codes depicted in accordance with a preferred embodiment of the present invention;

FIG. 45 shows how a text field representing a social security number can be validated and displayed depicted in accordance with a preferred embodiment of the present invention;

FIG. 46 shows how a social security number can be validated and converted back to a transmittable format depicted in accordance with a preferred embodiment of the present invention;

FIG. 47 illustrates the application of two edit rules, range checking, and formatting for viewing depicted in accordance with a preferred embodiment of the present invention;

FIG. 48 illustrates inheritance where the ViewControllerBaseImpl is a subclass of JPanel from the Java swing components depicted in accordance of a preferred embodiment of the present invention;

FIG. 49 illustrates inheritance where the ViewControllerBaseImpl is a subclass of java.lang.Object and where the methods getComponent, setEnabled and setVisible are implemented to ensure the ViewController subclassing ViewControllerBaseImpl can be treated as a GUI component, container or bean depicted in accordance of a preferred embodiment of the present invention;

FIG. 53 is a diagram illustrating runtime behavior of the Placement subsystem is depicted in accordance with a preferred embodiment of the present invention;

FIG. 54 is Java code illustrating the creation and firing of a PlacementEvent in an ApplicationMediator depicted in accordance with a preferred embodiment of the present invention;

FIG. 55 is Java code illustrating the callback to a PlacementListener with a PlacementEvent and inspecting the PlacementEvent for semantic interpretation depicted in accordance with a preferred embodiment of the present invention;

FIG. 58 is Java code illustrating the creation of an ApplicationMediator and the adding of a PlacementListener depicted in accordance with a preferred embodiment of the present invention;

FIG. 59, is Java code illustrating the creation and firing of a TopEvent in an ApplicationMediator depicted in accordance with a preferred embodiment of the present invention;

FIG. 60 is Java code illustrating the callback to a TopListener with a TopEvent and inspecting the TopEvent for semantic interpretation depicted in accordance with a preferred embodiment of the present invention;

FIG. 61 is a diagram illustrating runtime behavior of a RequestEvent subsystem depicted in accordance with a preferred embodiment of the present invention;

FIG. 62 is Java code illustrating the creation of RequestEvent, setting its major and minor codes, and firing an asynchronous RequestEvent from an ApplicationMediator depicted in accordance with a preferred embodiment of the present invention;

FIG. 63 is Java code illustrating the callback, to an ApplicationMediator, a successful asynchronous RequestEvent with a result depicted in accordance with a preferred embodiment of the present invention;

FIG. 64 is Java code illustrating the callback, to an ApplicationMediator, an unsuccessful asynchronous RequestEvent with a RequestException depicted in accordance with a preferred embodiment of the present invention;

FIG. 65 is a flowchart of a process for using a RequestEvent depicted in accordance with a preferred embodiment of the present invention;

FIG. 67 is Java code illustrating creation of a Transporter and adding it as a RequestListener depicted in accordance with a preferred embodiment of the present invention;

FIG. 69 is a diagram of Java code for creation of a Destination, setting a major code and adding it to a Transporter as a DestinationListener depicted in accordance with a preferred embodiment of the present invention;

FIG. 70 is a diagram illustrating Java code for creating Destinations with wild card, priority and normal major codes, firing a RequestEvent, and a report of the expected results depicted in accordance with a preferred embodiment of the present invention;

FIG. 71 is a diagram of Java code used for accessing, identifying type and recursively attaching JTC, AWT and JFC listeners to JTC, AWT and JFC programs and objects depicted in accordance with a preferred embodiment of the present invention;

FIG. 72 is a diagram of Java code used for attaching JTC listeners to JTC ApplicationMediators, ViewControllers and Transporters depicted in accordance with a preferred embodiment of the present invention;

FIG. 73 is a diagram of Java code used for attaching AWT and JFC listeners to AWT and JFC containers, components and beans depicted in accordance with a preferred embodiment of the present invention;

FIG. 74 is a diagram of Java code used for attaching AWT and JFC listeners to AWT and JFC components (java.awt.Button, com.sun.swing.java.JButton and com. and com.sun.java.swing.JTextField) depicted in accordance with a preferred embodiment of the present invention;

FIGS. 79–82 are diagrams of Java code for use in managing the refresh of data objects in an ApplicationMediator (79), managing the refresh of data objects in a ViewController using initial types (80), and managing the refresh of data objects in a ViewController using an multiple concurrent updated or additional data types (81, 82) depicted in accordance with a preferred embodiment of the present invention;

FIG. 102 illustrates example table entries from the loading of a configuration file for a virtual ApplicationMediator state machine depicted in accordance of a preferred embodiment of the present invention;

FIG. 105 is a diagram of a serializer system write depicted in accordance with a preferred embodiment of the present invention;

FIG. 106 is a diagram of a serializer system read depicted in accordance with a preferred embodiment of the present invention;

FIGS. 107A–107C are diagrams illustrating an object array depicted in accordance with a preferred embodiment of the present invention FIGS. 108A–108B are diagrams illustrating code used in a serialization method depicted in accordance with a preferred embodiment of the present invention;

FIG. 109 implements the methods readExternal and writeExternal for reading/writing from/to input/output stream depicted in accordance of a preferred embodiment of the present invention;

FIGS. 110A–110O are diagrams illustrating code used in a serialization method depicted in accordance with a preferred embodiment of the present invention;

DETAILED DESCRIPTION OF THE PREFERRED EMBODIMENT

I. Hardware

Figure 1:
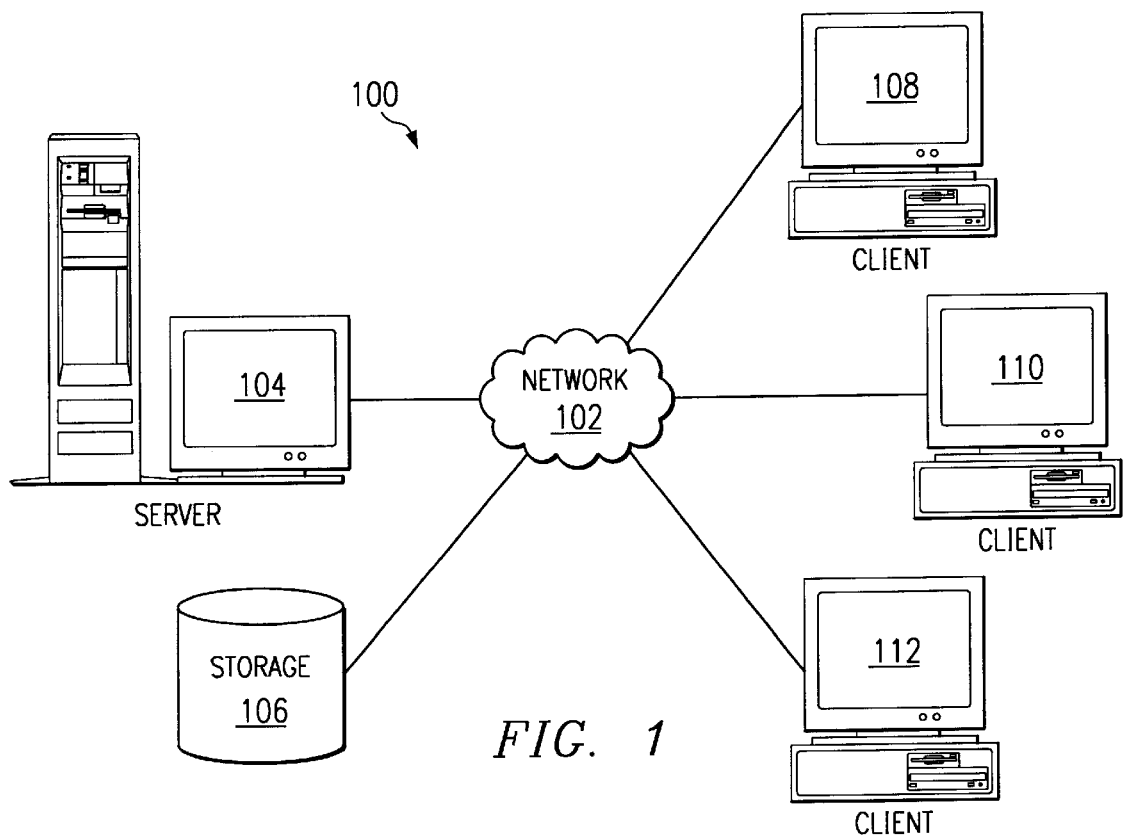
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
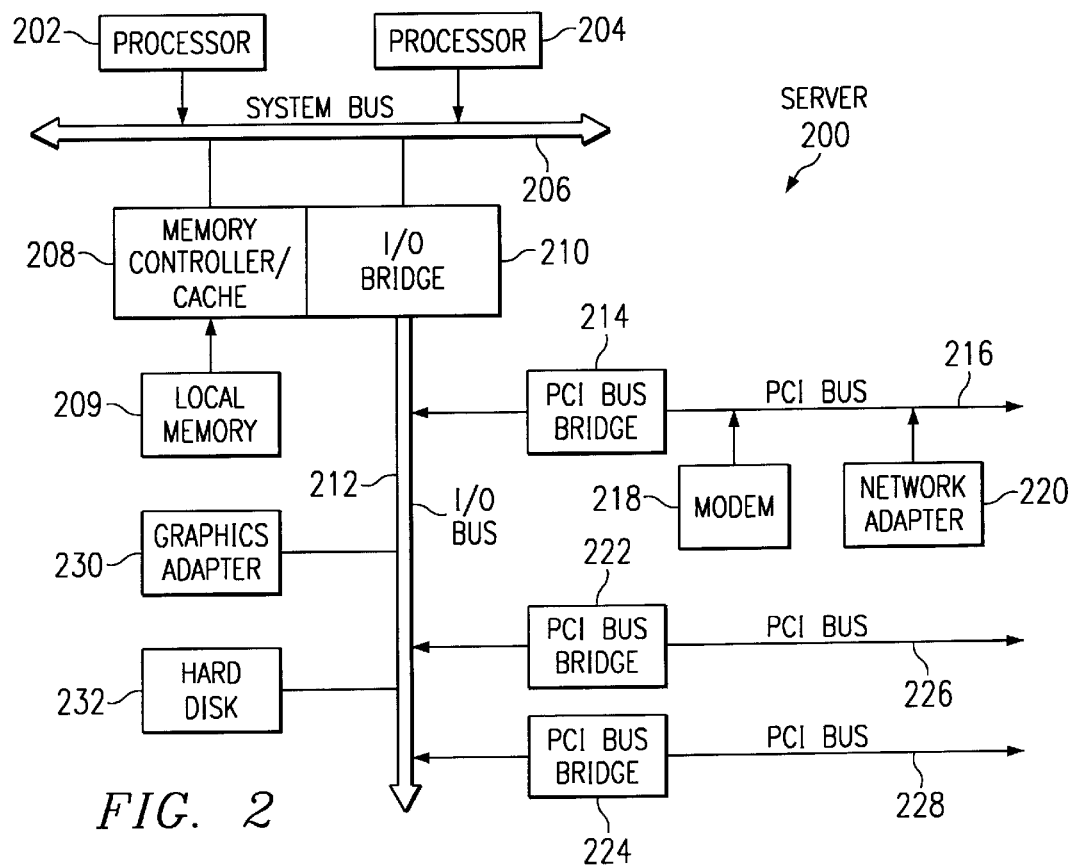
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
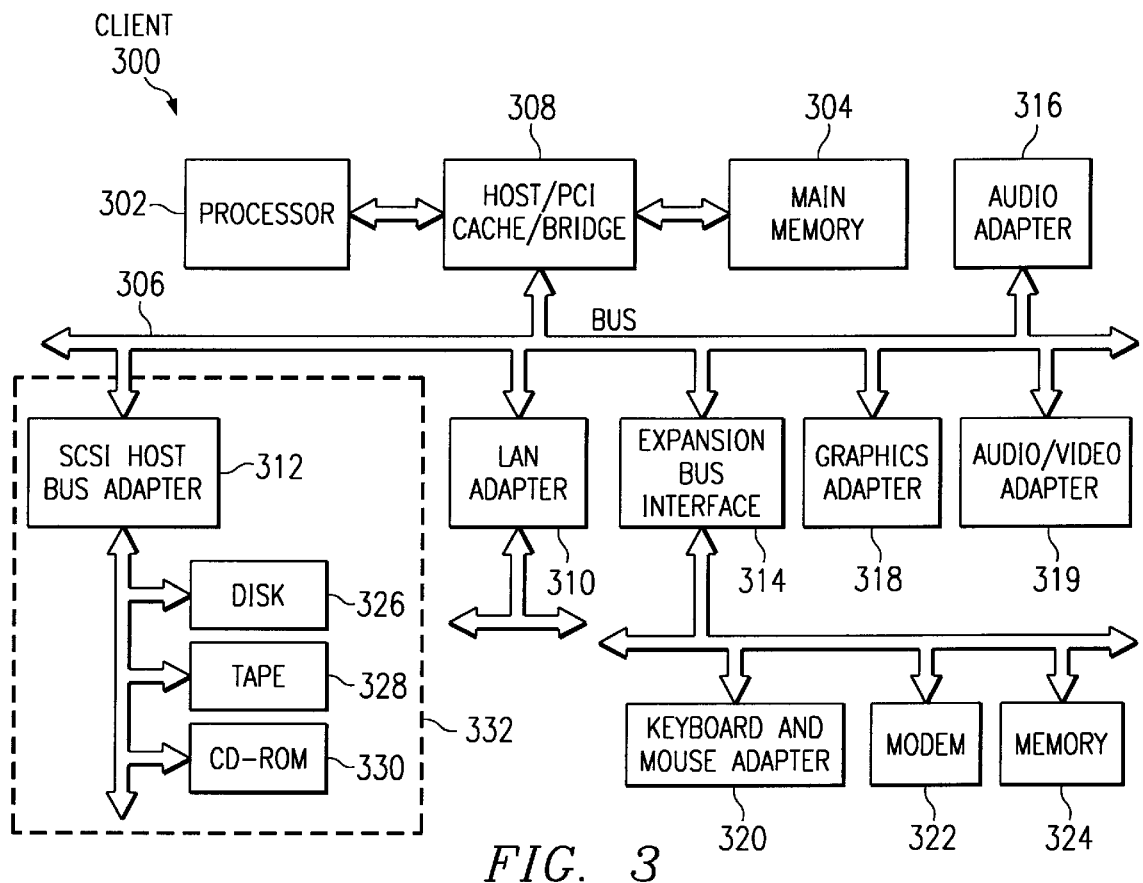
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

II. Overview

Figure 4:
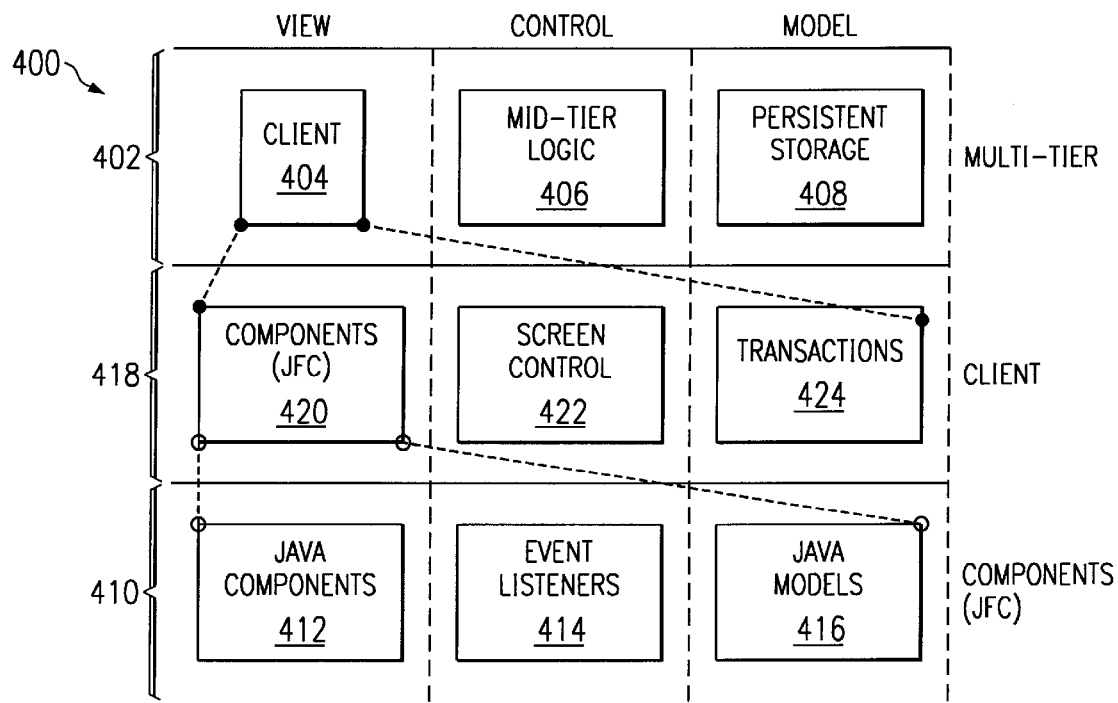
FIG. 4 is a diagram illustrating a model view controller diagram depicted in accordance with a preferred embodiment of the present invention.

With reference next to FIG. 4, a diagram illustrating a model view controller diagram is depicted in accordance with a preferred embodiment of the present invention. Model view control (MVC) diagram 400 includes an end-to-end section 402 in which the view is represented by client 404, the control is represented by mid-tier logic 406 and the model is represented by persistence storage 408. Section 410 is a graphical user interface (GUI) component architecture in which the view are Java components 412, the control are event listeners 414, and the model are Java models 416. GUI components 410 may be currently embodied in systems such as the Java Foundation Classes (JFC) from Java.

In accordance with a preferred embodiment of the present invention, the present invention provides an architectural pattern for views in the client, for naviagation of views in the client, for placing and presenting views in a client, for issuing requests for different concurrent servers and services from the client, for issuing requests for client platform services from the client, for using multiple concurrent data model types in the client, for issuing multiple message formats from the client, for using multiple protocols in the client and for specific partitioning of these pattern components in the client, such as client 404. In particular, section 418 in these examples significantly defines and enhances and includes a view as Java Abstract Windows Toolkit (AWT)/(JFC) 420, a control as screen control 422, and a model as transactions 424. AWT is a tool kit containing primitives for basic windowing functionality. These primitives include user interface functionality, such as window and dialogue box manipulations, text rendering, buttons, check box, and radio button creation and manipulation, as well as graphics primitives such as line drawing, color choice. Virtually all sophisticated graphics and user-interface tools are built upon these primitives. The Java foundation classes (JFC) is a package containing, among other things, primitives for windowing functionality that provide a rich superset of AWT. These primitives or components include everything that the AWT provides along with a rich superset of new primitives, including, for example, tree view, tabbed panes, hypertext markup language (HTML) text views, etc. Java AWT/(JFC) 420 could be described through section 410.

Object-oriented design depends heavily on the class concept and the relationships between various classes. A class is an abstraction of an object that contains both attributes (data) and behavior (methods). Each new object created from a class is referred to as an instance of that class. In other words, the class is an abstract encapsulation mechanism while an instance is a particular object created from the class. If a method in a class is called, it is sometimes said a message is sent to an object.

Classes are organized into inheritance hierarchies where a parent class may have one or several subclasses. The subclasses share all the data and methods from the parent class and any other ancestor class in the inheritance tree. The search for the appropriate methods to be used starts at the class for the object and proceeds up the tree as necessary to find the desired method (the name and parameters of the method must match exactly). Multiple inheritance means that a class can have two or more parent classes. Some programming languages (e.g., C++) support multiple inheritance while others (e.g., Smalltalk) do not. Multiple inheritance is difficult to manage, so some languages (e.g., Java) provide a mechanism called interfaces that provide a type oriented mechanism to achieve a similar functionality without incurring the implementation burdens. The class hierarchy diagram is based on a Java implementation and makes extensive use of the interface mechanism.

III. Architectural Pattern

The present invention provides a method, apparatus, and instructions for an architectural programming pattern and implementation. The architectural pattern of the present invention is illustrated as a Java implementation for building thin (or thick) client applications and is also referred to as "JTC." JTC is a process, architectural pattern, and implementation to guide developers on how to build applications, and in particular, Internet style thin clients. JTC adapts to Internet changes rapidly. JTC increases developer discipline by providing a common repeatable programming pattern. JTC facilitates project management by providing for concurrent development of the client. JTC facilitates project management by providing for concurrent client and server(s) development. JTC provides for a natural partition of various programmer skills. JTC has a formula based approach for cost estimates. JTC provides multi-channel support (ATM, Internet, Kiosk, Extranet, Mobile, Branch, Call Center, Business partners, etc.). JTC supports mobile user disconnected mode. JTC provides natural support for multiple servers with reduced code level cohesion and coupling. JTC provides natural support for multiple data models such as, for example, XML, DHTML, Objects, Key/Value, EJB, streaming and asynchronous. JTC has natural support for multiple protocols, such as, for example IIOP, RMI, Sockets, HTTP, HTTPs, and Files. JTC has natural support for client Java accessible RS232 devices and APIs such as currency counters, J/XFS, printers, and coin dispensers.

Figure 5:
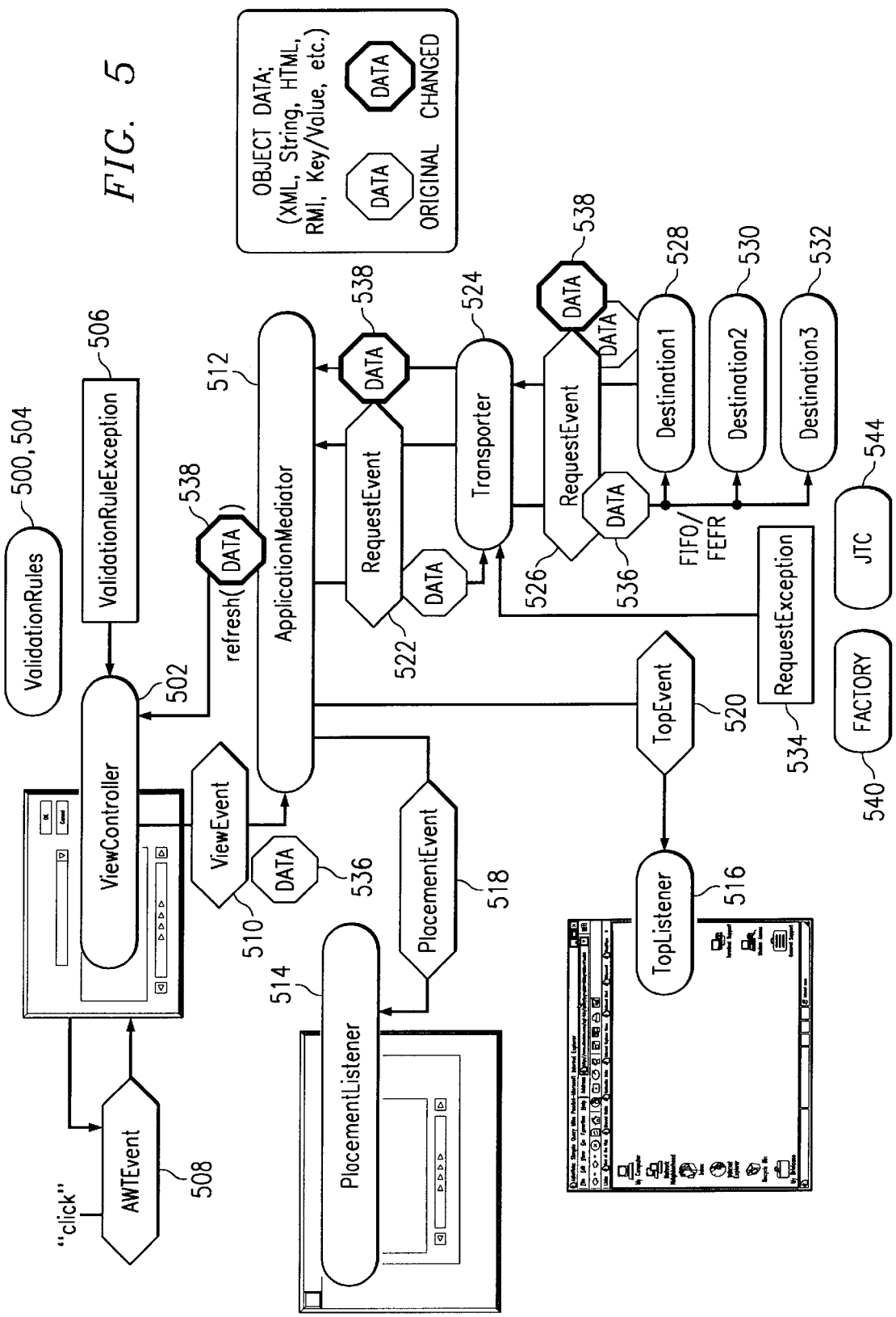
FIG. 5 is a diagram illustrating the components in an architectural pattern depicted in accordance with a preferred embodiment of the present invention.

With reference now to FIG. 5, a diagram illustrating the components in an architectural pattern is depicted in accordance with a preferred embodiment of the present invention. Architectural pattern 500 includes a ViewController 502, which provides a display of a component, container or bean on a data processing system. ViewController 502 basically provides a reusable GUI element containing graphical components such as text fields, labels, buttons, tables, images, beans, etc. to be displayed for viewing and interacting by a user. ValidationRules 504 are used to validate and format the user entry into components contained within the ViewController. For example, ValidationRules 504 may be applied to a single text field or to groups of text fields used for user entry. If a violation of a rule occurs, ValidationRuleException 506 is generated.

User inputs occur on the components, containers and beans controlled by ViewController 502. This user input is in the form of an AWTEvent 508 in the depicted examples. The AWTEvent 508 may be, for example, the click of a mouse button selecting a graphical button such as an "okay" button. In response, ViewController 502 will fire ViewEvent 510. ViewEvent 510 will contain major and minor codes that add more semantics than the AWTEvent 508. The changed data that may have been modified or entered by user or a reference to the data model may also be supplied for further semantics. AWTEvents 508 are not visible outside of the ViewController 502.

Next in architectural pattern 500, ApplicationMediator 512 is a form of a ViewListener in the depicted examples. ApplicationMediator 512 is the interface used to specify default behavior to control ViewController 502 as well as other ApplicationMediators 512. ApplicationMediator 512 will also mediate between ViewController 502 generated ViewEvents 510 and PlacementListener 514, TopListener 516 and Transporter 524. In this pattern, PlacementListener 514 is employed to manage the placement/containment of ViewControllers, such as ViewController 512 on the screen of a computer. PlacementListener 514 will manage ViewController 502 in response to a PlacementEvent 518 received from ApplicationMediator 512. For example, for a given component, container or bean represented by ViewController 502, PlacementListener 514 will control how ViewController 502 is placed on a screen, such as possibly in the south of a frame with a border layout.

ApplicationMediator 512 controls the ordering of ViewControllers, not the placement of ViewControllers.

As a result, complete separation between view creation and layout by ViewController 502, view ordering and mediation by ApplicationMediator 512, and view placement by PlacementListener 514 is provided. This mechanism in architectural pattern 500 increases the reusability of ViewControllers, ApplicationMediators, and PlacementListeners. PlacementEvent 518 is used to notify PlacementListener 514 if ViewController needs to be adjusted on the screen.

Next, TopListener 516 is an interface that performs specific desktop duties, such as, for example, the launching of an application, performing a desktop shutdown, displaying a message on the desktop, displaying a context sensitive title on the desktop or reconfiguring and non-intrusive observing the JTC application. TopEvent 520 is used to send a message to the TopListener to indicate that some action is needed on the desktop.

A desktop provides the operating-specific functionality of a windowing system and application management. For example, in Windows 95, the graphical interface that starts up is called a "desktop". The Windows 95 GUI itself is the "desktop system".

Additionally, a desktop application provides a view or window in which an application may run and launch other applications. This is typically accomplished by a display of a hierarchical list of applications, which may be selected and "launched".

ApplicationMediator 512 may generate and receive RequestEvents, such as RequestEvent 522. A RequestEvent, as used herein, represents a "lightweight transaction" that is used as an indication that an event and a service is required to process the event. A RequestEvent 522 is identified by major and minor codes. In addition, a reference to a data model may be included for additional semantics. In turn, Transporter 524 in architectural pattern 500 is used to map RequestEvents, such as RequestEvent 522, to Destinations 528, 530, and 532. In other words, Transporter 524 acts as an event broadcast mechanism within architectural pattern

500. Transporter 524 will route RequestEvents, such as RequestEvent 526 to various Destinations, such as Destination 528, Destination 530, or Destination 532. These destinations will interpret the RequestEvent 526, locate a server, create a message format, create a protocol and deliver the information to the server's service for processing. These response data will be returned to the Transporter 524 in a RequestEvent, such as RequestEvent 526. In turn, Transporter 524 will return the RequestEvent to ApplicationMediator 512, which will process the data contained in the event accordingly. For example, the return data may be sent to ViewController 502 to refresh the view displayed on the screen to the user. If an error occurs, a RequestException 534 may be generated and returned to Transporter 524 and returned to the ApplicationMediator 512.

The ApplicationMediator 512 can fire RequestEvents to the Transporter synchronously, asynchronously and repeating asynchronously. A synchronous RequestEvent will block the ApplicationMediator and either an error RequestException will be thrown or a possibly modified RequestEvent will contain the results. An asynchronous RequestEvent will return immediately. The error RequestException or a possibly modified RequestEvent will later be "called back" to the ApplicationMediator at the requestException and requestResponse interface, respectively.

In depicted examples, a type Object data, such as Data 536 may be passed in reference by ViewController 502 to a Destination such as Destination 1 528. This data is passed via different events, such as ViewEvent 510, RequestEvent 522, and RequestEvent 526. Changed data, such as Data 538 may be returned from a Destination to ViewController 502 for display. This type Object data may take various forms, such as Extensible Markup Language (XML), String, Hypertext Markup Language (HTML), key/value, Remote Method Invocation (RMI), J/XFS, RS232, etc. The ViewController reads and modifies the Object data but does not create the data and the Destination creates, reads and modifies the Object data and sends it to and receives it from a server.

In addition, architectural pattern 500 also includes a Factory 540, which is used to allocate objects. Factory 542 is employed to also allocate singleton objects.

JTC 544 the system also contains a JTC interface implemented by all major objects in a JTC application including ApplicationMediator, ViewController, Destination and Transporter. Together, the objects implementing the JTC interface give the external appearance of a single application as they implement and propagate the required JTC interface methods.

The architectural pattern separates ViewController 502 (GUI view) from ApplicationMediator 512 (GUI state transition) from PlacementListener 514 (GUI placement) from RequestEvent 522 (lite transaction) creation from Destination 528 (transaction dispatch) from data creation 528, from data usage 502, and from transaction fulfillment.

The JTC interface of the present invention provides automatic non-intrusive tracing of application, and automatic non-intrusive event logging of application.

The ValidationRules provide class separation of chained field validation logic from both GUI and data model. Also the ValidationRules can run on client, server, or both.

The Destinations provide plugable data model, network protocol, and message format modules for remote or local fulfillment. Further, Destinations can support both local and remote configurations in addition to multiple chains of them being called FIFO. The simpler the Destinations, the thinner the application. The more complex the Destinations, the thicker the application.

The ApplicationMediators can be nested. PlacementListeners provide for partitioning of how to place components on the screen from what the components are and what order they arrive. RequestEvents (lite transactions) can be broadcast to multiple servers using multiple network protocols with various data and message formats.

The architecture also provides permission keys to support intra and inter ViewController and ApplicationMediator user ID and/or group enabling and disabling, and provides settable generic field level, focus level, and RequestEvent level ValidationRule invocation.

The ViewControllerBaseImpl provides a mechanism to switch between various graphics containers. The example code described herein is illustrated in Java, but the processes of the present invention may be applied to other programming languages.

IV. Class Hierarchy

With reference now to FIG. 6, a diagram illustrating classes in a class hierarchy is depicted in accordance with a preferred embodiment of the present invention. Class hierarchy diagram 600 illustrates the class hierarchy of new classes introduced by the present invention. All of the classes are inherit from the class java.lang.Object. These classes provide an architectural pattern for client development in Java. The classes illustrated in class hierarchy diagram 600 contain interfaces and classes to support the architectural pattern of the present invention. Although the depicted examples are illustrated with respect to Java, the architectural pattern of the present invention may be applied to other types of programming environments. The depicted examples are not meant to be limitations on the programming environment in which the present invention may be applied.

Figure 7:
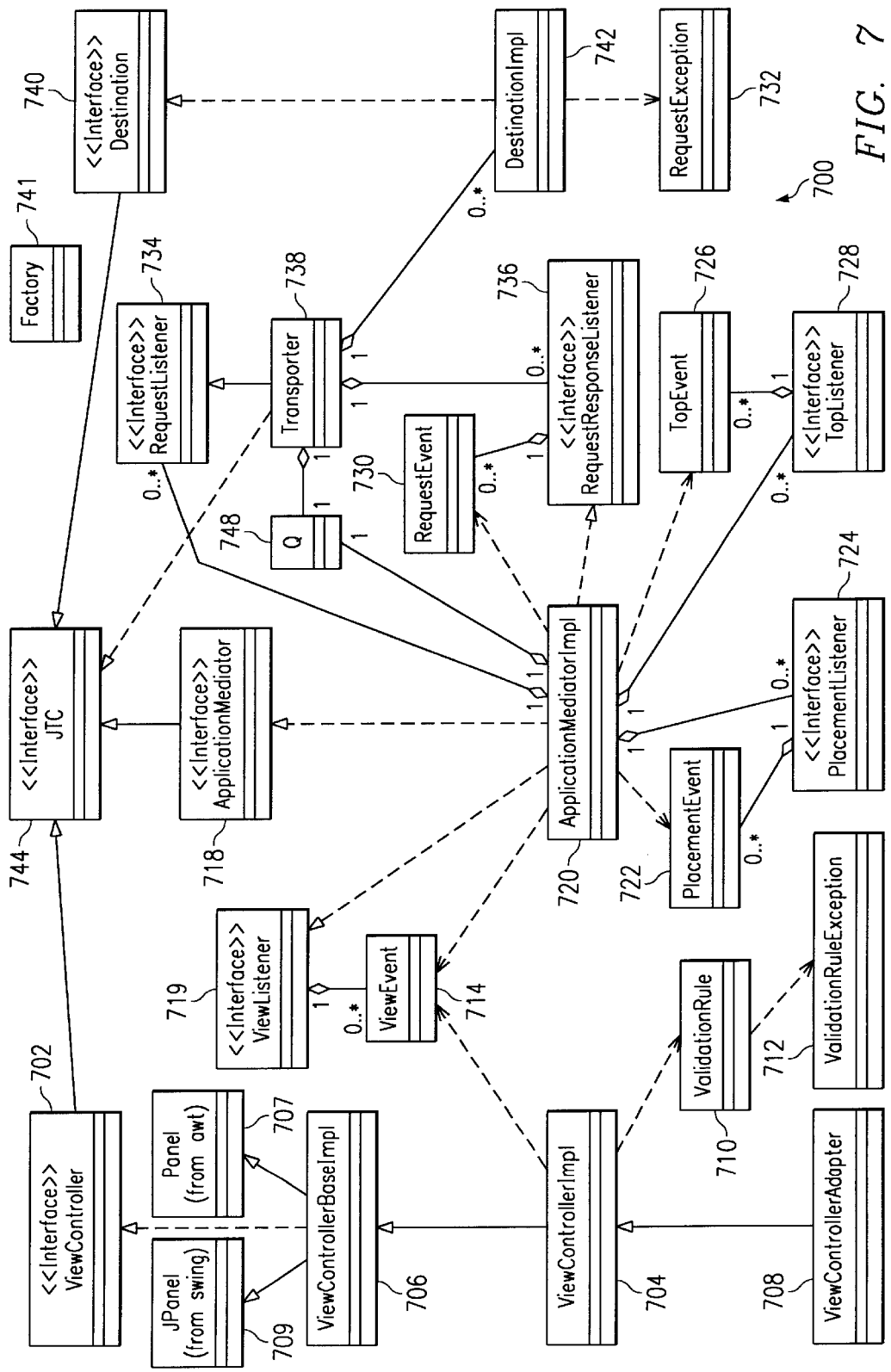
FIG. 7 is a unified modeling language diagram depicted in accordance with a preferred embodiment of the present invention.

With reference now to FIG. 7, a unified modeling language diagram is depicted in accordance with a preferred embodiment of the present invention. Unified modeling language (UML) diagram 700 is a diagram illustrating the class hierarchy between various classes and interfaces within the architectural pattern of the present invention.

UML diagram 700 uses the following conventions. A sub-interface of another interface (e.g., ViewControlle 702 to JTC 742) or a subclass of another class (e.g., ViewControllerImpl 704 to ViewControllerBaseImpl 706) is shown by a solid line from the subclass to the parent class where there is an open arrowhead. If a class is used to implement an interface, then a dashed line goes from the class to the arrowhead at the interface (e.g., ApplicationMediatorImpl 720 to ApplicationMediator 718). A class or interface may be aggregated into another; this is indicated by a solid line connecting to a small diamond (e.g., ViewEvent 714 to ViewListener 718). The end with the small diamond represents the class that is aggregating (or containing) the class at the other end. The multiplicity of the association is indicated by numbers at each end of the line, such as ViewEvent having multiplicity of 0 to many (with "many" indicated by "*") and ViewListener 718 having multiplicity one. So each instance of a ViewListener 718 may contain zero or more instances of ViewEvent 714.

Occasionally, alternative methods may be present for implementing an object. For example, ViewControllerBaseImpl 706 may implement a Container by either using the Java Abstract Window Toolkit (AWT) Panel 707 or a JFC 709. The small dashed lines indicate a choice.

Turning now to a discussion of the classes illustrated in FIGS. 6 and 7, ViewController 702 is are interface that defines an interface for a class that will be a single Component containing user interface components that are logically related to show information to the user and take input from the user. In particular, ViewController 702 is a public interface that defines reusable graphics components as part of an overall client application.

With reference now to FIGS. 8A and 8B, diagrams illustrating variables and methods in ViewController 702 are depicted in accordance with a preferred embodiment of the present invention. The abstract ViewControllerImpl class implements the ViewController interface to provide default behavior where possible. The user can subclass ViewControllerImpl so that not all of the interface methods of ViewController need be implemented.

The ViewControllerImpl 704 is an abstract class implementation of ViewController. ViewControllerImpl 704 and ViewController 702 are the basic GUI building blocks for thin clients. ViewControllerImpl 704 provides the function that will be required by a subclass (not shown). ViewControllerImpl 704 is controlled and mediated by an ApplicationMediator. ViewControllerImpl 704 extends the ViewControllerBaseImpl class and implements the ViewController interface so as to support the event handling methods and provide a default implementation for the other ViewController methods. This class maintains a reference to the client data model, the user validation level, and the UI properties and resources. Methods are present to add and remove listeners for view events generated, fire (send) view events to the appropriate listeners, cleanup list of event listeners on clear and exit, and enable or disable the panel.

With reference now to FIGS. 9A–9E, diagrams illustrating variables, constructors, and methods for ViewControllerImpl 704 are depicted in accordance with a preferred embodiment of the present invention. Table 900 in FIG. 9A illustrates the variables used in ViewControllerImpl 704. The tables used to describe the class include a name of the variable, constructor, or method, a declaration for the variable, and a description for the variables. Table 902 in FIG. 9B contains a similar table for the constructor used in ViewControllerImpl 704. Table 904 in FIG. 9C–9E provides a list of the methods used within ViewControllerImpl 704. Similarly, table 904 includes a name for the method, a declaration used for the method, and a description of the method.

ViewControllerImpl 704 is usually a Java Component or Container or bean with the extra methods specified here. The basic operation of a ViewControllerImpl is handles using the following steps: (1) implement the ViewController and JTC interfaces; (2) add your bean specific methods; (3) create and compose GUI; (4) return the Component in getComponent( ); (5) return and set permission keys, resources and properties when asked; (6) update permission keys, resources and properties when asked; (7) handle internal AWT events; (8) validate and format fields with ValidationRules; (9) issue ViewEvents for semantic interpretation; (10) return to the AWT Thread as soon as possible; (11) handle refresh(data) calls by updating GUI; (12) access data; and and (13) repeat from step (3).

ViewControllerImpl 704 is controlled and mediated by an ApplicationMediator. The default function provided by this class includes: from ViewController interface: add/remove ViewListener, fireViewEvent, setValidationLevel, refresh, getComponent, and AWTEvent threading. From the JTC interface, the functions provided include: clear, exit, set/getEnabled, set/getVisible, and toString.

ViewControllers know the full semantics of the data model being used, even though only a generic Object data; type reference is provided. The ViewControllers will cast generic reference into Class based data objects. Some design principles to use in ViewControllers when deciding how to communicate information to ViewListeners are described below.

A ViewEvent is created, its setter methods are called, and it is fired to the ViewListeners. The listeners interpret the major and minor codes to decided what to do.

To provide additional information, the ViewController can set a Java data object in the ViewEvent using the setData method. The data reference can be simple String objects or user defined data objects.

A similar approach to provide additional information is for the ViewController to supply application defined objects using the setData method. The data reference are more complex than simple objects (i.e. Customer, AccountInfo, Schematic, CarSpec, etc.).

The ViewController also can provide named methods. For example, a ViewListener may call customerVC.getCustomerName( ) to retrieve the customer name. The implementation of getCustomerName is hidden by the ViewController and could involve manipulating several Java Components. In addition, setters may also be provided, such as VC.setCurrentCustomer( ). In general, too many named methods may suggest that information sharing should be via data objects within ViewEvents and refresh methods instead. The use of named methods may reduce reuse of a ViewController by an applicationMediator.

The ViewController may listen to property change events on a data model using standard Java mechanisms. Thus, the ViewListeners, the ViewControllers, or any other interested object can communicate via the data model changes. In general, this is very data-oriented object model programming approach and can lead to object-spaghetti code. Changes in the data model ripple throughout the application.

ViewControllerBaseImpl 706 is an abstract class and is a superclass of ViewControllerImpl 704. This class provides the indirection to allow specification of the Component type of the ViewController via a "has a" and/or "is a" relationship. The idea is for the developer to replace this class entirely with the developer's own implementation. This replacement may be accomplished by creating the developer's own implementation of ViewControllerBaseImpl that implements the methods getComponent( ), setEnabled (boolean enable), and setVisible(boolean visible). ViewControllerBaseImpl 706 is generally used with either JPanel 707 or a java.awt.Panel 707 by changing the inherits statement. ViewControllerBaseImpl may also be used with any Java or user-defined component or container. The variables, constructors, and methods for ViewControllerBaseImpl 706 are found in FIGS. 10A–10C. The variable for ViewControllerBaseImpl 706 is found in table 1000 in FIG. 10A while the constructors are listed in table 1002 in FIG. 10B. The methods are listed in table 1004 in FIG. 10C.

ViewControllerAdapter 708 is an abstract class and is a helper adapter class that fits between ViewControllerImpl 704 and the developer's subclass. ViewControllerImpl 704 implements almost all of the standard Java AWT listeners and provides empty methods. This class allows ViewControllers to be implemented without having to specify all of the methods of a Java AWT listener interface when a subclass being created needs only one such method.

ViewControllerAdapter 708 implements the following AWT event listeners: AdjustmentListener, ComponentListener, FocusListener, ItemListener, KeyListener, MouseListener, TextListener. This class knows about everything that ViewControllerImpl knows, and also knows the default empty implementation of AWT event listener methods. The methods on the class allow for adding and removing of listeners for view events generated, firing (sending) of view events to the appropriate listeners, cleaning up the list of event listeners on clear and exit, and enabling or disabling the panel.

FIGS. 11A–11C illustrate a variable, a constructor, and methods for ViewControllerAdapter 708. Table 1100 in FIG. 11A illustrates the variable while table 1102 in FIG. 11B illustrates the constructor of ViewControllerAdapter 708. Methods for ViewControllerAdapter 708 are shown in table 1104 and FIG. 11C.

ValidationRule 710 is an abstract class for class-based value validation rules used to validate and format ViewController contents. Validation is normally used for single or groups of text fields (user entry). Examples include range checking, date, social security number, or other business specific formats. The definition of the validation rules are kept out of the data models and ViewControllers to maximize reuse of validation logic. These types of objects only encode which rule to use.

Typically, validation rules have two methods: (1) edit and (2) normalize. The edit method is used to input a string, validate the value and output the view friendly formatted string. The normalized method is used to input a string, validate the value and output a string that will be set into the data model and/or transmitted via a RequestEvent to a destination. For example, given a value of "1000.0", edit will produce "$1,000.00" and normalize will produce "1000". The ValidationRule 710 provides two static helper functions to apply edits or normalizes on an input string given a list of edit rule class names. This is called ValidationRule chaining. In this manner, ValidationRule 710 allows a developer to keep the implementations of validation rules small and simple so as to maximize reuse of validation code. Additionally, ValidationRule 710 may be run on a server. The methods can create an instance of a ValidationRule given a class name, apply edit rules sequentially on a string given a list of ValidationRule class names, or apply normalize rules sequentially on a string given a list of ValidationRule class names. Invocation of a validation rule is initiated by the ViewController or some business logic method. In case of failure, a ValidationRuleException is thrown.

With reference now to FIGS. 12A–12C, drawings illustrating variables, constructors, and methods for ValidationRule 710 are depicted in accordance with a preferred embodiment of the present invention. The variables are illustrated in table 1200 in FIG. 12A while the constructor is shown in table 1202 in FIG. 12B for ValidationRule 710. The methods used in ValidationRule 710 are shown in table 1204 in FIG. 12C. FIG. 12D contains code.1206, which is used to apply ValidationRules for classes in response to ValidationRule 710 being given a list of class names for processing). Code 1206 will apply each ValidationRule for a class and return a formatted result. A similar code is used for ValidationRule.applyNormalizes.

ValidationRuleException 712 is a class that extends the Exception class in Java to represent the type of exceptions thrown by rules defined in ValidationRule 710. ValidationRuleException 712 is generated when a validation rule has failed. The cause of the failure is contained in the exception. In the depicted examples, processing of remaining validation rules will halt. This class needs to know the validation rule exception string.

With reference now to FIGS. 13A and 13B, tables illustrating variables and constructors for a ValidationRuleException are depicted in accordance with a preferred embodiment of the present invention. Table 1300 in FIG. 13A illustrates a variable while table 1302 in FIG. 13B illustrates constructors for ValidationRuleException 712.

ViewEvent 714 is a class having a mechanism used for communication between ViewControllers and ViewListeners, such as ApplicationMediators and between ApplicationMediators. Notification occurs when a significant AWTEvent has occurred that the ViewController cannot handle. Both ViewControllers and ApplicationMediators can fire ViewEvents. The ViewEvent state includes a major code, a minor code, a source Object of the event, and a generic Object data reference. Numerous predefined major codes and minor codes are provided and a subclass can define additional application specific codes.

When a ViewController fires a ViewEvent, it is handled in the ApplicationMediatorImpl superclass first and then forwarded to the ApplicationMediatorImpl subclass in the processViewEvent method. This mechanism allows threading and queuing to be handled by the superclass. Dispatching a ViewEvent to a subclass is performed in one of two ways: queued-event dispatching and thread-event dispatching.

With reference now to FIGS. 14A–14D, diagrams illustrating variables, constructors, and methods for ViewEvent 714 are depicted in accordance with a preferred embodiment of the present invention. Table 1400 in FIGS. 14A–14D illustrates variables for ViewEvent 714. Table 1402 in FIG. 14E shows the constructors for ViewEvent 714. The methods for ViewEvent 714 are shown in table 1404 in FIG. 14F.

ViewListener 716 is an interface for receiving ViewEvents generated by ViewControllers. The listener will be called back on the viewEventPerformed method. ViewListener 716 interprets the values from the ViewEvent and decides what action to take. If more information needs to be conveyed, ViewListener 716 gets the data variable. A ViewListener can set the ViewEvent to be consumed. When the ViewEvent is consumed, the ViewEvent will not be forwarded to other ViewListeners.

Turning now to FIGS. 15A and 15B, diagrams illustrating a variable and a method for ViewListener 716 are depicted in accordance with a preferred embodiment of the present invention. The variable for ViewListener 716 is shown in table 1500 in FIG. 15A. The method used in ViewListener 716 is shown in table 1502 in FIG. 15B.

ApplicationMediator 718 is an interface that specifies methods for the management of PlacementListeners, ViewListeners, RequestListeners, TopListeners, permissions, properties, resources, visibility, validity. ApplicationMediator 718 also defines a generic method to refresh data. ApplicationMediator 718 defines the interface for a class that will mediate multiple ViewControllers or other ApplicationMediators. Methods are provided in this class to add and remove PlacementListeners for the ViewControllers, to add and remove TopListeners for the ApplicationMediator, to add and remove RequestListeners for RequestEvents generated, and to add and remove ViewListeners for ViewEvents passed up from the ViewControllers. Other methods in the ApplicationMediator 718 set the data used by the ViewControllers, tell where and how to handle ViewEvents generated by ViewControllers, and generate RequestEvents based on some application logic of ViewEvents. Methods are provided in this interface to set the property information and the resources used by the ViewControllers.

The FIGS. 16A and 16B, diagrams illustrating a variable and methods for ApplicationMediator 718 are depicted in accordance with a preferred embodiment of the present invention. Table 1600 in FIG. 16A illustrates the variable used for ApplicationMediator 718 while table 1602 in FIG. 16B illustrates the methods used in ApplicationMediator 718.

ApplicationMediatorImpl 720 is an abstract class, implements the ApplicationMediator interface, and provides default behavior to manage ViewControllers, ApplicationMediators, add/fire/remove of PlacementListeners, RequestListeners, ViewListeners and TopListeners. A subclass of ApplicatioMediatorImpl 718 should focus on managing the state machine for ordering the ViewControllers it creates and the mediating of events. This focus includes determining which ViewController to allocate, which ViewController to make visible, when to fire a PlacementEvent, when to fire a RequestEvent, and when to fire a TopEvent. A default list is provided to hold ViewControllers. The default list is a Vector and is directly available to subclasses. An ApplicatioMediatorImpl 720 may create other ApplicationMediators. As a result, a list to hold ApplicationMediators also is provided.

The helper methods initApplicationMediators and initViewControllers will load their respective classes and store them in Vectors. The helper methods getAM, getVC, setAM, and setVC provide a way to get/set the elements in the Vectors.

When a ViewController fires a ViewEvent, the ViewEvent is handled in ApplicationMediatorImpl 720 first and then forwarded to the subclass (not shown) in the processViewEvent method. This process allows threading and queuing to be handled first by ApplicationMediatorImpl 720.

ApplicationMediatorImpl 720 needs to have reference to the client data model, PlacementListeners, TopListeners, ViewListeners, ViewControllers, other ApplicationMediators, UI properties and resources, and Event processing threads.

Methods are provided in ApplicationMediatorImpl 720 to add and remove listeners for ViewEvents generated or forwarded from a ViewController, to fire (send) ViewEvents to the appropriate listeners, to add and remove listeners for RequestEvents generated, and to fire TopEvents and to fire (send) synchronous or asynchronous RequestEvents to the appropriate listeners. Other methods add and remove listeners for PlacementEvents generated, fire (send) PlacementEvents to the appropriate listeners, and cleanup a list of event listeners and event processing threads on clear and exit. It is also possible to enable or disable the visibility, create, initialize, and manage ViewControllers, and to create, initialize, and manage other ApplicationMediators. Other methods get references of all JTC objects managed, set client data references for all ViewControllers and ApplicationMediators managed, add TopListeners, and handle the processing of a received ViewEvent in a separate thread (either in a queue fashion or unique thread per event).

Turning next to FIGS. 17A–17E, diagrams illustrating variables and a constructor for ApplicationMediatorImpl 720 are depicted in accordance with a preferred embodiment of the present invention. Table 1700 in FIG. 17A illustrates variables for ApplicationMediatorImpl 720 while table 1702 in FIG. 17B shows the constructor used in ApplicationMediatorImpl 720. Table 1704 in FIGS. 17C and 17D, and 17E illustrate the methods used in ApplicationMediatorImpl 720.

With reference now to FIGS. 17F–17I, diagrams illustrating code used in methods for ApplicationMediatorImpl 720 are depicted in accordance with a preferred embodiment of the present invention. In FIG. 17F, code 1706 illustrates code used in an exit method for ApplicationMediatorImpl 720. This code allows the ApplicationMediator to be exited by exiting all allocated ViewControllers and ApplicationMediators. All data will be set to null by code 1706 and all lists destroyed.

In FIG. 17G, code 1708 illustrates code used to clear an ApplicationMediator by clearing all allocated ViewControllers and ApplicationMediators. The data is set to null, but the lists are not destroyed. A cleared ApplicationMediator can be used again. In FIG. 17H, code 1710 is used to initialize an ApplicationMediator using the listeners of an existing ApplicationMediator. In FIG. 17I, code 1712 is used to refresh an object. This code is used to refresh ViewControllers and ApplicationMediators when new data arrives. In FIGS. 17J–17M, depicts code 1714 which is used to handle the event dispatch.

PlacementEvent 722 is a class used to notify PlacementListeners that a ViewController needs to be adjusted on the screen. The value stored in a PlacementEvent 722 are: (1) major code indicating the placement type; (2) minor containing additional information; (3) source, which indicates the sender of the event; (4) Component, which is the ViewController's component; and (5) data, which is a generic Object data, containing the type to pass more information and is typically not the same type of data sent in ViewEvents and RequestEvents. Predefined placement types, which are used as major codes include, for example, add, remove, and modify. A subclass may define more application specific PlacementEvent codes. Additional information may be conveyed through the use of the minor variable or by supplying real data.

With reference now to FIGS. 18A–18C, diagrams illustrating variables, constructors, and methods for a PlacementEvent are depicted in accordance with a preferred embodiment of the present invention. Table 1800 in FIG. 18A illustrates variables used within PlacementEvent 722 while table 1802 in FIG. 18B show constructors used for PlacementEvent 722. Table 1804 in FIG. 18C shows the methods used within PlacementEvent 722.

PlacementListener 724 is an interface used to manage the placement of ViewControllers on the screen. For a given component or container, such as a ViewController, PlacementListener 724 controls the placement while ApplicationMediator controls the ordering of ViewControllers instead of their placement. For example, if a designer wishes to create a split pane with a tree in the left pane that allows selection of ApplicationMediators, ViewControllers will display on the right. As a result, an "add" method is called to the split pane. If a frame is used, "add" has a different syntax. An object handling placement of components will register as a listener for notifications to place objects on the screen. This role is the one played by PlacementListener 724. The ApplicationMediator controls the ordering of ViewControllers, not their placement. A PlacementListener adds itself to a PlacementEvent generator and is called back with a PlacementEvent which indicates a desired action. This mechanism allows complete separation between view creation (ViewController), view ordering (ApplicationMediator), and view placement (PlacementListener). This arrangement increases the reusability of ViewControllers and ApplicationMediators to nearly 100% with respect to placement.

With reference now to FIGS. 19A and 19B, diagrams illustrating a variable and method for a PlacementListener are depicted in accordance with a preferred embodiment of the present invention. Table 1900 in FIG. 19A illustrates the variable used in PlacementListener 724 while table 1902 in FIG. 19B illustrates the method used in PlacementListener 724.

TopEvent 726 is a class used to notify TopListeners that ApplicationMediator needs some desktop function to occur.

The value stored in TopEvent include: (1) major, which identifies the TopEvent type; (2) minor, which contains additional information; (3) source, which identifies the sender of the Event; (4) consume, which will result in the Event being processed if true; and (5) data, which is a generic object data used to pass more information. Predefined types, which are used as major codes include, for example, EXEC, BROWSER, TITLE, STATUS, and OS. This category of types is used for interaction with the desktop (operating system, browser, other applications). Additional major codes include TRANSPORTER, DESTINATION, APPLICATION_MEDIATOR, REQUEST_EVENT, VIEW_CONTROLLER, VIEW_EVENT, TOP_LISTENER, TOP_EVENT, PLACEMENT_LISTENER, PLACEMENT_EVENT, MAJOR, MINOR, AWT_EVENT, and JTC. This category of types is used to indicate a reconfiguration of the JTC application. Additional TopEvent codes may be defined through the use of subclasses. Additional information may be conveyed by using the minor variable or supplying real data.

With reference now to FIGS. 20A–20C, diagrams illustrating variables, constructors, and methods for a TopEvent are depicted in accordance with a preferred embodiment of the present invention.

Table 2000 in FIG. 20A illustrates the variables contained in <update this tabled based on latest javadoc contents> TopEvent 726 while table 2002 in FIG. 20B shows the constructors for TopEvent 726. The methods for TopEvent 726 are found in table 2004 in FIG. 20C.

TopListener 728 is an interface that performs business specific desktop duties for a display. TopListener 728 provides an interface that is highly customizable for each business application. This interface specifies a topEventPerformed method to receive a TopEvent encoding a task to be performed.

With reference now to FIGS. 21A and 21B, diagrams illustrating a variable and methods for TopListeners are depicted in accordance with a preferred embodiment of the present invention. Table 2100 in FIG. 21A illustrates the variable for TopListener 728 while table 2102 in FIG. 21B illustrates the methods in TopListener 728.

The RequestEvent 730 is a class that extends EventObject to represent RequestEvents generated by ApplicationMediators. This class represents a lite-weight transaction. The instances of this class denotes a unit of work. RequestEvent 730 represents a request for a transaction or data from a source external to the application. The request is handled by a remote or local destination. The Transporter is responsible for mapping RequestEvents to Destinations. The state of a RequestEvent 730 includes the following information: (1) major code identifying a family of RequestsEvents; (2) minor code identifying a specific request under the family); (3) version, which is usually user defined; (4) status which may be an appended string showing the stages of processing; (5) consume (a consumed Request Event will cause JTC to stop processing the Request Event); and (6) data, which may be, for example a reference to generic. Object data. A RequestEvent can be set to be consumed in which case Destinations and the Transporter will halt forwarding of the RequestEvent and return control to the ApplicationMediator.

Turning now to FIGS. 22A–22C, diagrams illustrating a variable, constructors, and methods for RequestEvent are depicted in accordance with a preferred embodiment of the present invention. Table 2200 in FIG. 22A illustrates the variable in RequestEvent 730. Table 2202 in FIG. 22B shows the constructors used in RequestEvent 730. Table 2204 in FIG. 22C illustrates the methods in RequestEvent 730.

RequestException 732 is a class that extends Exception to represent the type of exception thrown when there is a problem in submitting a RequestEvent. This class is used when the processing of a RequestEvent causes an error condition. This exception can be thrown directly when a synchronous or asynchronous RequestEvent is performed. This indicates failure in synchronous processing or failure in the fire mechanism. The exception can be thrown indirectly when asynchronous RequestEvent is processed. The cause of the failure is also indicated in the exception in the depicted examples. Thus, this class needs to know the string representing the reason for the RequestEvent exception.

With reference now to FIGS. 23A–23C, diagrams illustrating a variable, constructors, and methods for RequestException 732 are depicted in accordance with a preferred embodiment of the present invention. Table 2300 illustrates the variable for RequestException 730 while table 2302 in FIG. 23B illustrates the constructors used in RequestException 732. The methods for RequestException 730 are found in table 2304.

The RequestListener 734 is an interface that defines the method for a class to implement for receiving synchronous or asynchronous RequestEvents. This interface is implemented by classes that want to listen and be notified when a RequestEvent is fired. A typical example is a Transporter instance. The RequestListener is added to an ApplicationMediator as a listener for RequestEvents. Two styles of notification are possible: synchronous and asynchronous. The Transporter implements the RequestListener interface to map RequestEvents to Destinations. Other classes can implement the RequestListener interface and register for RequestEvents to monitor them. A RequestException can be thrown directly when invoking synchronous and asynchronous RequestEvents or on a callback when invoking only asynchronous RequestEvents.

With reference now to FIGS. 24A and 24B, diagrams illustrating a variable and methods for a RequestListener are depicted in accordance with a preferred embodiment of the present invention. Table 2400 in FIG. 24A illustrates the variable in RequestListener 734 while table 2402 in FIG. 24B illustrates the methods used in RequestListener 734.

RequestResponseListener 736 interface is implemented by a class that requires asynchronous RequestEvent processing. For example, when an ApplicationMediator implements this interface, it will be called back on one of the two methods after it fires asynchronous RequestEvents. Successful RequestEvents are returned through the requestResponse method and passed a RequestEvent that may have new data. Unsuccessful RequestEvents are returned through the requestException method and the RequestException contains the reason.

Turning now to FIGS. 25A and 25B, diagrams illustrating a variable and methods for a RequestResponseListener are depicted in accordance with a preferred embodiment of the present invention. Table 2500 in FIG. 25A shows the variable in RequestResponseListener 734 while table 2502 in FIG. 25B illustrates the methods in RequestResponseListener 736.

The Transporter 730 is a class that implements the JTC and RequestListener interfaces. The primary function of Transporter class 730 is to map RequestEvents to Destinations. In other words, Transporter 738 acts as an event broadcaster to route RequestEvents to the appropriate Destination. Typically, ApplicationMediators fire RequestEvents which are routed to a Destination by the Transporter. The Destination processes the RequestEvent by performing some interpretation and sending them to a target, such as a server. This event broadcasting is performed by Transporter 738 based on the major code of the RequestEvent in the depicted examples. Transporter 736 needs to know the Destinations, the major codes registered by the Destinations, RequestEvents, RequestResponseListener, and RequestExceptions.

Methods are provided in Transporter 738 to register a Destination that processes RequestEvents with a specific major code, remove the registration of a Destination, receive a RequestEvent for synchronous or asynchronous processing, handle the processing of a received asynchronous RequestEvent in a separate thread (either in a queue fashion or unique thread per event), and return a list of Destinations registered for a specific key (major code). Other methods cancel the processing of an asynchronous RequestEvent, cleanup threads and lists of Destinations on clear and exit, enable or disable the sending of RequestEvents to Destinations, and enable or disable the tagging (status setting) of RequestEvents.

With reference now to FIGS. 26A–26D, diagrams illustrating variables, a constructor, and methods for a transporter are depicted in accordance with a preferred embodiment of the present invention. Table 2600 in FIG. 26A illustrates variables for Transporter 736 while table 2602 in FIG. 26B illustrates a constructor for Transporter 738. The methods for Transporter 738 are illustrated in table 2604 in FIG. 26C–26D.

Turning now to FIGS. 26E–26F, diagrams illustrating code used in methods in Transporter 738 are depicted in accordance with a preferred embodiment of the present invention. Code 2604 in FIG. 26E illustrates processing or selecting Destinations in response to a RequestEvent. Given a RequestEvent of Destinations, code 2604 will call each Destination in a first in first out (FIFO)/first exption first return (FEFR) order. Code 2606 in FIG. 26F illustrates a process for submitting a synchronous request. For each Destination listening for the current family of RequestEvents, as indicated by the major code, the RequestEvent is sent to a Destination for processing. If a problem occurs, a RequestException is thrown. Processing the RequestEvent will occur as long as a RequestException being thrown is not from a Destination and the RequestEvent is not consumed. Submission of an asynchronous request is performed by code 2608 in FIG. 26G. Code 2610 in FIG. 26H illustrates code for handling executions of submits on another thread.

The Destination 740 is an interface used to pass results or events. This interface is implemented by classes that want to listen to Transporters and send RequestEvents to servers. Destination 740 performs the following functions: (1) server: locate it; (2) network transports: create the low level protocols such as sockets, RMI, URLs, Files, etc.; (3) server types: be able to talk to different servers such as EJBs, Servlets, web servers, legacy, etc.; (4) message formats:

be able to turn RequestEvents and data into formats that the servers understand; (5) timeouts: finish the job in the appropriate amount of time or cancel the operation; (6) retries: how many times should a connection be tried; (7) caching: save data until it becomes stale; (8) stale data: detect stale data; (9) heart beats: I am alive; (10) logging: save pre and post RequestEvents; and (11) objects: locate them, create them.

Example Destinations behaviors include the following: (1) serializing a request and writing it to a socket, (2) reading and writing requests and responses from a file for demonstrations, (3) casting the data in a RequestEvent into objects and so that RMI methods are visible, (4) debugging, (5) tracing, (6) compression, (7) encryption, and (8) translation.

A Destination 740 is first added to a Transporter as a RequestListener, listening for RequestEvents of a specific major code. When RequestEvents enter the Transporter, these RequestEvents are sent to each listening Destination via a requestEventPerformed. Additionally, a Destination monitors the state of the consumed attribute of the RequestEvent and will terminate processing when the state is true.

RequestEvents are identified by a major code (represents a family of Requests) and a minor code (represents a specific Request). Destinations are added to the Transporter as DestinationListeners specifying a major code for RequestEvents they are interested in receiving. The Destination is called when the major code of the RequestEvent matches the Destination's major code. Multiple Destinations can listen for the same RequestEvent major code and results of one Destination can be passed to the next Destination. RequestEvents are processed in a first in first out (FIFO)/first exception first return (FEFR) order.

With reference now to FIGS. 27A and 27B are diagrams illustrating a variable and methods for a Destination in accordance with a preferred embodiment of the present invention. Table 2700 in FIG. 27A illustrates the variable in Destination 740 while table 2702 in FIG. 27B illustrates the methods used in Destination 740.

DestinationImpl 742 is an abstract class that implements the Destination interface and provides a default implementation for the Destination interface methods. It needs to know whether the Destination is enabled or disabled, whether the RequestEvents are tagged with a status or not, and the RequestEvent processing timeout value. Methods are provided to enable or disable the processing of RequestEvents in the Destination and to set the RequestEvent processing timeout value.

With reference now to FIGS. 28A–28C, diagrams illustrating variables, constructors, and methods for a DestinationImpl are depicted in accordance with a preferred embodiment of the present invention. Table 2800 in FIG. 28A illustrates the variable used in DestinationImpl 742 while table 2802 in FIG. 28B illustrates the constructor used in DestinationImpl 742. Methods for DestinationImpl 742 are illustrated in table 2804 in FIG. 28C.

In FIG. 28D, code 2806 is used to process a RequestEvent. If an application uses a set of objects that perform the retrieval and update of data, then those objects can be accessed from a generic Destination class. Typically, a Destination implementation accesses a single interface class with methods and is written specifically to serve one purpose (i.e. the retrieval and update of customer data or the retrieval and update of employee data). However, a generic Destination class can be written to retrieve and update any set of data. The requirement is that the class/object that serves the data must all have methods with the same interface (in other words, they must take in the same number and type of object as parameters and return the same type or generic object.) This way, the Destination class can be implemented to use Java's reflection to access/create the object and invoke a particular method on the object. The major code of the RequestEvent can specify the class name and the minor code can specify the method name. The code in FIG. 28D shows how a Destination can be implemented to access an Enterprise JavaBean session bean instance from an application server using Java's RMI and Java's Reflection capabilities. The methods on the session beans all take a single parameter of type Object and return a parameter of type Object. The client user interface and the session beans know the specific type of data objects passed but the Destinations do not need to know about the data.

JTC 744 is an interface that provides a top level interface in the architecture of the present invention. All major objects in a JTC application implement this interface including the driver programs that launch the application/applet. This interface provides the ability to reference all objects using a single type. The behaviors expected include clear, exit, getJTCs, init, isEnabled, setEnabled, and tostring. The interfaces that extending JTC are ViewController, ApplicationMediator, and Destination. The classes implementing JTC are ViewControllerImpl, ApplicationMediatorImpl, Transporter, and DestinationImpl. Of particular importance is the getJTCs( ) method. Each JTC object returns the other JTC objects it creates. Iteration over these objects is possible. Inspection of the object types and addition of the appropriate listeners may be performed. This interface provides a mechanism for non-intrusive logging, tracing and debugging.

Factory 746 is a class used to make objects. This class is the place for code relating to prefetching, caching, and alternative "styles" for the new operator (or construction of objects), or loading a serialized object. The alternative "style" may be, for example, using Class.forName. The default behavior of a Factory includes, for example, creating a single object. Additionally, the behavior may include returning a previously created object if a key has been used or otherwise creating a new object and remembering the object.

Further, Factory 746 may be used to create multiple objects. Also, if a key[i] has been used, a previously created object may be returned. Otherwise, a new object [i] may be created and remembered by the Factory. For example, on a single JVM, a designer may want to create a single shared instance of a Transporter. Each access to the Transporter should be as follows: Transporter t=Factory.newInstance (com.ibm.jtc.Transporter, true). In this case, the Class.forName method is used with the key to create an instance of the Transporter. The true value indicates that a singleton may be created. The singleton may be turned off in which case all objects created are new and not remembered. Another key also may be used besides the class name. An example is as follows: Customer c=Factory.newInstance ("CUST", com.abc.Customer, true). The user can create a single object or create multiple of objects. For example, on a single JVM, a user may want to create and share one instance of a Transporter. The Factory class needs to know the list of singleton classes managed. The methods in this class provide several ways to create an instance of a class given one or more full path class name strings. The Factory class also can remove stored references of singleton classes.

With reference now to FIGS. 29A and 29B, diagrams illustrating variables and methods in a Factory are depicted in accordance with a preferred embodiment of the present invention. Table 2900 in FIG. 29A illustrates the variable used in Factory 746 while table 2902 in FIG. 29B illustrates the methods for Factory 744.

Q 740 is a class representing a queue of objects that are added and removed in first-in first-out (FIFO) ordering. The size of the queue can be set to a maximum or as unbounded. The structure maintains the queue of objects, the current size of queue, and the front and back ends of the queue. Methods are provided to add an object to the back end of the queue, remove an object from the front of the queue, and predicates to check if the queue is empty or full.

JTC 744 is a top level interface, which all major objects in an application created using the architecture of the present invention should implement. This would include driver programs that launch the application. This interface allows referencing of objects with a consistent type and a similar expected behavior.

Of particular importance in this class is the getjTCs( ) method. Each JTC object returns the other JTC objects it creates. With this interface, a process can iterate over these objects, inspect their types, and add the appropriate listeners. The system may be reconfigured through this interface. This reconfiguration includes, for example, disabling the Transporter, adding a priority Destination, and consuming an event. This interface provides an excellent mechanism for non-intrusive logging, tracing and debugging. For example, if a program Testl.java implements JTC, it will return the Transporter, ApplicationMediators and Destinations it creates.

With reference now to FIG. 30A and 30B, tables illustrating variables and methods in a JTC is depicted in accordance with a preferred embodiment of the present invention. Table 3000 in FIG. 30A illustrates variables in JTC while table 3002 in FIG. 30B illustrates methods for JTC.

V. Steps in Building an Application Using the JTC Architecture

A thin client application or a thick client application that follows the JTC architecture of the present invention can be built using a top-down, bottoms-up, or from the middle approach. All approaches allow for concurrent development within the JTC client application. All approaches all for concurrent development of the JTC client application and the server and services.

The following steps show a bottoms-up process. A proper design of interfaces and subsystem models, will ensure that the JTC application can be implemented in parallel.

A. Design Client Application Subsystems

The key to the successful implementation of a JTC application that has reusable and maintainable parts is the proper division of the application into logical subsystems. This division should be driven by the analysis of the application's domain. For example, using an object-oriented analysis of the application's domain, sets of use cases can be developed in the following manner. The actors external to the system are identified. For example, in designing an automated teller machine (ATM) the customer using the machine would be an actor and the bank's central computer is also an actor. The use case is a set of interactions the actor or actors have with the system. All sequences of interactions, including normal and exceptional behavior, should be specified. For example, normal behavior for withdrawing cash from an ATM would include a sequence of prompts and customer responses that eventually lead to the dispensing of cash. Exceptions would include an unreadable card, an incorrect PIN, insufficient cash in the machine, insufficient funds in the account, etc. Use cases can include a set of preconditions and post-conditions. A precondition for the ATM would be possession of an ATM card and a post condition, if the cash withdrawal is successful, would be an appropriate debit from the account balance.

The use cases produce natural divisions of function in an application. Use cases describe functions of the application that are most likely to be reused within and outside of the application. Each use case or possibly a group of fine-grained related use cases should make up the logical subsystem model. Groups of ViewControllers and Application-Mediators are implemented in these subsystems. A ViewController is used to represent a single reusable screen or grouping of information to be inputted and/or displayed. An ApplicationMediator mediates multiple ViewControllers for a single application function or use case.

Other subsystems of the client application include a communications subsystem, a client startup subsystem, reusable graphical components, business validation rules, and enterprise policies.

The business logic and central data management of an application should be separated out from the JTC application. This business logic and data can be physically located on any machine. JTC clients typically do not keep or manage transaction states; server side business logic manages the transaction states. Therefore, the communications subsystem is responsible for the sending of data requests and transaction requests to the business logic outside of the application. This consists of the implementation of Request-Events and Destinations.

A client startup subsystem manages the client application lifecycle and overall look and feel. This subsystem includes implementations of TopListeners and PlacementListeners.

Common reusable graphical components used by user interface panels should be separated out in their own subsystem so that they are designed and implemented for reuse and available to other subsystems and applications.

The rules for validating user input for display format and persistent storage should be separated into another subsystem. This allows for central maintainability of the rules and reuse across all other subsystems and applications. ValidationRules are implemented in this subsystem.

Enterprise policies include functions related to security, login/logout, users/groups/roles, profiles, locale; and languages. These requirements cross subsystems in a consistent and easily managed manner through methods including set/getProperties, set/getResources, set/getPermissions. Additional non functional enterprise polices such as caching, data pre-fetching and mobile users are implemented in common easily configurable Destination subsystems.

In a bottoms-up approach, the client data model should be developed next for the specific subsystem. This model specifies the structure and contents of data used by the client application. There are a variety of approaches to a client data model: Local Object Model, Workflow Object Model, XML, Named Methods, Key/Value Pairs, Ordinal Positioning, RMI, etc. To optimized concurrent development with the server and services, a bootstrap Key/Value data model is a sufficient and expeditious choice.

Once a data model approach is chosen, then the data objects must be created. These can be grouped and organized at different levels of granularity. In general, each component, such as, for example, a ViewController or an ApplicationMediator, should only reference the data the component uses or manages. For example, a ViewController should only have data required to be displayed on a single screen and the data input by the user on that screen.

B. Create a ViewController

In these examples, a ViewController is a panel that contains one reusable screen of user display and input. This screen can either contain Java Abstract Windowing Toolkit (AWT) components or Java Foundation Classes (JFC/Swing) components. The way to choose between the two types of components is to implement the ViewControllerBaseImpl class. The ViewControllerBaseImpl class can extend AWT's Panel class or JFC's JPanel class. Also ViewControllerBaseImpl can just contain a component, container or bean and return it in the getcomponent( ) method. In a graphical user interface, components are organized into manageable groups through the use of containers. Additionally, a container may provide basic window and dialogue services. A java.awt.Panel itself is a pure container. A java.awt.Panel itself is not a window in itself, but its sole purpose is to organize components in a window. With reference now to FIG. 31, a flowchart of a process for creating a ViewController is depicted in accordance with a preferred embodiment of the present invention. A particular screen is selected to implement (step 3100) and a class is created that extends one of the ViewController implementation classes (step 3102). This class should have a suffix of VC to distinguish it as a ViewController class. The init( ) method is overridden (step 3104) and replaced with code to create, initialize, and layout graphical components of the panel. Visual builders (such as IBM VisualAge) can be used to create this method automatically. The refresh( ) method is overridden (step 3106). In this method, data to be displayed will be passed in. ViewControllers should be implemented to be reusable with different sets of data. By invoking refresh( ), ApplicationMediators can control for what purpose the ViewController is used. The clear( ) method is overridden (step 3108). In this method, the set of data used is cleared from use and display. This allows for the ViewController to be used with another set of data.

As part of component initialization, the ViewController is added as its component's event listeners (step 3110). The event listeners are implemented for the components (step 3112). ValidationRules are used to validate user input from a component event (step 3114). Use ViewEvent's (described below) to send user inputted data or requests for more data from an ApplicationMediator. The fireViewEvent method and the ViewEvent listeners are used to process the event (step 3116). If another ViewController needs to be displayed, use a ViewEvent to represent that request and have the ApplicationMediator process that request.

VIII. Create ValidationRule(s)

Turning now to FIG. 32, a flowchart of a process for creating ValidationRules is depicted in accordance with a preferred embodiment of the present invention. A ValidationRule implements two methods: edit and normalize. A particular business validation rule is selected (step 3200) and a class that extends ValidationRule is created (step 3202). This class should have a suffix of Rule to distinguish it as a ValidationRule class. The edit( ) method is overridden (step 3204). The edit( ) method takes a user-inputted string and generates a formatted output for display. The normalize( ) method takes a user-inputted or formatted string and generates a normalized output for transmitting to some persistent storage (step 3206). If the normalize and edit methods have the same implementation, then implement in the edit( )method and have the normalize( ) method call the edit( ) method. The ValidationRule will compare user input against the selected business rule (step 3208). If the user input is not valid, then a ValidationRuleException is thrown (step 3210) and the process terminates thereafter. If the user input is valid, the process also terminates.

C. Create a ViewEvent

With reference now to FIG. 33, a flowchart of a process for creating a ViewEvent is depicted in accordance with a preferred embodiment of the present invention. In response to AWTEvents, ViewControllers visually manipulate components, containers and beans. A ViewEvent is created for an AWTEvent from a ViewController that needs action to be taken beyond the normal visual manipulation capabilities of the ViewController. ViewEvents are created by ViewControllers and processed by ApplicationMediators which are ViewListeners. Other ViewListeners can listen for ViewEvents to monitor and debug. The details are in two choices: 1) an interface is created to contain all the various ViewEvent codes used in the application (step 3300), 2)

MyViewEvent is a subclass ViewEvent and contains the ViewEvent codes. Create an instance of ViewEvent using one of the above codes (step 3302). Data can also be sent with the event and send the ViewEvent using fireViewEvent method of ViewControllerImpl (step 3304) with the process terminating thereafter.

D. Create an ApplicationMediator

Figure 34:
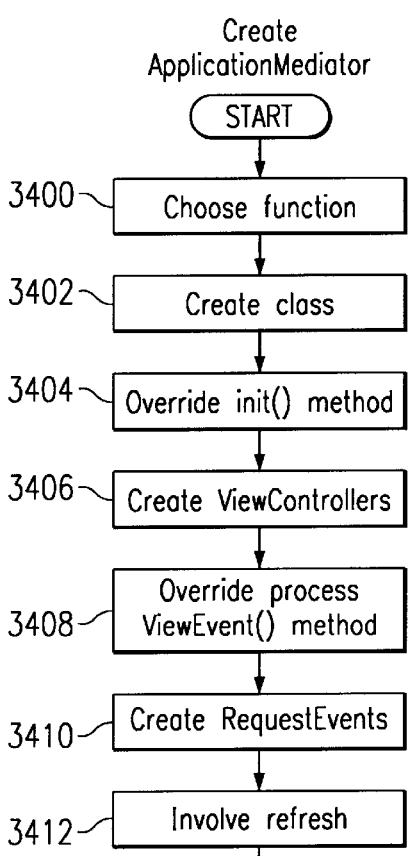
FIG. 34 is a flowchart of a process to create an ApplicationMediator depicted in accordance with a preferred embodiment of the present invention.

An ApplicationMediator class is typically present for every application function or use case of the system to be developed. An ApplicationMediator creates one or more ViewControllers to complete its function. It may also create other ApplicationMediators for nested functions or use cases. With reference now to FIG. 34, a flowchart of a process to create an ApplicationMediator is depicted in accordance with a preferred embodiment of the present invention. A particular function is selected (step 3400) and create a class that extends ApplicationMediatorImpl (step 3402). This class should have a suffix of AM to distinguish it as an ApplicationMediator class. The init( ) method is overridden (step 3404). The ViewControllers used by this ApplicationMediator are created (step 3406). The initViewControllers( ) and initApplicationMediators( ) methods can be used to create instances of the classes given a list of class name strings. These init methods also add the current ApplicationMediator as the ViewListener for the newly created instances. The processViewEvent( ) method is overridden (step 3408).

ViewEvents from all ViewControllers and ApplicationMediators created by the current ApplicationMediator are processed in this method. This method is called in a separate thread from the AWTEvent thread by the viewEventPerformed( ) method of ApplicationMediatorImpl, so that user processing can continue. RequestEvents are created for any requests for data or transaction to be processed by business logic outside of the client application (step 3410). These requests can be synchronous or asynchronous. For asynchronous RequestEvents, the requestResponse( ) and requestException( )methods must be overridden. Refresh( ) is invoked on the ViewController or ApplicationMediator based on the response of the RequestEvent (step 3412) with the process terminating thereafter. Other possible actions based on ViewEvents include, for example, passing control to other ViewControllers or ApplicationMediators. Also, the ViewEvent can even be sent to higher level listeners using the fireViewEvent method of ApplicationMediatorImpl.

E. Create a RecuestEvent

Figure 35:
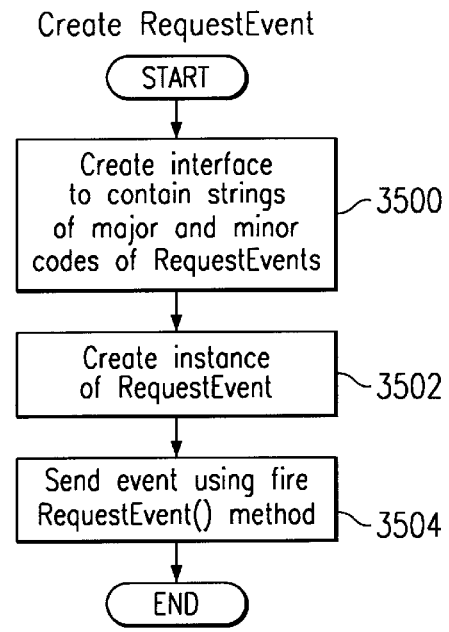
FIG. 35 is a flowchart of a process for creating a RequestEvent depicted in accordance with a preferred embodiment of the present invention.

RequestEvents contain a major code to determine the Destination of the request and a minor code to determine the type of request. Turning now to FIG. 35, a flowchart of a process for creating a RequestEvent is depicted in accordance with a preferred embodiment of the present invention.

An interface for containing the strings of major and minor codes of RequestEvents is created (step 3500). Major codes determine the Destination but should be based on a grouping of related request types. In this manner, the processing of these requests can be changed as a group. When processing a ViewEvent in an ApplicationMediator, a RequestEvent can be created for requesting data or a transaction from a business logic subsystem that may be outside of the client application. An instance of RequestEvent is created using the appropriate major and minor code (step 3502). The event is sent using fireRequestEvent method of ApplicationMediatorImpl (step 3504) with the process terminating thereafter.

F. Create a Destination

A Destination takes a RequestEvent and sends it to the appropriate location for processing including servers, the hosting client environment, an in memory algorithm, or local devices. Each major code can be mapped to a different Destination. This allows the client application to access multiple servers and change locations of server processing without requiring code changes in the client application.

Figure 36:
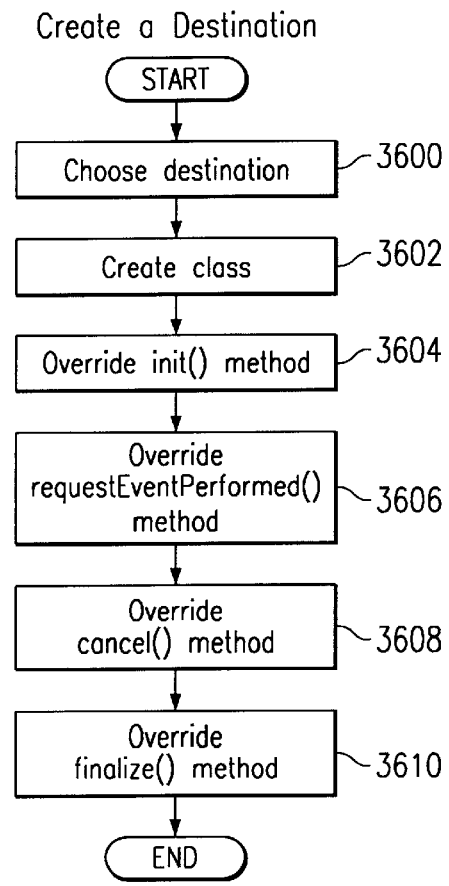
FIG. 36 is a flowchart of a process for creating a Destination depicted in accordance with a preferred embodiment of the present invention.

With reference now to FIG. 36, a flowchart of a process for creating a Destination is depicted in accordance with a preferred embodiment of the present invention. A particular Destination for processing client requests is selected (step 3600) and a class that extends DestinationImpl is created step (3602). In the depicted examples, this class has a suffix of Destination to distinguish it as a Destination class. The init( ) method is overridden (step 3604). Any initialization required to connect to a particular Destination can be implemented in this method. The requestEventPerformed( ) method is overridden (step 3606). A RequestEvent is passed to this method. The method should send the request to the appropriate Destination and update the RequestEvent with the response. Use the setStatus method of RequestEvent to update the processing status of the request. If a timeout value has been set, then implement a timeout mechanism for processing the request.

The Destination should observe the RequestEvent consume variable as an indicator that processing should be canceled. Next, the finalize( ) method is overridden (step 3610) with the process terminating thereafter. If connection to a Destination needs to be cleaned up, that functionality should be located in this method. The TopListener or any other class that starts the application should create Destinations and register them with the Transporter based on the major codes of the RequestEvents the Destination handles.

G. Create a TopListener

A TopListener manages the overall application. The TopListener is the entry point into the hosting client desktop environment, which includes the operating system, a browser, and legacy programs. Typically the class that contains the top frame of the application will also implement the TopListener interface. This class should have a suffix of Top to distinguish it as a TopListener class.

Figure 37:
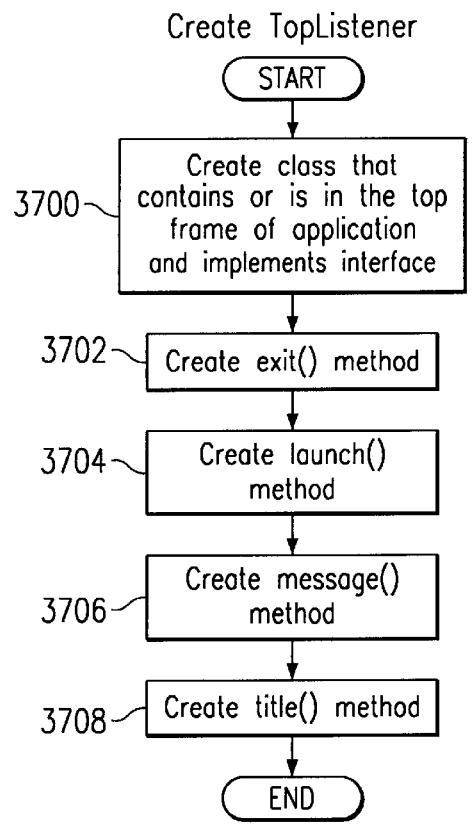
FIG. 37 is a flowchart of a process for creating a TopListener depicted in accordance with a preferred embodiment of the present invention.

With reference now to FIG. 37, a flowchart of a process for creating a TopListener is depicted in accordance with a preferred embodiment of the present invention. A class is created that contains or is the top frame of the application and implements the TopListener interface (step 3700). An exit( ) method is created (step 3702) and a launch( )method is created (step 3704). Next, a message( ) method is created (step 3706) and a title( ) method is created (step 3708). A TopEvent is created and sent to the TopListener with the fireTopEvent method. A major code of TopEvent.EXIT indicates that the ApplicationMediator is finished. A major code of TopEvent.LAUNCH indicates that the ApplicationMediator needs an operating system program to be invoked. A major code of TopEvent.MESSAGE indicates that the ApplicationMediator needs a desktop specific message to be displayed. A major code of TopEvent.TITLE indicates that the ApplicationMediator needs a desktop specific application title to be displayed.

H. Create a PlacementListener

Figure 38:
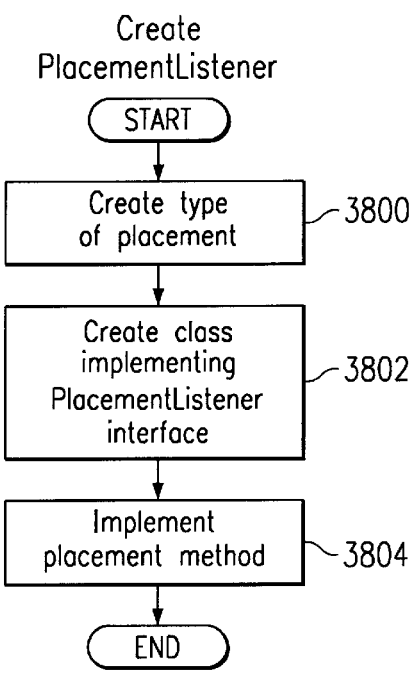
FIG. 38 is a flowchart of a process for creating a PlacementListener depicted in accordance with a preferred embodiment of the present invention.

A PlacementListener is used to place an actual component, container or bean (i.e. ViewController.getComponent( )) on a frame or window. With reference now to FIG. 38, a flowchart of a process for creating a PlacementListener is depicted in accordance with a preferred embodiment of the present invention. A single type of placement is selected (step 3800) and creates a class that implements the PlacementListener interface (step 3802). This class should have a suffix of Placement to distinguish it as a PlacementListener class.

The placementEventPerformed method is then implemented (step 3804) with the process terminating thereafter. An ApplicationMediator and a Java Component is passed in to the method. The component should be added to some container managed by the PlacementListener class.

I. Assembling the JTC Program

The JTC pattern for building most client applications is now given. This description is the JTC pattern. A Destination "D" object is created and initialized. A Transporter object "T" is created and infitialized. A major code "MC" is defined. "D" is added to "T" as a DestinationListener using major code "mc".

A main program "P" that implements the JTC, PlacementListener and TopListener interfaces is created and it creates top level frames.

An ApplicationMediator "AM" object is created. Transporter "T" is added as a RequestListener. Main program "P" is added as a PlacementListener and a TopListener. ApplicationMediator "AM" is initialized. ApplicationMediator "AM" creates and initializes one or more ViewControllers "VC" and immediately fires a PlacementEvent to start the program visuals.

This is the Java code for the JTC pattern:

```
public class MyProgram implements JTC,
    PlacementListener, TopListener {
  public static void main (String[ ]) {
    MyProgram P=new MyProgram( );
    P.createFrames( );
    MyDestination D=new MyDestination( );
    dest.init( );
    MyTransporter T=new MyTransporter( );
    trans.init( );
    String MC="mc";
    T.addDestinationListener(MC, D);
    MyApplicationMediator AM=
       new MyApplicationMediator( );
    AM.addPlacementListener(P);
    AM.addTopListener(P);
    AM.addRequestListener(T);
    AM.init( );
{
```

VI. Subsystem Behavior

A. ViewController Subsystem Runtime Behavior

Figure 39:
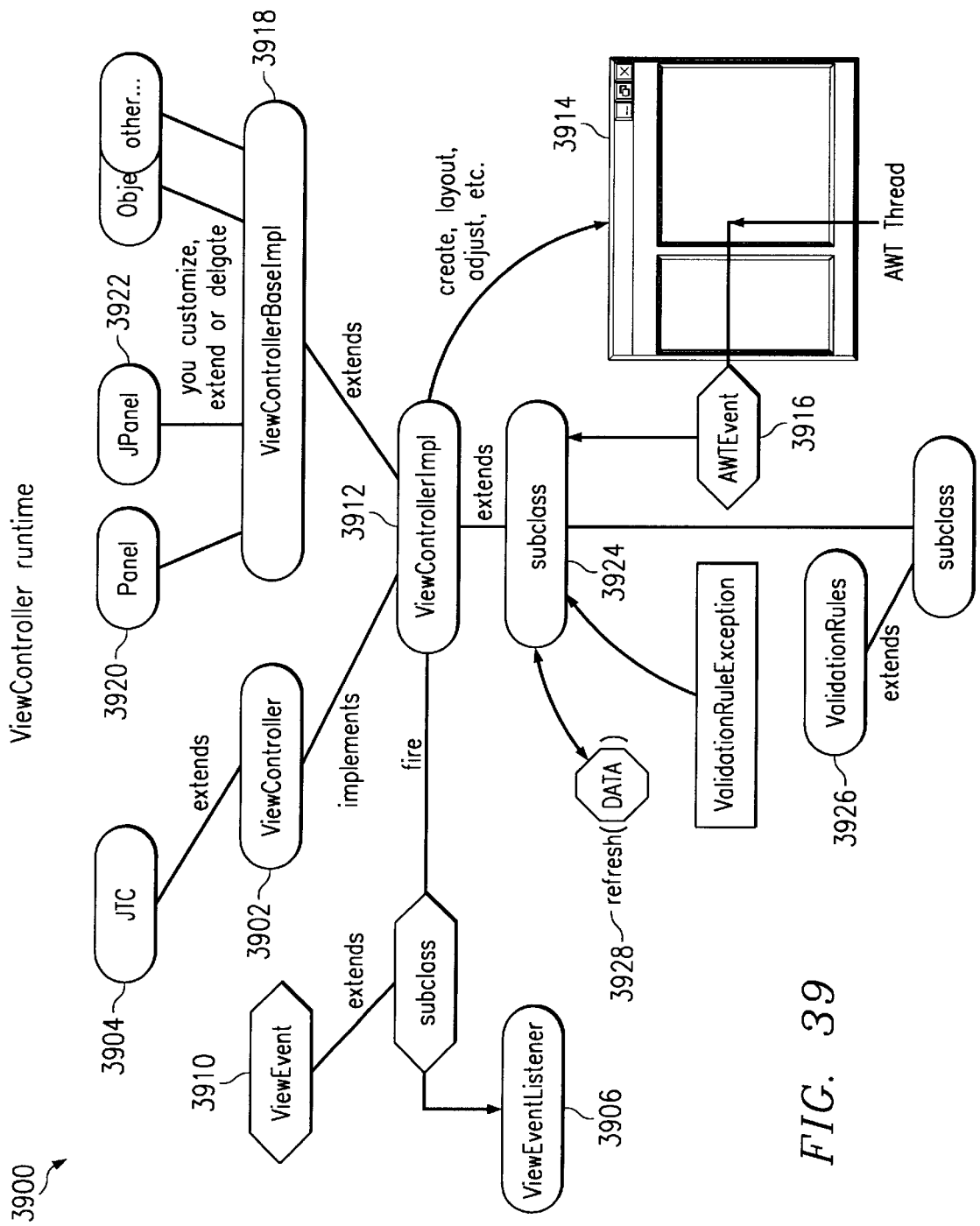
FIG. 39 is a diagram illustrating runtime behavior of a ViewController subsystem depicted in accordance with a preferred embodiment of the present invention.

With reference now to FIG. 39, a diagram illustrating runtime behavior of a ViewController subsystem is depicted in accordance with a preferred embodiment of the present invention. The runtime behavior of the ViewController subsystem 3900 is shown in FIG. 39. This subsystem is the basic GUI building block and the primary mechanism for interacting with the user. The ViewController interface 3902 extends JTC interface 3904. It defines the graphic components of an application and specifies methods for managing ViewListeners 3906, permissions, properties, resources, visibility and validity. It also specifies methods to refresh data. The ViewController is also responsible for handling refresh calls 3908 and updating the GUI accordingly.

ViewController 3902 is responsible for communication of information to ViewListeners 3906. ViewController 3902 knows the full semantics of the data model. One communication technique for sending information to ViewListeners 3906, is to fire a ViewEvent 3910 that the listeners can interpret. The specification of the major and minor codes in ViewEvent 3910 directs the listeners as to what action to perform. Additional information in the form of a String or user-defined data object can be specified by the setData method. ViewController 3902 also can provide named methods. Once a ViewEvent 3910 is consumed, it is not forwarded to other listeners. Another communications technique is to use property change events on the data model. Management of data and use of this approach is discussed explicitly in a later section.

The actual implementation of ViewController interface 3902 is performed in the ViewControllerImpl class 3912. A ViewControllerImpl creates a panel 3914 that allows interaction with the user. All AWTEvents 3916 are sent to a user-defined subclass 3918, which extends the ViewControllerImpl 3912. Java provides two built-in mechanisms for managing panels: the Panel class 3920 that is part of the Java AWT and the Jpanel class 3922 that is part of the com.sun-.java.swing package. ViewControllerBaseImpl 3924 is a superclass of ViewControllerImpl 3912, which abstracts these different panel mechanisms.

ViewController subsystem 3900 is also responsible for validating data formats. ValidationRules 3926 themselves are not part of the ViewController 3902, but the ViewController 3902 performs this validation between the input and output using the standard AWT methods such as getText and setText. The edit method inputs a transmittable string and outputs it in visible form (e.g., 1234 to $12.34) while the normalize method inputs. a string in visible form and converts it to transmittable form (e.g., $12.34 to 1234). A failure in format conversion results in a ValidationRuleException 3928.

For instance, data starts out in a text field (component) in a ViewController (component) that derives from JPanel (container). The value of the text field is retrieved and passed as a String to the validation rule. The result will be a validated and formatted string or an exception. In the former case, the textfield is redisplayed with the new contents AND/OR the data model is updated. In the latter case, some error message is displayed.

With chaining, the results of each validation rule call are passed to the next validation rule. Processing will stop when the first exception is encountered (first exception first return (FEFR) ) or all validation rules have been processed.

Figure 40:
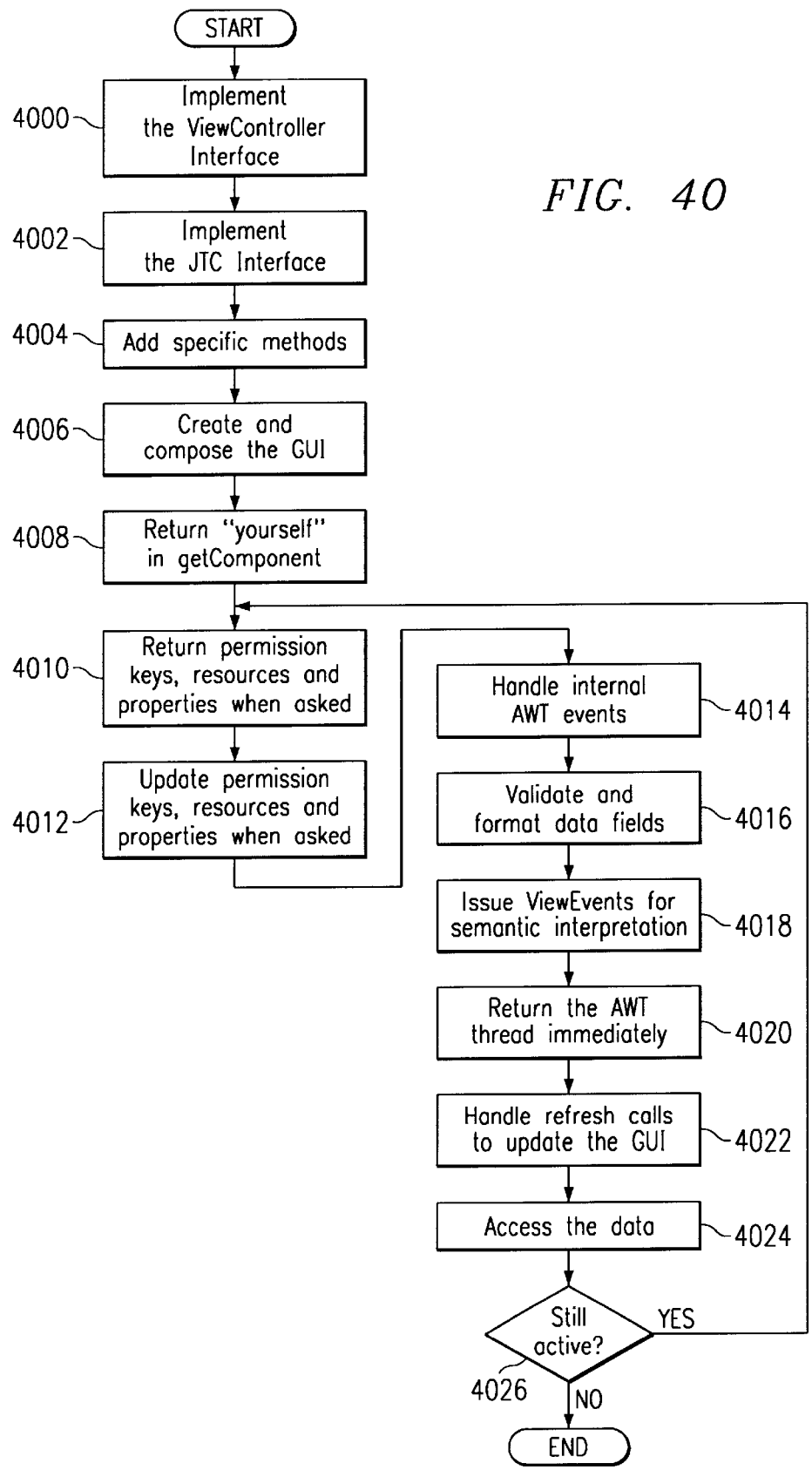
FIG. 40 are steps in the operation of a ViewController subsystem, as viewed from a ViewControllerImpl, depicted in accordance with a preferred embodiment of the present invention.

Turning next to FIG. 40, steps in the operation of a ViewController subsystem, as viewed from a ViewControllerImpl, are depicted in accordance with a preferred embodiment of the present invention. The process begins by implementing the ViewController interface (step 4000). Thereafter, the JTC interface is implemented (step 4002). Thereafter, specific methods are added for the ViewController (step 4004). Thereafter, the GUI is created and composed (step 4006). Thereafter, a reference to "yourself" is returned in getcomponent (step 4008). ViewControllerBaseImpl or any subclass of ViewControllerImpl can return the particular component to be placed (by the PlacementListener) in the getcomponent( ) method) Thereafter, permission keys, resources, and properties are returned when requested (step 4010).

The permission keys, resources, and properties are updated when requested (step 4012). Internal AWTEvents are handled (step 4014). Data fields are validated and formatted (step 4016). ViewEvents are issued for semantic interpretation (step 4018). The AWT thread is returned (step 4020). Refresh calls are handled to update the GUI(step 4022). Data is accessed (step 4024). A determination is made as to whether the ViewController is still active (step 4026). If the ViewController is still active, the process returns to step 4010. Otherwise, the process terminates for the ViewControllerImpl.

Additionally, a ViewController may be used to generate alternate views. For example, the application containing the view controller may be located on the server in which a placement listener is used to call a method in the ViewController to generate a presentation of a component in an alternate format, for example to be displayed in an HTML browser or an XML browser. In this example, the ViewController is on the server while the alternate view is displayed on the client. The PlacementListener has one method: placementEventPerformed that takes a PlacementEvent as a parameter. The PlacementEvent contains a major, minor, source ApplicationMediator and Component (from getcomponent( ) of the ViewController). To use the alternate view, and without extending the PlacementEvent definition, it should be noted that to call for the alternate view, the ViewController needs to be accessed. Therefore, the ViewController can be accessed via the Object data; variable in the PlacementEvent.

Alternate views, may include, for example, text for text based terminals or event data for a debug monitoring display also, any user input from HTML or other view comes back to ApplicationMediators and ViewControllers as refresh data. The ApplicationMediator may either display the next ViewController or have current ViewController redisplay the entered user input.

Figure 41:
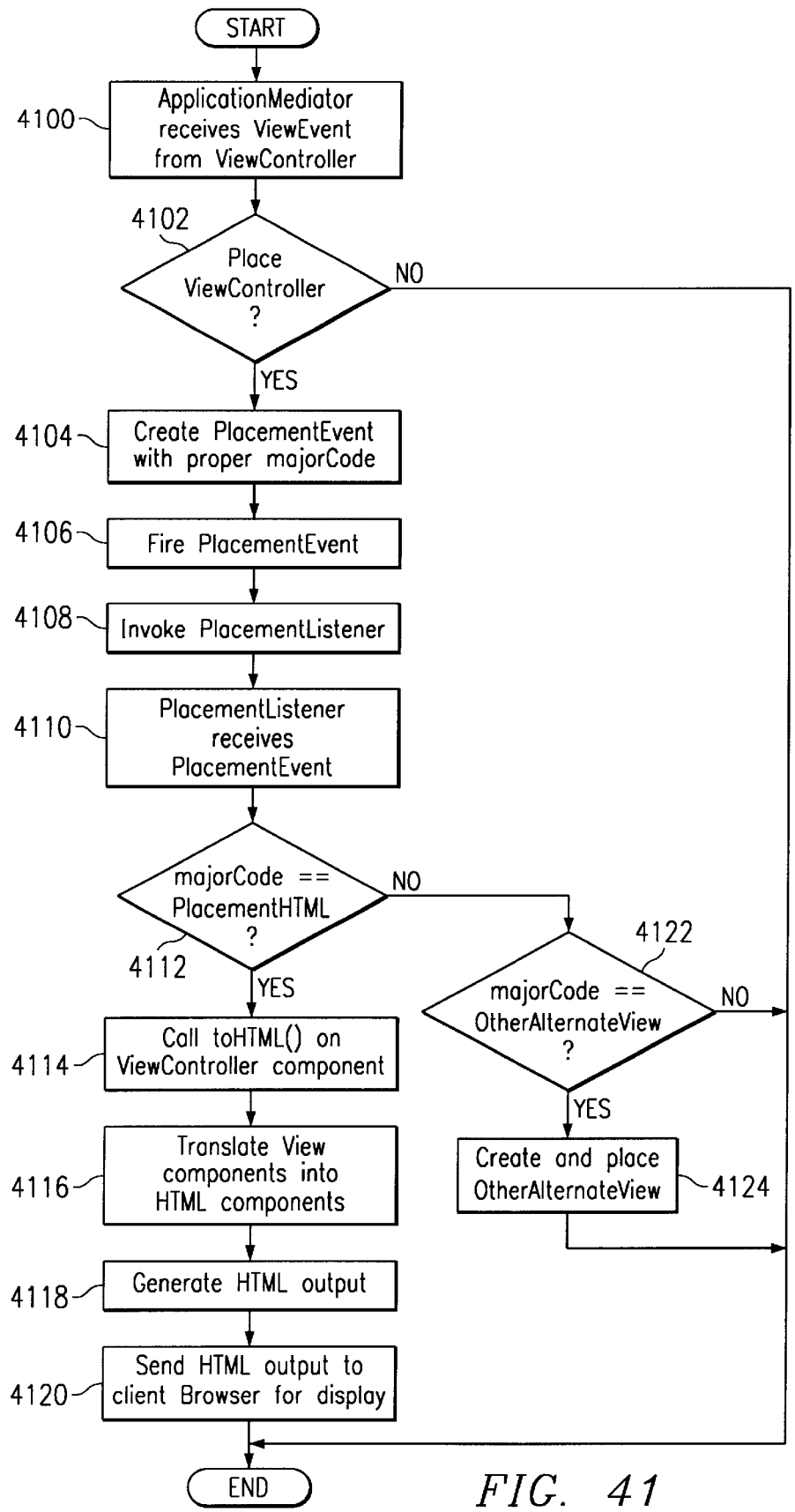
FIG. 41 is a flowchart of a process for a JTC application to present alternate views (HTML/XML) of itself while running in a separate environment, such as a server, as the alternate views depicted in accordance with a preferred embodiment of the present invention.

With reference now to FIG. 41, a flowchart of an alternate view process is depicted in accordance with a preferred embodiment of the present invention. The processes of the present invention may be applied to other types of applications other than clients. For example, the process of the present invention may be applied to create applications for use on a server. In FIG. 41, the process of the present invention is used to generate an alternate view in which the containers are output in the form of HTML for transfer to a client over a communications link.

In FIG. 41, the application mediator receives a ViewEvent from a ViewController (step 4100). A determination is made as to whether the ViewController should be placed in the client (step 4102). If the ViewController should not be placed, then the process terminates. If the ViewController should be placed, then a PlacementEvent is created with the proper major code (step 4104). This PlacementEvent is then fired (step 4106). A PlacementListener is invoked (step 4108). The PlacementListener receives the PlacementEvent (step 4110). A determination is made as to whether the major code is for a placement HTML (step 4112). If the major code is for an HTML placement then a call is made by the PlacementListener to toHTML method in the ViewController. (step 4114). In response, the view components are translated into HTML components (step 4116). An HTML output is generated (step 4118). This HTML output is then sent to the client browser for display (step 4120) with the process then terminating.

With reference again to step 4112, if the major code does not indicate the use of HTML as an alternate view, then a determination is made as to whether the major code identifies another alternate view (step 4122). If another alternate view is not indicated by the major code, then the process terminates. Otherwise, an alternate view is created and placed (step 4124) with the process then terminating. The other alternate view may take various forms, such as, for example, XML. Step 4122 may be iterated for a number of different alternate views that may be provided through the ViewController component. In this manner, the architectural pattern of the present invention may be applied for use on a server. This mechanism is used by a PlacementListener to call a method in a ViewController to create an HTML version of an existing screen. The mechanism for creating the HTML view is application dependent/screen dependent in the depicted examples.

An example of how to configure JTC with alternate views on a server is given. The deployment of JTC on the server is under the control of a servlet. Since, as described in this example, HTML is in the client, when a client browser invokes a URL submit, the web server obtains the request and passed control to a servlet. The servlet obtains a key/value pair list of values entered in the HTML client. This list is passed to the ViewController alternate view being displayed. The ViewController iterates over the list and applies its ValidationRules. If a ValidationRuleException is generated, the servlet indicates an error message to the HTML client. If a successful result is obtained, the ViewController will generate a ViewEvent, as mentioned above, causing the alternate view cycle through the ApplicationMediator and PlacementListener to repeat. The primary benefit being that one source code system can be maintained and versioned to produce multiple client channel views.

Turning now to FIGS. 42 and 43, diagrams detailing processes within the ViewController subsystem are depicted in accordance with a preferred embodiment of the present invention. The code illustrated is Java code in the depicted examples.

The creation of a ViewEvent based on an ActionEvent from the Java AWT is shown in FIG. 42. The actionPerformed method detects the type of action and constructs a corresponding ViewEvent. The source of the ActionEvent was a click of the nextButton. This is detected and the ViewEvent ve is created with the self-referential "this" pointer being passed in. The major field is set to NEXT, a predefined type, and the event is fired. ActionPerformed has done its job and returns.

FIG. 43 shows how a ViewEvent is processed by a Before any events can be processed, an object has to add itself as a listener for the appropriate ViewEvents. In this case, the listener is added to the customerDetailsViewController. The method processViewEvent may carry out some initial action for all events and then a switch statement is used to separate out all of the major code fields of interest. The comments inside the switch indicate where different actions can be performed for different events. A complete list of predefined major event codes is given in FIG. 44.

Validation rules either use edit to convert from a transmittable string to the viewable format or use normalize to convert from a viewable format to a transmittable string. FIG. 44 shows how a text field representing a social security number can be put into visual form (e.g., 123-45-6789) by calling SocialSecurity.edit. Since a ValidationRuleException will be thrown if the conversion is unsuccessful, this call is embedded in a try statement with a catch for exception handling. In a comparable manner, FIG. 46 shows how the visual format for a social security number can be converted back to a transmittable format.

It is possible to build a chain of validation rules. FIG. 47 illustrates the application of two edit rules, range checking (that is, the value is within specific limits) and formatting for viewing. The separate rules are assigned to string values named range and money. This string values are then put into an array of strings. The transmittable form of the data is stored in value. The method applyEdits applies both validation rules to this data; if any exception occurs, it is handled by the catch portion of the try statement. The setText method from the Java AWT is used to redisplay the formatted data.

Two techniques exist for creating the ViewControllerBaseImpl class: by inheritance and by delegation. FIG. 48 illustrates inheritance where the ViewControllerBaseImpl is a subclass of JPanel from the Java com.sun.java.swing package. Notice that the operation getcomponent simply returns a pointer to itself. When delegation is used, as shown in FIG. 49, ViewControllerBaseImpl implements the ViewController interface. The constructor for a user defined XYZ class creates a new instance, called xyz. Operations from the ViewControllerBaseImpl class are translated into corresponding operations from the XYZ class. Three operations are illustrated: getcomponent, setEnabled, and setvisible.

B. ApplicationMediator Subsystem Runtime Behavior

Figure 50:
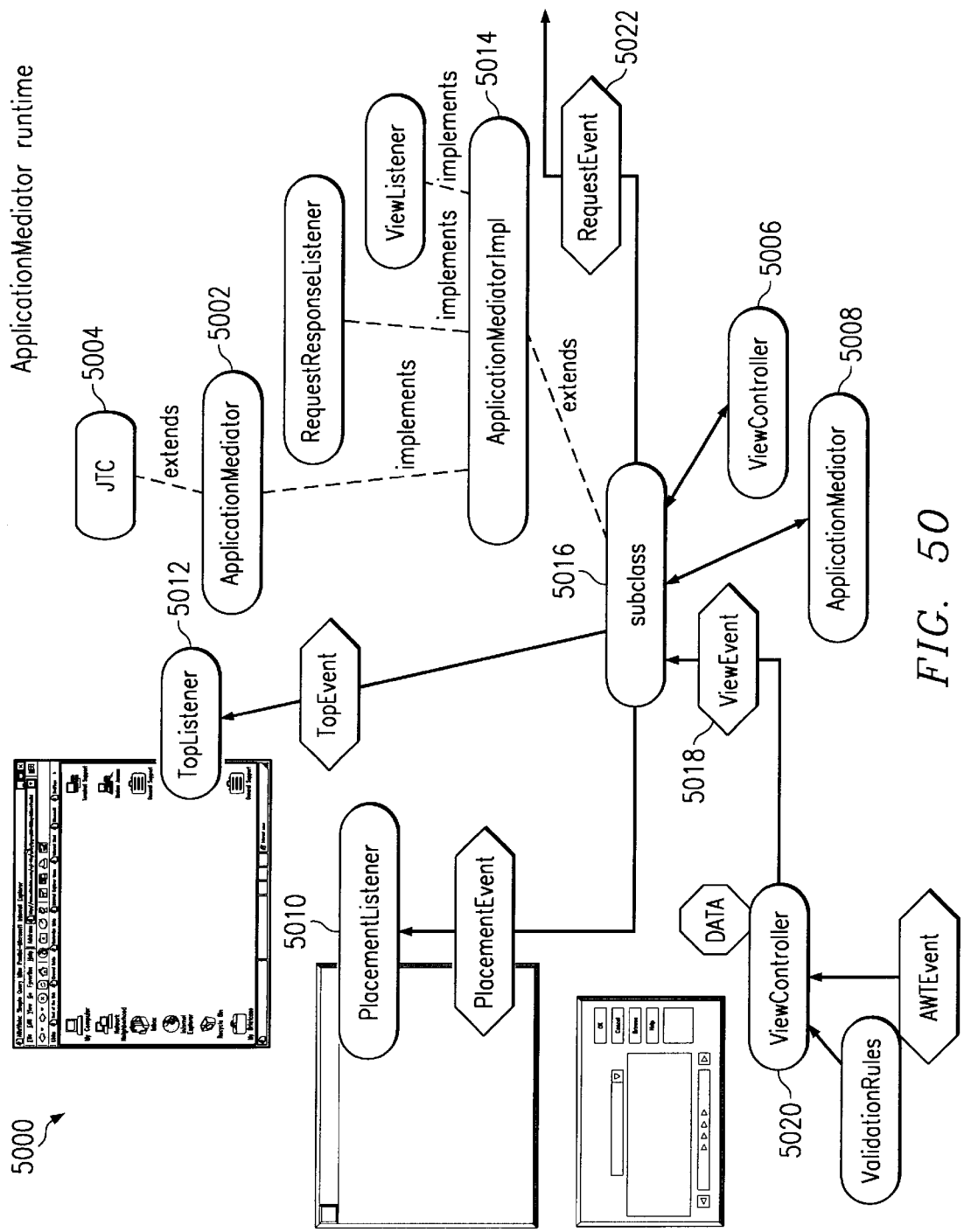
FIG. 50 is a diagram illustrating runtime behavior of an ApplicationMediator subsystem depicted in accordance with a preferred embodiment of the present invention.

Turning now to FIG. 50, a diagram illustrating runtime behavior of an ApplicationMediator subsystem is depicted in accordance with a preferred embodiment of the present invention. The runtime behavior c)f the ApplicationMediator subsystem 5000 is shown in FIG. 50. ApplicationMediator 5002 manages all the major components of the thin client architecture JTC 5004. This includes managing instances of ViewControllers 5006 and ApplicationMediators 5008, and adding, firing, or removing instances of PlacementListeners 5010 and TopListeners 5012. The implementation of the interface of ApplicationMediator 5002 is carried out by the class ApplicationMediatorImpl 5014. An application dependent subclass 5016 of ApplicationMediatorImpl 5014 actually processes the various events in the subsystem 5000. ApplicationMediator subsystem 5000 can process ViewEvents 5018 generated by ViewController 5020 and it can generate its own ViewEvents if necessary. Requests for actions to be performed by the server result in RequestEvents 5022.

A subclass is needed to implement a state machine for correctly ordering operations. Sample operations include which ViewControllers 5006 to allocate or which to make visible, when to fire or re-fire a ViewEvent, when to fire a RequestEvent 5022, and when to fire a TopEvent 5012.

The typical sequence of actions when a. ViewEvent is received is to request a PlacementListener 5010 to place another ViewController 5006 on the screen, to request TopListener 5012 to do something with the operating system desktop, and to fire RequestEvents 5022 for fulfillment by a server. Refresh calls are propagated to the ViewControllers 5006 and ApplicationMediators 5008. All JTC objects allocated are returned via the getJTCs method.

Figure 51:
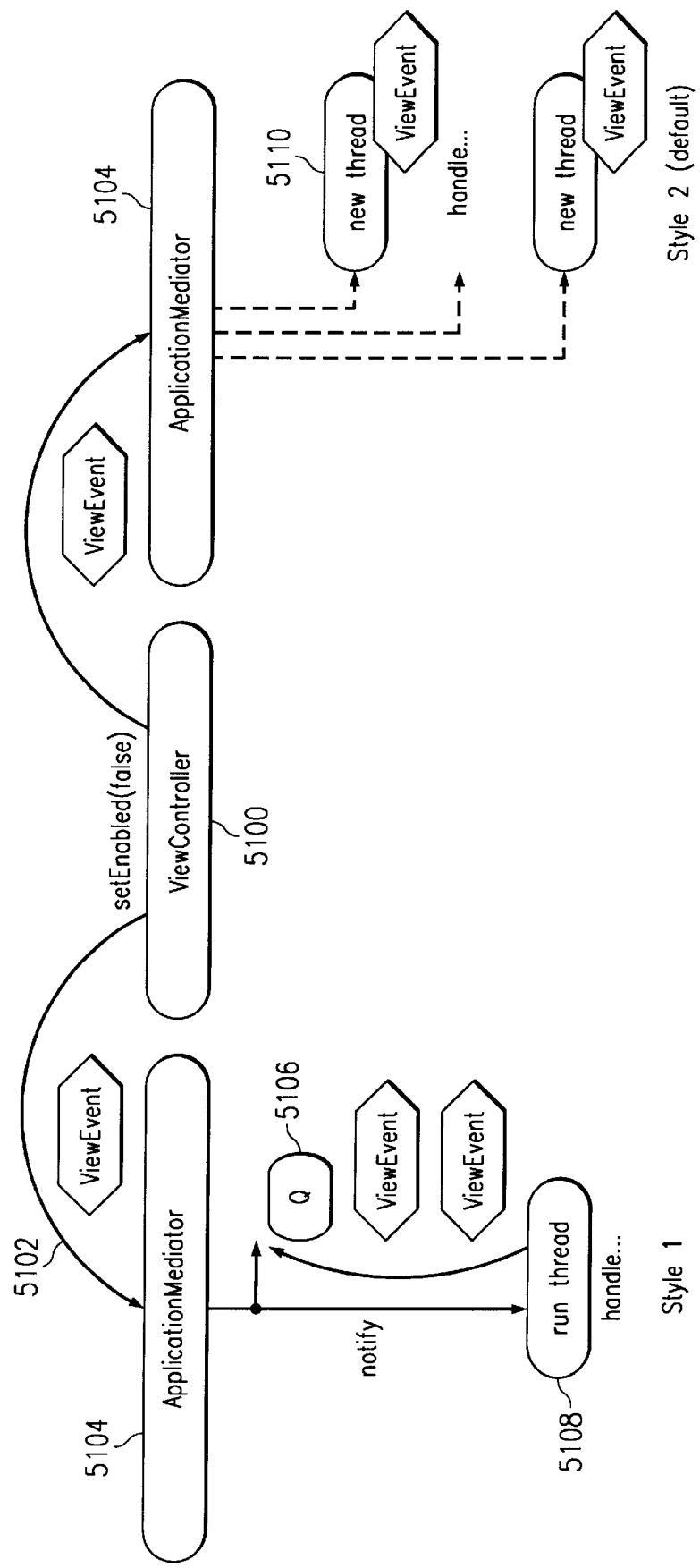
FIG. 51 is a diagram illustrating Event threading support depicted in accordance with a preferred embodiment of the present invention.

Turning next to FIG. 51, a diagram illustrating Event threading support is depicted in accordance with a preferred embodiment of the present invention. FIG. 51 illustrates the two styles of AWT Event threading support. This occurs when a ViewController 5100 generates a ViewEvent 5102 that is to be processed by the ApplicationMediator 5104. Style 1 uses a queuing mechanism while style 2, the default, uses thread dispatching.

The following steps occur when using the queuing approach: create a sleeping thread during initialization, when a ViewEvent arrives place it in a queue 5106 of ViewEvents, notify the sleeping thread and return to the calling ViewEvent thread (typically an AWT Event thread). The run( ) method 5108 wakes up to process the ViewEvent by taking it off the queue. The processViewEvent method is then called. Subclasses override this method to handle the ViewEvent directly.

The second mechanism is to use thread dispatching directly. When a ViewEvent arrives, create and start a thread 5110 passing it the ViewEvent and return to the calling ViewEvent thread. Add the new thread to a list to provide a handle to access it. This new thread invokes the processViewEvent method which subclasses can override to handle the ViewEvent directly.

Figure 52:
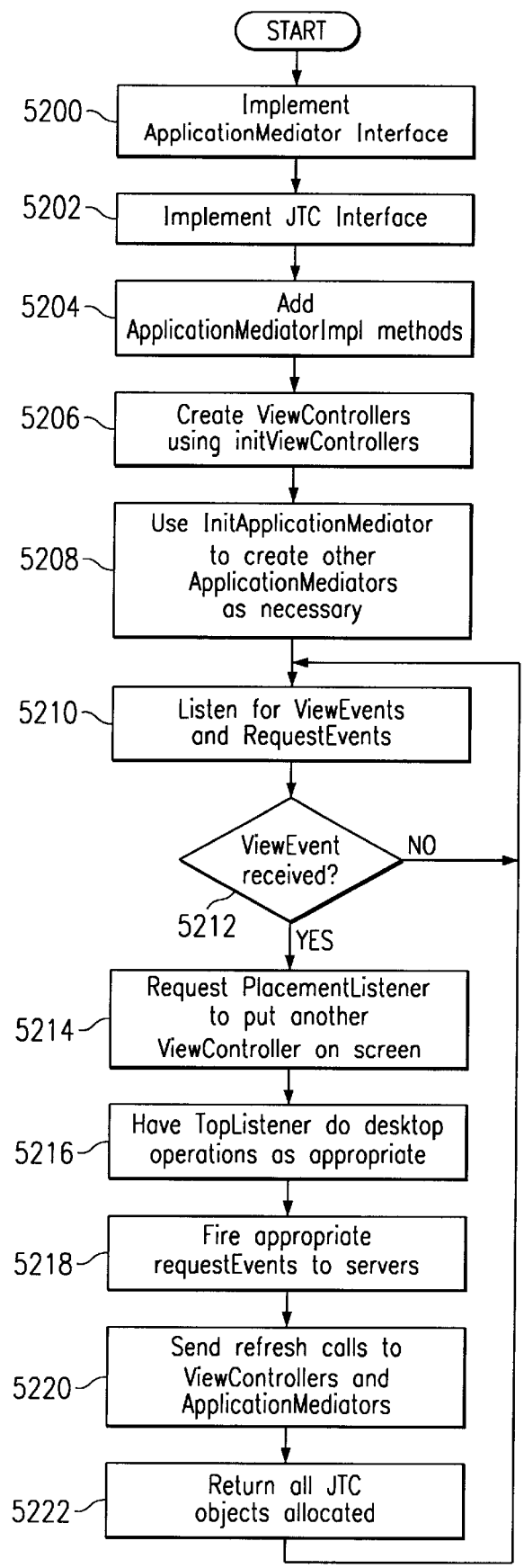
FIG. 52 is a flowchart of a process used in designing and executing an ApplicationMediator depicted in accordance with a preferred embodiment of the present invention.

With reference now to FIG. 52, a flowchart of a process used in designing and executing an ApplicationMediator is depicted in accordance with a preferred embodiment of the present invention. The process begins by implementing an ApplicationMediator interface (step 5200). Thereafter, the JTC interface is implemented (step 5202). ApplicationMediatorImpl methods are added (step 5204). ViewControllers are created using the initViewController method (step 5206).

Thereafter, initApplicationMediator are used to create other ApplicationMediators as necessary (step 5208). Thereafter, the process listens for ViewEvents and RequestEvents (step 5210). A determination is made as to whether a ViewEvent has been received (step 5212). If a ViewEvent has not been received, the process returns to step 5210. Otherwise, a request is made to a PlacementListener to put another ViewController on the screen (step 5214). This step basically results in the display of another ViewController's getComponent( ) on the screen.

Next, the TopListener performs desktop operations as appropriate (step 5216). The ApplicationMediator also fires the appropriate RequestEvent to server (step 5218). Refresh calls are sent to ViewControllers and ApplicationMediators (step 5220). All JTC objects allocated are returned (step 5222) with the process then returning to step 5210.

C. Placement Subsystem Runtime Behavior

With reference now to FIG. 53, a diagram illustrating runtime behavior of the Placement subsystem is depicted in accordance with a preferred embodiment of the present invention. The runtime behavior of the Placement subsystem is 5300 shown in FIG. 53. The JTC architecture separates out the actions of ViewEvent 5302 creation (done by ViewController, 5304), view ordering (done by ApplicationMediator, 5306), and view placement (done by PlacementListener, 5308). A PlacementEvent 5310 is used to notify a PlacementListener that a ViewController needs to be adjusted on the screen.

The state of a PlacementEvent includes a major code, which is the primary identifier of the PlacementEvent. A minor code serves as the secondary identifier of the PlacementEvent. The PlacementEvent state also includes a source identifying the source object that creates the Event. A java.awt.Component also is present in the state that identifies the component to be placed. The state also contains consume, which identifies whether an PlacementEvent has been consumed. A consumed PlacementEvent will cause the JTC to stop processing the PlacementEvent immediately. Additionally, the PlacementEvent state also may contain other data, which may be, for example, a reference to generic object data that specifies placement information specific to the application.

Each PlacementEvent 5310 contains a placement type (ADD, ADDALL, REMOVE, REMOVEALL, MODIFY, SHOW, DONE, FREEZE, and REPAINT are predefined), a minor code for additional information, the sender of the event, the component, and provisions for additional generic data. Typically an ApplicationMediator 5306 will assign the appropriate major code, find the component using the getcomponent method, create PlacementEvent 5310 making itself the sender, and fire the placement event. The PlacementListener 5308 uses placementEventPerformed to process PlacementEvent 5310 based on the placement type and the source of the event.

Details of the steps discussed above are now examined through various examples of Java code. The creation of a PlacementEvent from an ApplicationMediator is shown in FIG. 54. There are three parameters to a PlacementEvent constructor: the object (referenced by "this") creating the event, the component involved, and the major code. In this example, the major code is set to ADD and the component comes from customerDetailsViewController. After the PlacementEvent is created, it is fired by the ApplicationMediator.

The PlacementEvent is processed by a PlacementListener, as shown in FIG. 55. The method placementEventPerformed decides on the appropriate action based on the major code and the source. In this example, the major code is ADD, which is one of the cases in a switch statement. If the source is PreferencesAM, then the PlacementEvent component is centered in panel1, otherwise it is added to panel2.

Figure 56:
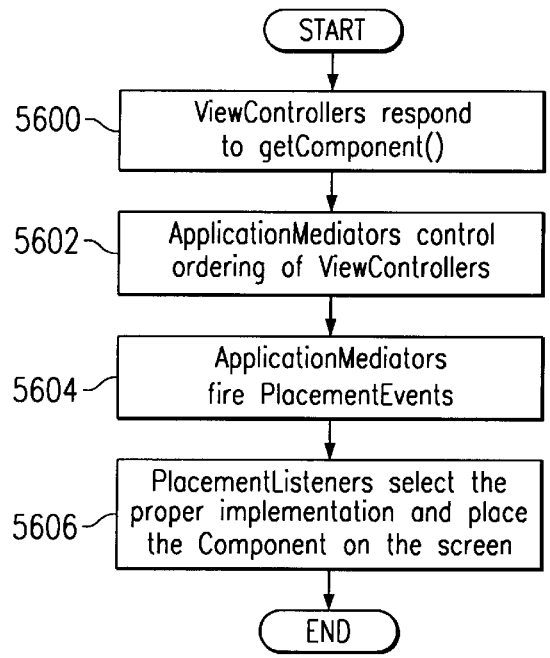
FIG. 56 is a flowchart of a process used in processing a PlacementEvent depicted in accordance with a preferred embodiment of the present invention.

Turning now to FIG. 56, a flowchart of a process used in processing a PlacementEvent is depicted in accordance with a preferred embodiment of the present invention. The process begins by one or more ViewControllers responding to getcomponent (step 5600) After, ApplicationMediators control the ordering of the ViewController (step 5602). The ApplicationMediators fire PlacementEvents (step 5604). The PlacementListeners select the proper implementation and place the Component on the screen (step 5606) with the process.terminating thereafter.

D. TopListener Runtime Behavior

Figure 57:
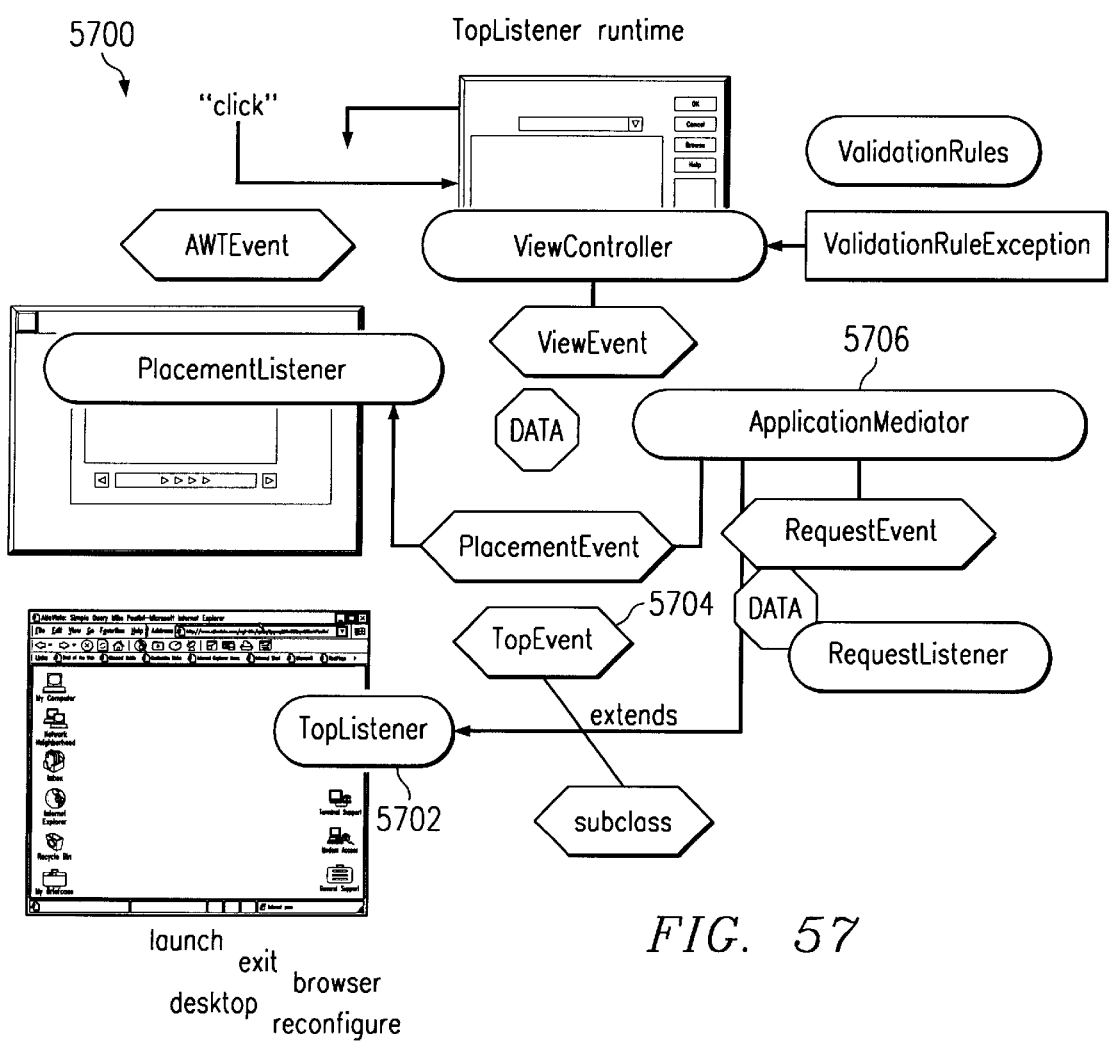
FIG. 57 is a diagram illustrating runtime behavior for a TopListener subsystem depicted in accordance with a preferred embodiment of the present invention.

With reference now to FIG. 57, a diagram illustrating runtime behavior for a TopListener subsystem is depicted in accordance with a preferred embodiment of the present invention. The runtime behavior of the TopListener subsystem 5700 is shown in FIG. 57. TopListener 5702 performs generic operations on the business desktop, as specified by a TopEvent 5704. The TopEvent and TopListener have several functions. One function is interaction with the host environment (i.e. for a Java application—the operating system), with the host environment services (i.e. other applications on the operating system), with the application enabler (i.e. the Netscape browser and its status line or maybe aspects of the Java Virtual Machine), and with host environment policies (i.e. how is shutdown handled, how are error messages handled). The hosting client desktop environment is an embodiment of one or more of these items.

The TopListener is also used by the JTC application to send events to itself. For example, based on some heuristic, the TopListener may decide to change the Destination from one using sockets to one using URLs. Or, a second destination may be added to perform logging. The permissions also may be altered. The TopListener may use a heuristic to decide to invoke hookJTCs and hookAWTs on the application and start tracing. Thus, in addition to accessing hosting services, the TopListener also allows self alterable JTC actions to occur on the JTC application.

TopEvent 5704 contains a major code, a minor code, the source that created the event, a consumed event that causes the JTC to stop processing it as soon as possible, and a generic data object. There are predefined constants for EXIT, BROWSER, TITLE, STATUS, OS, TRACE, DEBUG, LOG, HOOKAWT, and HOOKJTC. ApplicationMediator 5706 uses addTopListener to pass itself to the TopListener for later callback in the topEventPerformed method.

Details of the steps discussed above are now examined through various examples of Java code. With reference now to FIGS. 58–60, Java code used in a TopListener is depicted in accordance with a preferred embodiment of the present invention. The creation of an ApplicationMediator and the adding of a PlacementListener is shown in FIG. 58. The creation and firing of a TopEvent in an ApplicationMediator is shown in FIG. 59. Java code illustrating the callback to a TopListener with a TopEvent and inspecting the TopEvent for semantic interpretation is shown in FIG. 60. This method uses the major code to separate out the various cases and to perform the appropriate actions.

E. RequestEvent Subsystem Runtime Behavior

The RequestEvent subsystem provides a mechanism for sending messages between various components in the architectural pattern of the present invention. This subsystem provides a mechanism to access data and to send data between components, such as an ApplicationMediator, a Transporter, and a Destination. With reference now to FIG. 61, a diagram illustrating runtime behavior of a RequestEvent subsystem is depicted in accordance with a preferred embodiment of the present invention. The runtime behavior of the RequestEvent subsystem 6100 is shown in FIG. 61. An ApplicationMediator 6102 receives a ViewEvent 6104 from a ViewController 6106 and determines it has to issue a RequestEvent 6108 to an appropriate service provider. RequestEvent 6108 can either be synchronous or asynchronous in the depicted examples. RequestEvent 6108 has fields for a major code (a request family), a minor code (a specific request), a user-defined version, a status string showing the current stage of processing, a possible consume event that will cause the JTC application to stop processing it as soon as possible, and a data field for a generic data object.

ApplicationMediator 6102 calls fireRequestEvent. A Transporter, which is one example of a RequestListener 6110, is responsible for forwarding all RequestEvents to one or more destinations based on the major code. ApplicationMediator 6102 will be called back in one of two ways: requestResponse to indicate success and passed a RequestEvent that may have new data or requestException to indicate failure and passed a RequestException with the reason for failure.

With reference now to FIG. 62, Java code illustrating the creation of RequestEvent, setting its major and minor codes, and firing an asynchronous RequestEvent from an ApplicationMediator is depicted in accordance with a preferred embodiment of the present invention. Details of the steps discussed above are now examined through various examples of Java code.

The creation, firing, and callback of a RequestEvent in an ApplicationMediator is shown in FIG. 62. After the RequestEvent r is created, the major and minor codes are set to "Loans" and "SubmitCustomerInfo" in this example. The event r is fired asynchronously by the ApplicationMediator. This is done inside of a try statement so that any RequestException can be caught and processed appropriately in FIG. 63. Later there will be a callback to the ApplicationMediator by requestResponse to indicate successful processing of the RequestEvent or by requestException to indicate failure processing the RequestEvent in FIG. 64.

With reference now to FIG. 65, a flowchart of a process for using a RequestEvent is depicted in accordance with a preferred embodiment of the present invention. The process begins by an ApplicationMediator receiving a ViewEvent from a ViewController (step 6500). Thereafter, the ApplicationMediator creates a RequestEvent specifying the major code, and a version (step 6502). Thereafter, a fireRequestEvent is issued to cause the RequestEvent to be sent to a service provider (step 6504). Based on the major code, the Transporter forwards the RequestEvent to one or more Destinations (step 6506) with the process terminating thereafter.

F. Transporter Subsystem Runtime Behavior

Figure 66:
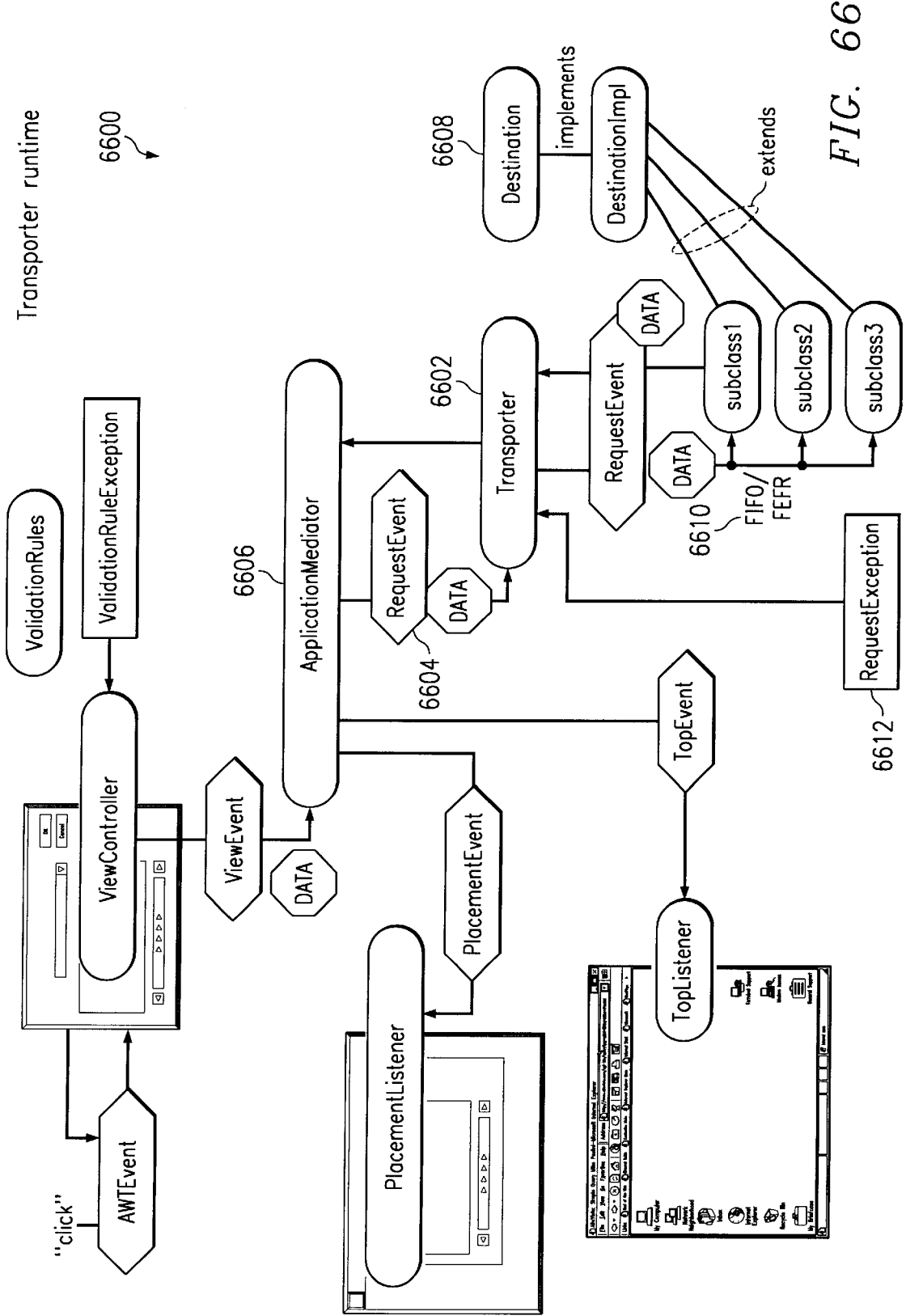
FIG. 66 is a diagram illustrating runtime behavior of a Transporter subsystem depicted in accordance with a preferred embodiment of the present invention.

The Transporter subsystem is used to map and send various RequestEvents to different Destinations . With reference now to FIG. 66, a diagram illustrating runtime behavior of a Transporter subsystem is depicted in accordance with a preferred embodiment of the present invention. The runtime behavior of the Transporter subsystem 6600 is shown in FIG. 66. The main task of the Transporter class 6602 is to map RequestEvents 6604 received from an ApplicationMediator 6606 to the appropriate Destinations. A Destination 6608 is added to the Transporter 6602 by using addDestinationListener. Each listener is associated with a destination major code. In the depicted examples, multiple destinations can listen for the same major code. Events are processed in a First-In First-Out, First Exception First Return (FIFO/FEFR ) 6610 fashion in these examples. It is possible to have one Destination pass a message to another Destination. RequestExceptions 6612 are used to handle failures.

Turning now to FIG. 67, Java code illustrating creation of a Transporter and adding it as a RequestListener is depicted in accordance with a preferred embodiment of the present invention. The Transporter t and ApplicationMediator am are both created. The method addRequestListener is called to add t as the transporter for am.

G. Destination Subsystem Runtime Behavior

A Destination subsystem provides a number of different functions, such as, for example, locating a server, creating low level protocols, such as sockets, URLs, RMI, and files for network transport. Additionally, the Destination subsystem provides a mechanism to communicate with different servers, such as EJB, servlets, web servers, application servers, and other legacy systems. Additionally, message formats are provided to turn RequestEvents and data into formats for the target or server. Additionally, the Destination subsystem will finish the job in an appropriate amount of time or cancel the operation in response to a timeout. Additionally, the Destination subsystem also determines how many times a connection should be retried. Additionally, the Destination subsystem caches data until it becomes stale. Additionally, the Destination creates all data model objects used in the JTC client application. Preprocessed and post-processed RequestEvents are also logged along with locating and creating objects for processing requests.

Figure 68:
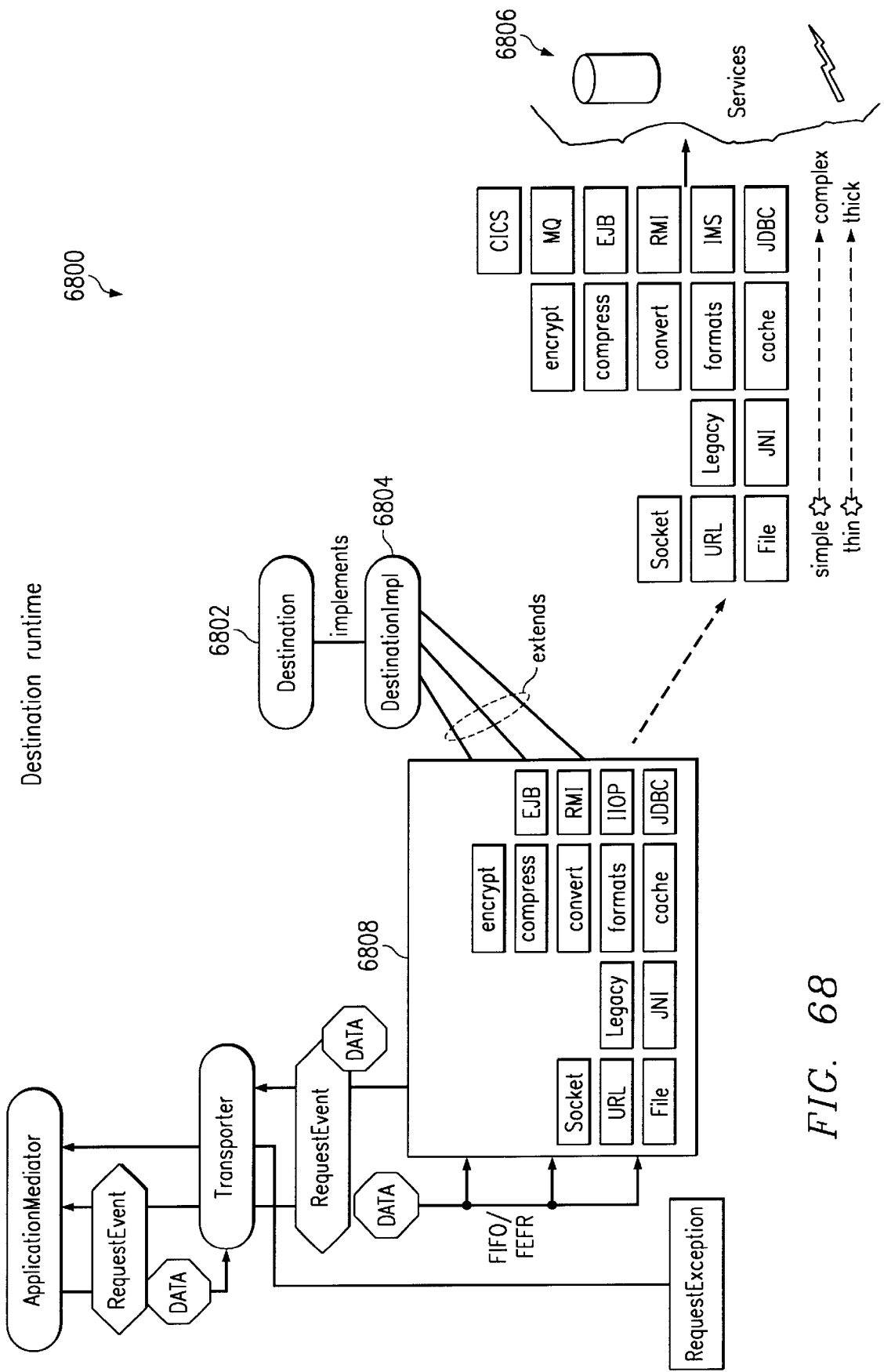
FIG. 68 is runtime behavior of a Destination subsystem shown in accordance with a preferred embodiment of the present invention.

With reference now to FIG. 68, runtime behavior of a Destination subsystem is shown in accordance with a preferred embodiment of the present invention. In Destination subsystem 6800, Destination class 6802 and its implementation, DestinationImpl 6804, handles all the details to locate server 6806, use various transport types and server types 6808, and, in general, keeps track of where objects are. Destination codes are either named, given a wildcard value (*, means interested in all requests) or given a priority value (!, means interested in all requests and has priority). Some special cases of priority are FIRST, SECOND, . . . , NINTH. DON'T_CARE is a special case of wildcard that indicates even if a RequestException is present, do not stop processing and send the request to the Destination.

Details of the steps discussed above are now examined through a Java code example. In FIG. 69, a diagram of Java code for creation of a Destination and adding it as a destination listener is depicted. Turning now to FIG. 69, Java code illustrating creation of a Transporter and adding it as a RequestListener is depicted in accordance with a preferred embodiment of the present invention. The Destination d and the Transporter t are both created. The method addDestinationListener is called to add d as a destination listener for transporter t using the major code "Loans."

Turning next to FIG. 70, a diagram illustrating Java code for creating Destinations with wild card, priority and normal major codes, firing a RequestEvent, and a report of the expected results is depicted in accordance with a preferred embodiment of the present invention. Transporter t and WildDestination d are created and d is added as a WILD-CARD destination listener. Destination d is now assigned to be a EJBDestination and added to t with the major code of "Loans." Destination d is then assigned to be a PriorityDestination and added to t with the major code of PRIORITY. Finally d is assigned to be a LoggerDestination and added to t with the major code of DON'T_CARE. At a later time, the RequestEvent r is created with the major field of "Loans" and is fired. Event r will be sent to PriorityDestination $1^{st}$, EJBDestination $2^{nd}$, WildDestination $3^{rd}$, and LoggerDestination last. Event r reaches the first three destinations only if no RequestExceptions are thrown; it reaches LoggerDestination regardless of any RequestExceptions.

VII. Component Details and Applications

A. Use of getJTCs

The architectural pattern of the present invention as all major objects in a JTC application implement the JTC interface. This includes the driver programs that launches the Application or applet. This interface allows referencing of all objects with a consistent Java type. The behavior includes, clear, exit, getJTCs, init, isEnabled, setEnabled, and toString. Interfaces extending JTC are ViewController, ApplicationMediator, and Destination. ViewControllerImpl, ApplicationMediatorImpl, Transporter, and DestinationImpl are classes implementing JTC. Consider a program called "program" that implements all of "significant" the Java and user defined interfaces. A significant interface is an interface in which the "program" is interested in receiving callbacks. The getJTCs method causes each JTC object to return a list of other JTC objects that the JTC object creates. This method may be used by the "program" to iterate over this list and inspect each object's types and add the "program" as a listener to all of the object's significant event listener types.

As a result, the system may be reconfigured through this mechanism. For example, the Transporter may be disabled or a priority Destination may be added using this method. Further, this method provides a mechanism for non-intrusive logging, tracing, debugging, and monitoring. This is particularly significant when a ViewController is encountered. In addition to adding the "program" as a ViewListener, the getcomponent method is called to retrieve a java.awt.Component. The java.awt.Component object is at the top of the Java graphics Component hierarchy. The "program" recursively looks at this hiearchy, traverses it, and add the "program", as listeners for all significant Java AWTEvent and JFC events. Using reflection, any Java object that is returned can be inspected and "hooked" for significant interface events. The "program" can do various tasks with these events such as trace, remotely display the events, reroute the client application to a new server, and record user statistics; all non-intrusive to the application in terms of writing additional code to support this capability.

With reference now to FIG. 71, a diagram of Java code used for accessing, identifying type and recursively attaching JTC, AWT and JFC listeners to processing accessible JTC, AWT and JFC programs and objects JTCs is depicted in accordance with a preferred embodiment of the present invention. In particular, all JTCs are found and put into a Java Vector. Additional actions are performed depending on the type of JTC, such as adding RequestListeners for ApplicationMediators or adding ViewListeners for ViewControllers. This function continues processing all JTC objects in a recursive manner.

The function is named hookJTCs and it starts out at the root JTC. The Vector jtcs is initialized to null. The method getJTCs is used to find all JTCs of the root. If an exception occurs or no JTCs are found, the function is exited.

Assuming the vector is not empty, each JTC object in the vector is processed in turn. This code illustrates the "program" adding itself as a RequestListener and ViewListener to ApplicationMediators. This code issustrates the "program" adding itself as a ViewListener to ViewControllers Although not shown in the code, other JTC objects, such as a Transporter, might be hooked by the "program". The function hookJTCs is called recursively at this point resulting in the JTC hierarchy being processed in a depth-first then breadth-first fashion.

With reference now to FIG. 72, an example of a test program is depicted in accordance with the preferred embodiments of the present invention. In FIG. 71, the main program Test1.java stores a static reference to itself so that a launcher can call getJTCs( ) and hook the application. FIG. 73 is a diagram of Java code used for attaching AWT and JFC listeners to AWT and JFC containers, components and beans depicted in accordance with a preferred embodiment of the present invention. FIG. 74 is a diagram of Java code used for attaching AWT and JFC listeners to AWT and JFC components (java.awt.Button, com.sun.swing.java.JButton and com. and com.sun.java.swing.JTextField) depicted in accordance with a preferred embodiment of the present invention.

Figure 75:
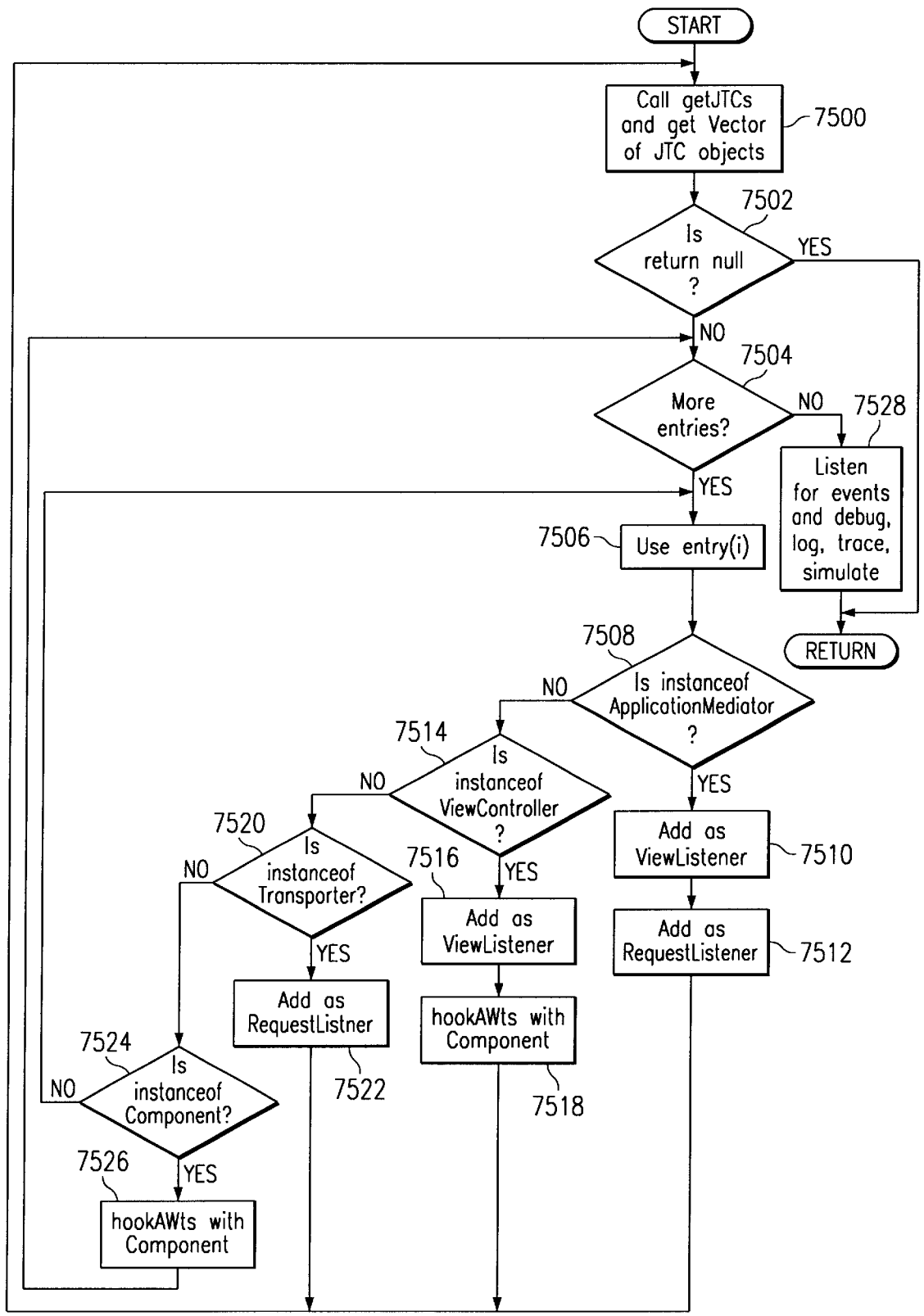
FIG. 75 is a flowchart of a process for for performing hookJTCs and hookAWTs, non intrusive tracing, hooking, debugging, monitoring and logging of JTC programs and JTC program objects depicted in accordance with a preferred embodiment of the present invention.

With reference now to FIG. 75, a flowchart of a process for accessing objects is depicted in accordance with a preferred embodiment of the present invention. The process begins by receiving a call to get JTCs and get the vector of JTC object (step 7500). A determination is then made as to whether a return is null (step 7502). If the return is null, the process then returns. This indicates that no objects are present. Otherwise, a determination is made as to whether more entries are present (step 7504). If more entries are present, then an unprocessed entry is used (step 7506). Thereafter, a determination is made as to whether the entry is an instance of an ApplicationMediator (step 7508). If the instance is that of an ApplicationMediator, the "program" is added as a ViewListener (step 7510).

The process then adds the "program" as a RequestListener (step 7512) with the process then making a recursive call and starting at step 7500.

With reference again to step 7508, if the entry is not an instance of an ApplicationMediator, a determination is made as to whether the instance is that of a ViewController (step 7514). If the object for the entry is an instance of a ViewController, the "program" is added as a ViewListener (step 7516). Thereafter, a hookAWTs with the component returned from the ViewController's getcomponent method is performed (step 7518). This step is described in more detail below with respect to FIG. 77. The process then makes a recursive call and starts at step 7500.

With reference again to step 7514, if the instance is not a ViewController, then a determination is made as to whether the object for the entry is an instance of a Transporter (step 7520). If the object is an instance of a Transporter, the "program" is added as a RequestListener (step 7522) with the process then making a recursive call and starting at step 7500.

With reference again to step 7520, if the object is not an instance of a Transporter, a determination is made as to whether the object is an instance of a component (step 7524). If the object is an instance of the component, the process performs hookAWTs with the component (step 7526) with the process then proceeding to step 7504. Step 7526 is used to hookAWTs to a component. With reference again to step 7524, if the object is not an instance of a component, the process then returns to step 7506 to select another entry for processing.

With reference again to step 7504, if more entries are not present, then a non-intrusive program, the "program", is run to listen for events and debug, log, trace, and/or simulate (step 7528). The debug, log, trace, and/or simulate functions may be performed using presently available techniques for debugging, logging, tracing, and/or simulating applications.

B. Recursive Processing of a Component Hierarchy

Figure 76:
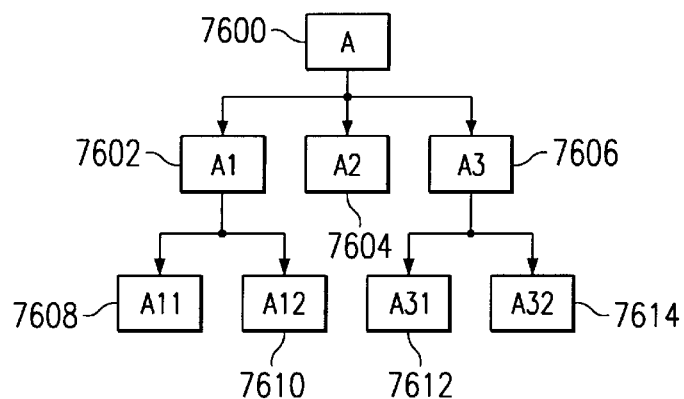
FIG. 76 is a diagram describing the relationship between components and containers depicted in accordance with a preferred embodiment of the present invention.

A component hierarchy is a recursive data structure in the sense that, if the component is a container, then it may contain other components, which in turn may contain other components, and so forth. Consider the hierarchy shown in FIG. 76. Component A 7600 is a container that is a list of three other components: A1 7602, A2 7604, and A3 7606. A1 7602 is a container with two components A11 7608 and A12 7610), and A3 7606 is a container with two components (A31 7612 and A32 7614). The components A11 7608, A12 7610, A2 7604, A31 7612, and A32 7614 are not containers. The goal of a "hook" algorithm is to find all the components in the hierarchy and "hook" each "child" component to the "program" component in the sense of adding appropriate listeners for events, while passing through the "parent" container.

Since the component hierarchy is a recursive data structure, a recursive algorithm most easily processes this hierarchy. It starts at the root component, A BT00, and determines if it is a container. It proceeds to process the first component in the container, A1 BT02, using the same algorithm. A1 7602 is also a container, so the algorithm is applied recursively to the component A11 7608. All is not a container, so a "hook" to this component (that is, appropriate listeners) is added. Control now returns to the algorithm processing A1 7602. There is another component in the list of A1 7602, namely A12 7610, and it is processed recursively. A12 7610 is not a container, so it adds listeners appropriate for its type. No more components exist in the list of components for A1 7602, so it has now added listeners for all its children. Control returns back to the algorithm processing parent A.

Component A proceeds to the next item in its container, namely A2 7604. A2 7604 is not a container, so it adds listeners appropriate for its type. A now has added all the appropriate listeners for its children, A1 7602 and A2 7604, and all of their descendants. A3 7606 is processed next and, in a manner analogous to A1 7602, it adds listeners for its two children, A31 7608 and A32 7614. Listeners have been added for all of the descendants of A 7600, so the algorithm terminates.

Figure 77:
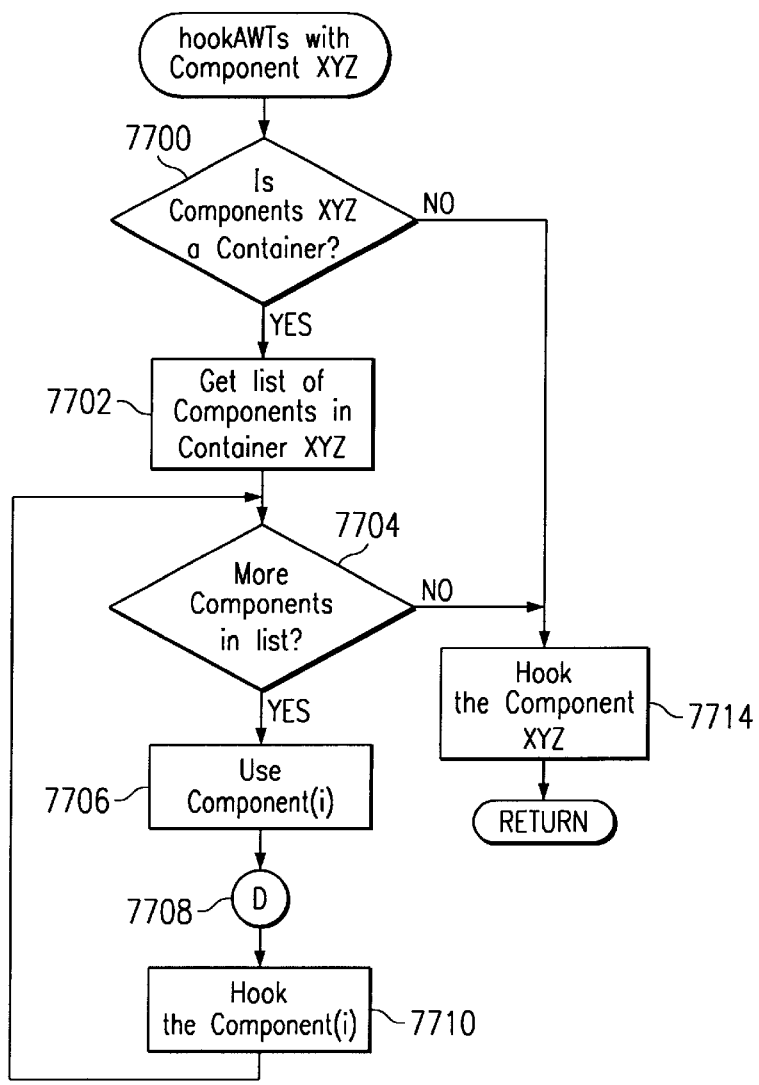
FIG. 77 is a flowchart of a process for performing hookAWTs depicted in accordance with the preferred embodiment of the present invention.

With reference now to FIG. 77, a flowchart of a process for performing hookAWTs is depicted in accordance with the preferred embodiment of the present invention. This process is used to hookAWTs to a component. The processes depicted in FIG. 77 are a more detailed description of steps 7518 and 7526 in FIG. 75. The process begins by determining whether the component is a container (step 7700). If the component is a container, then a list of the components in the container is obtained (step 7702). Thereafter, a determination is made as to whether more components are present in the list (step 7704). If more components are present in the list, then the next component is selected for processing (step 7706). A recursive call to D is performed (step 7708). This step results in the process returning to step 7700 and performing the steps as described above. Thereafter, the process hooks the component (step 7710). Then, the process returns to step 7704 to determine whether more components are present in the list.

If more components are not present in the list, then the component is hooked (step 7712) with the process and returns.

With reference again to step 7700, if the component is not a container, then the process also proceeds to step 7712. Step 7710 and step 7712 are described in more detail below in FIG. 78.

Figure 78:
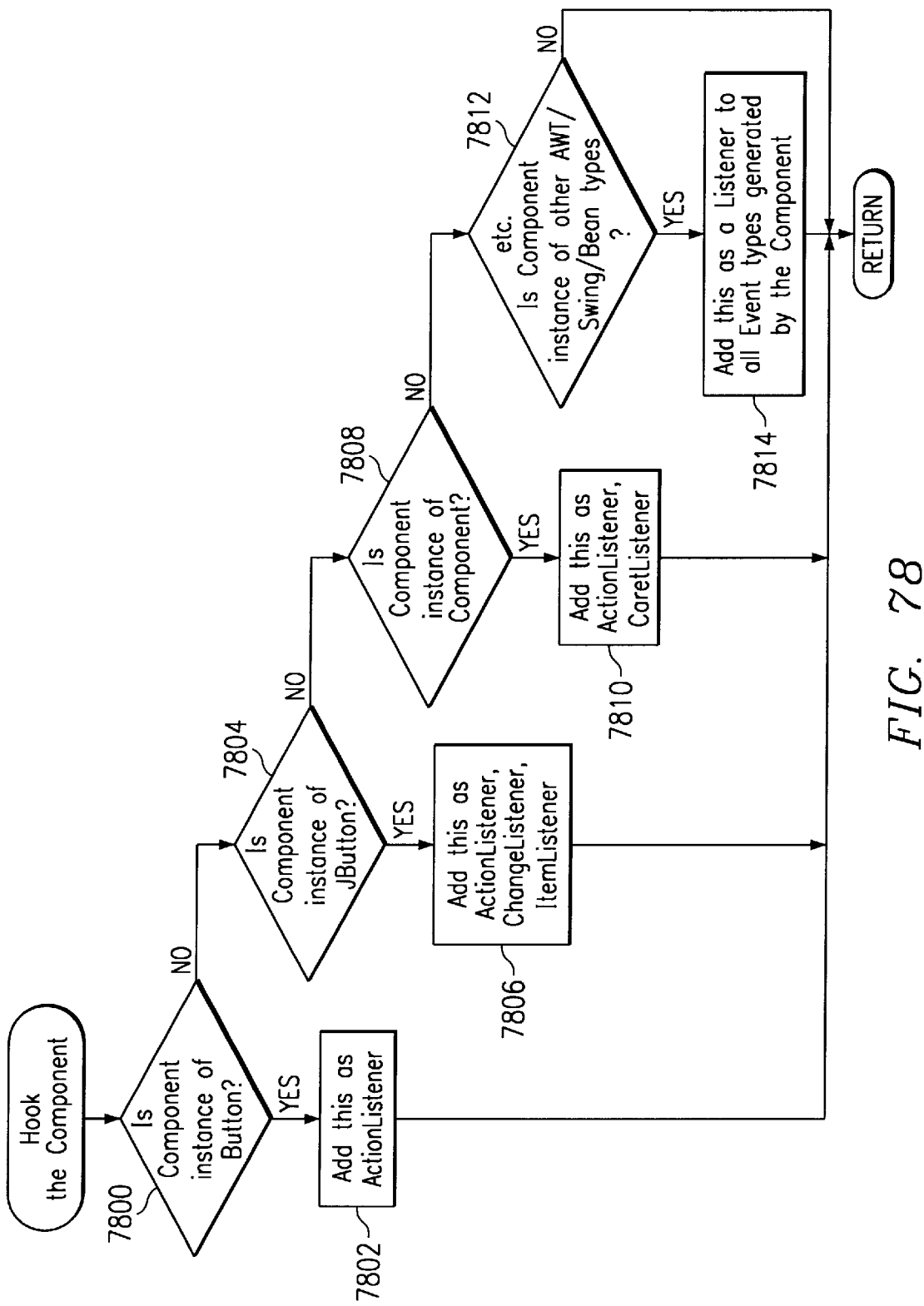
FIG. 78 is a process for hooking an AWT and JFC component depicted in accordance with the preferred embodiment of the present invention.

With reference now to FIG. 78, a process for hooking a component is depicted in accordance with the preferred embodiment of the present invention. FIG. 78 is a more detailed description of the processes performed in step 7710 and 7712 in FIG. 77. The process begins by determining whether the component is an instance of a button (step 7800). If the component is an instance of a button, the button is added as an action listener (step 7802) (with the process then returning). An Action Listener listens for events generated by Button, List, MenuItem, and TextField, all objects that can be part of the user interface. The event is handled by the method actionPerformed.

With reference again to step 7800, if the component is not an instance of a button, a determination is made as to whether the component is an instance of a JButton (step 7804). Button is an object built using the AWT. JButton is an object built using the Swing library. Swing components typically provide greater platform independence. If the component is an instance of a JButton, then the JButton is added as ActionListener, a ChangeListener, and an ItemListener (step 7806). A ChangeListener listens for events generated by JFC components when their internal state has changed. The event is handled by the method stateChanged.

An ItemListener listens for events generated by Checkbox, CheckboxMenuItem, Choice, and List, all objects that can be part of the user interface. The event is handled by the method itemStateChanged.

With reference again to step 7804, if the component is not an instance of a JButton, a determination is made as to whether the component is an instance of a component (step 7808). If the component is an instance of a component, then the component is added as an ActionListener and a CareListener (step 7810), with the process returning thereafter. A CaretListener listens for events generated by objects that contain text cursor positions (caret) and the caret changes in the position of text. The event is handled by the caretUpdate method.

With reference again to step 7808, if the component is not an instance of a component, a determination is made as to whether the component is an instance of other AWT/Swing/Bean types in Java (step 7812). If the component is an instance of these other types, then the component is added to all event types generated by the component, with the process returning thereafter. If the component is not an instance of these other types, the process then returns.

The getJTCs and getAWTs algorithms are easily extended to other object types and hiearchies by brute force coding of the "instanceof/addListener" tests or by using reflection on the objects to "search for interfaces, search for interface methods, addListener" as reflection supports.

C. Management of Data Objects

User interaction triggers ViewEvents to perform a variety of tasks. These include system tasks (e.g., open, close, cancel, etc.), status tasks (e.g., various messages), navigation tasks (e.g., next, previous, first, last, etc.), data tasks (e.g., add, delete, modify, etc.), assist tasks (e.g., search, find, help, etc.) and live (streaming) tasks (e.g. fast, medium, delay, timer, on, off, high, low, etc.).

Some tasks can be performed locally, but others are sent to a service fulfillment provider (the Destination) in the form of a RequestEvent containing appropriate data. Data is returned, often different than the data sent, and refresh is used to change what the user is viewing.

Details of the steps discussed above are now examined through various examples of Java code. With reference now to FIGS. 79–82, diagrams of Java code for use in managing data objects is depicted in accordance with a preferred embodiment of the present invention. Passing data for the main program to ApplicationMediators is shown in FIG. 79. The ApplicationMediator am1 and the data object named data are created. By using the refresh method, the main program passed this data into the ApplicationMediator. Refresh accepts any data object regardless of the number or shape of objects. It is because the data type definition is "Object data;" that JTC data support is neutral to the actual classes and interfaces of the data models being used. It is because the refresh method uses a data type definition "Object data;" that additional data models can readily be integrated into a JTC client application with minimal effort and side effects. The ApplicationMediatorImpl passes the refresh on to all ApplicationMediators and ViewControllers.

Alternatively, if the results of a RequestEvent contains changed data, the ApplicationMediator can initiate the refresh on to all ApplicationMediators and ViewControllers.

The code in FIG. 80 illustrates how a ViewController would handle data that uses the an example key-value pair data model. The first refresh function simply receives the data as type Object and type casts it to type KeyValue in a call to the worker refresh function of the key-value data model. The refresh of key-value pairs calls the AWT method setText for each of the textfields and then calls repaint( )to change the user display (validate( ) followed by repaint( ) can also be used). The code in FIG. 81 illustrates how this top level refresh method can input any object and route it to a more particular version of refresh by detecting the type of data and casting it to a more specific type. The types Vector, KeyValue, and XMLData are shown, but others can be added. FIG. 82 illustrates the processing of data in the form of a Vector where the first element is of type Customer and the second element is the ID. These two values are extracted from the vector, cast and then assigned to the appropriate fields by using setText. A repaint updates the screen.

Although the Destination locates, creates and packages these data types, the ViewController also knows the syntax of the data layout and packaging and the semantics of the data model.

Figure 83:
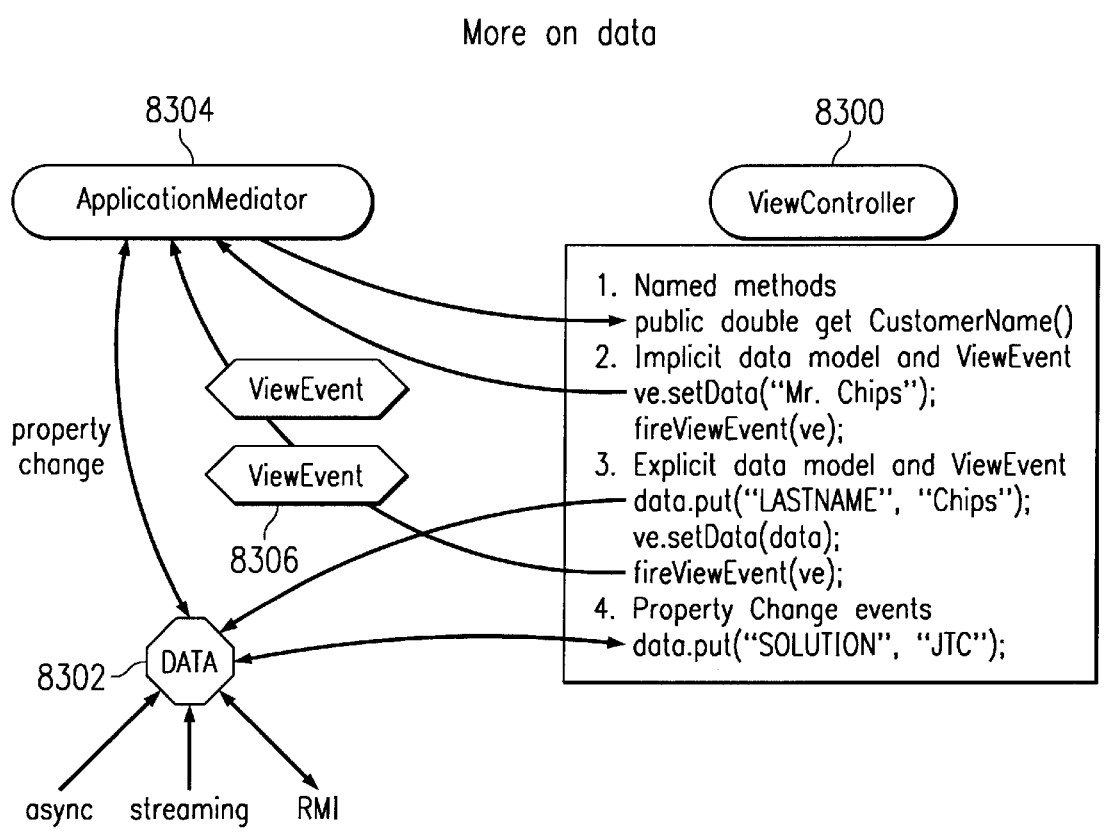
FIG. 83 is a diagram of using multiple concurrent data model update notification mechanisms in a ViewController and ApplicationMediator depicted in accordance with a preferred embodiment of the present invention.

ApplicationMediators and ViewControllers can also bypass the normal JTC ViewEvent notifications when data has changed. For example, refresh can use an implicit data model (i.e. String, Integer), a user defined data model (described above), named methods in the ViewController (less portable) and traditional Java property change event notifications. Further, live data models (i.e. streaming media, asynchronous device input) can also be incorporated easily. It is because JTC uses the data type "Object data;" and because the refresh method uses a data type definition "Object data;" that additional data models, event notifications, data access and data update differences can readily be integrated into a JTC client application with minimal effort and side effects—the GUI parts of the ViewController, ValidationRules, ApplicationMediators, ViewEvents, RequestEvents, TopEvents, PlacementEvents, TopListeners, and PlacementListeners do not have to change. Only small parts of the ViewController and Destinations need modification. This variety of techniques is illustrated next in FIG. 83.

One way for the ViewController 8300 to change data 8302 is implicitly through the ApplicationMediator 8304. The ApplicationMediator will have a named method to get the appropriate field, such as CustomerName as shown. The setData method is called for a ViewEvent 8306 and the ViewEvent is fired. The ApplicationMediator 8304 changes the data through a property change. The other alternative is to change the data explicitly through the ViewController

8300. A put operation on the appropriate field is attached to an instance of the data. This is sent to the data via a ViewEvent. The operation data.put is a property change event.

In general, the developer should keep the data "thin." This means the number of classes to represent data should be kept small and the size should be kept small to facilitate network transfer. For some applications, it is appropriate to use lists for "drill down" or cached data to facilitate disconnected mode.

D. TopListener

Figure 84:
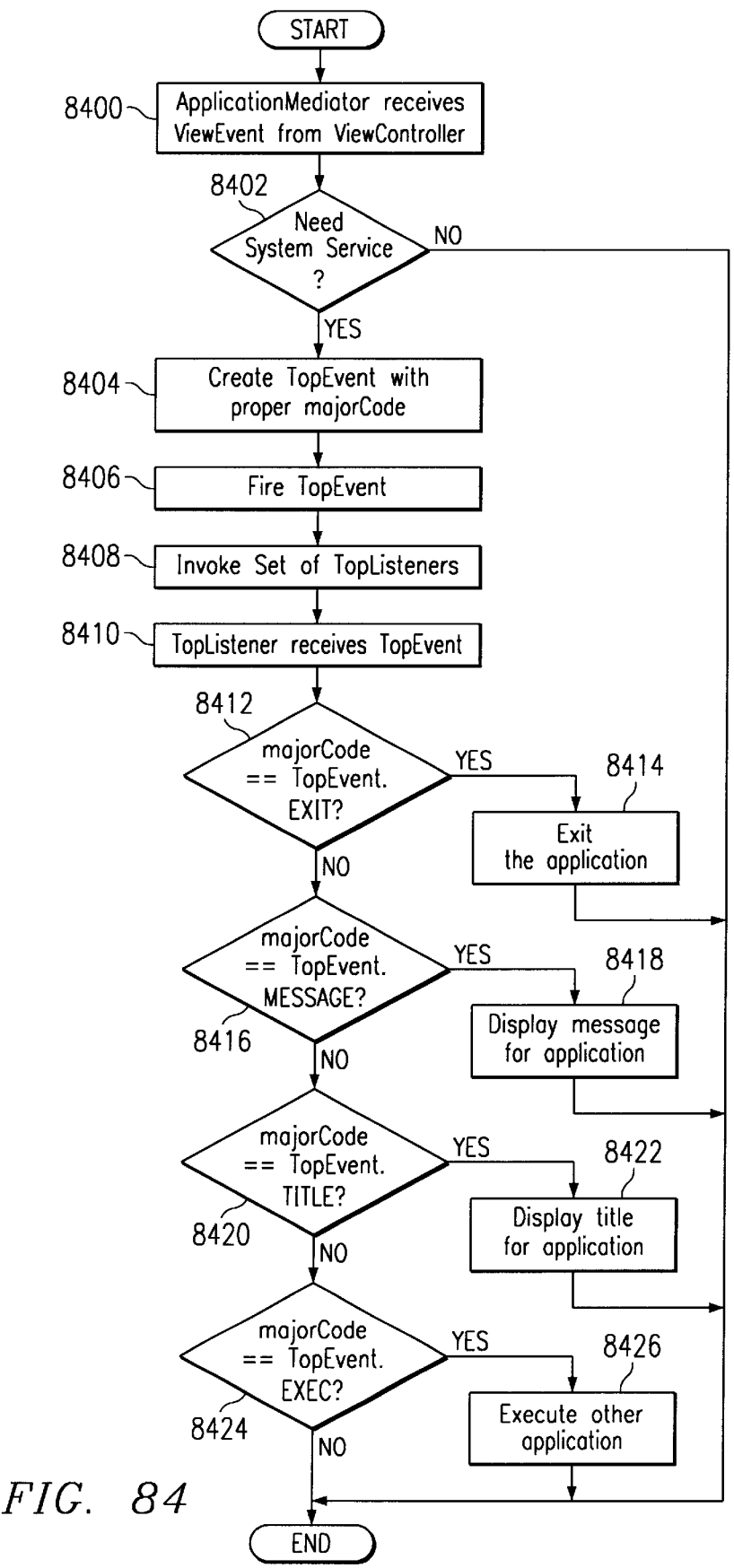
FIG. 84 is a flowchart of a process used in a TopListener depicted in accordance with a preferred embodiment of the present invention.

With reference now to FIG. 84, a flowchart of a process used in a TopListener is depicted in accordance with a preferred embodiment of the present invention. The process begins by an ApplicationMediator receiving a ViewEvent from a ViewController (step 8400). A determination is made to whether system service is needed (step 8402). If system service is not needed, the process terminates. Otherwise, a TopEvent is created with the proper major codes (step 8404). Thereafter, the TopEvent is fired (step 8406). After, a set of TopListeners is invoked (step 8408). This set of TopListeners may include a single TopListener or many TopListeners. The TopListener receives the TopEvent (step 8410). Thereafter, a determination is made as to whether the major code of the TopEvent is EXIT (step 8412).

If the major code is exit, then the application is exited (step 8414) with the process terminating thereafter. Otherwise, a determination is made as to whether the major code for the TopEvent is MESSAGE (step 8416). If the major code for the TopEvent is message, then the message is displayed for the application (step 8418) with the process terminating thereafter.

If the major code is not a message, then a determination is made as to whether the major code is a TITLE (step 8420). If the major code for the TopEvent is a title, then the title is displayed for the application (step 8422) with the process terminating thereafter. Otherwise, a determination is made as to whether the major code for the TopEvent is to execute (EXEC) (step 8424). If the major code is execute, then the data in the TopEvent specifies an application to be launched (step 8426) with the process terminating thereafter. If none of these major codes are present, the process terminates without taking any action.

E. PlacementListener

Figure 85:
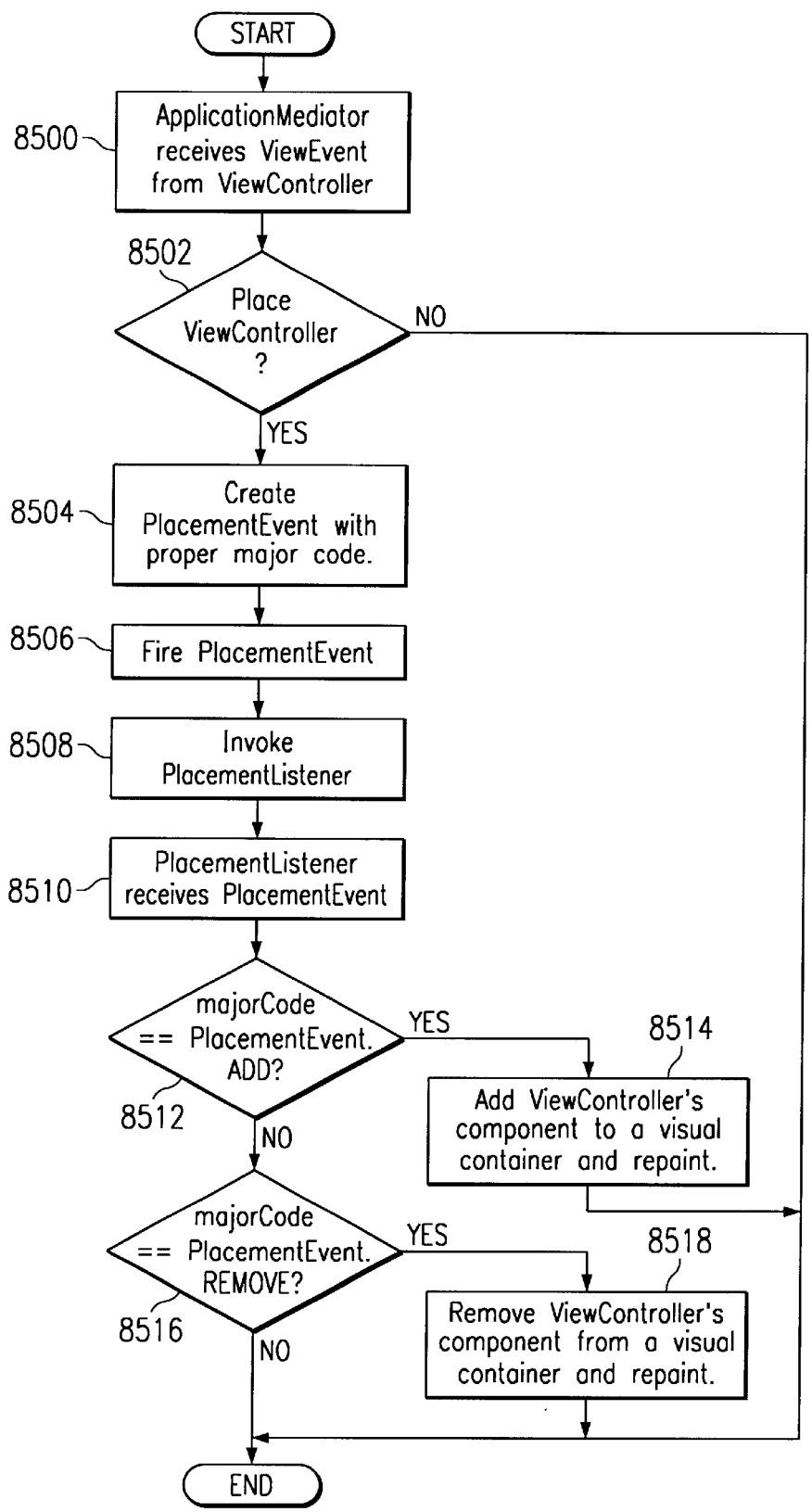
FIG. 85 is a flowchart of a PlacementListener depicted in accordance with a preferred embodiment of the present invention.

With reference now to FIG. 85, a flowchart of a PlacementListener is depicted in accordance with a preferred embodiment of the present invention. The process begins by the ApplicationMediator receiving a ViewEvent from a View Controller (step 8500). Thereafter, a determination is made as to whether ViewController needs to be placed (step 8502). If the ViewController does not need to be placed, the process terminates. Otherwise, a PlacementEvent is created with the appropriate major codes (step 8504). Thereafter, the ApplicationMediator fires the PlacementEvent (step 8506) A set of PlacementListeners is then invoked (step 8508). In the depicted examples, the set of PlacementListeners may be a set of one PlacementListener or many PlacementListeners.

Thereafter, the PlacementListener receives the PlacementEvent (step 8510). A determination is made as to whether the major code for the PlacementEvent is ADD (step 8512). If the PlacementEvent is add, then the ViewController's component is added to a visual container and ViewController is repainted (step 8514) with the process terminating thereafter. With reference to (step 8512), if the major code is not add, then a determination is made as to whether the placement code is removed in the PlacementEvent (step 8516). If the PlacementEvent is removed, then the ViewController's component is removed from the visual container and repainted (step 8518) with the process terminating thereafter. Otherwise, the process also terminates.

Figure 86:
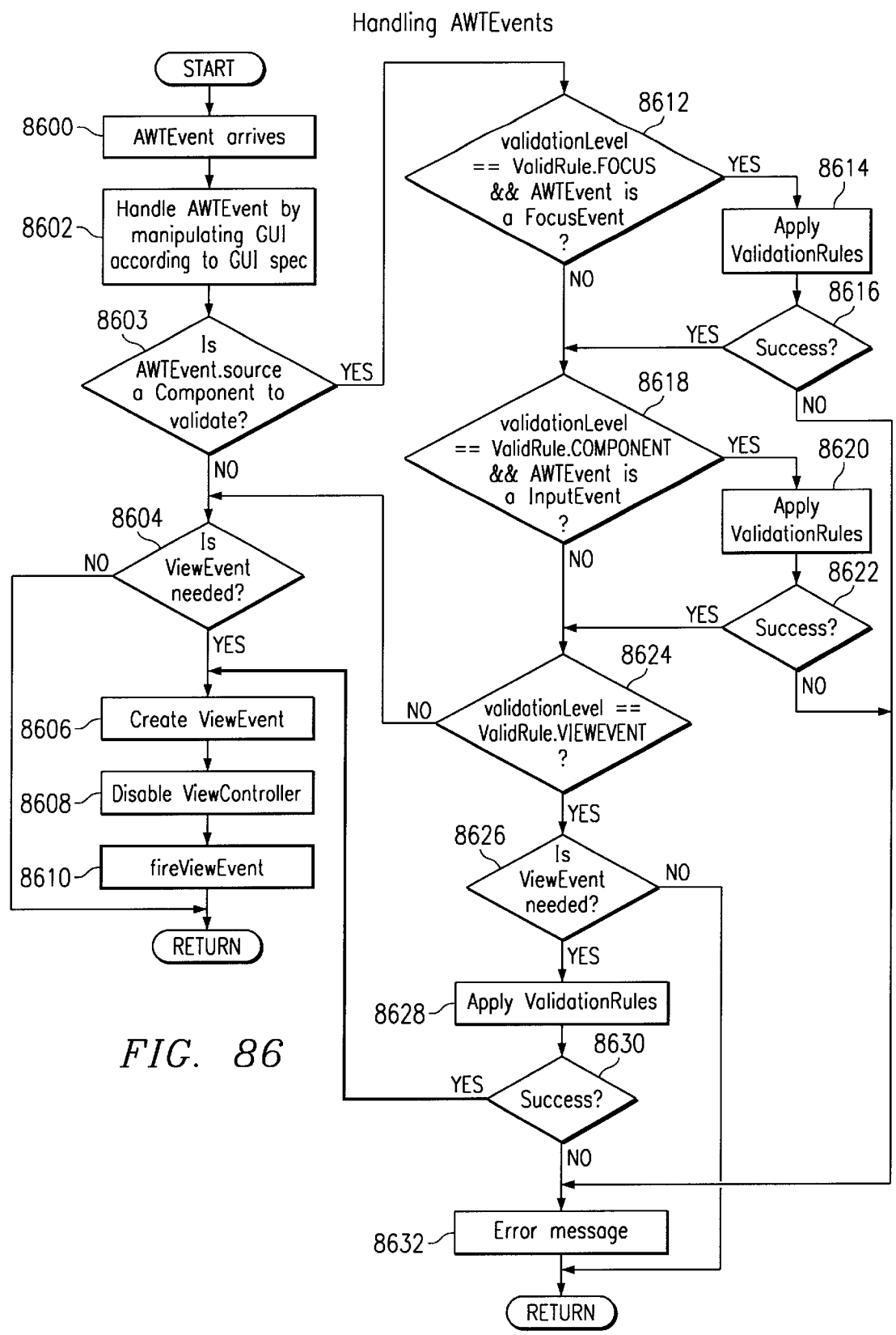
FIG. 86 is a flowchart illustrating handling of AWTEvents by a ViewController depicted in accordance with a preferred embodiment of the present invention.

With reference now to FIGS. 86–F3, flowcharts illustrating processes used in a ViewController are depicted in accordance with a preferred embodiment of the present invention. Turning first to FIG. 86, a flowchart illustrating handling of AWTEvents by a ViewController is depicted in accordance with a preferred embodiment of the present invention. The process begins by receiving an AWTEvent (step 8600). The Event is handled by manipulating the GUI according to the GUI specifications (step 8602). Then, a determination is made as to whether the AWTEvent.source is a component to validate (step 8603). If the determination is no, then another determination is made as to whether a ViewEvent is needed (step 8604). If a ViewEvent is needed, then a ViewEvent is created (step 8606). Thereafter, the ViewController is disabled (step 8608) and the ViewEvent is fired (step 8610) with the process then returning.

With reference again to step 8604, if a ViewEvent is not needed, the process also returns.

F. ValidationRule

With reference again to step 8602, if the AWTEvent.source is a component to validate, the process then determines whether the validation level is ValidationRule.FOCUS and the AWTEvent is a focus event (step 8612). If the answer to this determination is yes, then the ValidationRules are applied (step 8614). A determination is made as to whether the application was successful (step 8616). If the application was successful, then a determination is made as to whether a validation level is equal to ValidationRule.COMPONENT and whether the AWTEvent is an input event (step 8618). This determination is made directly from step 8612 if the validation level is not set equal to ValidationRule.FOCUS. The AWTEvent is not a focus event. If the determination is that the validation level is a ValidationRule for a component and the AWTEvent is an input event, then the ValidationRules are applied (step 8620) and a determination is made as to whether the rules were successfully applied (step 8622).

If the rules were successfully applied, then a determination is made as to whether the validation level is equal to ValidationRule.VIEWEVENT (step 8624). If this determination is no, the process then returns to step 8604 as described above. Otherwise a determination is made as to whether a ViewEvent is needed (step 8626). If a ViewEvent is needed, then ValidationRules are applied (step 8628). A determination is made as to whether the ValidationRules were successfully applied (step 8630). If the ValidationRules were successfully applied, the process then proceeds to step 8606 as previously described.

In any of the steps in which a determination is made as to whether a ValidationRule was successful (steps 8616, 8622, and 8630), if the application of the rules was unsuccessful, then an error message is created (step 8632) with the process then returning. Steps 8612 and 8618 describe the various times the ViewController will validate user input. If the setValidationLevel of a VC is set to COMPONENT, then validation is performed on every input event for a component (i.e. key strokes, so only valid keys are allowed to be inputted). If the validationLevel is FOCUS, then validation is performed when the user hits the Tab key or uses the mouse to move focus out of the current component. If the validationLevel is VIEWEVENT, then validation is performed when a view event needs to be fired; This situation typically occurs when the user hits the "Ok" or "Next" button for further processing. If a view event is not needed in step 8626, the process returns.

With reference again to step 8618, if the determination is such that the validation level is not a ValidationRule for a component and the AWTEvent is not an input event, then the process proceeds to step 8624 as described above.

Figure 87:
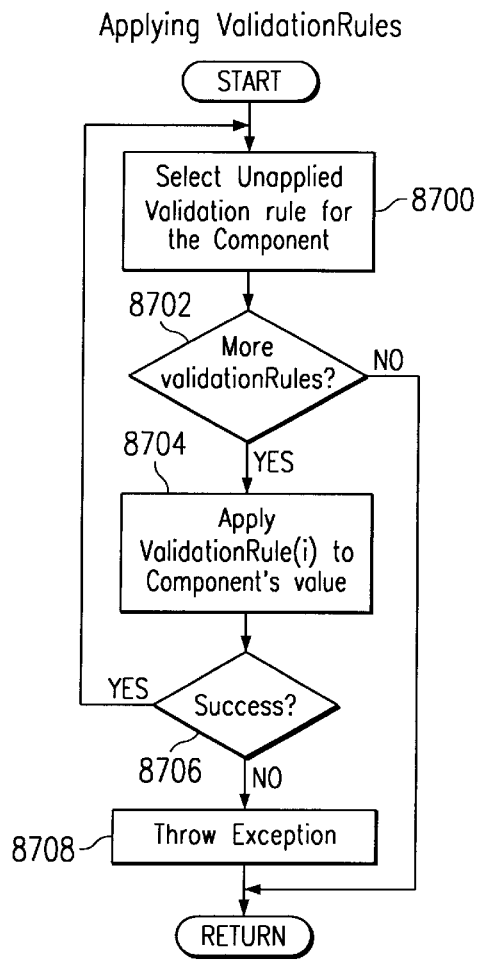
FIG. 87 is a flowchart illustrating application of ValidationRules depicted in accordance with a preferred embodiment of the present invention.

With reference now to FIG. 87, a flowchart illustrating application of ValidationRules is depicted in accordance with a preferred embodiment of the present invention. FIG. 87 is a more detailed description of steps 8614, 8620, and 8628 in FIG. 86. The process is applied for each rule defined for the component (step 8700). A determination is made as to whether ValidationRules are present that have not been applied (step 8702). If more rules are present, then the ValidationRule(i) is applied to the component's value (step 8704). A determination is made as to whether a successful application has occurred (step 8706). If a successful application has occurred, the process returns to step 8700 to select the next rule.

With reference again to step 8706, if the application of the rules are unsuccessful, then an exception is thrown (step 8708) with the process then returning. With reference again to step 8702, if a determination that more ValidationRules are not present for processing, the process also returns.

G. ViewEvent

Figure 88:
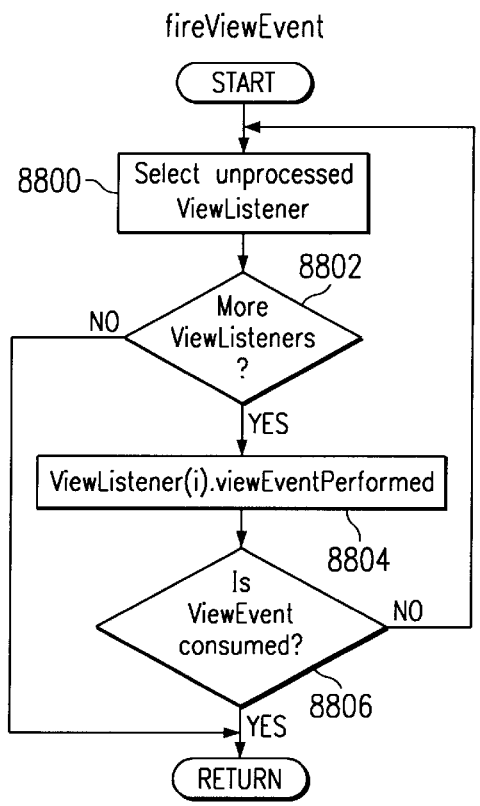
FIG. 88 is a flowchart of a process for firing a ViewEvent depicted in accordance with a preferred embodiment of the present invention.

With reference now to FIG. 88, a flowchart of a process for firing a ViewEvent is depicted in accordance with a preferred embodiment of the present invention. The process begins by selecting a ViewListener (step 8800) that has not yet been processed from the list of ViewListeners that have been added to using addViewListener. Thereafter, a determination is made as to whether ViewListeners are present for processing (step 8802). If ViewListeners are present, then invoke the method ViewListener(i) viewEventPerformed (step 8804) This method is implemented by a ViewListener (such as an ApplicationMediator) to process the ViewEvent passed. Typically, this processing of the ViewEvent will occur on a separate thread. Also, the ViewListener may decide to "consume" the event by calling the consume( ) method on the ViewEvent. This essentially specifies that the ViewEvent should not be sent to any other ViewListeners left to be processed.

Thereafter, a determination is made as to whether the ViewEvent has been consumed (step 8806). If the ViewEvent is not consumed, the process returns to step 8800 to select another ViewListener. Otherwise, the process returns. With reference again to step 8802, if more ViewListeners are not present, the process also returns.

H. Data Refresh

Figure 89:
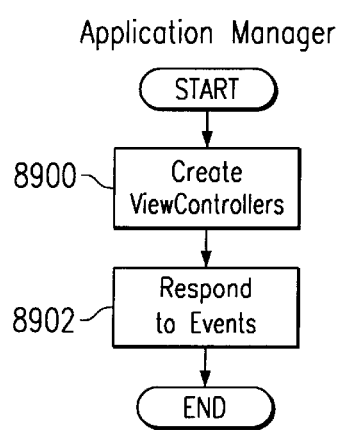
FIGS. 89–95 are flowcharts illustrating processes used by an ApplicationMediator depicted in accordance with a preferred embodiment of the present invention.

With reference now to FIGS. 89–98, flowcharts illustrating processes used by an ApplicationMediator are depicted in accordance with a preferred embodiment of the present invention. With reference now to FIG. 89, a high level flowchart of the process used by the ApplicationMediator is depicted in accordance with a preferred embodiment of the present invention. The process begins by creating ViewControllers (step 8900). Thereafter, the ApplicationMediator responds to events (step 8902) with the process terminating thereafter.

Figure 90:
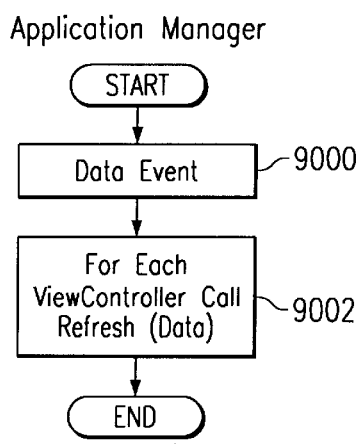

With reference now to FIG. 90, a flowchart of a process for handling DataEvents is depicted in accordance with a preferred embodiment of the present invention. The process begins by the ApplicationMediator receiving a DataEvent (step 9000). In response to receiving the DataEvent, the ApplicationMediator will send a call to refresh data for each ViewController handled by the ApplicationMediator (step 9002) with the process terminating thereafter.

Figure 91:
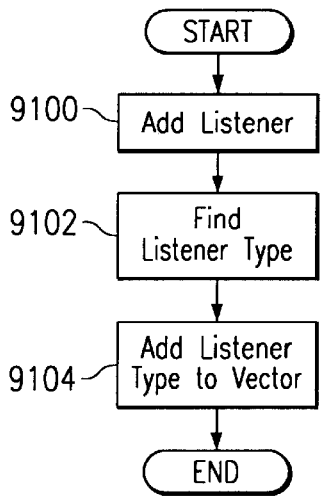

With reference now to FIG. 91, a flowchart of a process for adding a listener is depicted in accordance with a preferred embodiment of the present invention. The process begins by the ApplicationMediator receiving a request to add a listener (step 9100). The listener type is then found (step 9102). The listener is then added to a vector (step 9104) with the process terminating thereafter.

Figure 92:
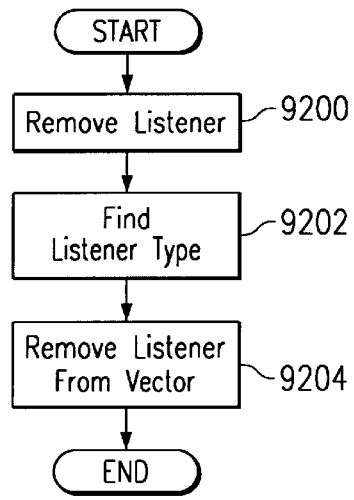

With reference now to FIG. 92, a flowchart of a process for removing a listener is depicted in accordance with a preferred embodiment of the present invention. The process begins by receiving a request to remove a listener (step 9200). The listener type is then found (step 9202). The listener is then removed from the vector (step 9204) with the process terminating thereafter.

Figure 93:
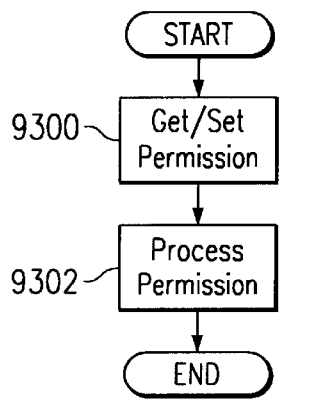

With reference now to FIG. 93, a flowchart of a process for managing permissions is depicted in accordance with a preferred embodiment of the present invention. The process begins by receiving a request to gather and set permissions (step 9300). The permissions are then processed (step 9302) with the process terminating thereafter.

Figure 94:
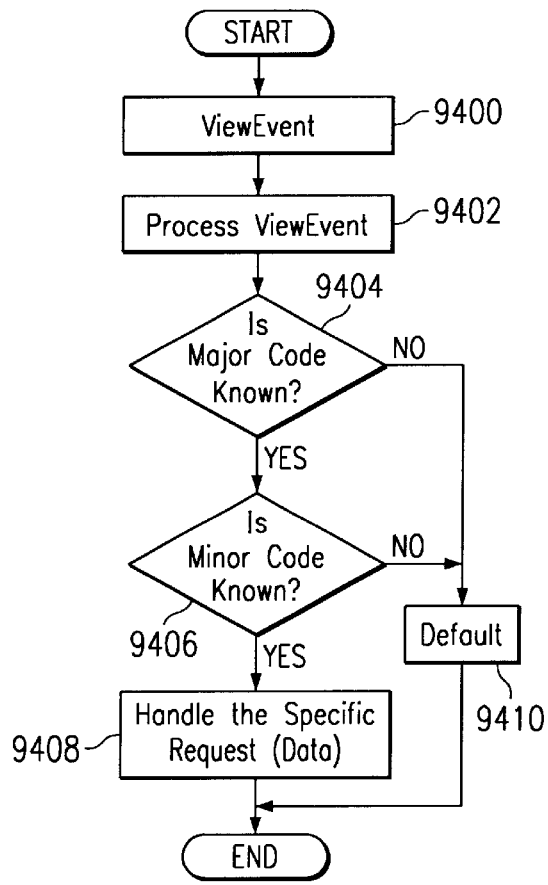

With reference now to FIG. 94, a flowchart of a process for handling ViewEvents is depicted in accordance with a preferred embodiment of the present invention. The process begins by receiving a ViewEvent (step 9400). Thereafter, the ViewEvent is processed (step 9402). A determination is made as to whether the major code in the ViewEvent is known (step 9404). If the major code is known, then a determination is made as to whether the minor code is known (step 9406). If the minor code is known, the process then handles the specific request (step 9408) with the process terminating thereafter. A specific request may be, for example, a RequestEvent, a request for fresh data, a TopEvent, a PlacementEvent, or there may not be a specific request.

With reference again to step 9404, if the major code or minor code in step 9406 is unknown, the process defaults (step 9410) and terminates thereafter.

Figure 95:
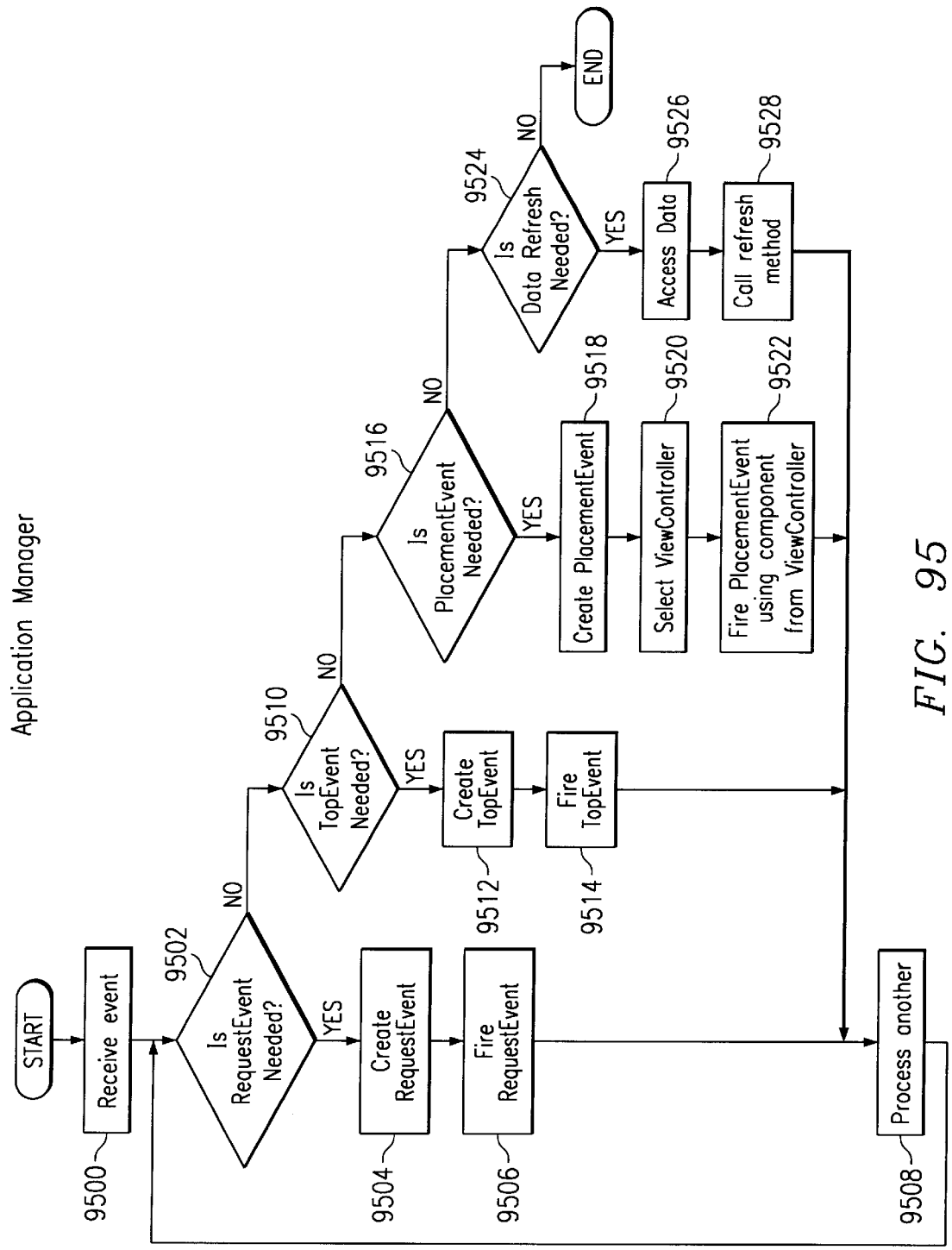

With reference now to FIG. 95, a flowchart of a process for refreshing object data in an ApplicationMediator is depicted in accordance with a preferred embodiment of the present invention. The process begins by receiving an event (step 9500) (typically a ViewEvent from a ViewController or other ApplicationMediator). A determination is made as to whether the processing of the event recieved requires a RequestEvent (step 9502). If a RequestEvent is needed, then a RequestEvent is created (step 9504). Thereafter, the RequestEvent is fired (step 9506). The ApplicationMediator can repeat the processes of creating an event, firing it, processing the results and then go on to the next event to create or end. The process then returns to step 9502.

With reference again to step 9502, if a RequestEvent is not needed for the event, a determination is then made as to whether a TopEvent is needed (step 9510). If a TopEvent is needed, a TopEvent is created (step 9512) and the TopEvent is fired (step 9514). Thereafter, the process proceeds to step 9508 as described above.

With reference again to step 9510, if a TopEvent is not needed, a determination is then made as to whether a PlacementEvent is needed (step 9516). If a PlacementEvent is needed, then a PlacementEvent is created (step 9518). Thereafter, a ViewController is selected (step 9520). The PlacementEvent is fired using a component from the ViewController (step 9522) with the process then proceeding to step 9508.

With reference again to step 9516, if a PlacementEvent is not needed, then a determination is made as to whether a data refresh is needed (step 9524). If a data refresh is needed, then the data is accessed (step 9526). Thereafter, the refresh method on the ViewController or ApplicationMediator is called. (step 9528) with the process then proceeding to step 9508 as described above. With reference again to step 9524, if a data refresh is not needed, then the process terminates.

Figure 96:
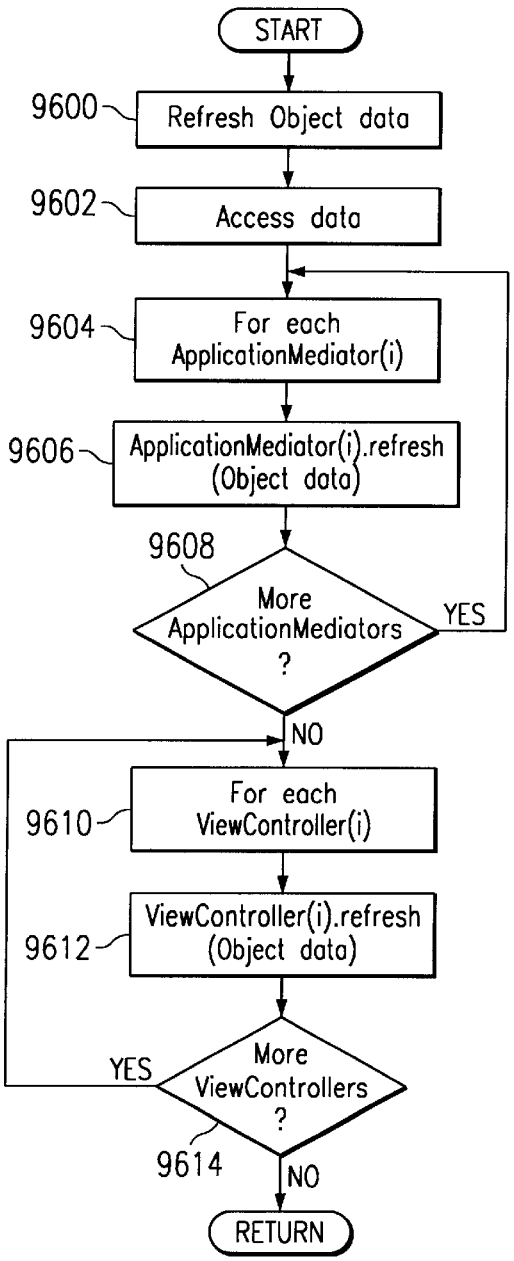
FIGS. 96 and 97 are diagrams illustrating processes used to refresh object data in an ApplicationMediator and ViewController depicted in accordance with a preferred embodiment of the present invention.
Figure 97:
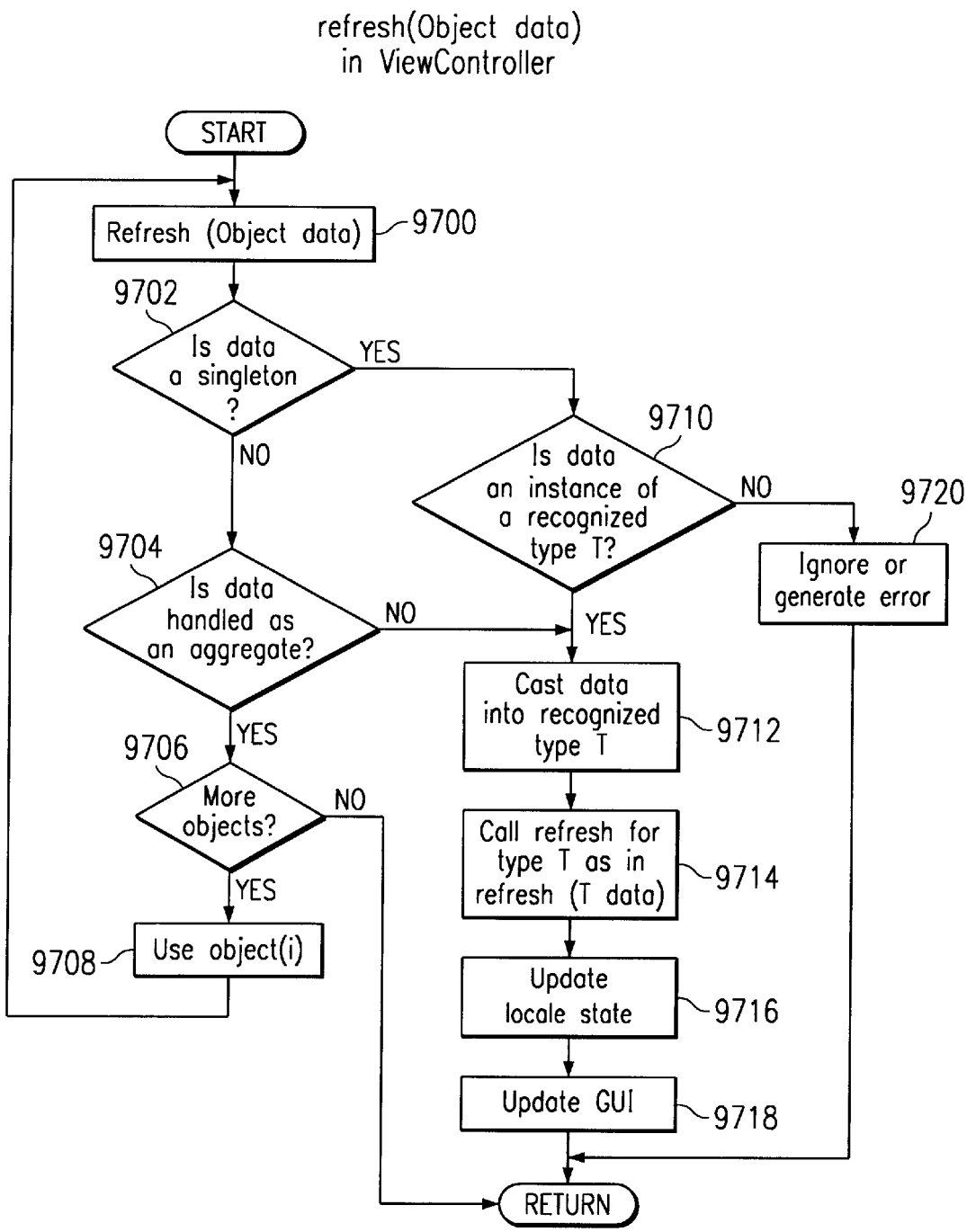

With reference now to FIGS. 96 and 97, diagrams illustrating processes used to refresh object data is depicted in accordance with a preferred embodiment of the present invention. The data coming in can be one object or an object containing multiple objects, such as a Vector or more generically, a list. This data is represented by the type "Object data;" the process of data refresh includes seeing if the data is a singleton and if data is handled (a recognized type), then format it (cast) into the recognized type and then call refresh again in the same view controller. For example, refresh(Object data) yields refresh(Customer data) if this data type is handled (a recognized aggregate type such as Vector), then the data is formatted (cast) into the recognized type. Then refresh is called again in the same view controller. For example, refresh(Object dataAggreate) yields refresh(Vector data).

If the data is an aggregate (not a singleton), and if the data is not handled, then iterations are performed over the aggregate and refresh is called for each object in the aggregate. For example, refresh(Object dataNotSupportedAggregate) yields refresh (Object dataNotSupportedAggregate(i)) for each i.

When a singleton data type is supported, has been cast, and a new refresh has been called, there are a plurality of actions that can result. These actions include, for example: updating one or more components, containers or beans; updating the reference to the local data model; application of ValidationRules again; and even the firing of a new ViewEvent. Thus, for each refresh in the plurality of refreshes possible from the initial refresh, a plurality of actions can result from the plurality of possible actions.

With reference now to FIG. 96, a flowchart of a process for refreshing data in an ApplicationMediator is depicted in accordance with the preferred embodiment of the present invention. The process begins by receiving a call to refresh object data (step 9600). Thereafter, an access of data is performed (step 9602). Data is accessed by the ApplicationMediator rarely. The reasons to access data in an ApplicationMediator arise around the need to activate another sub ApplicationMediator or a ViewController. Thereafter, ApplicationMediator is selected for processing (step 9604). This step is used to identify unprocessed ApplicationMediators for processing. Thereafter, an ApplicationMediator(i) .refresh(Object data) is performed (step 9606). Thereafter, a determination is made as to whether more ApplicationMediators are present for processing (step 9608). If more ApplicationMediators are present, the process returns to step 9604. Otherwise, a ViewController is identified for processing (step 9610). This step is used to select unprocessed ViewControllers for processing. A ViewController (i).refresh(Object data) is performed (step 9612). This step is described in more detail in FIG. 97 below. Thereafter, a determination is made as to whether more ViewControllers are present for processing (step 9614). If additional ViewContollers are present, the process returns to step 9610. Otherwise, the process returns.

With reference now to FIG. 97, a flowchart of a ViewContoller refresh process is depicted in accordance with the preferred embodiment of the present invention. FIG. 97 is a more detailed description of step 9612 in FIG. 96. The process begins by receiving a request to refresh (Object data) (step 9700). Thereafter, a determination is made as to whether the data is a singleton (step 9702). If the data is not a singleton, then a determination is made as to whether the data is handled as an aggregate (step 9704). If the data is to be handled as an aggregate, then a determination is made as to whether additional objects are present in the aggregate that are unprocessed (step 9706). If additional objects are present, then the use object process is performed (step 9708). By using an object, an unprocessed object is selected with a recursive call of refresh on that object. Once that object (and all of its objects) are processed, the next object is then selected. Thereafter, the process returns to step 9706. When no more objects are present, the process returns.

With reference again to step 9704, if the data is not to be handled as an aggregate, the process then proceeds to step 9712 as described below.

With reference again to step 9702, if the data is a singleton, a determination is made as to whether the data is an instance of a recognized type T (step 9710). Type "T" is any Java data model type that the JTC systems is currently supporting. For example, you may support a type Object data; and a type KeyValue data; Until you then add support for XMLData data, T cannot be of that type. Once the code is added for XMLData type, T can be of that type. If the data is an instance of a recognized type T, then the data is cast into a recognized type T (step 9712). Thereafter, a call refresh for type T is made (step 9714). This call may be, for example, refresh (T data). Thereafter, the local state is updated (step 9716), and the GUI is updated (step 9718) with the process then returning. With reference again to step 9710, if the data is not an instance of a recognized type then an ignore or error is generated (step 9720) with the process then returning.

Figure 98:
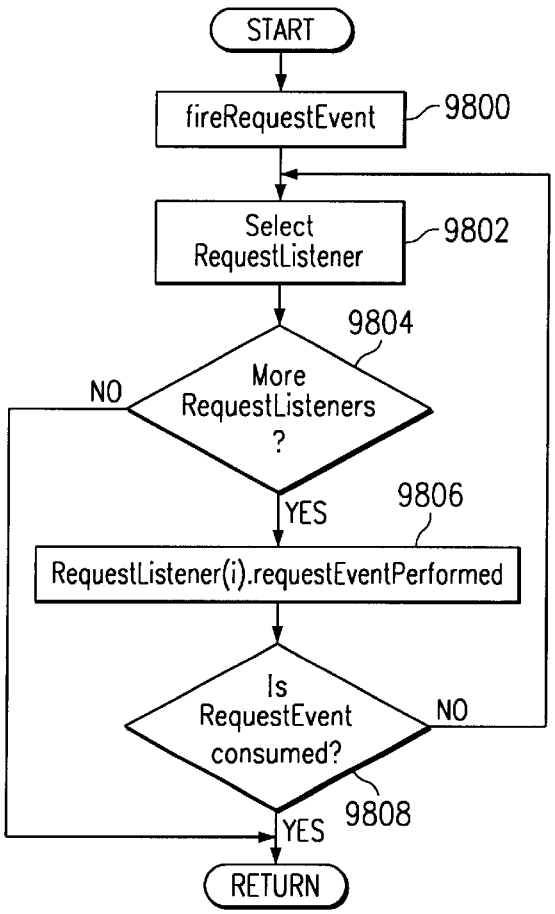
FIG. 98 is a flowchart of a process used to process RequestEvents depicted in accordance with a preferred embodiment of the present invention.

With reference now to FIG. 98, a flowchart of a process used to process RequestEvents is depicted in accordance with a preferred embodiment of the present invention. The process begins by the firing of a RequestEvent (step 9800). Thereafter, the process will select a RequestListener (step 9802). A determination is made as to whether more RequestListeners are present for processing (step 9804). If a RequestListener is present, then the process executes RequestListener(i).requestEventPerformed (step 9806). Thereafter, a determination is made as to whether the RequestEvent has been consumed (step 9808). If the RequestEvent has not been consumed, the process returns to step 9802 to select another RequestListener for processing. Otherwise, the process returns. With reference again to step 9804, if additional RequestListeners are not present for processing, all of the RequestListeners have been processed and the process returns.

I. Hierarchical ApplicationMediators

The present invention provides for the use of hierarchical ApplicationMediators for handling events from ViewControllers. In such a system, ApplicationMediators are arranged in a hierarchical fashion in which different ApplicationMediators may handle different types of events or perform different functions. If graphed, the ApplicationMediators would look like the tree in which nodes represent ApplicationMediators. Events would be received by the lowest level ApplicationMediators, those farthest away from the root. One event will percolate up the graph and then the event might cause actions to a group of ApplicationMediators from the set of ApplicationMediators which in turn may results in a set of actions from the plurality of view controllers. Another way to view it, "event" moves up the graph and then come back down in numerous possible paths.

Each node in the graph is an ApplicationMediator. View controllers. The partitioning of the nodes are based on some logical heuristic on example is the higher the node, the higher semantic level the code has.

Figure 99:
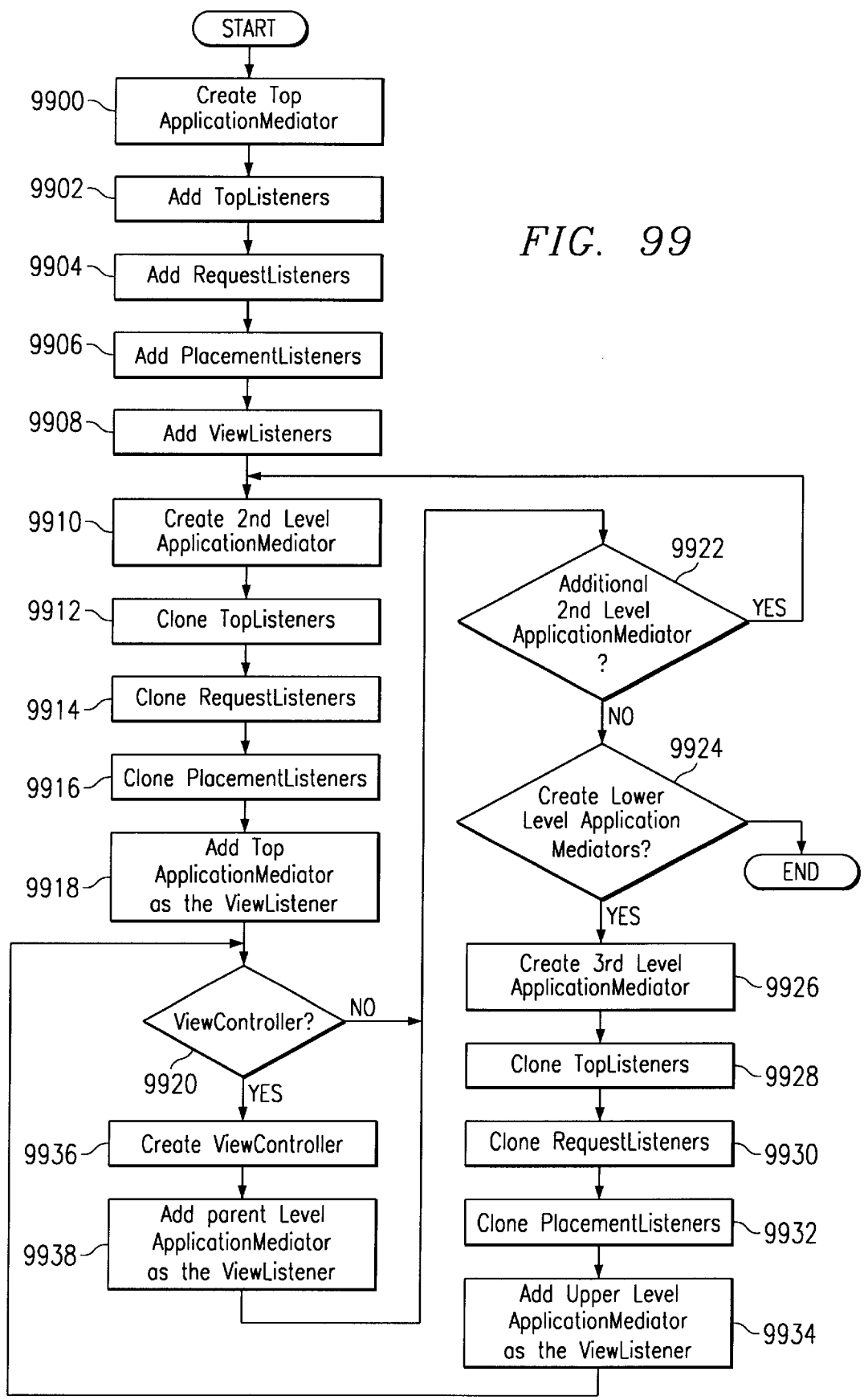
FIG. 99 is a flowchart of an initialization process for creating hierarchical ApplicationMediators depicted in accordance with a preferred embodiment of the present invention.

With reference now to FIG. 99, a flowchart of an initialization process for creating hierarchical ApplicationMediators is depicted in accordance with a preferred embodiment of the present invention. The process begins by creating a Top ApplicationMediator (step 9900). TopListeners are added (step 9902), and RequestListeners are added (step 9904). Thereafter, PlacementListeners are added (step 9906) and ViewListeners are added (step 9908).

The concept here is that when the application starts the top level AM is provided with the highest level listeners. Then, any Ams created as children AMs are initialized with the same listeners as specified by the top level AM. Once the Listeners are created they will wait to be called back via a fireEvent invocation . . . topEventPerformed( ), viewEventPerformed( ), requestEventPerformed( ), placementEventPerformed( )etc Next, a second level ApplicationMediator is created (step 9910), and the TopListeners are cloned (step 9912). The RequestListeners are cloned (step 9914), and the PlacementListeners are cloned (step 9916).

Cloning means to create an exact copy, which means that the copy has its own specific reference while a non-cloned copy would have the same reference as the original, which means that if a person has a dollar amount and choose to copy the amount into another object without cloning it then any changes made to the copy will also affect the original, while the original is cloned rather than just copied, any changes to the cloned object will only affect the clone. Therefore, the reason to clone the listeners here is so that children ApplicationMediators do not have the same Vector instance as the parent ApplicationMediators. If the Vector instance was the same, then the children ApplicationMediators and top level ApplicationMediator would always share the same lists of listeners.

Thereafter, the top ApplicationMediator is added as a ViewListener to the second level ApplicationMediator (step 9918). A determination is then made as to whether a ViewController is to be added (step 9920). If a ViewController is not to be added, then a determination is made as to whether additional second level ApplicationMediators are to be added (step 9922). If additional second level ApplicationMediators are to be added, the process then returns to step 9910. Otherwise, a determination as to whether a lower level ApplicationMediator is to be added (step 9924).

If a lower level ApplicationMediator is to be added, then the lower level ApplicationMediator is created (step 9926). The TopListeners are cloned (step 9928) and the RequestListeners are cloned (step 9930). Thereafter, the PlacementListeners are cloned (step 9932). Then, the upper level ApplicationMediator is added as the ViewListener (step 9934). The upper level ApplicationMediator is the ApplicationMediator in the level above the one created.

If there are no more lower level ApplicationMediators then the initialization process completes and application is ready to begin. Also, lower level ApplicaitonMediators and ViewControllers may be created at any time while the application is running.

Thereafter, the process returns to step 9920. With reference to step 9920, if a ViewController is to be added, then the ViewController is created (step 9936). Then, the parent level ApplicationMediator is added as the ViewListener (step 9938) with the process then proceeding to step 9922.

A parent level ApplicationMediator is the application mediator that manages several ApplicationMediators and/or ViewControllers. The usage for this is when functions of an application are nested. For example, assume an application has a function to display an interest rate calculator. This calculator has maybe several screens associated with it. Therefore, an CalculatorApplicationMediator is created to manage those screens. Now, assume that this calculator function will be used by two different higher-level processes such as a Auto Loan calculator and a Home Mortgage calculator. So the AutoLoanAM and HomeMortgageAM would be parent AMs for the CalculatorAM. The parent/child APPLICATIONMEDIATOR communication is done through ViewEvents and refresh just like APPLICATIONMEDIATOR to VIEWCONTROLLER communication. In other words, a child ApplicationMediator represents a child or sub-process that can be re-used in many places.

Figure 100:
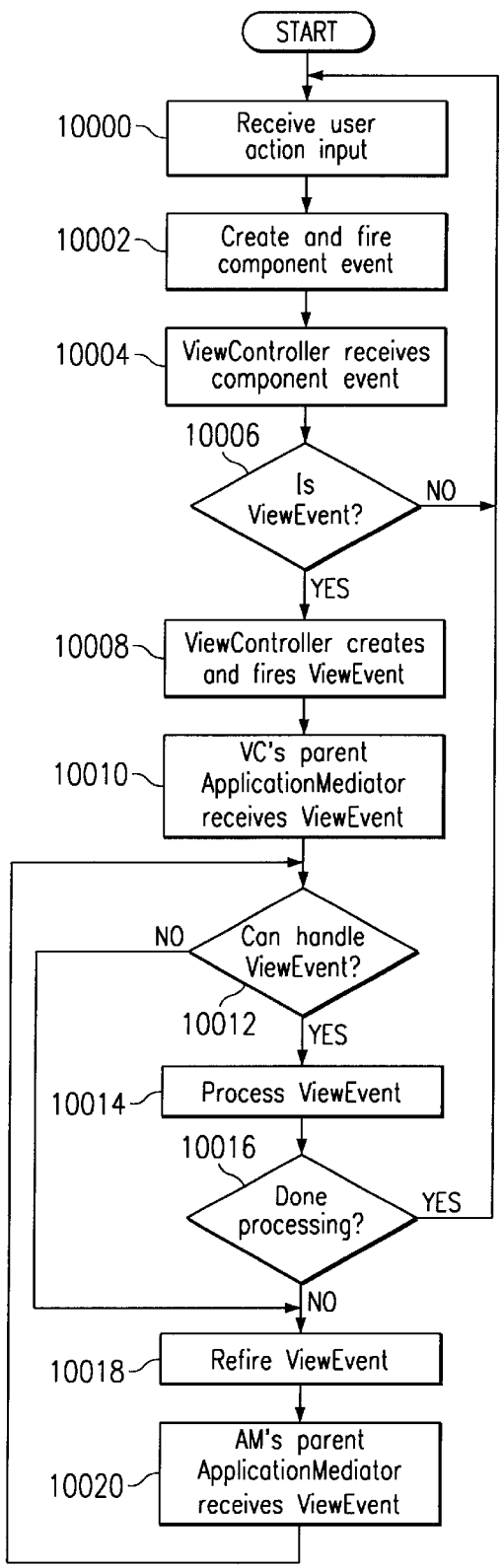
FIG. 100 is a flowchart of a process for handling events in a hierarchical ApplicationMediator system depicted in accordance with a preferred embodiment of the present invention.

With reference now to FIG. 100, a flowchart of a process for handling events in a hierarchical ApplicationMediator system is depicted in accordance with a preferred embodiment of the present invention. The process begins by receiving user action input (step 10000). A ComponentEvent is created and fired (step 10002). The ViewController receives the ComponentEvent (step 10004). A determination is then made as to whether the ComponentEvent is a ViewEvent (step 10006). If the ComponentEvent is not a ViewEvent, the process returns to step 10000. Otherwise, the ViewController creates and fires a ViewEvent (step 10008). The ViewController's parent ApplicationMediator receives the ViewEvent (step 10010).

A determination is made as to whether the ApplicationMediator is able to handle the ViewEvent (step 10012). If the ApplicationMediator is able to handle the ViewEvent, the ViewEvent is processed (step 10014). Thereafter, a determination is made as to whether the processing has completed (step 10016). If the processing has completed, the process returns to step 10000. Otherwise, the ViewEvent is refired (step 10018). The parent ApplicationMediator to the current ApplicationMediator receives the ViewEvent (step 10020) with the process then returning to step 10012.

With reference again to step 10012, if the ApplicationMediator is not able to handle the ViewEvent, the process proceeds directly to step 10018 as described above.

J. Virtual Application Mediators

With reference now to FIGS. 101–104, flowcharts illustrating state encoding in an ApplicationMediator is depicted in accordance with a preferred embodiment of the present invention. An ApplicationMediator can be built as a,state machine loaded by properties file, which describes other ApplicationMediators. These other AppliationMediators are also referred to as Virtual ApplicationMediators. The present invention employs an encoding language to describe the state transitions of an ApplicationMediator. Encoding is provided for ViewEvents, refresh of data, SettingProperties, SettingPermissions, and for methods that may alter the ApplicationMediator state. The actual Virtual ApplicationMediator used may be described in and passed in SetProperties.

An AWTEvent is generalized with increased semantics first as a ViewEvent, then as a RequestEvent, PlacementEvent and TopEvent.

Numerous heuristics may be employed that can determine how to solve mediation, such as how to encode a RequestEvent, why a RequestEvent and not a TopEvent or ViewController action.

More than one semantic event can be generated for each ViewEvent.

The Application Mediator interface provides default behavior to manage ViewControllers, ApplicationMediators, and to add/fire/remove PlacementListeners, ViewListeners, and a TopListener. The ApplicationMediatorImpl implements methods in the ApplicationMediator and JTC interfaces.

A dispatching state machine is used to manage all of these actions. As indicated by the name, a state machine consists of a finite set of states, a set of possible transitions between states, and, optionally, one or more actions to be performed when a transition is made between two states. State recognition will be based on the object being monitored. For example, for a ViewEvent the state is typically determined by a subset of the source of the event, the major code, the minor code and possibly the value of the data reference. Examples of possible actions are to make an existing ViewController visible, to create/fire a PlacementEvent, to create/fire a RequestEvent, or to create/fire a TopEvent. It is be possible to "hand build" the finite state machine for every ApplicationMediator, but this route is very tedious.

Instead, according to the present invention, the virtual ApplicationMediator builds the finite state machine from a set of transition rules that recognize the current state and if matched, trigger a state transition and associated actions. In general, it is unpractical to build a language within a language. If the encoding of the transition rules included control statements (i.e. if/then/else, while, switch) it is better to implement the ApplicationMediator in the programming language at hand, Java. If the definition of the transition rules are indeed simple, not control structures and the ApplicationMediator has little state except the Vectors of its ApplicationMediators, ViewControllers, Properties, Permissions, and Resources, then encoding becomes simple, flexible, powerful and easy to manage. The resulting benefit is that one set of ApplicationMediator code can be used to implement numerous virtual ApplicationMediators simply by changing the transition rules via the setproperties method.

Figure 101:
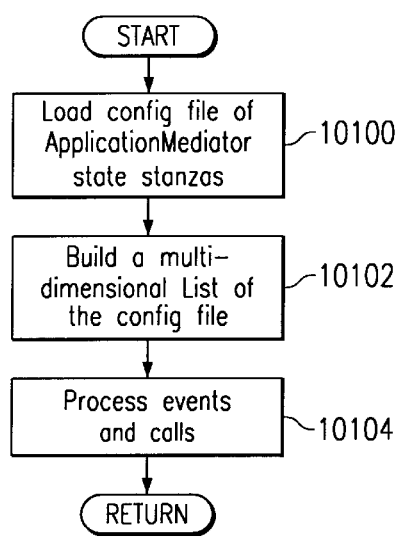
FIG. 101 is a flowchart for a process for building a virtual ApplicationMediator state dispatching machine depicted in accordance with a preferred embodiment of the present invention.

In FIG. 101, a flowchart for a process for building a state machine is depicted in accordance with a preferred embodiment of the present invention. The process begins by loading a configuration file of ApplicationMediators state stanzas (step 10100). A multi-dimensional list of the configuration file is built (step 10102). A multi-dimensional list has more than one dimension, traditional list are a single dimension implementation such as a list of numbers, or collection of elements. Multi-dimensional list would have, as its elements, containers that also represent containers. For example, a list of lists. This is clearly a list, yet the elements themselves are lists. This means a particular list in one dimension may be referenced while accessing the elements of that list in another dimension. Example colorList is a list of colors. To reference a color, a call would be made, such as colorList[2] and the color that is stored at location 2 would be obtained. If it is desired to store several list of list of colors and access to a particliar color that is in color list 2, at location 4 is desired, the color would be referenced as listOfColors[2] [4]. Thereafter, the state machine processes events and calls (step 10104) with the process terminating thereafter.

Turning now to FIG. 102, example table entries from the loading of a configuration file for a virtual ApplicationMediator is depicted in accordance with a preferred embodiment of the present invention.

Figure 103:
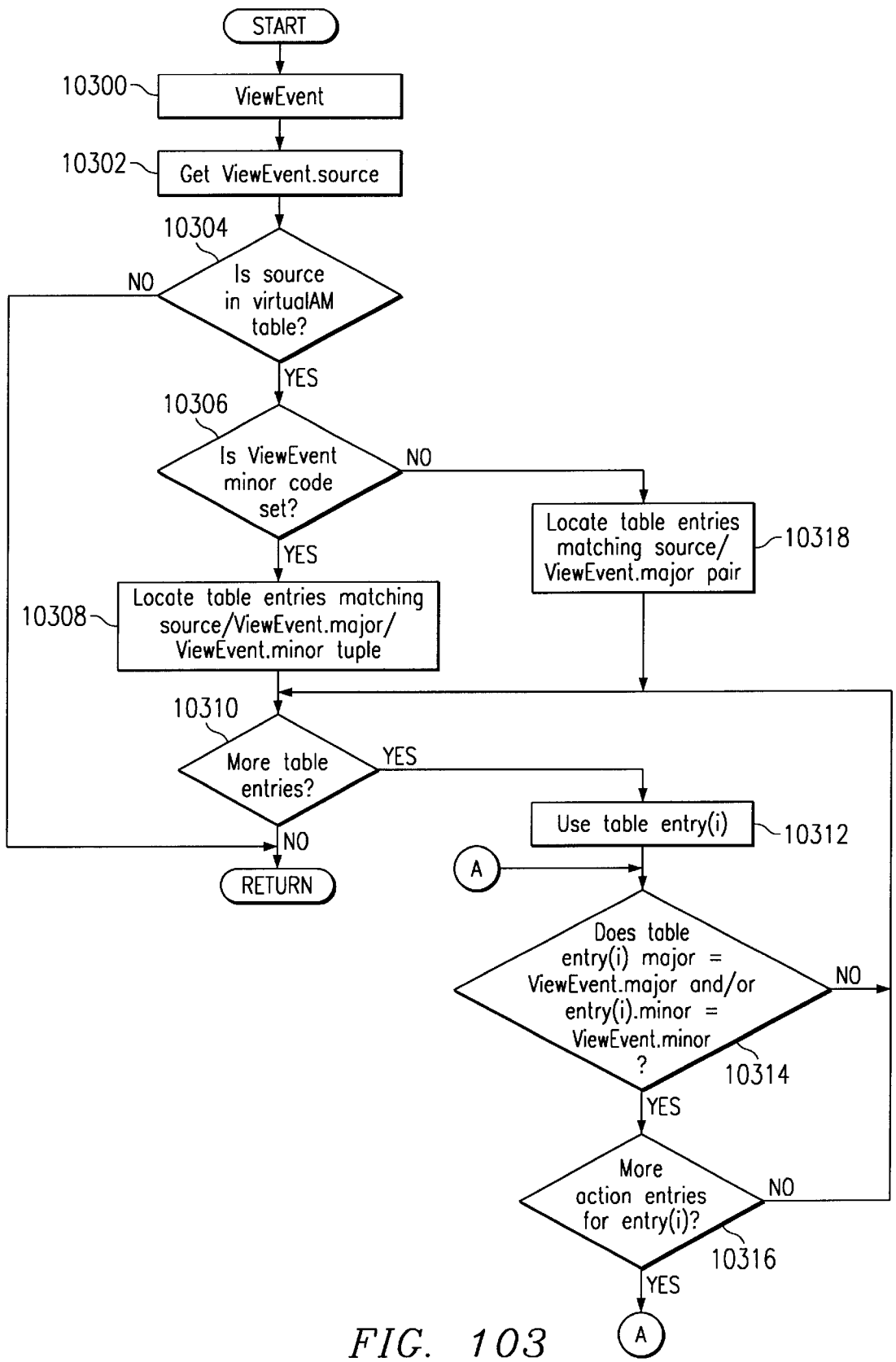
FIGS. 103 and 104 are virtual ApplicationMediator access state dispatching machine used to determine whether processing of a ViewEvent is needed depicted in accordance with a preferred embodiment of the present invention.
Figure 104:
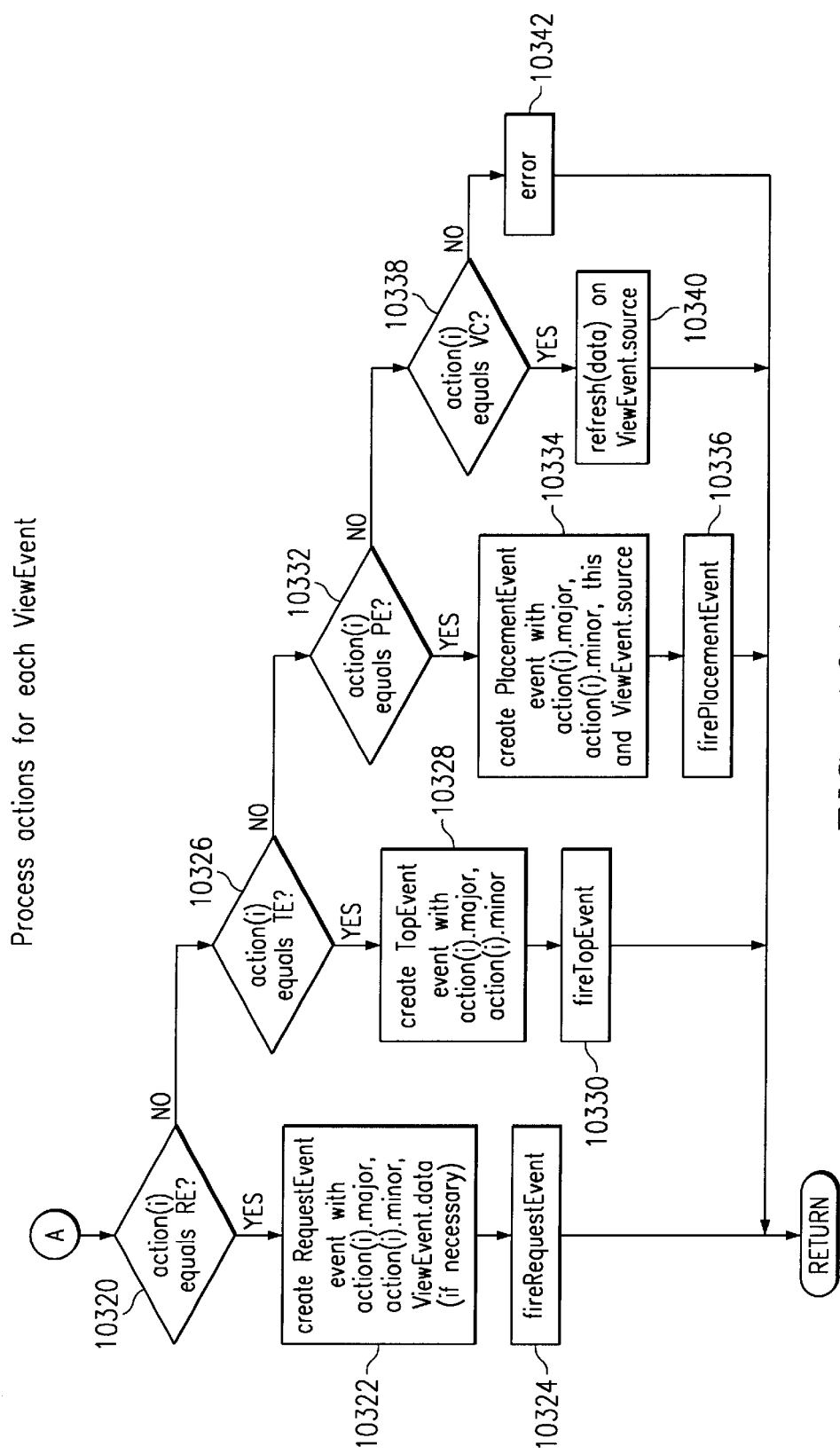

With reference now to FIGS. 103 and 104, an access state machine used to determine whether processing of a ViewEvent is needed is depicted in accordance with a preferred embodiment of the present invention. The process begins by receiving a ViewEvent (step 10300). After the ViewEvent.source is located (step 10302), a determination is then made as to whether the source is in a virtual ApplicationMediator list. (step 10304). If the ViewController is not located in the dispatch table, the process returns. Otherwise, a determination is made as to whether a minor code has been set for the ViewEvent (step 10306). If a minor code has been set for the ViewEvent, then the table entries locate source/ViewEvent.major/ViewEvent.minor tuple (step 10308).

The process then determines whether more table entries are present for processing (step 10310). If more table entries are not present for processing, the process returns. Otherwise, table entry (i) is used (step 10312). A determination is made as to whether table entry(i) has a major equal to ViewEvent.major and/or entry(i).minor is equal to ViewEvent.minor (step 10314). If the table does not have a major equal to the major for the ViewEvent, the process returns to step 10310 to see if more table entries are present for processing. Otherwise, a determination is made as to whether more action entries are present for entry(i) (step 10316). If additional action entries are not present, the process also returns to step 10310.

With reference again to step 10306, if the ViewEvent is not a minor code set, then the table entries matching source and the major pair for the ViewEvent are located (step 10318) with the process then returning to step 10310.

With reference again to step 10316, if more action entries are present for entry(i), the process then proceeds to FIG. 104 and determines whether action(i) is equal to RE (step 10320). If action(i) equals RE, then a RequestEvent is created with action(i) major, action(i) minor, ViewEvent.data (step 10322). Thereafter, the RequestEvent is fired (step 10324) with the process then returning. With reference again to step 10320, if action(i) does not equal to RE, then a determination is made as to whether action(i) equals TE (step 10326). If action(i) equals TE, then a TopEvent is created with an action(i) major and an action(i) minor (step 10328). Thereafter, the TopEvent is fired (step 10330) with the process then returning.

With reference again to step 10326, if action(i) does not equal TE, then a determination is made as to whether action(i) is equal to PE (step 10332). If action(i) is equal to PE, then a PlacementEvent is created with an action(i) major and an action(i) minor along with a ViewEvent source (step 10334). Thereafter, the PlacementEvent is fired (step 10336) with the process returning. With reference again to step 10332, if action(i) does not equal to PE, then determination is made as to whether action(i) is equal to VIEWCONTROLLER (step 10338). If action(i) is equal is VIEWCONTROLLER, then a refresh data is performed on the source for the ViewEvent (step 10340) with process then returning. With reference again to step 10338, if action(i) does not equal ViewController, then an error has occurred and an error is generated (step 10342) with the process then returning K. Serialization/Deserialization When communications take place between the client and the server, it is convenient to "pack" an object into a single entity, send it over the network, and then "unpack" it at the other end. The Serialize packs the object for transmission and the Deserializer unpacks it at the other end.

With reference now to FIG. 105, a diagram of a serializer system is depicted in accordance with a preferred embodiment of the present invention. Serializer system 10500 is used to serialize data for transfer. With reference to FIG. 106, a deserialier is depicted in accordance with a preferred embodiment of the present invention.

When an object is serialized, the object is being written to an external source. The size of the data array is first written and then the data is sent to a serializer for serialization. Typically, a serializer will look up the code for the data element, write the code to the stream, and then look up the serializer for the element. If the serializer for the element exists, then the serializer is allowed to write the element. Otherwise, if the element is "externalizable", it is allowed to write itself. In this last case, it is a call to the method writeExternal on the data element. If the element does not have a serializer and is not externalizable, then it is written as a standard object. Such a writing of the element as a standard object is expensive in terms of serialization space and time and should not happen under normal circumstance.

When an object is read, the size of the data array is read. Thereafter, a base serializer class is used to read each data element. The code for the data element is read and looked up to see if a serializer exists for the code. If a serializer exists, then the serializer reads the data elements and creates the object. Otherwise, an instance of the element type is created. If the element is externalizable, the element is allowed to read itself. This may be accomplished through a call to readexternal on the data element. Otherwise, the data element is read into an object.

The default serialization provided by Java writes the class name of the data element then the attribute name and the value for each attribute of the data element. The size benefit provided by the present invention comes from writing a code representing the element type instead of the type name and the attributes that are required to recreate the data objects without writing the names of the attributes. For example, an integer is written as follows: The class name [java.lang.Inter], the attribute name [value java.lang.Number], the attribute value [00 00 00 08] size: 81 bytes. Alternatively enhanced serialization: the code [01], the value [00 00 00 08] size: 11 bytes.

With reference now to FIGS. 107A–107C, a diagram illustrating an object array is depicted in accordance with a preferred embodiment of the present invention. Typically user defined data classes extend a class similar to that shown in FIGS. 107A–107C. Specifically, FIGS. 107A–107C illustrates an object array that contains all the attributes of the user-defined data. The subclasses just provide getter/setter methods (i.e. getXXX( ) and setXXX( ) methods where XXX is a particular attribute name). These getter and setter methods just access the object array in FIG. 107 using getData and setData methods based on an index for the attribute. This is a common extension of using an indexed-array data model combined with an attribute-based object model. The advantage of this model is to reduce the serialization size by removing the attribute names that are typically outputted in the default Java serialization mechanism.

Turning now to FIGS. 108A–108B, a diagram illustrating code used in a serialization method is depicted in accordance with a preferred embodiment of the present invention. The mechanism of the present invention adds to the serialization method 10800 provided in FIGS. 108A–108B. To use the special serialization, any and all user-defined data classes can extend the BaseDataS class 10800 illustrated in FIG. 108. In Java, the default Java serialization for an object can be overridden by implementing the Externalizable interface illustrated in FIG. 109 and implementing the methods readExternal and writeExternal for reading/writing from/to input/output stream.

Method 10800 uses the BaseSerializer class, as illustrated in FIGS. 110A–110O for implementing default serialization for many of Java's base classes and even some of Java's collection classes. Also, the user can specify a serializer for other data classes by implementing the SerializerIF interface 10900 in FIG. 109 and listing the serializer's class name on the same line after the data class name in the ClassNames.ini file separated by a space. If no serializer is specified and none are provided by the BaseSerializer 11000, then the default Java serialization method for that class is used.

Using this new serialization mechanism coded in the read/write External methods of BaseDataS method in FIGS. 108A–108B and BaseSerializer method 10800 in FIG. 109 provides the benefits of reduced serialization size. The combination of the two mechanisms above provide the 80% reduction in serialization size.

In these examples, the serialization process of the present invention is able to reduce the serialization size further by completely removing any full-path class name strings that are typically outputted in the default Java serialization. Of course, depending on the implementation, other information may be removed and processed a similar manner to the full-path class name strings.

The number and length of these class name strings can be incur a high amount of overhead for serialization. The only disadvantage is that the actual class names must be provided on both sides of serialization (reader/writer). The class names are hashed and the hash code is stored in the serialization instead of the actual full class name. (This is why the classes need to be listed in the ClassNames.ini file and provided on either side of the client/server that needs serialize/unserialize the data). Another way to reduce this dependency is to automatically send the class names once before any other communication between client/server is done.

Figure 111:
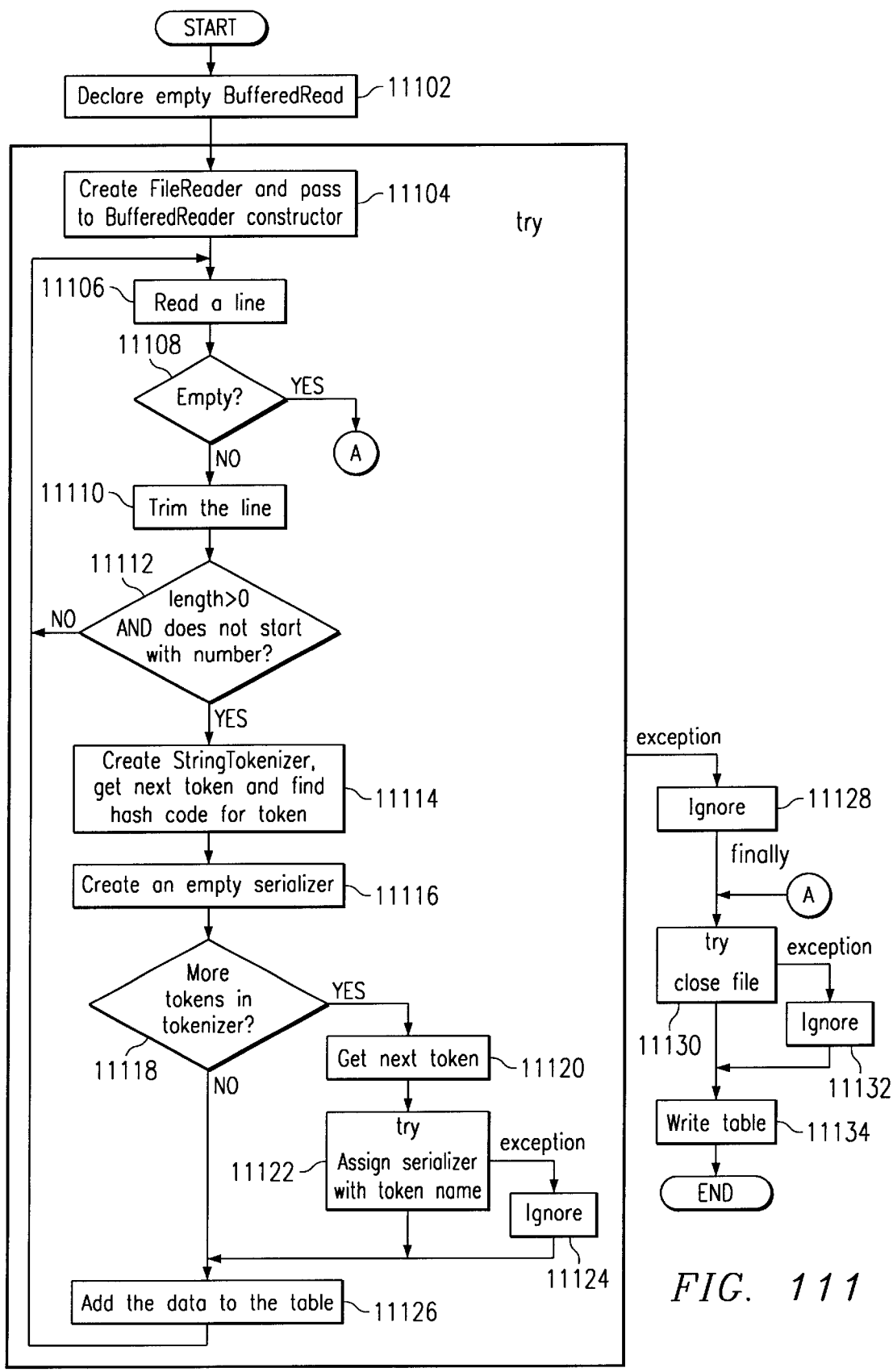
FIG. 111 is a flowchart of a process for using a serializer depicted in accordance with the preferred embodiment of the present invention.

The ClassNames.ini file contains a sequence of lines that are either a class name for a user-defined data class or a class name followed by a serializer's class name if the user created their own serializer for that particular data class. If no serializer is provided and the data class is not in the BaseSerializer, then the default Java serializer for the data class is used. The process of reading this file produces a table that contains the class name, a hash code, and a serializer. The flowchart in FIG. 111 shows how the ClassNames.ini file is read.

Since the read will be buffered, an empty BufferedRead object is declared (step 11102). A FileReader object is created and passed to the constructor for the BufferedRead object (step 11104). Each line of the file is read sequentially (step 11106). A determination is then made as to whether there is additional data in the file (step 11108). If so, control passes to the finalization code (step 11130). Otherwise, the line is trimmed (step 11110), which means all leading and trailing spaces are removed. Next, a determination is made as to whether the line length is 0 or it begins with a # (indicating a comment) (step 11112). If not, the process returns to step 11106 where another line is read. For lines with data, a string tokenizer is created and the first token is read (this is the class name) and the Java method hashcode( ) is applied to the class name to find an associated integer value (step 11114); this integer value is used for hash table processing. StringTokenizer is a built-in Java class that breaks a string into its components, much like a sentence could be broken into separate words. Next, an empty serializer is created (step 11116).

A determination is then made as to whether there is another token (step 11118). If so, then it is fetched (this is a user-defined serializer name) (step 11120) and a serializer is created using this name (step 11122). If this causes an exception, it is ignored (step 11124) and the class name, hash code, and serializer name are added to the table (step 11126). Control returns to step 11106 to read the next line from the file. If an exception occurs at any time while processing the ini file, it is ignored (step 11128). The finalization code closes the file (step 11130); any exception is ignored (step 11132). Then the table is written (step 11134) completing the process of reading the ini file. With reference again to step 11122, if there are no additional tokens in the tokenizer, the process proceeds directly to step 11126 as described above.

L. Permissions

A permission is a capability that a user is allowed to perform. For example, given a user (defined with a user id, password, location, etc.), this user's capabilities may include running ApplicationMediator 1 and 2, but not 3. Similarly, the same user may be allowed to operate ViewController 1 and 2 in ApplicationMediator 1, but not ViewController 3. Similarly, the same user may be allowed to use all of the GUI components in ViewController 1 in ApplicationMediator 1, except the "next" button, which is disabled.

A permission is the encoding of the above functionality. It is defined as part of the enterprise deployment business processes and security model. Enterprise support to maintain storage of permission data is required for JTC permissions to operate.

For example, using the above description, [Joshua: "AM1=yes AM2=yes AM3=no"] would be defined before deployment and stored in a database and later to be sent to the client. The client program knows that, while the current user is Joshua, AM3 cannot be started.

For another example, [Jacob: "AMI: VC1=yes VC2=yes VC3=no"] would be defined before deployment and stored in a database and later to be sent to the client. Now the client program knows that, while the current user is Jacob and running AM1, Jacob cannot use VC3.

For example, [John:"AM1.VC1: customerlist=yes ok=yes previous=yes namefiled=yes next=no"] would be defined before deployment and stored in a database and to be sent to the client. Now the client program knows that, while the current user is John and running AM1, and in VC1, the customerlist, ok button, previous button, and namefield are enabled while the next button is disabled. The JTC ApplicationMediators and ViewControllers alter their internal state when setPermissions method is called. They do not hard code user permission information. They do check a system specific user session and compare it to their permission state to determine what actions to alter for ViewEvents, PlacementEvents, etc.

Likewise, possibly at build time, the ApplicationMediators and ViewControllers, when called with getPermissions, will return the sets of "keys" that they will react to at runtime. The actual value of the keys (for example, "yes" above) is implementation and business specific.

With respect to permissions, user will typically login to an Application. Login validation is typically provided by external services. The user may have a role based on various attributes, such as user ID, password, location, or time. After logging in, the user will execute the Application as defined by the role. Sometimes, functions provided by another role not accessible by the current user may be required. For example, a cashier may need to void a transaction, requiring the manager to issue an override. For another example, a salesperson may need a branch banking loan officer to approve a loan. In such a case, a new user will login to supplement or replace the current user. The new user can execute the Application according to the new role. In such a case, more functionality may be enabled. Thereafter, the new user will logout. The architectural pattern of the present invention provides a key/value pair of permissions model to support such roles. In such a case, ApplicationMediators may enable and disable ViewControllers while ViewControllers enable and disable GUI parts. In such a case, an ApplicationMediator will return a list of "keys" that represent alterable items. These are usually ViewControllers. New ViewControllers will return a list of "keys" that represent alterable items. These are usually GUI related components, containers and beans. A user management system may create a GUI tool to map role definitions to the ApplicationMediator and ViewController permission keys (i.e. IBM's On Demand Server). In such a case, for example, for each key, a well defined value is stored that defines the alterable item. These keys/value mapping are stored in a database. In setting permissions, if a login is successful, the login and service provider will provide the key/value mappings. For example, ApplicationMediators will be passed the key/value mappings. In turn, the ApplicationMediators will pass them to the ViewControllers associated with the ApplicationMediators.

The perssmission information is almost always retrieved or changed via a change in user login (security). A JTC application may choose to create a simple list of the user login sessions. Each session may contain permissions for the user as well as properties, references to ApplicationMediators and references to ViewControllers. A policy of a single current user, two current users or multiple current users may be implemented. In all cases, the ApplicationMediators and ViewControllers do not know why properties are being set, they are just set because top level ApplicationMediator receives the properties data from the server or the login session list and calls the setPermissions method.

Figure 112:
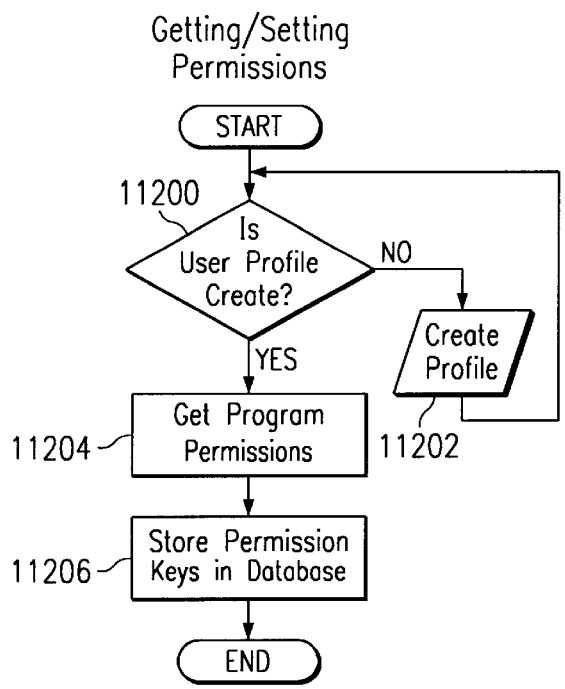
FIG. 112 is a flowchart of a process for statically creating matching user profiles and associated JTC permission keys for JTC programs, where keys are built by recursively querying JTC ApplicationMediator and ViewController objects, depicted in accordance with a preferred embodiment of the present invention.

FIGS. 112–119 are a series of flowcharts describing the process for getting and setting permissions are depicted in accordance with a preferred embodiment of the present invention. With reference now to FIG. 112, a high level flowchart of a process for obtaining permissions is depicted in accordance with a preferred embodiment of the present invention. The process begins by determining whether a user profile has been created (step 11200). If a user profile has not been created, the process creates a user profile (step 11202). Thereafter, the process returns to step 11200. If a user profile has been created, then program permissions are obtained (step 11204). These program permissions are stored as permission keys in a database (step 11206) with the process terminating thereafter.

Figure 113:
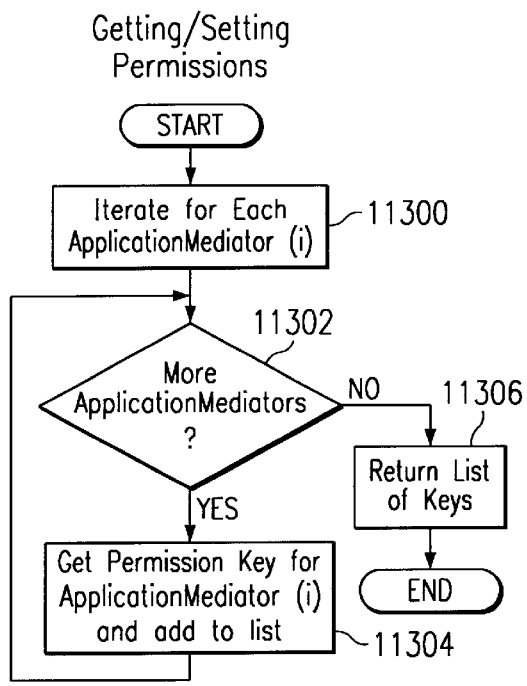
FIG. 113 is a flowchart of a process for a JTC program building a database of permission keys by iterating over JTC ApplicationMediator's getPermissions method and returning permission keys that are ViewController names that are alterable at runtime depicted in accordance with a preferred embodiment of the present invention.

With reference now to FIG. 113, a flowchart of a process for getting program permissions is depicted in accordance with a preferred embodiment of the present invention. The process is iterated for each ApplicationMediator created (step 11300). A determination is made as to whether more ApplicationMediators are present (step 11302). If more ApplicationMediators are present that have not been processed, then the permission keys for the particular ApplicationMediator are added to the list (step 11304) with the process then returning to step 11302. With reference again to step 11302, if more ApplicationMediators are not present for processing, then a list of keys are returned (step 11306) with the process terminating thereafter.

Figure 114:
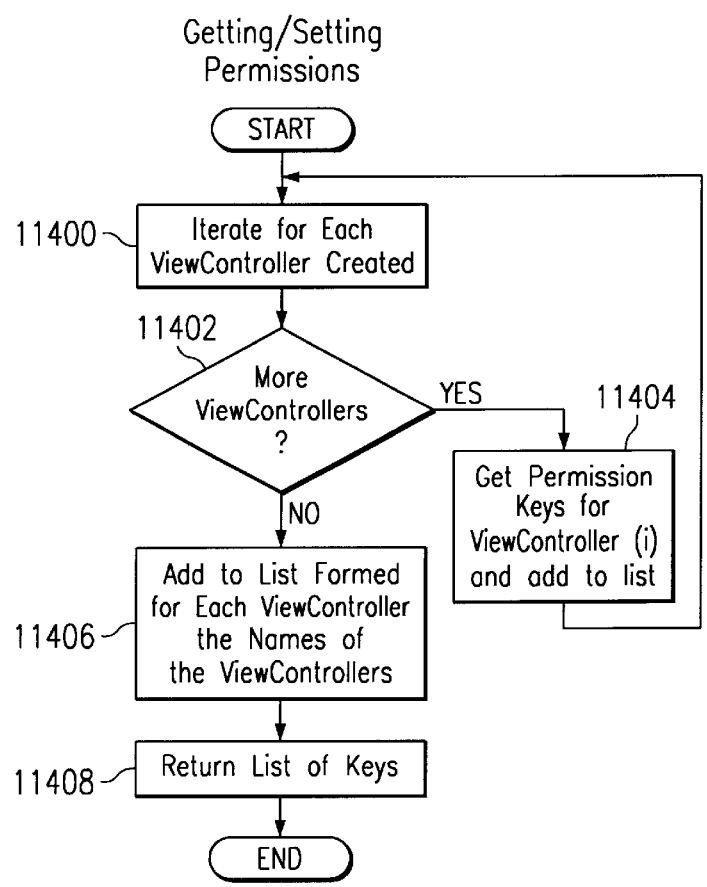
FIG. 114 is a flowchart of a process for a JTC ApplicationMediator building a database of permission keys by iterating over JTC ViewController's getPermissions method and returning permission keys that are names known only to the ViewController and hat are alterable at runtime depicted in accordance with a preferred embodiment of the present invention.

With reference now to FIG. 114, a flowchart of a process for obtaining ApplicationMediator permissions is depicted in accordance with a preferred embodiment of the present invention. The process begins by iterating for each ViewController created (step 11400). A determination is then made as to whether more ViewControllers are present for processing (step 11402) If more ViewControllers are present, then the permission keys for the ViewController are obtained and added to the list (step 11404) with the process then returning to step 11400.

With reference to step 11402, if more ViewControllers are not present for processing, then the names of the ViewControllers are added to the list formed for each ViewController (step 11406). Next, a list of keys are returned (step 11408) with the process terminating thereafter.

Figure 115:
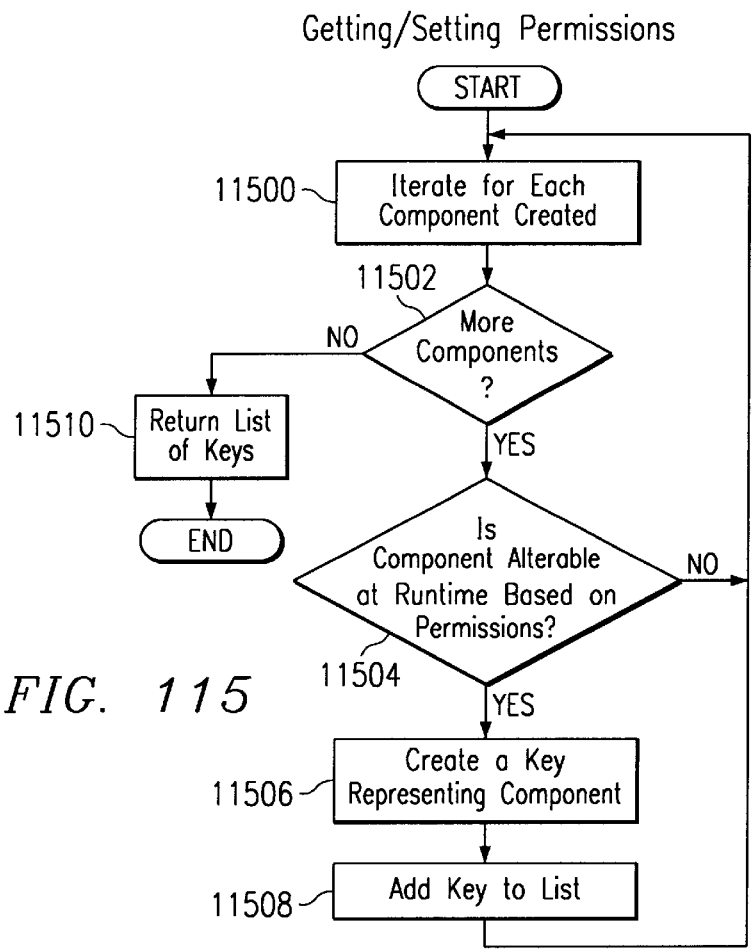
FIG. 115 is a flowchart of a process for a JTC ViewController building a database of permission keys by iterating over runtime alterable components, containers and beans and returning permission keys that are component, container or bean names that are alterable at runtime depicted in accordance with a preferred embodiment of the present invention.

With reference now to FIG. 115, a flowchart of a process for obtaining ViewController permissions is depicted in accordance with a preferred embodiment of the present invention. The process begins by iterating for each component, container or bean created (step 11500). A determination is made as whether more components are present for processing (step 11502). If more components are present, a determination is then made as to whether the component is alterable at run time based on permissions (step 11504). If the component is not alterable at run time, then the process returns to step 11502 to process another component. Otherwise, a key representing the component is created (step 11506). The key is then added to the list (step 11508) with the process then returning to step 11500. With reference to step 11502, if more components are not present, then a list of keys are returned to step 11510 with the process terminating thereafter.

Figure 116:
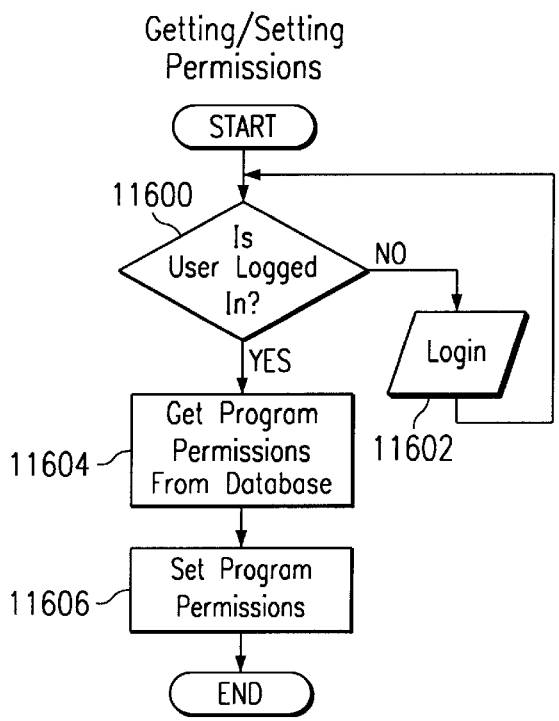
FIGS. 116 is a flowchart of a process for a JTC program accepting a database of permission keys by retrieving permission key/value data supplying the data to a JTC program depicted in accordance with a preferred embodiment of the present invention.

With reference now to FIG. 116, a flowchart of a process for setting permissions is depicted in accordance with a preferred embodiment of the present invention. The process begins by determining whether the user is logged in (step 11600). If the user is not logged in, then a login process is performed (step 11602) with the process then returning to step 11600.

When the user is logged in, program permissions are obtained from the database (step 11604). Thereafter, the program permissions are set (step 11606) with the process then terminating.

Figure 117:
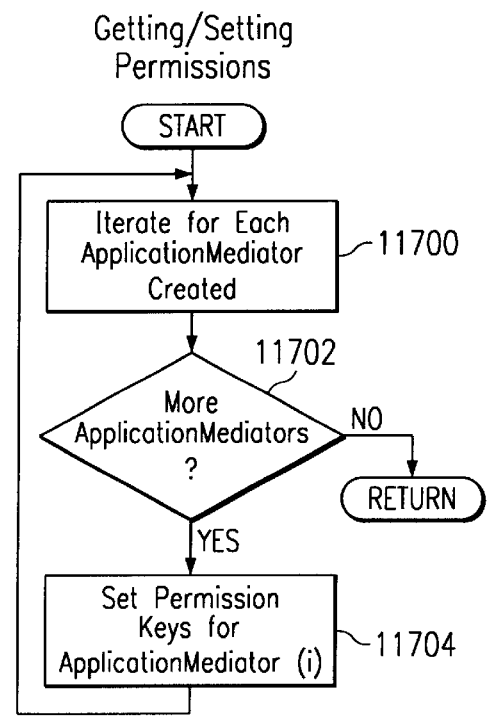
FIG. 117 is a flowchart of a process for a JTC program supplied with a setting of permission key/value data and iterating over all ApplicationMediators and passing the key/value data through setPermissions depicted in accordance with a preferred embodiment of the present invention.

With reference now to FIG. 117, a flowchart of a process for setting program permissions is depicted in accordance with a preferred embodiment of the present invention. The process begins with iterating through each ApplicationMediator present and selects an ApplicationMediator for processing (step 11700). A determination is then made as to whether more ApplicationMediators are present (step 11702). If more ApplicationMediators are not present, the process then returns. Otherwise, permission keys are set for the particular ApplicationMediator being processed (step 11704) with the process then returning to step 11700.

Figure 118:
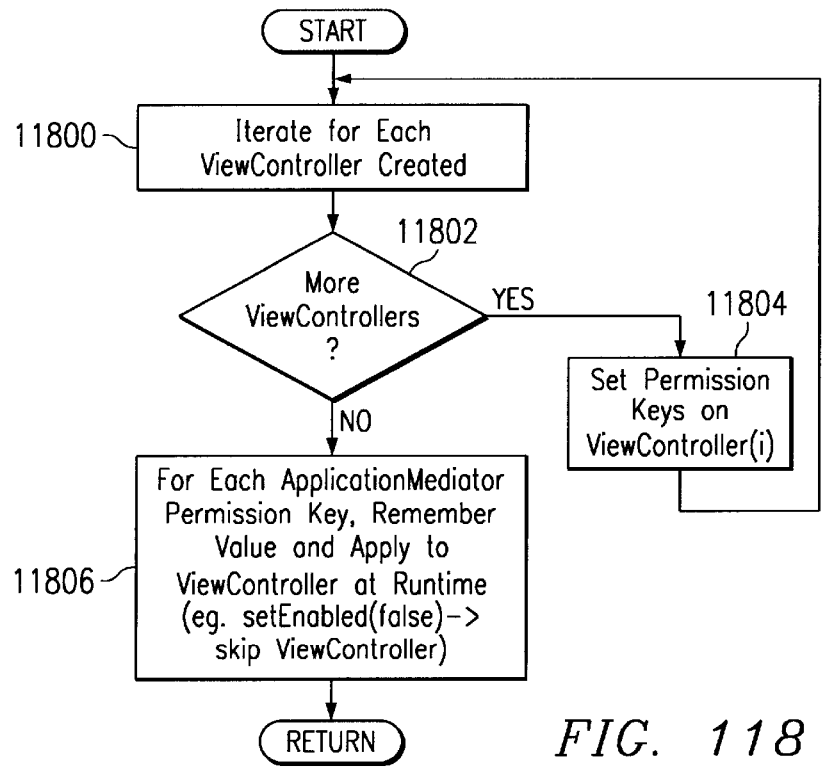
FIG. 118 is a flowchart of a process for a JTC ApplicationMediator called with setPermissions of permission key/value data and iterating over all ViewControllers and passing the key/value data through setPermissions depicted in accordance with a preferred embodiment of the present invention.

With reference now to FIG. 118, a flowchart of a process for setting ApplicationMediator permissions is depicted in accordance with a preferred embodiment of the present invention. The process begins by selecting a ViewController for processing and will iterate through each ViewController present(step 11800). Thereafter, a determination is made as to whether more ViewControllers are present (step 11802). If more ViewControllers are present for processing, the process then sets permission keys for the particular ViewController (step 11804) with the process then returning to step 11800. With reference back to step 11802, when additional View Controllers are not present for processing, then for each ApplicationMediator permission key, the value is remembered and applied to the ViewController at one time (step 11806) with the process returning thereafter.

Figure 119:
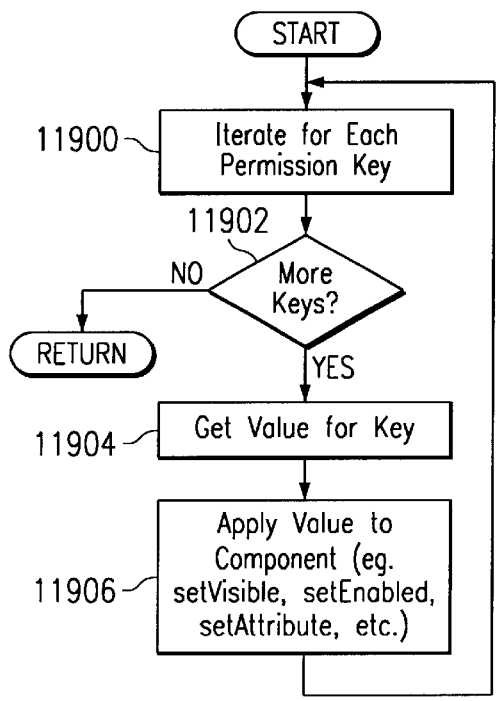
FIG. 119 is a flowchart of a process for a JTC ViewController called with setPermissions of permission key/value data and iterating over the permission keys, identifying the corresponding components, containers and beans, and applying the value to the components, containers and beans, depicted in accordance with a preferred embodiment of the present invention.

With reference to FIG. 119, a flowchart of a process for setting ViewController permissions is depicted in accordance with a preferred embodiment of the present invention. The process begins by selecting a permission key for processing and will iterate for each permission key (step 11900). A determination is then made as to whether more permission keys are present (step 11902). If more permission keys are present, the process then gets the value for the key (step 11904). Thereafter, a value is applied to the particular components (step 11906). The value may be, for example, related to the method setVisible, setEnabled, or setAttribute. The process then returns to step 11900. With reference to step 11902, if more keys are not present, the process then returns.

VIII. Example Patterns

Figure 120:
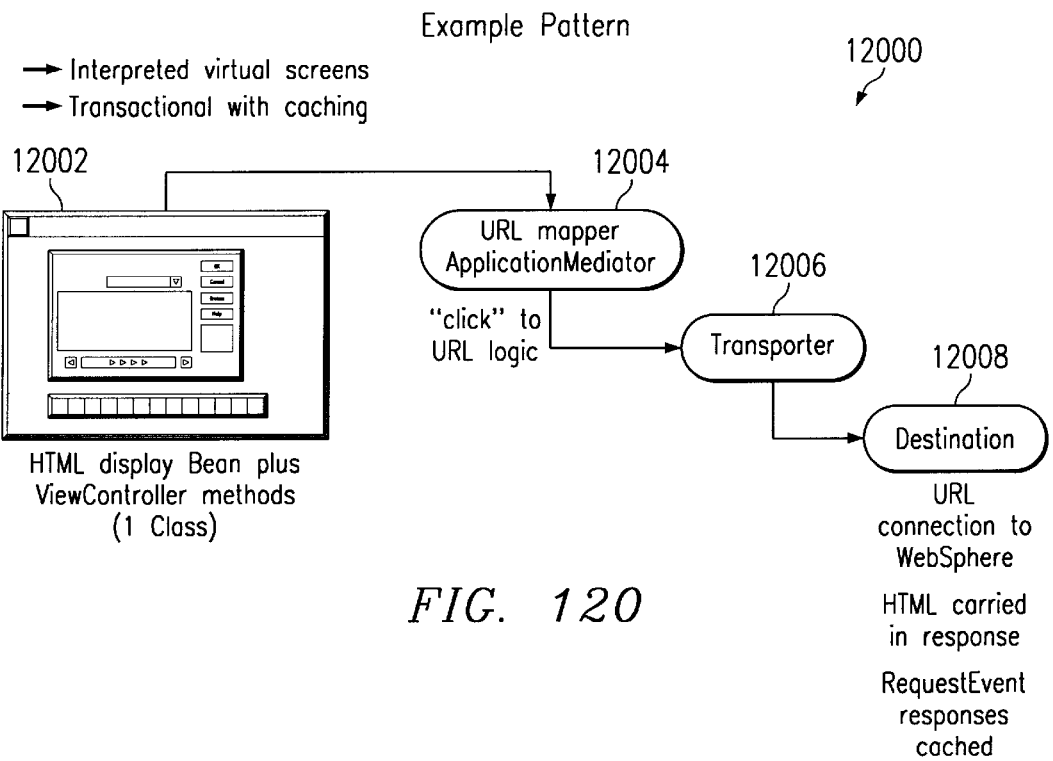
FIGS. 120–123 illustrate example patterns using the architectural pattern of the present invention depicted in accordance of a preferred embodiment of the present invention.

FIGS. 120–123 illustrate example patterns using the architectural pattern of the present invention. Turning now to FIG. 120, a sample pattern for a Uniform resource locator (URL) mapper 12000 is depicted in accordance with a preferred embodiment of the present invention. URL mapper 12000 is a pattern which provides a mapping to URL links that are cached. The user interface 12002 is part of the ViewController. User interactions that are AWT events are translated to ViewEvents that are processed by the ApplicationMediator 12004. These ViewEvents become RequestEvents that are sent via the transporter 12006 to the destination 12008. The RequestEvent responses carry the hypertext markup language (HTML) and are cached.

Figure 121:
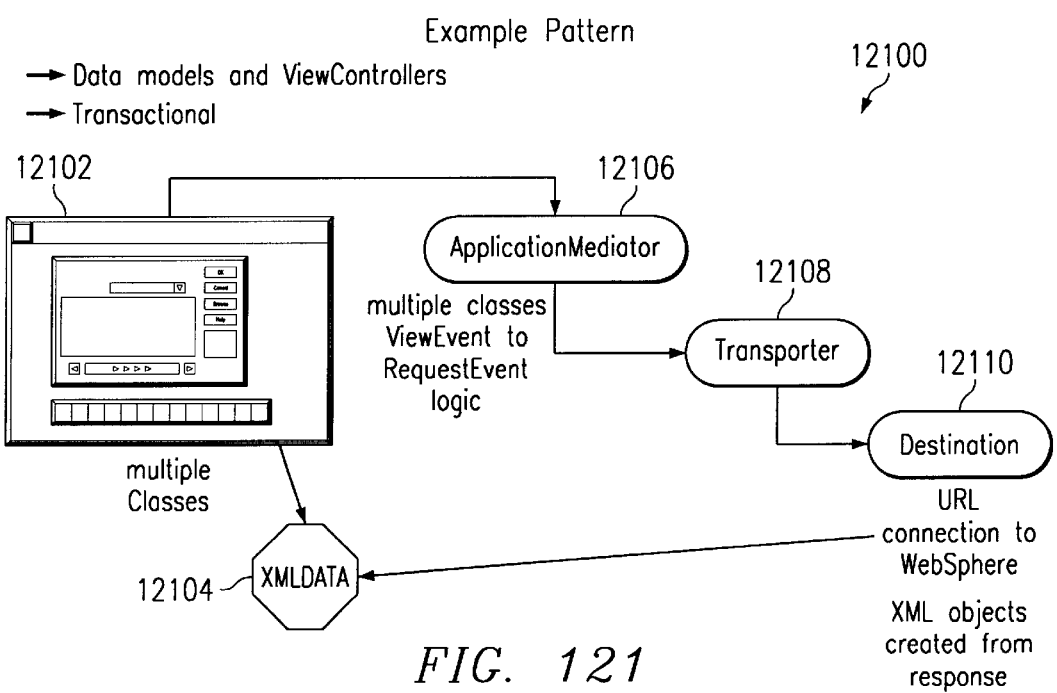

With reference now to FIG. 121, a data model using the architectural pattern of the present invention is depicted in accordance with a preferred embodiment of the present invention. In this example, pattern 12100 in FIG. 121 illustrates the use of data models. The user interface 12102 is implemented as multiple classes that can interact with an XML database 12104. ViewEvents generated as a result of user interaction are translated into RequestEvents by the ApplicationMediator 12106. These RequestEvents are sent to the destination 12110 via the transported 12108. The RequestEvent responses carry XML objects that are put into the XML database.

Figure 122:
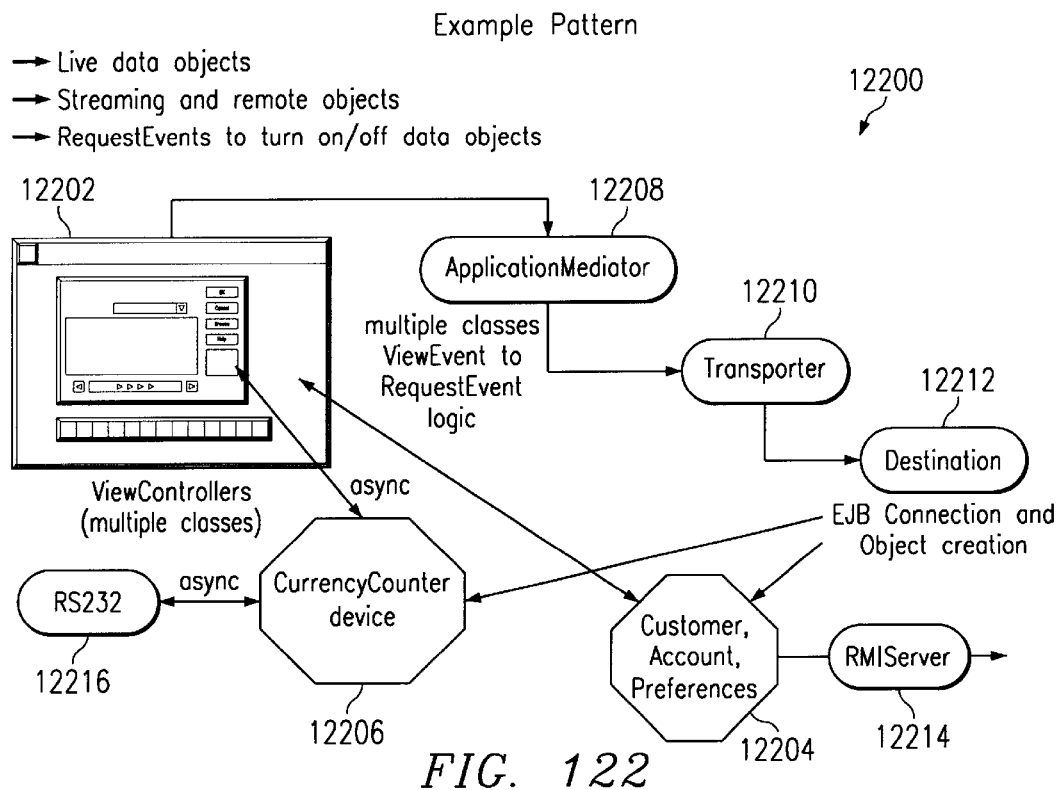

Turning next to FIG. 122, a diagram illustrating interaction with logged data objects processed in a streaming environment is depicted in accordance with a preferred embodiment of the present invention. In this example, the pattern 12200 in FIG. 122 illustrates interaction with live data objects processed in a streaming environment. The user interface 12202 is implemented as multiple classes that can interact with a Customer database 12204. There is also asynchronous interaction with CurrencyCounter 12206 that keeps track of the data objects. ViewEvents generated as a result of user interaction are translated into RequestEvents by the ApplicationMediator 12208. These RequestEvents are sent to the destination 12212 via the transported 12210. This is an Enterprise Java Beans application where EJB objects are sent back as part of the responses. These objects affect both the Customer database 12204 and the CurrencyCounter 12206. The Customer data 12204 can also be accessed remotely through an Remote Method Invocation (RMI) server 12214. The CurrencyCounter 12206 also communicates asynchronously with an RS232 port 12216.

A JTC program and its elements (i.e. Transporters, Destinations, ApplicationMediators, ViewControllers, components/containers, beans and the main program) all implement the JTC interface. If a reference to the main program is available, a call may be made to getJTCs and a list of all the objects that main allocates that implement the JTC interface are returned. This mechanism is independent of the AWTEvent, ViewEvent, RequestEvent paths.

Iteration can be performed over this list and a determination can be made what the object types with the type of the object, the type of listeners it supported by the objects can be identified. Therefore, a process can be added to objects as a listener as long as the callback method is supported. This can be done for any object type. This normally includes JTC objects and AWT (includes AWT and JFC) objects.

For any object, numerous events may be generated. These events are associated with an interface. If an object is added as a listener to the object for these events, the object must implement the numerous methods associated with the numerous interfaces to support the numerous events from the various types of objects.

After the event arrives, numerous actions may result ranging from logging, to tracing, to connecting to a network and sending them out of the box, to generating further events. A tracing program can in fact be a JTC program and it can be hooked (traced) while it is tracing another JTC program. A graph-tree of programs may be built where the root is the top level program and the root listens to its children and so forth, until the leaves are reached and they are just running JTC programs.

Although events such as AWTEvent, ViewEvent, RequestEvent, and TopEvent, still occur anywhere in the graph, they do not cause the hooking via getJTCs/getAWTs to start. This is done primarily when the program is launched. It could be initiated in the event path. Alternatively, the TopEvent may cause the hooking to start. For example, the user hits "help" in a ViewCoritroller that causes a ViewEvent to a RequestEvent to launch a request for help and it also sends a TopEvent to trace the program and send the events to a call center over the network.

Figure 123:
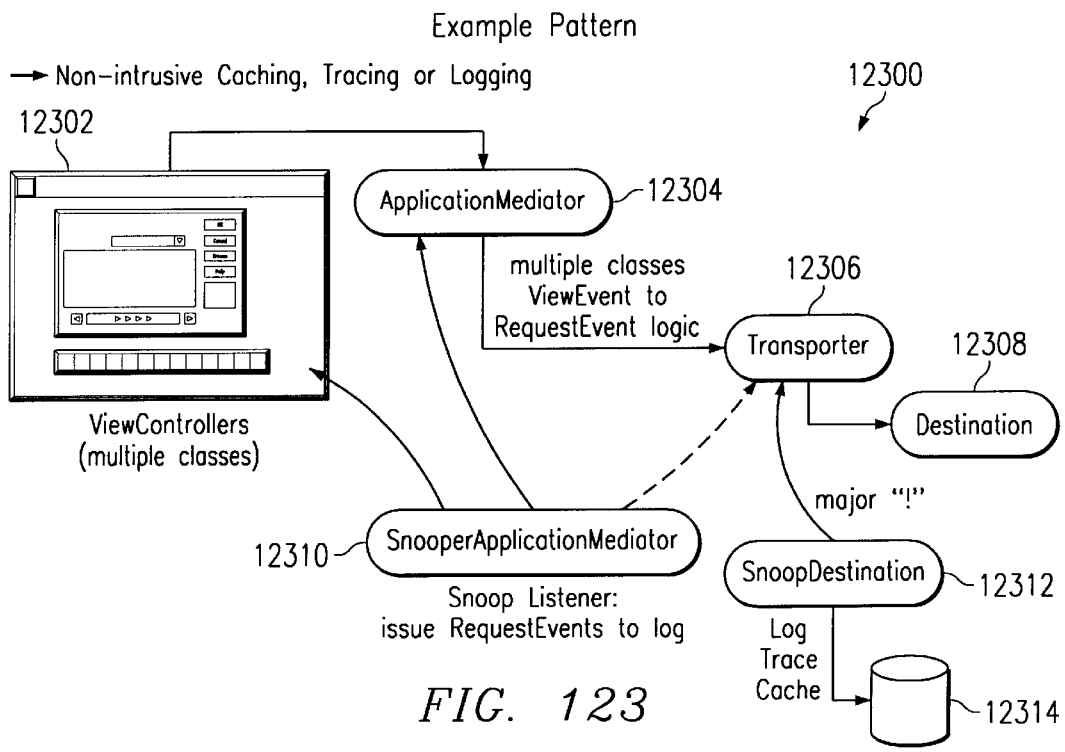

With reference next to FIG. 123, a diagram illustrating nonintrusive caching, tracing, or logging using an architectural pattern is depicted in accordance with a preferred embodiment of the present invention. Pattern 12300 in FIG. 123 shows how non-intrusive caching, tracing, or logging can be added to any thin client pattern. The main sequence of events from the application perspective is ViewEvents generated in the ViewControllers 12302 being handled by the ApplicationMediator 12304 and translated into appropriate RequestEvents. These RequestEvents are passed on to the destination 12308 via the transported 12306. A SnooperApplicationMediator 12310 runs in parallel with the application. The SnoopListener monitors ViewEvents and RequestEvents and, as appropriate, issues RequestEvents to the logging system. The SnoopDestination 12312 can log, trace or cache information on an appropriate storage device 12314.

Thus, the present invention provides an architectural pattern that may be used to create Internet friendly Java applications, which are small, fast, and flexible. Additionally, through the architectural pattern of the present invention, the object reuse on a client may be between 50 to 100 percent. Additionally, the architectural pattern and methodology of the present invention reduces the time needed to develop an application. By the separation of the functions and processes as described above, a client application may be designed, implemented, and tested as parallel tasks in the client application. By the separation of the functions and processes as described above, a client application may be designed, implemented, and tested in parallel with the server application. Through the present invention, lock-step designing and testing may be eliminated. The addition of new network protocols, new servers and new data models are straight forward and easily performed. Also, changing the graphical user interface to change the look and feel of an application also is easily performed through the compartmentalization and segregation of duties and functions set out in the architectural pattern of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted architectural pattern is illustrated in a Java programming environment, the architectural pattern of the present invention may be applied to other types of programming environments. For example, VisualBasic, C++ and Smalltalk are other programming environments in which the processes of the present invention may be applied. In addition, the description of the classes along with the variables, constructors, and methods are provided for purposes of illustration only. Classes, variables, constructors, and methods may vary depending on the particular implementation. Illustration of these classes, variables, constructors are for illustrative purposes and not intended to limit the architectural pattern of the present invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a data processing system for processing events in an object oriented system, the method comprising the data processing system implemented steps of:
   responsive to receiving a selected user input to a container, sending a view event from a view controller to an application mediator, wherein the view event identifies an action to be taken to generate the selected user input;
   selectively generating a request event base on the view event, wherein the request event includes a major code identifying a class name as a destination and a minor code identifying a method name of a function to be invoked; and
   sending the request event to a transporter; and
   responsive to receiving the request event at the transporter, sending the request event to a destination object within a plurality of destination objects based on in the class name.

2. The process of claim 1, wherein the action is a pressing of a button displayed in the container.

3. The process of claim 1, wherein each of the plurality of destination objects is associated with a destination and wherein each or the plurality of destination objects translates the request event into a format recognizable by the destination.

4. The process of claim 3, wherein the plurality of destinations is a plurality of applications located on a remote data processing system having an ability to communicate with the data processing system.

5. The process of claim 4, wherein the request event is used to invoke the method at the destination.

6. The process of claim 1, wherein the request event includes data in a form of parameters for the method.

7. The process of claim 4, wherein the request event is used to alter a method at the destination.

8. The process for claim 4, wherein the request is event is used to access a class located at the destination.

9. A data processing system for processing events in an object oriented system, the data processing system comprising:
- first sending means, responsive to receiving the selected user input to a container, for sending a view event from a view controller to an application mediator, wherein the view event identifies an action to be taken to generate the selected user input;
- generating means for selectively generating a request event based on the view event, wherein the request event includes a major code identifying a class name as a destination and a minor code identifying a method name of a function to be invoked;
- second sending means for sending the request event to a transporter; and
- third sending means, responsive to receiving the request event at the transporter, for sending the request event to a destination object within a plurality of destination objects based on the class name.

10. The data processing system of claim 9, wherein the action is a pressing of a button displayed in the container.

11. The data processing system of claim 9, wherein each of the plurality of destination objects is associated with a destination and wherein each of the plurality of destination objects translates the request event into a format recognizable by the destination.

12. The data processing system of claim 11, wherein the plurality of destinations is a plurality of applications located on a remote data processing system having an ability to communicate with the data processing system.

13. The data processing system of claim 12, wherein the request event is used to invoke the data system at the destination.

14. The data processing system of claim 9, wherein the request event includes data in a form of parameters for the data processing system.

15. The data processing system of claim 12, wherein the request event is used to alter a data processing system at the destination.

16. The data processing system for claim 12, wherein the request event is used to access a class located at the destination.

17. A computer program product in a computer readable medium for processing events in an object oriented system, the computer program product comprising:
- first instructions, responsive to receiving a selected user input to a container, for sending a view event from a view controller to an application mediator, wherein the view event identifies an action to be taken to generate the selected user input;
- second instructions for selectively generating a request event based on the view event, wherein the request event includes a major code identifying a class name as a destination and a minor code identifying a method name of a function to be invoked;
- third instructions for sending the request event to a transporter; and
- fourth instructions, responsive to receiving the request event at the transporter, for sending the request event to it destination object within a plurality of destination objects based on its the class name.

* * * * *

UNITED STATES PATENT AND TRADEMARK OFFICE
CERTIFICATE OF CORRECTION

PATENT NO. : 6,748,570 B1
DATED : June 8, 2004
INVENTOR(S) : Bahrs et al.

It is certified that error appears in the above-identified patent and that said Letters Patent is hereby corrected as shown below:

Column 6,
Line 27, after "17A-", delete "17D" and insert -- 17E --;

Column 30,
Line 3, after "is the", delete "getjTCs()" and insert -- jetJTCs() --;

Column 33,
Line 47, after "Create a", delete "RecuestEvent" and insert -- RequestEvent --;

Column 38,
Line 32, after "processed", delete "by a" and insert -- . --;

Column 39,
Line 33, after "when a" delete ".";

Column 50,
Line 4, after "FIGS.", delete "86-F3" and insert -- 86-87 --;

Column 53,
Lines 57-58, after "additional", delete "ViewContollers" and insert
-- ViewControllers --;
Lines 60-61, after "of a" delete "ViewContoller" and insert -- ViewController --;

Column 66,
Line 39, after "event", delete "base" and insert -- based --;
Line 43, after "invoked;" delete "and";
Line 48, before "the class name." delete "in";
Line 53, after "each", delete "or" and insert -- of --;
Line 66, after "request" delete "is";

UNITED STATES PATENT AND TRADEMARK OFFICE
CERTIFICATE OF CORRECTION

PATENT NO. : 6,748,570 B1
DATED : June 8, 2004
INVENTOR(S) : Bahrs et al.

It is certified that error appears in the above-identified patent and that said Letters Patent is hereby corrected as shown below:

Column 67,
Line 4, after "receiving" delete "the" and insert -- a --;

Column 68,
Line 27, before "destination object within a", delete "it" and insert -- a --.

Column 68,
Line 28, after "based on" delete "its".

Signed and Sealed this

Twenty-fifth Day of October, 2005

JON W. DUDAS
*Director of the United States Patent and Trademark Office*